(12) United States Patent
Burch et al.

(10) Patent No.: US 7,982,350 B2
(45) Date of Patent: Jul. 19, 2011

(54) CONICAL MAGNETS AND ROTOR-STATOR STRUCTURES FOR ELECTRODYNAMIC MACHINES

(75) Inventors: Donald Burch, Los Altos, CA (US); John Patrick Petro, Los Altos, CA (US); Jeremy Franz Mayer, Mountain View, CA (US)

(73) Assignee: NovaTorque, Inc., Sunnyvale, CA (US)

( * ) Notice: Subject to any disclaimer, the term of this patent is extended or adjusted under 35 U.S.C. 154(b) by 271 days.

(21) Appl. No.: 12/080,788

(22) Filed: Apr. 3, 2008

(65) Prior Publication Data
US 2008/0278022 A1 Nov. 13, 2008

Related U.S. Application Data

(63) Continuation-in-part of application No. 11/925,661, filed on Oct. 26, 2007, now Pat. No. 7,884,522, which is a continuation-in-part of application No. 11/255,404, filed on Oct. 20, 2005, now Pat. No. 7,294,948.

(60) Provisional application No. 60/933,590, filed on Jun. 7, 2007, provisional application No. 60/622,258, filed on Oct. 25, 2004.

(51) Int. Cl.
*H02K 1/12* (2006.01)
*H02K 1/00* (2006.01)
*H02K 21/12* (2006.01)
*H02K 21/14* (2006.01)

(52) U.S. Cl. .............. 310/114; 310/156.38; 310/156.46; 310/156.49; 310/156.53; 310/156.55; 310/156.56; 310/254.1; 310/90; 310/90.5

(58) Field of Classification Search ............. 310/156.46, 310/156.59, 114, 156.38, 156.49, 156.53, 310/156.55, 156.56, 254.1, 90, 90.5; *H02K 1/12, H02K 21/12, 21/14*
See application file for complete search history.

(56) References Cited

U.S. PATENT DOCUMENTS
414,659 A 11/1889 Seafert
(Continued)

FOREIGN PATENT DOCUMENTS
CH 400323 4/1966
(Continued)

OTHER PUBLICATIONS

Lee W. Young; Notification of Transmittal of the International Search Report and The Written Opinion of the International Searching Authority, or the Declaration; International Application No. PCT/US08/66072; Date of Mailing Aug. 18, 2008; Form PCT/ISA/220; 1 page.

(Continued)

*Primary Examiner* — Quyen Leung
*Assistant Examiner* — Michael Andrews
(74) *Attorney, Agent, or Firm* — Kokka & Backus, PC

(57) ABSTRACT

Embodiments of the invention provide for conical magnets for rotors in electrodynamic machines, methods to design the same, and rotor-stator structures for electrodynamic machines. In various embodiments, a rotor-stator structure for electrodynamic machine can include field pole members and conical magnets. According to at least some embodiments, one or more of the conical magnets can include a magnetic region configured to confront one or more air gaps. The magnetic region can be substantially coextensive with one or more acute angles to the axis of rotation. The magnetic region can also include a surface positioned at multiple radial distances from the axis of rotation in a plane perpendicular to the axis of rotation.

17 Claims, 73 Drawing Sheets

U.S. PATENT DOCUMENTS

| | | | |
|---|---|---|---|
| 422,862 A * | 3/1890 | Washburn | 310/209 |
| 439,102 A | 10/1890 | Bradley | |
| 754,066 A | 3/1904 | Hoffman | |
| 829,975 A | 9/1906 | Lincoln | |
| 846,079 A | 3/1907 | Yost | |
| 1,039,197 A | 9/1912 | Roth | |
| 1,557,213 A | 10/1925 | Lee | |
| 1,640,742 A | 8/1927 | Wallace | |
| 1,763,104 A | 6/1930 | Shurtleff | |
| 1,771,281 A | 7/1930 | Wilsing | |
| 1,874,094 A | 8/1932 | Ford | |
| 1,962,832 A | 6/1934 | Neureuther | |
| 2,025,560 A | 12/1935 | Warren | |
| 2,081,993 A | 6/1937 | Gebhardt | |
| 2,141,681 A | 12/1938 | Brueck | |
| 2,378,668 A | 6/1945 | Vickers | |
| 2,480,825 A | 9/1949 | Adolsh | |
| 2,484,001 A | 10/1949 | Raymond | |
| 2,500,730 A | 3/1950 | Yonkers | |
| 2,561,890 A | 7/1951 | Stoddard | |
| 2,575,153 A | 11/1951 | Wightman | |
| 2,669,687 A | 2/1954 | De Tastes | |
| 2,677,256 A | 5/1954 | Donandt | |
| 2,677,259 A | 5/1954 | Woodward | |
| 2,694,781 A | 11/1954 | Hinz | |
| 2,717,969 A | 9/1955 | Buchhold | |
| 2,769,106 A | 10/1956 | Dembowski | |
| 2,796,542 A | 6/1957 | Bekey | |
| 2,802,959 A | 8/1957 | Powers | |
| 2,824,272 A | 2/1958 | Delaporte | |
| 3,001,093 A | 9/1961 | Wilcox | |
| 3,025,445 A | 3/1962 | Welch | |
| 3,153,157 A | 10/1964 | Rabe | |
| 3,173,042 A | 3/1965 | Fodor | |
| 3,175,111 A | 3/1965 | Orr | |
| 3,205,384 A | 9/1965 | Sears | |
| 3,223,866 A | 12/1965 | Tiltins | |
| 3,241,111 A | 3/1966 | Sandstrom | |
| 3,241,304 A | 3/1966 | Mattingly | |
| 3,309,547 A | 3/1967 | Woodward | |
| 3,319,100 A | 5/1967 | Erickson | |
| 3,321,652 A | 5/1967 | Opel | |
| 3,356,425 A | 12/1967 | Carrierre | |
| 3,360,667 A | 12/1967 | Gordon | |
| 3,374,376 A | 3/1968 | Kromrey | |
| 3,396,291 A | 8/1968 | Somerville | |
| 3,399,002 A | 8/1968 | Atkinson | |
| 3,428,837 A | 2/1969 | Morreale | |
| 3,471,729 A | 10/1969 | Latta | |
| 3,490,816 A | 1/1970 | Lyman | |
| 3,519,859 A | 7/1970 | Morreale | |
| 3,565,495 A | 2/1971 | Lyman | |
| 3,603,826 A | 9/1971 | Saretzky | |
| 3,619,014 A | 11/1971 | Quick | |
| 3,648,090 A | 3/1972 | Voin | |
| 3,651,355 A | 3/1972 | Mason | |
| 3,689,787 A | 9/1972 | Saretzky | |
| 3,717,780 A | 2/1973 | Hohne | |
| 3,723,796 A | 3/1973 | Mason | |
| 3,787,100 A | 1/1974 | Habermann | |
| 3,822,768 A | 7/1974 | Sebulke | |
| 3,863,084 A | 1/1975 | Hasebe | |
| 3,936,680 A | 2/1976 | Kuwako | |
| 3,937,993 A | 2/1976 | Noodleman | |
| 3,956,651 A | 5/1976 | Brammerlo | |
| 4,031,421 A | 6/1977 | Geiger | |
| 4,043,614 A | 8/1977 | Lyman | |
| 4,045,696 A * | 8/1977 | Lutz et al. | 310/49.43 |
| 4,047,807 A | 9/1977 | Okano | |
| 4,066,922 A | 1/1978 | Hennemann | |
| 4,080,724 A | 3/1978 | Gillette | |
| 4,117,359 A | 9/1978 | Wehde | |
| 4,152,570 A | 5/1979 | Inoue | |
| 4,156,817 A | 5/1979 | Preece | |
| D256,351 S | 8/1980 | Schulze | |
| 4,221,984 A | 9/1980 | Mason | |
| 4,259,603 A | 3/1981 | Uchiyama | |
| 4,310,768 A | 1/1982 | Colley | |
| 4,328,411 A | 5/1982 | Haller | |
| 4,358,693 A | 11/1982 | Palmer | |
| 4,378,146 A | 3/1983 | Suzuki | |
| 4,390,262 A | 6/1983 | Hirohata | |
| 4,395,815 A | 8/1983 | Stanley | |
| 4,460,253 A | 7/1984 | Kawai | |
| 4,476,395 A | 10/1984 | Cronin | |
| 4,480,208 A | 10/1984 | Logie | |
| 4,483,570 A | 11/1984 | Inoue | |
| 4,491,401 A | 1/1985 | Inaba | |
| 4,503,349 A * | 3/1985 | Miller | 310/178 |
| 4,543,506 A | 9/1985 | Kawada | |
| 4,564,775 A | 1/1986 | Mazzorana | |
| 4,577,129 A | 3/1986 | Bertram | |
| 4,593,222 A | 6/1986 | Burkel | |
| 4,594,539 A | 6/1986 | Michelson | |
| 4,601,564 A | 7/1986 | Yamamoto | |
| 4,628,220 A | 12/1986 | Flogvall | |
| 4,658,228 A | 4/1987 | Leupold | |
| 4,663,581 A | 5/1987 | Glennon | |
| 4,674,178 A | 6/1987 | Patel | |
| 4,713,569 A | 12/1987 | Schwartz | |
| 4,731,626 A | 3/1988 | Kawamoto | |
| 4,734,604 A | 3/1988 | Sontheimer | |
| 4,748,359 A | 5/1988 | Yahara | |
| 4,748,361 A | 5/1988 | Ohnishi et al. | |
| 4,757,224 A | 7/1988 | McGee | |
| 4,759,186 A | 7/1988 | Sugden | |
| 4,760,314 A | 7/1988 | Mohri | |
| 4,763,150 A | 8/1988 | Sumi | |
| 4,777,397 A | 10/1988 | Parshall | |
| 4,788,369 A | 11/1988 | Marsh | |
| 4,788,465 A | 11/1988 | Hertrich | |
| 4,802,347 A | 2/1989 | Nystuen | |
| 4,879,484 A | 11/1989 | Huss | |
| 4,883,996 A | 11/1989 | Aoki | |
| 4,885,489 A | 12/1989 | Stuhr | |
| 4,918,802 A | 4/1990 | Schaefer | |
| 4,920,295 A | 4/1990 | Holden | |
| 4,939,397 A | 7/1990 | Morrill | |
| 4,962,583 A | 10/1990 | Yang | |
| 4,984,972 A | 1/1991 | Clausen | |
| 5,033,265 A | 7/1991 | Sugden | |
| 5,036,235 A | 7/1991 | Kleckner | |
| 5,045,741 A | 9/1991 | Dvorsky | |
| 5,047,682 A | 9/1991 | Burgbacher | |
| 5,049,771 A | 9/1991 | Challlita | |
| 5,081,387 A | 1/1992 | Nystuen | |
| 5,130,592 A | 7/1992 | Bitsch | |
| 5,140,212 A | 8/1992 | Iwasaki | |
| 5,212,418 A | 5/1993 | Mason | |
| 5,216,308 A | 6/1993 | Meeks | |
| 5,233,254 A | 8/1993 | Fisher | |
| 5,258,677 A | 11/1993 | Mason | |
| 5,283,492 A | 2/1994 | Mason | |
| 5,300,848 A | 4/1994 | Huss | |
| 5,406,157 A | 4/1995 | New | |
| 5,436,518 A | 7/1995 | Kawai | |
| 5,486,730 A | 1/1996 | Ludwig | |
| 5,514,924 A | 5/1996 | McMullen | |
| 5,536,985 A | 7/1996 | Ward et al. | |
| 5,610,460 A | 3/1997 | Jacobson | |
| 5,627,419 A | 5/1997 | Miller | |
| 5,674,169 A | 10/1997 | Yang | |
| 5,744,887 A | 4/1998 | Itoh | |
| 5,751,086 A | 5/1998 | Taghezout | |
| 5,767,597 A | 6/1998 | Gondhalekar | |
| 5,777,421 A | 7/1998 | Woodward | |
| 5,780,950 A * | 7/1998 | Yang | 310/114 |
| 5,844,345 A | 12/1998 | Hsu | |
| 5,955,806 A | 9/1999 | Devenyi | |
| 5,955,811 A * | 9/1999 | Chiba et al. | 310/90.5 |
| 5,962,948 A | 10/1999 | Hakala | |
| 6,013,693 A | 1/2000 | Takahashi | |
| 6,025,769 A | 2/2000 | Chu | |
| 6,049,148 A | 4/2000 | Nichols | |
| 6,057,613 A | 5/2000 | Trago | |
| 6,104,115 A | 8/2000 | Offringa | |
| 6,157,109 A | 12/2000 | Schiferl | |

| | | | |
|---|---|---|---|
| 6,188,159 B1 * | 2/2001 | Fan | 310/216.037 |
| 6,194,797 B1 | 2/2001 | Simon | |
| 6,236,124 B1 * | 5/2001 | Sekiyama et al. | 310/12.24 |
| 6,246,146 B1 | 6/2001 | Schiller | |
| 6,346,755 B1 | 2/2002 | Tong | |
| 6,359,357 B1 * | 3/2002 | Blumenstock | 310/90.5 |
| 6,455,975 B1 * | 9/2002 | Raad et al. | 310/209 |
| 6,492,753 B2 | 12/2002 | Zepp | |
| 6,700,280 B1 | 3/2004 | Geiger | |
| 6,707,221 B2 | 3/2004 | Carl | |
| 6,720,688 B1 | 4/2004 | Schiller | |
| 6,784,582 B1 * | 8/2004 | Kolomeitsev et al. | 310/156.38 |
| 6,897,596 B2 | 5/2005 | Laing | |
| 7,061,152 B2 * | 6/2006 | Petro et al. | 310/156.38 |
| 7,205,693 B2 * | 4/2007 | Petro et al. | 310/156.43 |
| 7,239,058 B2 * | 7/2007 | Petro et al. | 310/156.34 |
| 7,294,948 B2 * | 11/2007 | Wasson et al. | 310/156.38 |
| 7,719,159 B2 * | 5/2010 | Petro et al. | 310/433 |
| 7,884,522 B1 * | 2/2011 | Petro et al. | 310/254.1 |
| 2003/0067236 A1 * | 4/2003 | Takahata et al. | 310/156.21 |
| 2005/0088052 A1 | 4/2005 | Ionel et al. | |
| 2005/0264118 A1 * | 12/2005 | Kascak et al. | 310/90.5 |
| 2006/0001328 A1 | 1/2006 | Rau et al. | |
| 2006/0131976 A1 | 6/2006 | Kikuchi et al. | |
| 2006/0152099 A1 | 7/2006 | Petro et al. | |
| 2006/0238053 A1 | 10/2006 | Kascak et al. | |

FOREIGN PATENT DOCUMENTS

| | | |
|---|---|---|
| DE | 2433809 | 2/1978 |
| DE | 37 42 502 A1 | 6/1989 |
| DE | 199 54 196 A1 | 6/2000 |
| DE | 101 40 362 A1 | 3/2003 |
| EP | 0208124 A2 | 1/1987 |
| EP | 0251350 A2 | 1/1988 |
| GB | 960879 | 6/1964 |
| JP | 60066658 | 4/1985 |
| JP | 61-289889 | 7/1988 |
| JP | 04-026350 | 1/1992 |
| JP | 06-014521 | 1/1994 |
| JP | 06-141527 | 5/1994 |
| JP | 06-351212 | 12/1994 |
| JP | 08-080019 | 3/1996 |
| JP | 10-174399 | 6/1998 |
| JP | 10-174400 | 6/1998 |
| JP | 11-222025 | 6/2000 |
| WO | WO-00/48297 A1 | 8/2000 |

OTHER PUBLICATIONS

Lee W. Young; International Search Report; International Application No. PCT/US 08/66072; Date of Mailing Aug. 18, 2008; Form PCT/ISA/210; 2 pages.

Lee W. Young; Written Opinion of the International Searching Authority; International Application No. PCT/US 08/66072 Date of Mailing Aug. 18, 2008; Form PCT/ISA/237; 4 pages.

Baharlou, Simin, Notification Concerning Transmittal of International Preliminary Report on Patentability (Chapter I of the Patent Cooperation Treaty), PCT/US2008/066072, Dec. 17, 2009, Form PCT/IB/326 (1 page), Form PCT/ISA/237 (6 pages).

USPTO Office Action in U.S. Appl. No. 11/707,817, mailed Sep. 27, 2010.

USPTO Office Action in U.S. Appl. No. 11/707,817, mailed Apr. 16, 2010.

USPTO Office Action in U.S. Appl. No. 11/707,285, mailed Apr. 1, 2010.

USPTO Office Action in U.S. Appl. No. 11/925,661, mailed Mar. 30, 2010.

USPTO Office Action in U.S. Appl. No. 11/707,817, mailed Nov. 5, 2009.

Young, Lee W. Notification of Transmittal of the International Search Report and the Written Opinion of the International Searching Authority, or the Declaration, Patent Cooperation Treaty, Feb. 15, 2008, International Application No. PCT/US 07/03734.

* cited by examiner

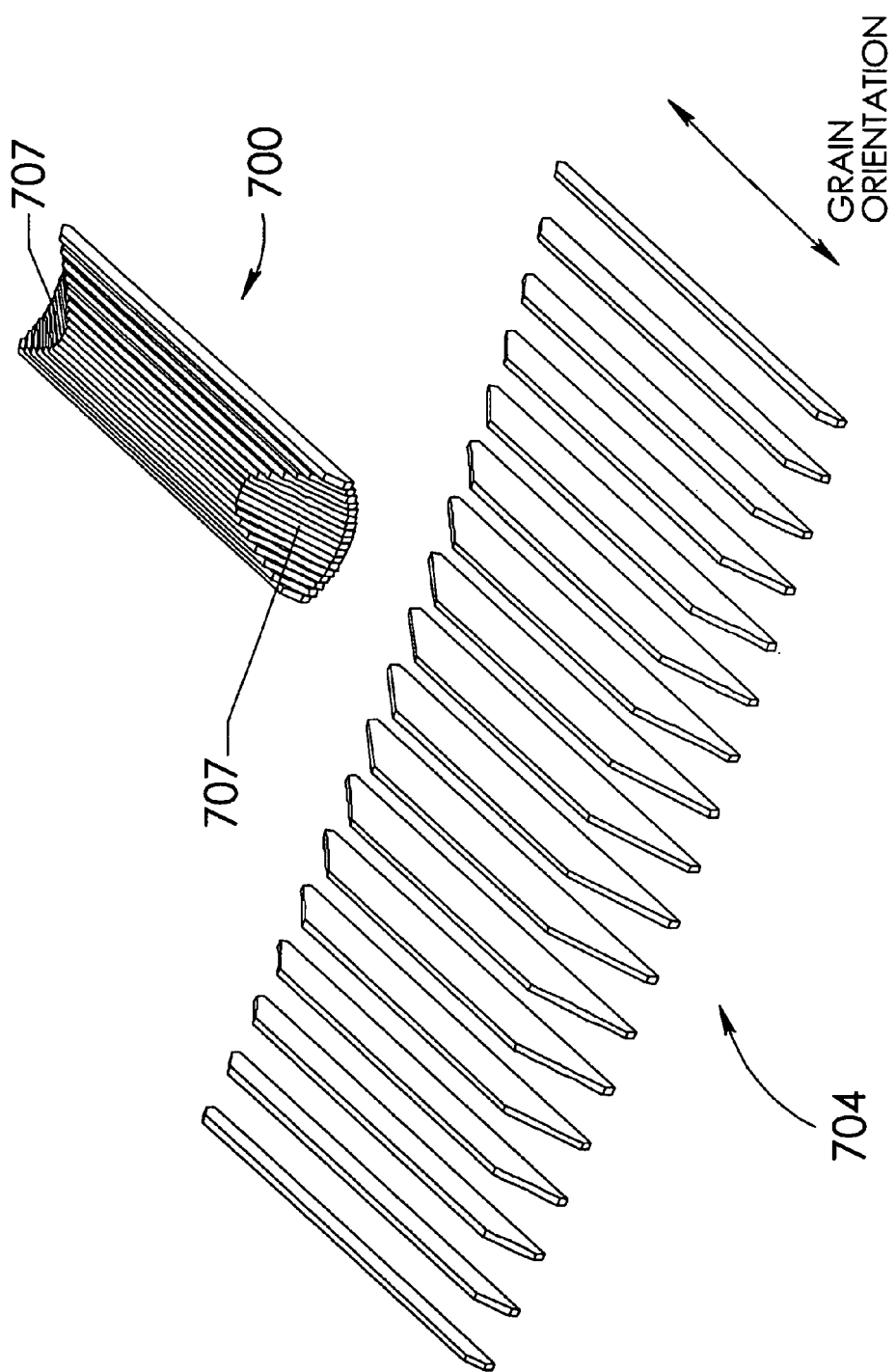

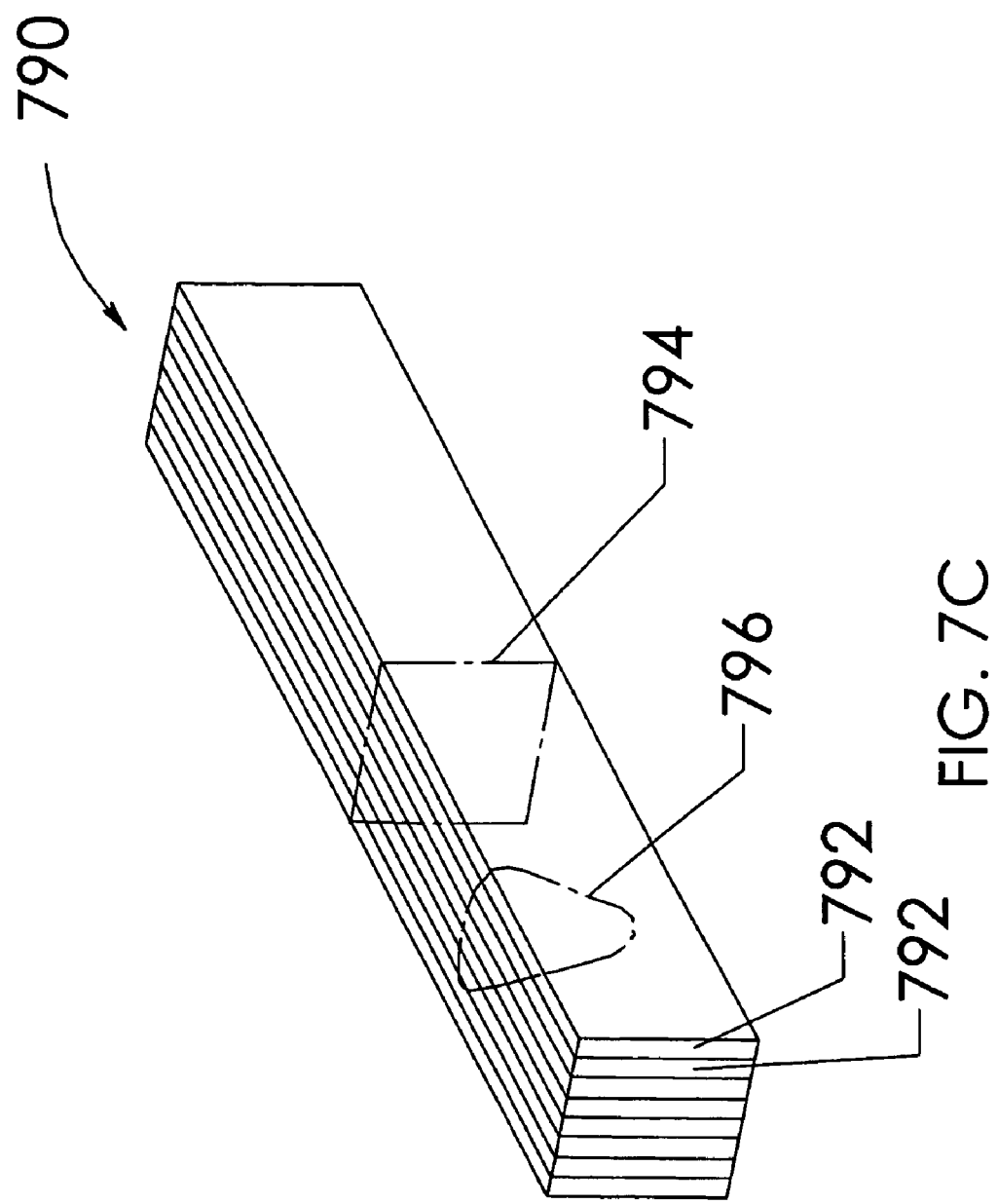

ize and demagnetize the magnetic material constituting the stator regions, wherein hysteresis losses increase as the amount of magnetic material increases. As magnetic return path 116 has one or more turns of ninety-degrees or greater, the use of anisotropic materials, such as grain-oriented materials, cannot effectively reduce hysteresis losses because the magnetic return path 116 in peripheral flux-carrying segment 119 would cut across the directional orientation of laminations 114, such as direction 120, which represents the orientation of grains for laminations 114.

While traditional motor and generator structures are functional, they have several drawbacks in their implementation. It would be desirable to provide improved techniques and structures that minimize one or more of the drawbacks associated with traditional motors and generators, including axial motors.

CONICAL MAGNETS AND ROTOR-STATOR STRUCTURES FOR ELECTRODYNAMIC MACHINES

CROSS REFERENCE TO RELATED APPLICATIONS

This application claims priority to U.S. Provisional Patent Application No. 60/933,590, entitled "Conical Magnet Structures for Rotors in Electrodynamic Machines," filed on Jun. 7, 2007, and this application is a Continuation-in-Part of U.S. Nonprovisional application Ser. No. 11/925,661, filed on Oct. 26, 2007, which is a Continuation-in-Part of U.S. Nonprovisional application Ser. No. 11/255,404, filed on Oct. 20, 2005 and issued as U.S. Pat. No. 7,294,948, which claims priority to U.S. Provisional Application No. 60/622,258, filed on Oct. 25, 2004, all of which are hereby incorporated by reference.

BRIEF DESCRIPTION

Various embodiments of this invention relate generally to electrodynamic machines and the like, and more particularly, to conical magnets and rotor-stator structures for electrodynamic machines.

BACKGROUND

Both motors and generators have been known to use axial-based rotor and stator configurations, which can experience several phenomena during operation. For example, conventional axial motor and generator structures can experience detent, which is also known as "cogging torque" or "detent torque." Detent can be described as a periodic torque that can arise in motors and generators that co-axially integrate magnetically permeable elements, such as field poles, to form a stator structure, and use permanent magnets to form a rotor structure. When either the stator or rotor structure is rotated with respect to the other, a periodic varying torque can be created because the magnet structure typically prefers to align at a position that is centered with the magnetically permeable elements rather than at the intervening field pole gaps of air between the field pole elements.

FIG. 1A illustrates a traditional electric motor exemplifying commonly-used stator and rotor structures. Electric motor 100 is a cylindrical motor composed of a stator structure 104, a magnetic hub 106 and a shaft 102. The rotor structure of motor 100 includes one or more permanent magnets 110, all of which are attached via magnetic hub 106 to shaft 102 for rotation within stator structure 104. Stator structure 104 typically includes field poles 118, each having a coil winding 112 (only one is shown) that is wound about each field pole 118. Stator structure 104 includes slots 108 used in part to provide a wire passage for winding coil wire about stator field poles 118 during manufacturing. Slots 108 also provide magnetic separation between adjacent field poles 118. Stator structure 104 includes a peripheral flux-carrying segment 119 as part of magnetic return path 116. In many cases, stator structure 104 is composed of laminations 114, which typically are formed from isotropic (e.g., non-grain oriented), magnetically permeable material. Magnetic return path 116, which is one of a number of magnetic return paths in which permanent magnet-generated flux and AT-generated flux is present, is shown as being somewhat arcuate in nature at peripheral flux-carrying segment 119 but includes relatively sharp turns into the field pole regions 118.

Another drawback of conventional electric motors is that laminations 114 do not effectively use anisotropic materials to optimize the flux density and reduce hysteresis losses in flux-carrying poles, such as through field poles 118, and stator regions at peripheral flux-carrying segment 119. In particular, peripheral flux-carrying segment 119 includes a non-straight flux path, which limits the use of such anisotropic materials to reduce the hysteresis losses (or "iron losses"). Hysteresis is the tendency of a magnetic material to retain its magnetization. "Hysteresis loss" is the energy required to magnet

SUMMARY

Disclosed are conical magnets for rotors in electrodynamic machines, methods to design the same, and rotor-stator structures for electrodynamic machines, according to various embodiments. In various embodiments, a rotor-stator structure for electrodynamic machine can include field pole members and conical magnets. According to at least some embodiments, one or more of the conical magnets can include a magnetic region configured to confront one or more air gaps. The magnetic region can be substantially coextensive with one or more acute angles to the axis of rotation. The magnetic region can also include a surface (or a portion thereof) that is positioned at multiple radial distances from the axis of rotation (e.g., in a plane perpendicular to the axis of rotation).

BRIEF DESCRIPTION OF THE FIGURES

The various embodiments of the invention are more fully appreciated in connection with the following detailed description taken in conjunction with the accompanying drawings, in which:

FIGS. 7A to 7E illustrate examples of implementations of field pole members, according to various embodiments of the invention;

Like reference numerals refer to corresponding parts throughout the several views of the drawings. Note that most of the reference numerals include one or two left-most digits that generally identify the figure that first introduces that reference number.

DETAILED DESCRIPTION

Definitions

Figure 1:
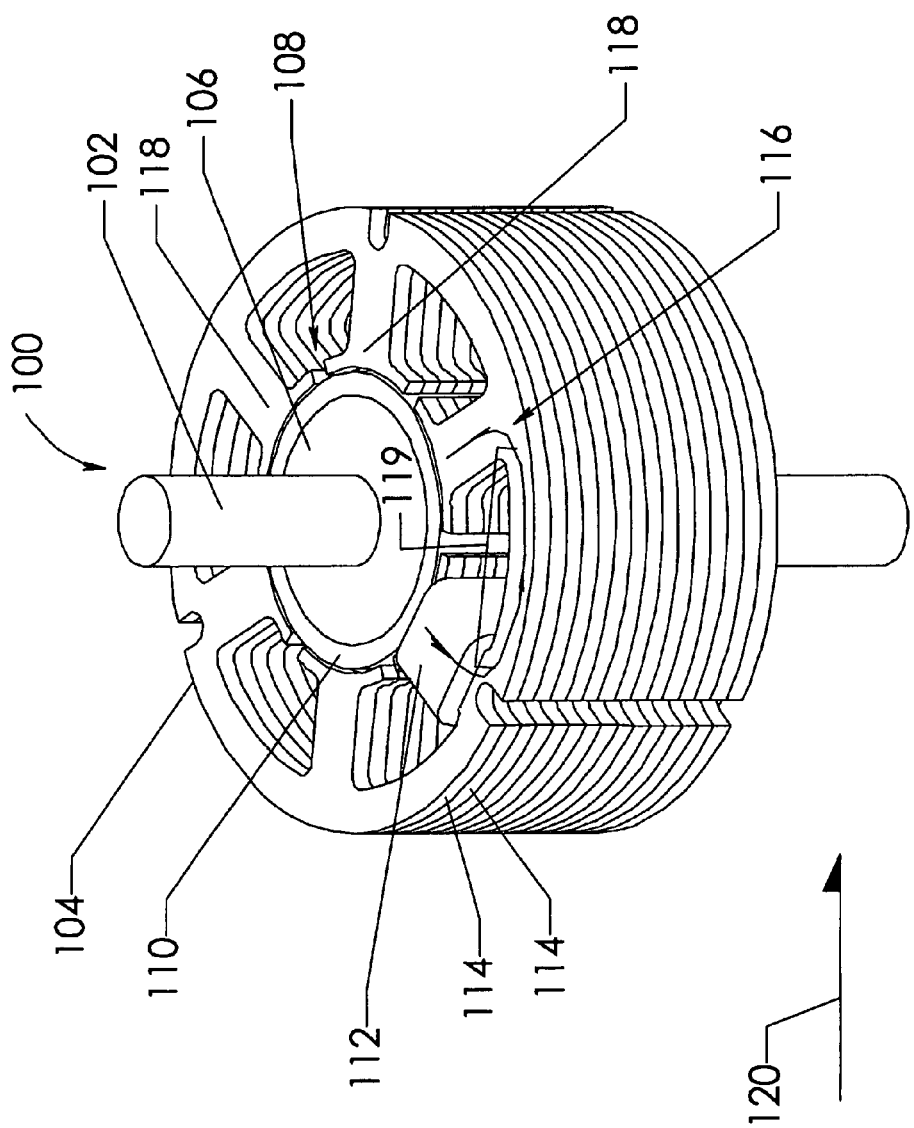
FIG. 1 exemplifies commonly-used stator and rotor structures implemented in a traditional electric motor.

The following definitions apply to some of the elements described with respect to some embodiments of the invention. These definitions may likewise be expanded upon herein.

As used herein, the term "air gap" refers, in at least one embodiment, to a space, or a gap, between a magnet surface and a confronting pole face. Such a space can be physically described as a volume bounded at least by the areas of the magnet surface and the pole face. An air gap functions to enable relative motion between a rotor and a stator, and to define a flux interaction region. Although an air gap is typically filled with air, it need not be so limiting.

As used herein, the term "back-iron" commonly describes a physical structure (as well as the materials giving rise to that physical structure) that is often used to complete an otherwise open magnetic circuit. In particular, back-iron structures are generally used only to transfer magnetic flux from one magnetic circuit element to another, such as either from one magnetically permeable field pole member to another, or from a magnet pole of a first magnet to a magnet pole of a second magnet, or both, without an intervening ampere-turn generating element, such as coil, between the field pole members or the magnet poles. Furthermore, back-iron structures are not generally formed to accept an associated ampere-turn generating element, such as one or more coils.

As used herein, the term "coil" refers, in at least one embodiment, to an assemblage of successive convolutions of a conductor arranged to inductively couple to a magnetically permeable material to produce magnetic flux. In some embodiments, the term "coil" can be described as a "winding" or a "coil winding." The term "coil" also includes foil coils (i.e., planar-shaped conductors that are relatively flat).

As used herein, the term "coil region" refers generally, in at least one embodiment, to a portion of a field pole member around which a coil is wound.

As used herein, the term "core" refers to, in at least one embodiment, a portion of a field pole member where a coil is normally disposed between pole shoes and is generally composed of a magnetically permeable material for providing a part of a magnetic flux path. The term "core," in at least one embodiment, can refer, in the context of a conical magnet, to a structure configured to support magnetic regions. As such, the term core can be interchangeable with the term "hub" in the context of a rotor magnet, such as a conical magnet.

As used herein, the term "field pole member" refers generally, in at least one embodiment, to an element composed of a magnetically permeable material and being configured to provide a structure around which a coil can be wound (i.e., the element is configured to receive a coil for purposes of generating magnetic flux). In particular, a field pole member includes a core (i.e., core region) and at least one pole shoe, each of which is generally located near a respective end of the core. Without more, a field pole member is not configured to generate ampere-turn flux. In some embodiments, the term "field pole member" can be described generally as a "stator-core."

As used herein, the term "active field pole member" refers, in at least one embodiment, to an assemblage of a core, one or more coils, and at least two pole shoes. In particular, an active field pole member can be described as a field pole member assembled with one or more coils for selectably generating ampere-turn flux. In some embodiments, the term "active field pole member" can be described generally as a "stator-core member."

As used herein, the term "ferromagnetic material" refers, in at least one embodiment, to a material that generally exhibits hysteresis phenomena and whose permeability is dependent on the magnetizing force. Also, the term "ferromagnetic material" can also refer to a magnetically permeable material whose relative permeability is greater than unity and depends upon the magnetizing force.

As used herein, the term "field interaction region" refers, in at least one embodiment, to a region where the magnetic flux developed from two or more sources interact vectorially in a manner that can produce mechanical force and/or torque relative to those sources. Generally, the term "flux interaction region" can be used interchangeably with the term "field interaction region." Examples of such sources include field pole members, active field pole members, and/or magnets, or portions thereof. Although a field interaction region is often referred to in rotating machinery parlance as an "air gap," a field interaction region is a broader term that describes a region in which magnetic flux from two or more sources interact vectorially to produce mechanical force and/or torque relative to those sources, and therefore is not limited to the definition of an air gap (i.e., not confined to a volume defined by the areas of the magnet surface and the pole face and planes extending from the peripheries between the two areas). For example, a field interaction region (or at least a portion thereof) can be located internal to a magnet.

As used herein, the term "generator" generally refers, in at least one embodiment, to an electrodynamic machine that is configured to convert mechanical energy into electrical energy regardless of, for example, its output voltage waveform. As an "alternator" can be defined similarly, the term generator includes alternators in its definition.

As used herein, the term "magnet" refers, in at least one embodiment, to a body that produces a magnetic field externally unto itself. As such, the term magnet includes permanent magnets, electromagnets, and the like. The term magnet can also refer to internal permanent magnets ("IPMs"), surface mounted permanent magnets ("SPMs"), and the like.

As used herein, the term "motor" generally refers, in at least one embodiment, to an electrodynamic machine that is configured to convert electrical energy into mechanical energy.

As used herein, the term "magnetically permeable" is a descriptive term that generally refers, in at least one embodiment, to those materials having a magnetically definable relationship between flux density ("B") and applied magnetic field ("H"). Further, the term "magnetically permeable" is intended to be a broad term that includes, without limitation, ferromagnetic materials such as common lamination steels, cold-rolled-grain-oriented (CRGO) steels, powder metals, soft magnetic composites ("SMCs"), and the like.

As used herein, the term "pole face" refers, in at least one embodiment, to a surface of a pole shoe that faces at least a portion of the flux interaction region (as well as the air gap), thereby forming one boundary of the flux interaction region (as well as the air gap). In some embodiments, the term "pole face" can be described generally as including a "flux interaction surface." In one embodiment, the term "pole face" can refer to a "stator surface."

As used herein, the term "pole shoe" refers, in at least one embodiment, to that portion of a field pole member that facilitates positioning a pole face so that it confronts a rotor (or a portion thereof), thereby serving to shape the air gap and control its reluctance. The pole shoes of a field pole member are generally located near one or more ends of the core starting at or near a coil region and terminating at the pole face. In some embodiments, the term "pole shoe" can be described generally as a "stator region."

As used herein, the term "soft magnetic composites" ("SMCs") refers, in at least one embodiment, to those materials that are comprised, in part, of insulated magnetic particles, such as insulation-coated ferrous powder metal materials that can be molded to form an element of the stator structure of the invention.

Discussion

Figure 2A:
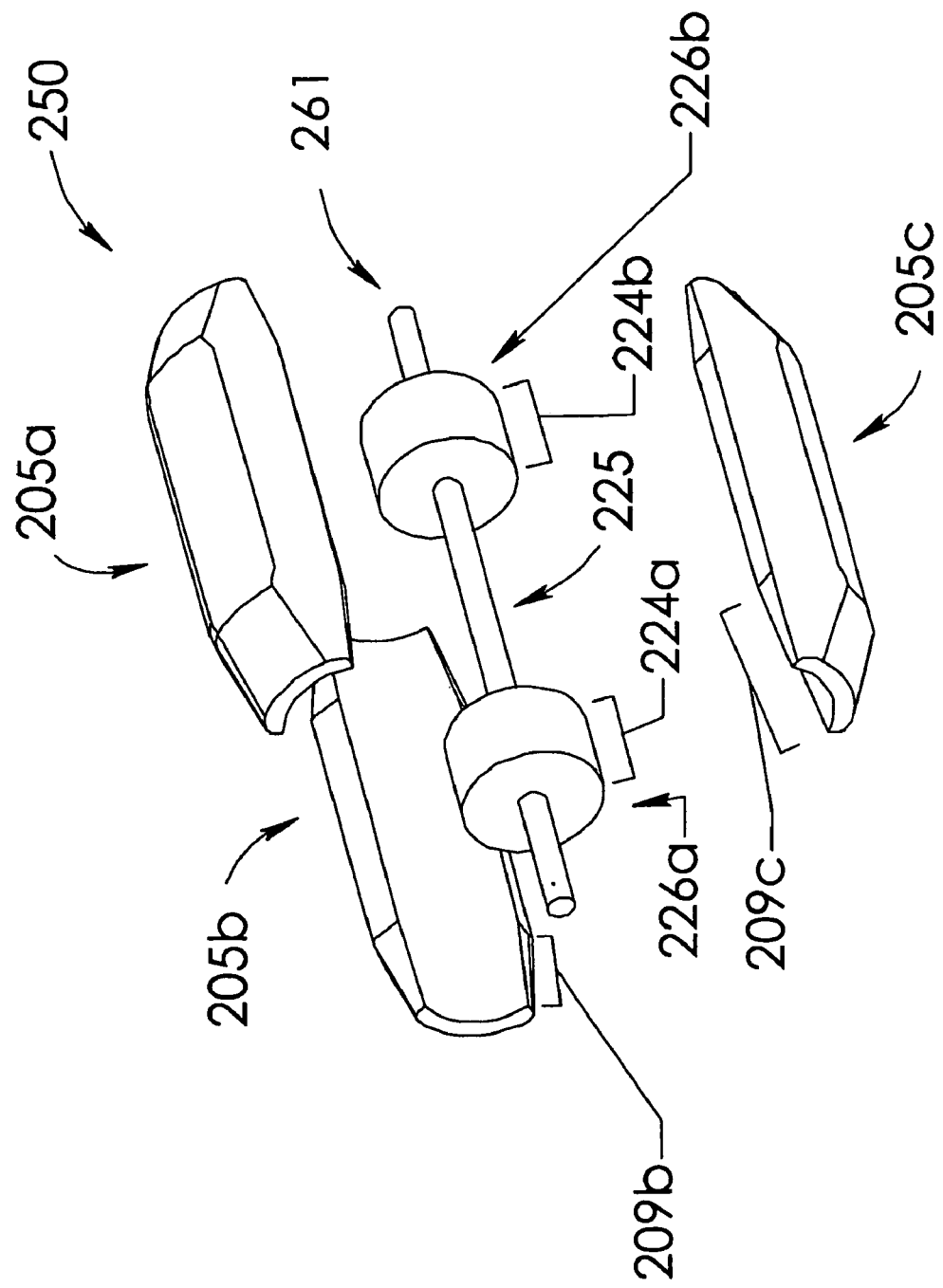
FIG. 2A is an exploded view of exemplary rotor-stator structure implementing cylindrical magnets, according to one embodiment of the invention.

FIG. 2A is an exploded view of an exemplary rotor-stator structure in accordance with a specific embodiment of the invention. FIG. 2A depicts a rotor assembly 261 including at least two cylindrical magnets 226a and 226b mounted on or affixed to a shaft 225, each of cylindrical magnets 226a and 226b having magnet surfaces (or at least portions thereof) 224a and 224b, respectively, that are cylindrical. In various embodiments of the invention, shapes other than cylinders, such as cones, can be implemented to practice rotor-stator structure 250. FIG. 2A also depicts field pole member 205a, 205b, and 205c respectively having pole faces 209a, 209b, and 209c for confronting portions of magnet surface 224a. Note that not all pole faces are shown or identified.

In various embodiments, each of field pole members 205 is configured to increase torque generated per unit size (or per unit weight) for electric motor implementations by at least minimizing the length of magnetic flux paths through field pole members. Further, field pole members 205 provide straight or substantially straight flux paths (or segments thereof) to minimize linear deviations of the magnetic flux. Typically, the path segments are generally parallel to the axis of rotation. So by implementing straight or substantially straight paths, each of those field pole members provide a relatively low reluctance flux path as compared to conventional magnetic return path designs that require magnetic flux to turn sharply about the periphery, such as at an angle of ninety-degrees (or thereabout), between field pole regions. As such, rotor-stator structures in some embodiments can implement straight or substantially straight paths to enable electrodynamic machines to operate with reduced magnetic losses and increased efficiency. Various alternate embodiments and features of the rotor-stator structure of the invention are described next. The following description is applicable to magnets having other shapes than or equivalents to conical and/or cylindrical magnet shapes.

Figure 2B:
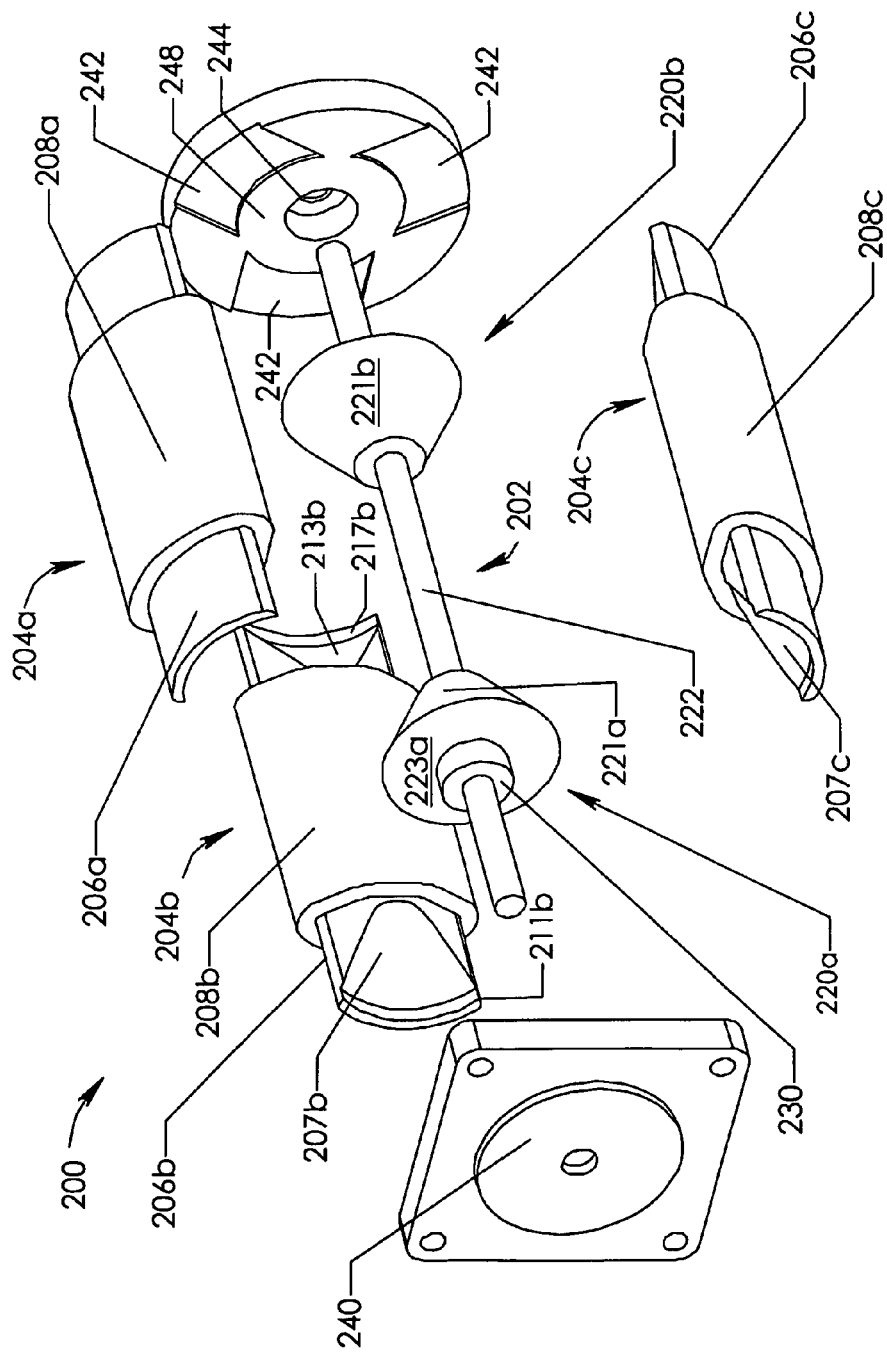
FIG. 2B is an exploded view of an exemplary rotor-stator structure in which the magnets are conical in shape, according to one embodiment of the invention.

FIG. 2B is an exploded view of an exemplary rotor-stator structure in accordance with a specific embodiment of the invention. In this example, rotor-stator structure 200 includes a rotor assembly 202 and a number of active field pole members 204 (i.e., active field pole members 204a, 204b, and 204c), whereby active field pole members 204 are configured to magnetically couple to and drive magnets of rotor assembly 202. Rotor assembly 202 includes two conical magnets 220a and 220b mounted on or affixed to a shaft 222 such that at least a portion of a conical magnet surface 221a on conical magnet 220a faces at least a portion of a conical magnet surface 221b on conical magnet 220b. In particular, the smaller-diameter ends (i.e., nearest the cones' vertices, if present, or nearest the cones' conceptual vertices if otherwise not present due to, for example, truncation of the cone) of the conical magnets 220a and 220b face each other. Further, conical magnets 220a and 220b are each positioned adjacent to one group of ends of active field pole members 204. In various embodiments of the invention, conical magnet surfaces 221a and 221b each have an angle of inclination with respect to the axis of rotation, where the angle is from about 5 degrees to about 85 degrees. In a specific embodiment, the angle of inclination can be from about 10 degrees to about 80 degrees. In at least one embodiment, the angle of inclination is about 30 degrees with respect to the axis of rotation, for example, when conical magnets 220a and 220b are composed of relatively high performing magnet material (e.g., magnets having relatively high values of maximum energy product and "Br," and high coercivity, as is discussed below). In various embodiments, shaft 222 can be composed of magnetically permeable material, while in other embodiments it can be made of non-magnetic and/or non-electrically conductive materials. As such, rotor-stator structure 200 does not require shaft 222 to form flux paths; active field pole members 204 and conical magnets 220a and 220b are sufficient to form flux paths in accordance with at least one embodiment of the invention.

Each of active field pole members 204 includes a field pole member 206 and an insulated coil 208 wrapped around a respective field pole member 206. Field pole members 206 are positioned coaxial about an axis of rotation, which can be defined by the axis of shaft 222. Coils 208a, 208b and 208c are generally wound about the central portions of field pole members 206a, 206b and 206c, respectively, to produce ampere turn-generated magnetic flux in field pole members 206 when the coils 208 are energized with current. In at least one embodiment, one or more active field pole members 204 constitute, at least in part, a stator assembly (not shown). At each end region of active field pole members 204 are pole faces 207, each of which is located adjacent to and confronting at least a portion of the conical magnet surfaces of the conical magnets 220a and 220b, thereby defining functional air gaps between magnet surfaces (or portions thereof) and pole faces. According to a specific embodiment of the invention, pole faces 207 are contoured to mimic the surfaces of a magnet, such as that of conical magnet 220a. For example, pole face 207b is a concave surface resembling the curvature of that of a convex surface of conical magnet 220a. In one embodiment of the present invention, an optional extended end, such as an extended end 211b, extends longitudinally from field pole members 206 to extend over and/or past outer surfaces of conical magnets 220a and 220b. As another example, extended end 217b is configured to extend past the outer surface of conical magnet 220b for insertion into one of grooves 242 to construct rotor-stator structure 200. But note that in some embodiments, extended end 211b as well as other extended ends of field pole members 206 are absent, thereby permitting pole faces 207 to confront conical magnets 220a and 220b that have their larger diameter ends (one of which coincides with or is nearest outer magnet surface 223a) extending to or beyond a radial distance associated with the outer surfaces of field pole members 206.

As either rotor assembly 202 or the number of active field pole members 204 can be configured to rotate in relation to the other, rotor-stator structure 200 can optionally include bearings 230 and both a front mounting plate 240 and a rear mounting plate 248. In a specific embodiment, mounting plates 240 and 248 can be made of non-magnetic and/or non-electrically conductive materials. Cavities 244 in mounting plates 240 and 248 are designed to receive bearings 230, and grooves 242 are designed to receive at least a portion of an extended end, such as extended end 217b, of an active field pole member. In some cases, grooves 242 confine the movement of active field pole members 204 to maintain a proper position with respect to rotor assembly 202. A protective housing (not shown) can be added to protect both rotor assembly 202 and field pole members 204 and can also serve as a heat sink for one or more coils 208. While useful to implement the exemplary rotor-stator structure 200, various embodiments of the invention are not limited to including mounting plates 240 and 248 as well as bearings 230 and grooves 242, especially when generating a flux path in accordance with embodiments of the invention.

Note that although each field pole member 206 is shown to be wrapped by insulated coil 208, fewer than all of field pole members 206 can be wrapped by coil 208, according to a specific embodiment. For example, coils 208b and 208c can be omitted from active field pole members 204b and 204c, respectively, to form an electrodynamic machine that, for example, costs less to manufacture than if coils 208b and 208c were included. Without coils 208b and 208c, members 204b and 204c constitute field pole members rather than active field pole members. Also note that although field pole members 206a, 206b and 206c are shown as straight field pole members, there is no requirement that field pole members 206a, 206b and 206c be straight or substantially straight. In some embodiments, one or more of field pole members 206a, 206b and 206c can be shaped to implement transition regions, such as described below, in field pole members to convey flux in other than a straight flux path. For example, field pole members 206a, 206b and 206c can be shaped to position coils 208 closer to shaft 222, thereby decreasing the volume of an electrodynamic machine implementing rotor-stator structure 200.

In at least one specific embodiment, each of one or more active field pole members 204 include only one or more coils 208 and a field pole member, such as any of 206a, 206b and 206c. In some cases, active field pole members 204 can include tape, paper, and/or paint, or the like that do not add substantial support for coil windings that are wound about a field pole member. Generally, the windings of one or more coils 208 are wound directly on the field pole member itself. The conductors of one or more coils 208 can generally include insulation. But in this specific embodiment, each of active field pole members 204 does not include any other intermediate structure, such as a coil carrier structure, which requires additional material cost and labor during a manufacturing process.

Figure 3:
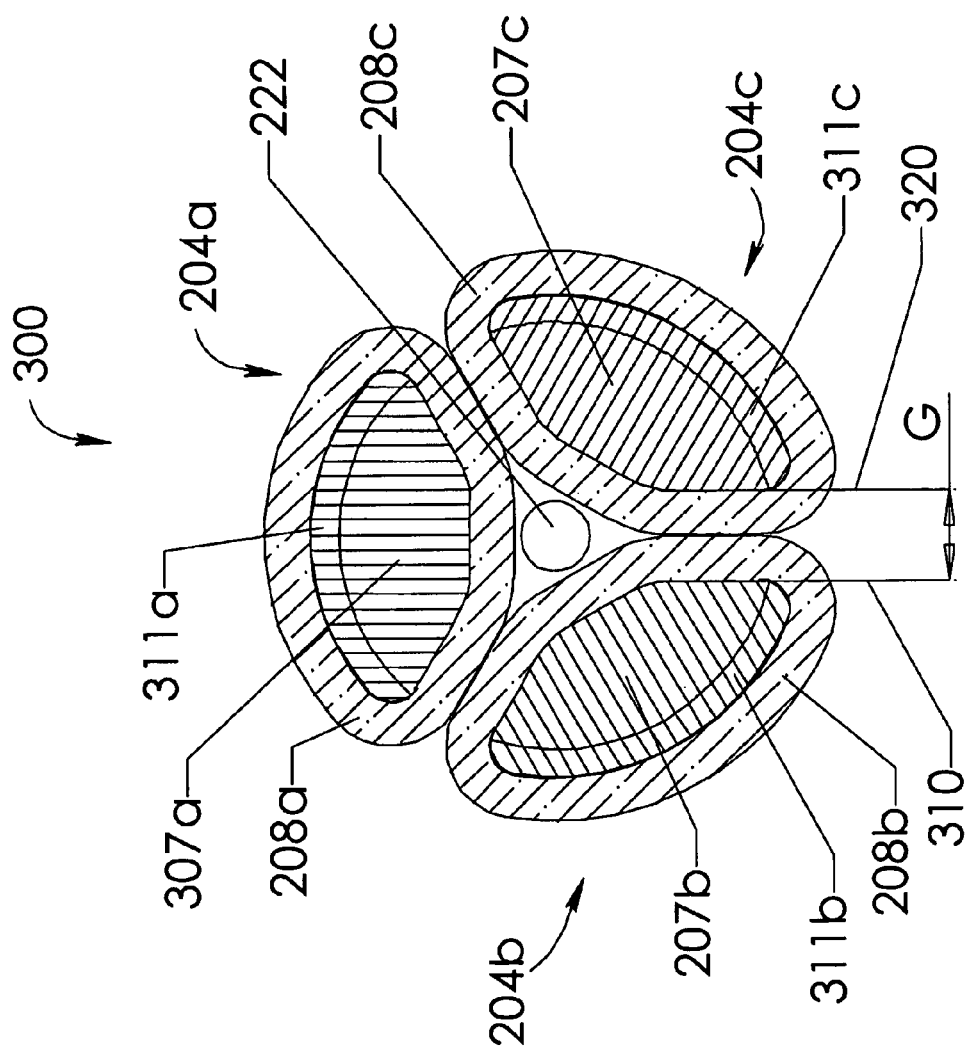
FIG. 3 depicts an end view for the rotor-stator structure of FIG. 2B without a magnet to illustrate the orientation of the pole faces that are configured to interact via an air gap with a confronting magnetic surface of a conical magnet, according to one embodiment of the invention.

FIG. 3 depicts an end view 300 of rotor-stator 200 illustrating orientation of the pole faces that are configured to interact via an air gap with a confronting magnetic surface of conical magnet 220a, according to one embodiment of the invention. Absent from FIG. 3 is front mounting plate 240, bearings 230 and conical magnet 220a, all of which are omitted to depict the end views of both the active field pole member and coil shapes, as well as the field pole gaps ("G") between the field poles. As shown, coils 208a, 208b, and 208c respectively encompass field pole members 206a, 206b and 206c to form active field pole members 204a, 204b and 204c, all of which are compactly positioned to increase the packing density of a motor or generator implementing rotor-stator structure 200 (as compared to conventional motors using coil windings that typically are wound using slots 108 of FIG. 1). FIG. 3 also depicts edges of extended ends 311a, 311b, and 311c, and pole faces 307a, 207b, and 207c of respective active field pole members 204a, 204b and 204c. Pole faces 307a, 207b, and 207c are positioned to form magnetic air gaps between each of those pole faces, or surfaces, and at least a portion of the conical magnet surface of conical magnet 220a. Further, field pole gaps are defined by the sides (or edges) of the field pole members that constitute active field pole members 204a, 204b and 204c. For example, gap "G" represents any of the field pole gaps as defined, for example, by planes 310 and 320 extending from sides of respective field pole members 206b and 206c (FIG. 2B). In at least one specific embodiment, a surface area associated with each of pole faces 307a, 207b, and 207c is dimensioned to generate maximum torque output in an optimal configuration. An example of such a configuration is one where magnetic coupling between conical magnet 220a and field pole members 206a, 206b and 206c is at or near a maximum amount while leakage across gap "G" between the field pole members is at or near a minimal amount. Note that by increasing the surface area of any of pole faces 307a, 207b, and 207c, magnetic coupling is increased.

Figure 4:
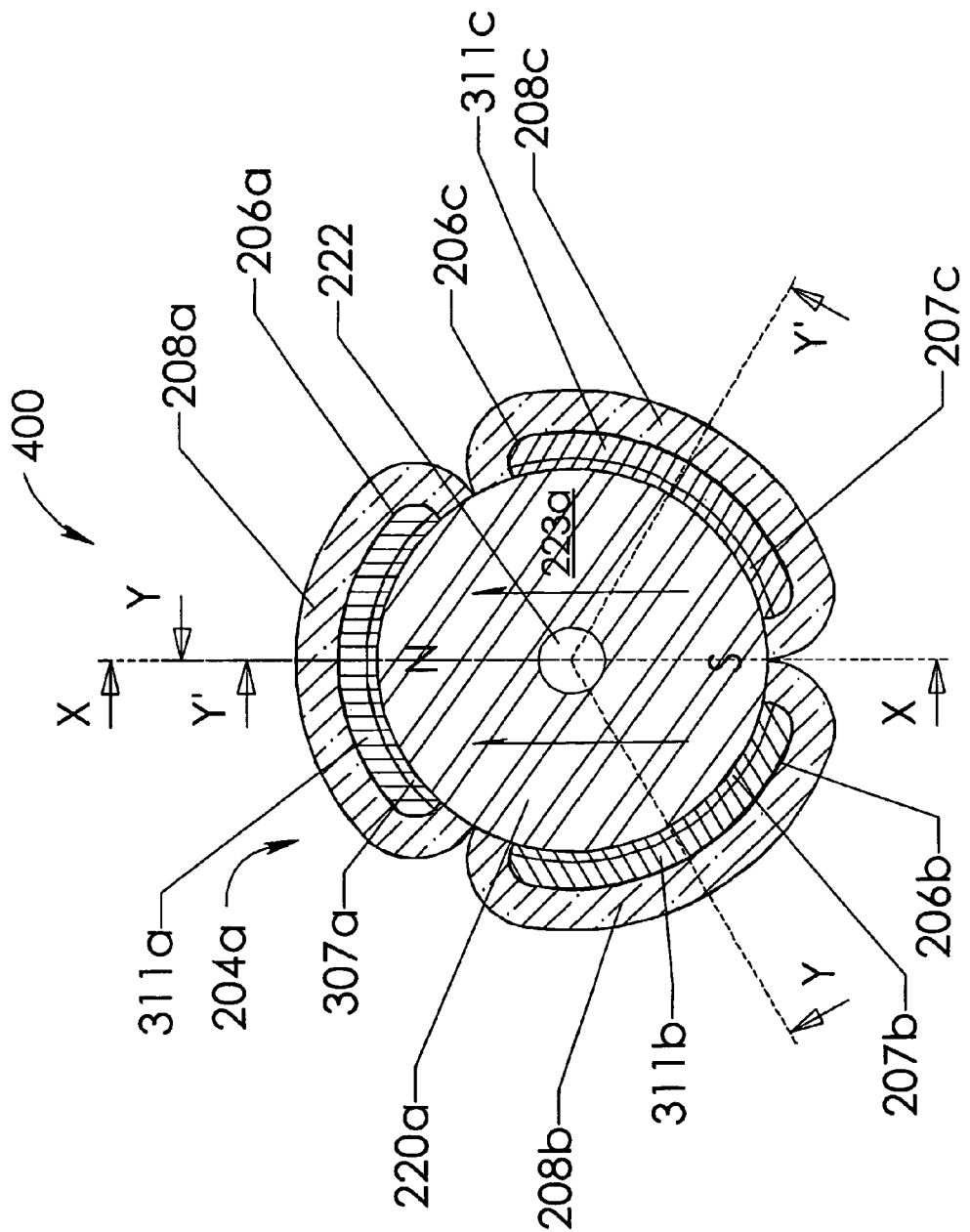
FIG. 4 depicts another end view for the rotor-stator structure of FIG. 2B illustrating a conical magnet positioned adjacent to pole faces in accordance with an embodiment of the invention.

FIG. 4 depicts another end view 400 of rotor-stator 200 and conical magnet 220a positioned adjacent to pole faces 307a, 207b, and 207c (FIG. 3) in accordance with an embodiment of the invention. As shown, outer magnet surface 223a of conical magnet 220a is visible, as are the protruding edges of extended ends 311a, 311b, and 311c and coils 208. Note that while this example shows conical magnet 220a as a dipole magnet (e.g., a permanent magnet) having a north pole ("N") and a south pole ("S"), conical magnet 220a can have any number of north poles and south poles. Note that in some embodiments, conical magnets 220a and 220b can be implemented using electro-magnets. Also, FIG. 4 defines three sectional views. The first sectional view, X-X, cuts straight through as a centerline bisecting field pole member 206a and coil 208a and then passes via magnet 220a through a field pole gap between other field pole members 206b and 206c. A second section view, Y-Y, bisects field pole member 206a and coil 208a and then passes via magnet 220a through field pole member 206b and coil 208b. A third view section view, Y'-Y', which is similar to the second section view, Y-Y, bisects field pole member 206a and coil 208a and then passes via magnet 220a through field pole member 206c and coil 208c. Section view X-X is shown in FIG. 5A, whereas views Y-Y and Y'-Y' produce similar drawings, both of which are depicted in FIG. 5B.

Figure 5A:
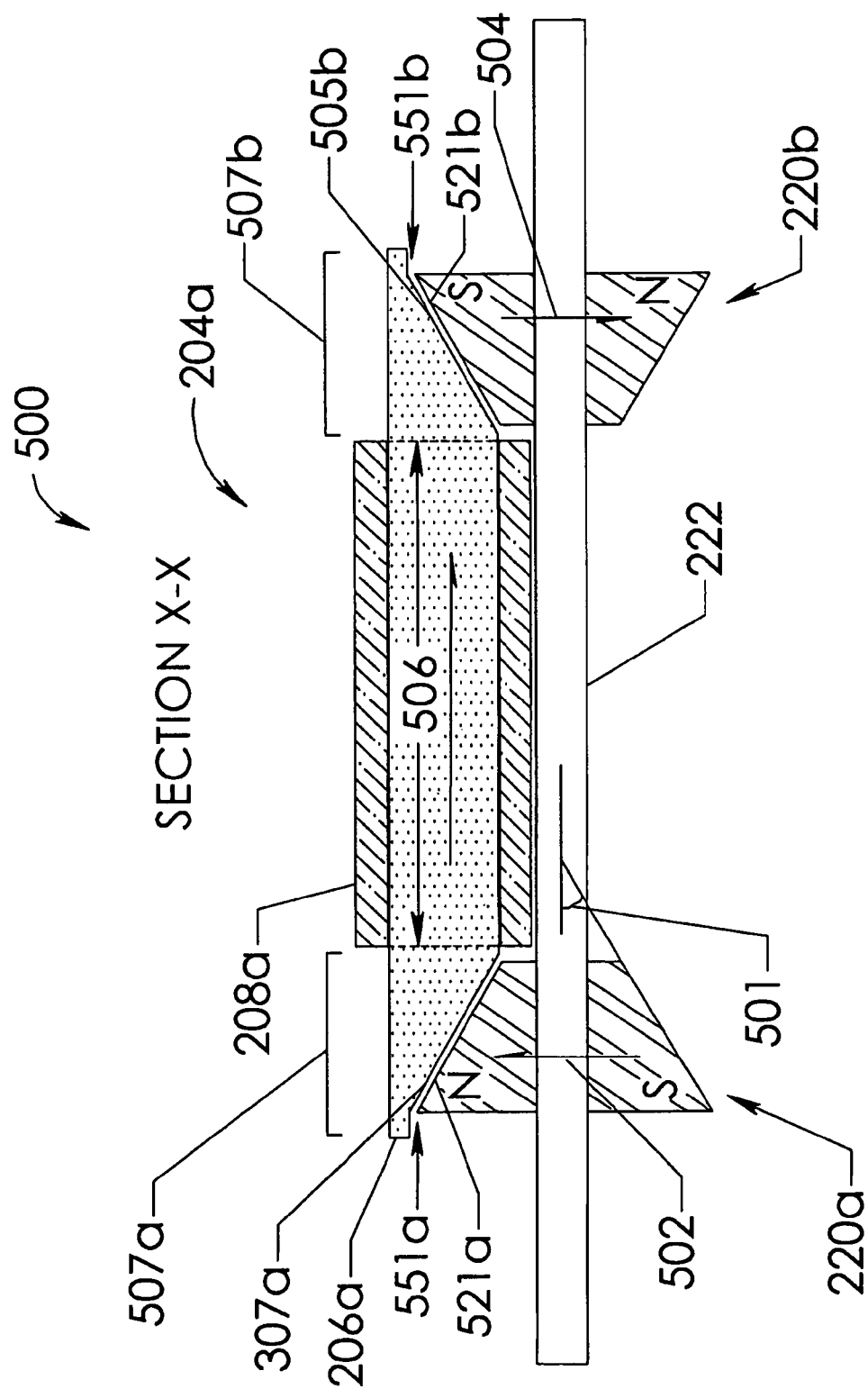
FIGS. 5A and 5B depict sectional views illustrating an exemplary magnetic flux path, according to at least one embodiment of the invention.
Figure 5B:
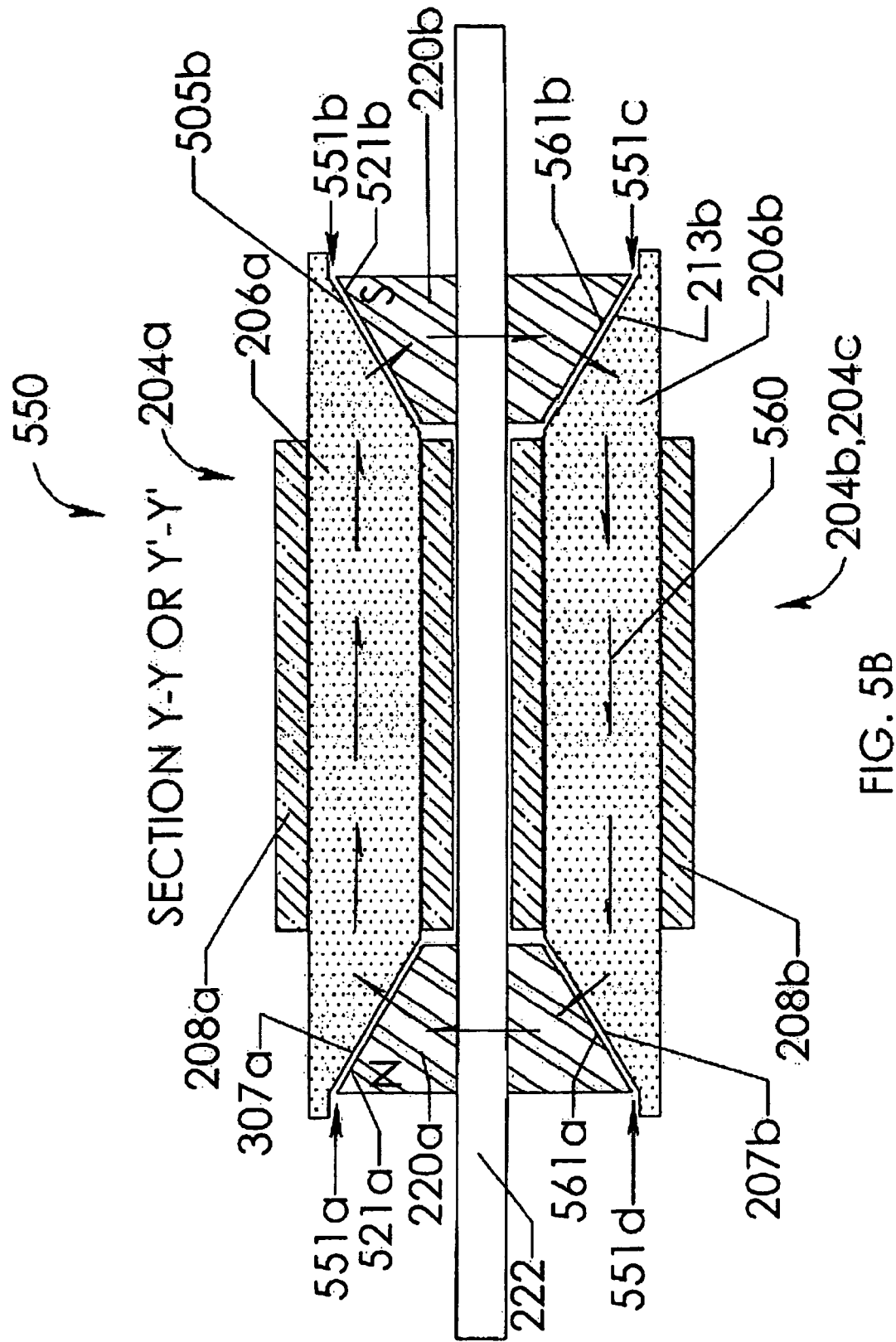

FIGS. 5A and 5B depict sectional views illustrating an exemplary magnetic flux path, according to at least one embodiment of the invention. FIG. 5A depicts a cross section of active field pole member 204a of rotor-stator structure 500, the cross section showing a sectional view X-X of coil 208a and field pole member 206a. In this example, active field pole member 204a includes pole faces 307a and 505b, pole shoes 507a and 507b, a coil region 506 and coil 208a. In view X-X of FIG. 5A, conical magnets 220a and 220b are diametrically magnetized in opposite directions and are positioned adjacent to respective pole shoes 507a and 507b of field pole member 206a. Correspondingly, pole face 307a of pole shoe 507a forms a magnetic air gap 551a with at least a portion 521a of magnet surface 221a of FIG. 2B, with portion 521a confronting pole face 307a and shown as a cross-section. Similarly, pole face 505b of pole shoe 507b forms a magnetic air gap 551b with at least a portion 521b of magnet surface 221b of FIG. 2B, with portion 521b confronting pole face 505b and shown as a cross-section. Note that portions 521a and 521b need not extend the axial length of conical magnets 220a and 220b, respectively. For example, portions 521a and 521b can be defined by regions that are bounded between the largest and smallest cross-sectional diameters of conical magnets 220a and 220b, but can be of any size. Accordingly, portions 521a and 521b need only form air gaps with a pole face, with other surface portions of conical magnets 220a and 220b being configured not to form air gaps, according to at least one embodiment. Further, coil 208a encloses a coil region 506 of field pole member 206a, whereby coil region 506 is defined approximately by the axial length of coil 208a surrounding a portion of field pole member 206a. Absent in FIG. 5A is a depiction of one or more field interaction regions, which can encompass a space larger than an air gap, such as air gap 551a, and can extend into, for example, conical magnet 220a.

In at least one embodiment of the invention, at least one of magnet portions 521a and 521b of surfaces on respective conical magnets 220a and 220b can be defined as being bounded by an angle of inclination (".theta.") 501, which is an angle with respect to an axis of rotation. In the example shown, the axis of rotation is coterminous with shaft 222. In a specific embodiment, angle of inclination (".theta.") 501 is 30 degrees from shaft 222. But note that angle 501 can be any angle.

With opposite polarizations, conical magnet 220a is polarized with its north pole ("N") pointing in direction 502, and conical magnet 220b is polarized with its north pole ("N") pointing in direction 504. In some embodiments, conical magnets 220a and 220b are diametrically magnetized in exactly opposite directions (i.e., 180 degrees between directions 502 and 504). But in other embodiments, directions 502 and 504 can be offset to any angle between those directions other than 180 degrees, for example, to reduce detent torque ("cogging"). In a specific embodiment, directions 502 and 504 are offset to an angle between from about 150 degrees to about 180 degrees. In various embodiments, conical magnets 220a and 220b (or other types of magnets) are each polarized to have a direction of polarization in one or more planes that are substantially perpendicular to the axis of rotation.

FIG. 5B depicts cross sections of active field pole member 204a and either active field pole member 204b or active field pole member 204c of FIG. 3, and depicts a magnetic flux path, according to one embodiment of the invention. For ease of discussion, only view Y-Y will be discussed. View Y-Y is a sectional view of coil 208a and field pole 206a passing though coil 208b and field pole member 206b. Magnetic flux path 560 passes through both field pole members 206a and 206b and through both conical magnets 220a and 220b. For purposes of illustration, magnetic flux path 560 (or flux path) may be described as comprising two flux paths that are combined by the principle of superposition. Conical magnets 220a and 220b form the first flux path (i.e., permanent magnet-generated flux), whereas flux developed by amp-turns of the coil form the second flux path (i.e., ampere turn-generated flux). In this example, magnet flux as the first flux path exits the north pole ("N") of conical magnet 220a and crosses air gap 551a to enter pole face 307a (FIG. 3), the north pole coinciding with surface portion 521a, which confronts pole face 307a. The first flux path then traverses longitudinally through field pole member 206a and then exits pole face 505b at the end of field pole member 206a adjacent to conical magnet 220b. The first flux path continues by crossing air gap 551b and enters the south pole ("S") of conical magnet 220b, the south pole generally coinciding with a surface portion 521b of magnet surface 221b and confronts pole face 505b. The first flux path passes through conical magnet 220b to its north pole, which generally coincides with a surface portion 561b of magnet surface 221b that confronts pole face 213b. Next, the first flux path crosses air gap 551c and enters pole face 213b (FIG. 2B). From there, the first flux path returns through field pole member 206b to pole face 207b from which it exits, crosses air gap 551d, and then enters the south pole of conical magnet 220a, thereby completing the first flux path. Generally, the south pole of conical magnet 220a coincides with a surface portion 561a of magnet surface 221a (FIG. 2B) that is confronting pole face 207b. Note that in the case shown, the flux exiting pole face 207b is equivalent to that flux exiting pole face 207c. Note that no supplemental structure or material need be required to form any portion of magnetic flux path 560. As such, rotor-stator structure 550 does not include back-iron.

In a specific embodiment, the diameters of conical magnets 220a and 220b are set so that the length of the flux path in each of conical magnets 220a and 220b is relatively large with respect to the four air gaps 551a to 551d, thereby establishing a favorable magnet load line. Note that each of the four air gaps 551a to 551d provides for a flux interaction region to facilitate magnetic flux interaction between (or through) pole faces and the magnet. Note further that a flux path in either conical magnet 220a or 220b is shown to align along the axis of magnetization (i.e., from the south pole to the north pole), which can contribute to low magnet manufacturing costs and to magnets that can generate a relatively high output torque per unit volume (or size). The coercivity of the magnet, which is the property of the magnet that determines how well a magnet will keep its internal flux alignment in the influence of strong external magnetic fields, can be optimally selected by using appropriate magnet materials for a specific application.

In at least one embodiment, rotor-stator structure 550 (FIG. 5B) generates at least a portion of magnetic flux path 560 that extends substantially linearly from about surface portion 521a of the magnet surface of first conical magnet 220a to about surface portion 521b of the magnet surface of second conical magnet 220b. In one instance, the portion of the magnetic flux path consists essentially of surface portion 521a of first conical magnet 220a, surface portion 521b of the second conical magnet 220b, at least one of the field pole members, such as field pole member 206a, and two or more air gaps, such as air gaps 551a and 551b.

In at least one embodiment of the invention, conical magnets 220a and 220b can have at least the following two magnetic properties. First, conical magnet 220a and 220b are able to produce magnetic flux, such as measured in terms of flux density, "B," with CGS units of Gauss. "CGS" refers to units described in terms of the centimeter, the gram, and the second. Second, the magnet materials of conical magnet 220a and 220b are such that the magnets resist demagnetization. Materials that have an ability to highly resist demagnetization are often described as having "high coercivity," as is well known in the art. Suitable values of demagnetizing fields can be used to drive a specific magnet material flux density output to zero. As such, magnet materials that have relatively high values of coercivity generally indicate that a magnet material is capable of withstanding large values of adverse external magnetic field intensities without suffering demagnetization effects. In a specific embodiment, conical magnet 220a and 220b are composed of magnet materials having a recoil permeability value relatively close to 1.00 and sufficient coercivity, Hd, under operating conditions as to be reliable in reasonably expected conditions of operation.

Magnet materials are often characterized in part by a maximum energy product of such materials. In addition, magnet materials may be characterized by "Br," which is the magnetic flux density output from a magnet material when measured in a closed circuit and no measured external magnetic fields are being applied to that magnetic material. That maximum flux density value is frequently denoted as "Br." A high value of Br indicates that a magnet material is capable of large magnetic flux production per pole area (i.e., a high flux density). In at least one embodiment, conical magnets 220a and 220b use magnets having high flux production capability (e.g., having high values of "Br") in configurations where relatively high torque is desired in relatively small device volumes.

In various embodiments, conical magnets 220a and 220b (or other magnets) use high-valued Br magnets that can be relatively short in the axial direction and use a cone angle of about 30 degrees, for example, from the axis of rotation. But in some embodiments, conical magnets 220a and 220b (or other magnets suitable for practicing the invention) use magnet materials having lower cost and lower values of Br. In this case, the magnets generally are implemented with an air gap having a relatively larger area than those associated with higher values of Br. In particular, an increased area for an air gap is formed by increasing the axial length of a magnet, thereby increasing the surface area of a magnetic surface confronting a respective pole face. As such, lesser cone angles (e.g., less than 30 degrees) in a same outer diameter device (e.g., motor housing) can be used, albeit longer in the axial direction. Although the output torque performance, and Km, can remain the same over many embodiments, the manufacturing cost can be less in the low-valued Br version even though there can be an increase in axial length.

While various embodiments of the invention cover a multitude of design motor and/or generator designs using any of known available magnet materials, at least one embodiment uses magnet materials with low ratios of values of B to values of adverse applied field intensity, H, such ratios, as is typically specified in many magnet material data sheets, being measured at the respective material's Br point, those ratios defining the "recoil permeability at Br" of such materials. While in some cases magnet materials need not only be limited to high values of coercivity, the magnet materials should exhibit predictable output flux densities when subjected to expected adverse magnetic field or thermal conditions. As such, the value of "recoil permeability" can be at least one factor when designing motors and/or generators using a rotor-stator structure of the invention.

Recoil permeability is generally an expression of the relationship between values of B and the values of adverse applied field intensity. The values of recoil permeability are typically evaluated in terms of CGS units (because the permeability of air is 1.0 in CGS units) and can be determined by dividing a value of B (e.g., expressed in Gauss), near or at Br, by a value of adverse applied field intensity (e.g., H, near or at Hc, expressed in Oerstead). For some magnet materials, an average recoil permeability value can be determined and may be useful in magnet material selection. In one embodiment, recoil permeability can be defined for various magnetic materials by Magnetic Materials Producers Association ("MMPA") Standard 0100-00, as maintained by the International Magnetics Association ("IMA"). Note that recoil permeability can also be described in terms of MKS units (i.e., meter, kilogram, and second).

Generally, values of recoil permeability are not less than one when expressed in CGS units. The closer that a recoil permeability value is to 1.0, however, the higher the coercivity can be for a specific measured material. In most embodiments of the invention, a value of recoil permeability is typically less than 1.3. Typical high-coercivity magnet materials, such as magnets composed of neodymium-iron ("NdFe") and variants thereof, can have a recoil permeability value of about 1.04 in CGS units. Examples of recoil permeability values from various suppliers are as follows: 1.036 for grade 32H (as manufactured by Hitachi, Ltd.); 1.028 for grade 35H (as manufactured by Magnetic Component Engineering, Inc. or "MCE"); and 1.02 for grades 22H through 33H as well as 1.05 for grades 35SA through N52 (as manufactured by Shin-Etsu Magnetics Inc.). An example of such a variant is Neodymium-Iron-Boron, or "NdFeB." Common low-cost ceramic magnets, such as those composed of ferrite ceramic, can have a ratio value of about 1.25, which permits ceramic magnets to perform adequately in most applications. Note that the average recoil permeability of typical high performance ceramic magnets is usually within a range of 1.06 to 1.2 in CGS units, more or less. Example values from one supplier, Hitachi, Ltd., are as follows: 1.2 for isotropic grade YBM 3 and 1.06 for anisotropic grades YBM 1 and 2. Permanent magnets in various embodiments of the invention can comprise any magnetic material known to those ordinarily skilled in the art. Examples of such magnet materials include one or more rare-earth magnet materials that are known in the art, such as Neodymium Iron Boron ("NdFeB"), Samarium Cobalt ("SmCo") and variants of both, as well as ceramic magnets.

Coils 208 wound around each of field pole members 206 form the second flux path. In this example, the flux generated by the ampere-turns in coils 208a and 208b of FIG. 5B travels in a similar path to the permanent magnet flux, with the exception that conical magnets 220a and 220b (FIG. 2B) and cylindrical magnets 226a and 226b (FIG. 2A) have effective properties similar to that of air as viewed by the ampere turn-generated flux. As such, the ampere-turn flux generated within field pole member 206a (e.g., within coil region 506) is present at the pole faces adjacent to conical magnets 220a and 220b of FIGS. 5A and 5B and cylindrical magnets 226 of FIG. 2A. Note that coils 208, as conductors, can be wires having a circular cross-section or any other shape, such as square or rectangular.

In at lease one specific embodiment, coils 208 can include foil conductors that are conductors having a rectangular cross-section with a relatively large width and a relatively small height. Foil conductors with insulation between layers can be used in place of wire to decrease winding resistance and increase current handling capacity in the same available winding volume. Use of a foil conductor can also decrease the inductance of the winding. In one embodiment, the insulation is affixed to one side of the foil to isolate the foil conductor in subsequent windings around the core. That is, only one side of the foil conductors need be insulated since that one side insulates a non-insulated side of a previous wound portion of the foil conductor (or foil coil). Advantageously, this reduces the amount of insulation required for coils 208, thereby saving resources, increasing packing density and increasing the number of ampere turns (while decreasing the number of conductor turns) in a space otherwise filled by fully insulated conductors (i.e., insulated on all sides, such as an insulated wire). As the foil conductor also provides for relatively smaller bending radii, it can thereby decrease the winding resistances usually common in conductors having sharper bends. By decreasing the resistance, this type of conductor can also conserve power in generating amp-turn flux, especially in battery-powered motor applications.

Figure 5C:
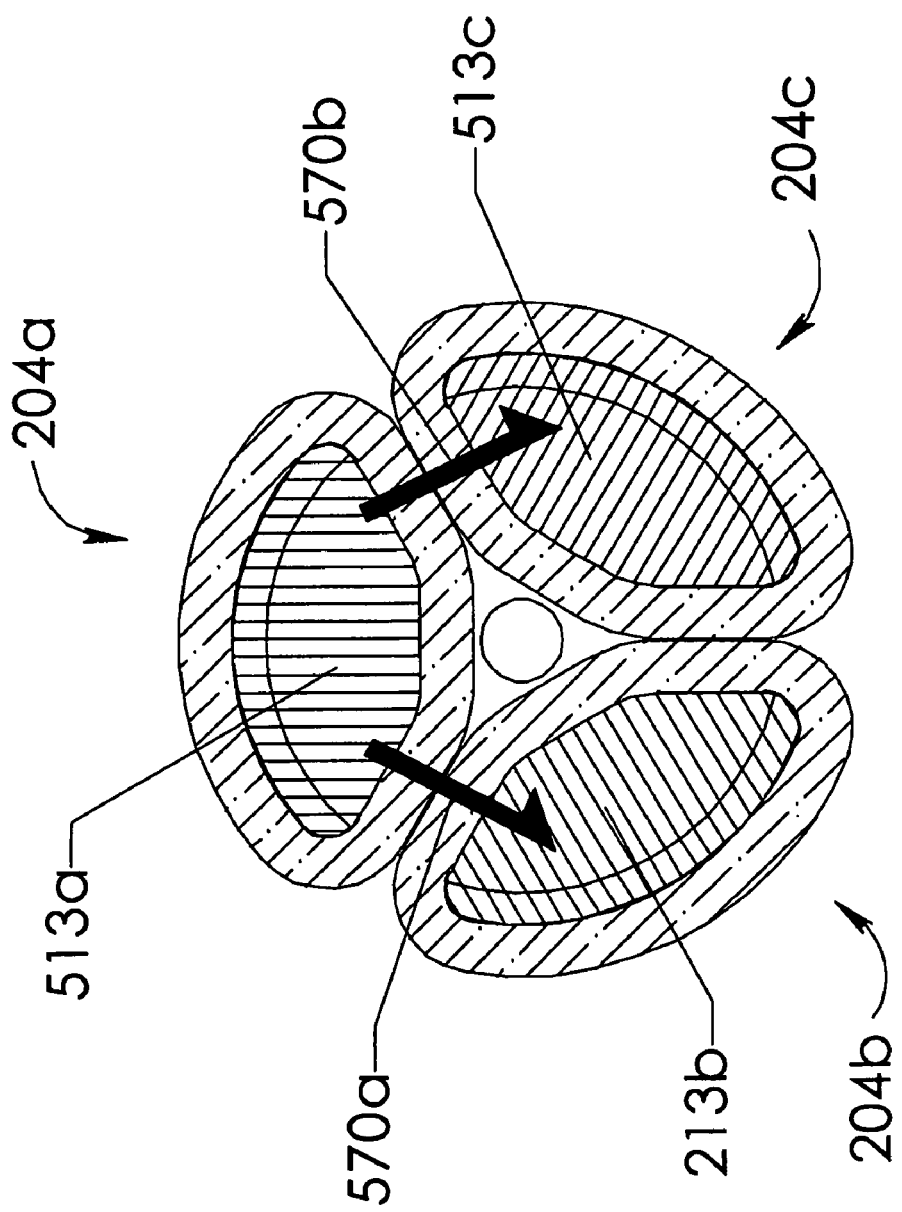
FIG. 5C depicts an example of a second flux path exiting a pole face of a field pole member generating an ampere-turn magnetic flux, according to one embodiment of the invention.

FIG. 5C depicts an example of a second flux path exiting a pole face of the active field pole member that generates that ampere-turn magnetic flux, according to one embodiment of the invention. In this figure, ampere-turn ("AT")-generated flux is generated in active field pole member 204a and then exits from pole face 513a of FIG. 5C (or as shown as pole face 505b in FIG. 5B) while dividing approximately in half to form flux 570a and 570b. Then, ampere-turn flux 570a enters pole face 213b, and ampere-turn flux 570b enters pole face 513c. Then, respective portions of the second flux path then travel longitudinally through the other field pole members (e.g., field pole members 206b and 206c) to the other ends of those other field pole members to return to active field pole member 204a, which initially generated the second flux path.

Figure 5D:
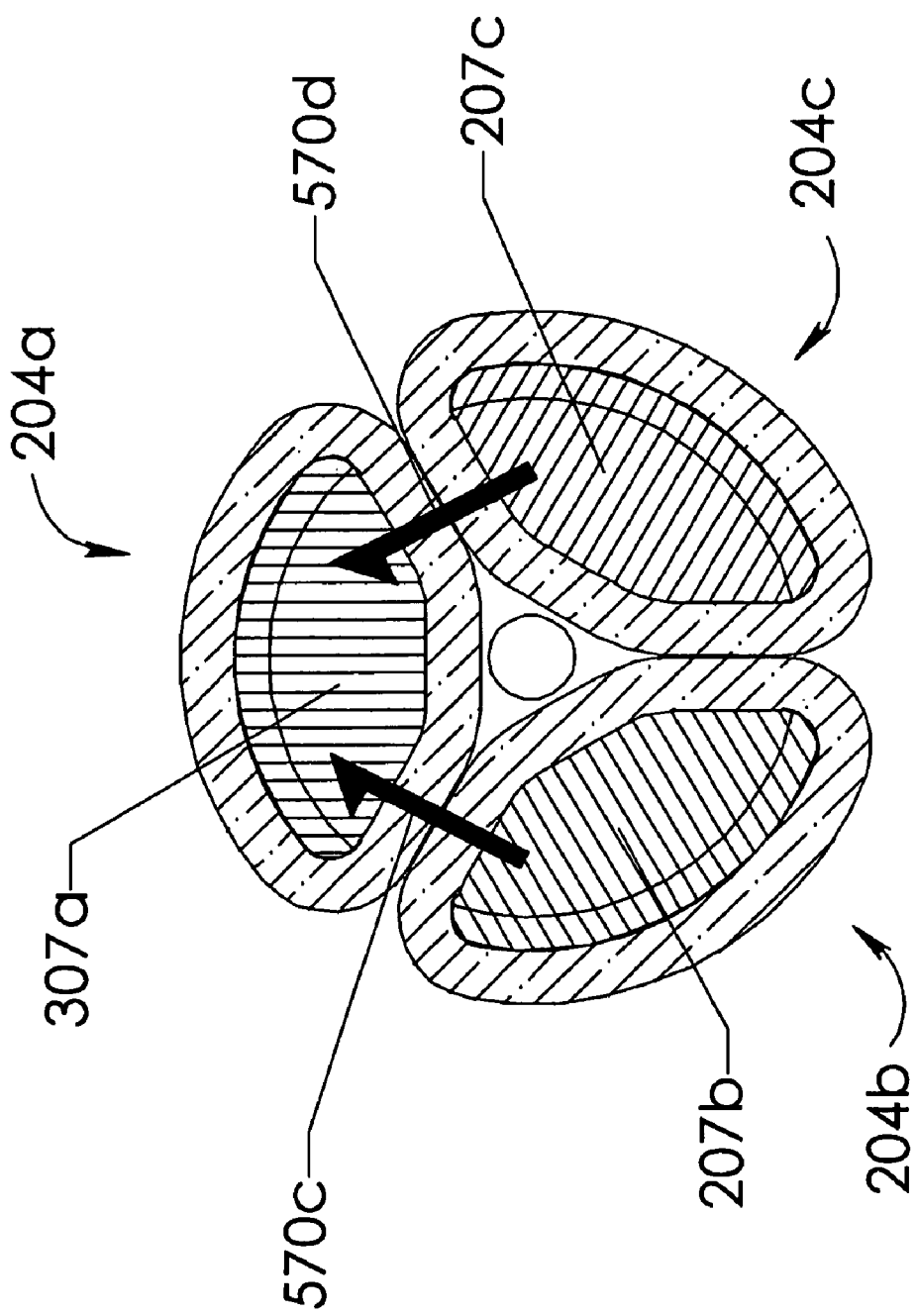
FIG. 5D depicts an example of a second flux path(s) entering a pole face of an active field pole member that originally generated the ampere-turn magnetic flux of FIG. 5C, according to one embodiment of the invention.

FIG. 5D depicts an example of the second flux path(s) returning to a pole face of the active field pole member that generated the ampere-turn magnetic flux, according to one embodiment of the invention. As shown, ampere-turn magnetic flux 570c and 570d exit respective pole faces 207b and 207c to enter pole face 307a, thereby completing the magnetic circuit of the second flux path (i.e., the ampere-turn magnetic flux path).

Conceptually, the magnetic fields generated by the ampere-turns in each field pole member of active field pole members 204a, 204b, and 204c in FIG. 5D can be viewed as regions of magnetic potential at each of the pole faces at the end regions or pole shoes of the active field pole members. In the air gaps between the confronting surfaces of the conical magnets and their adjacent pole faces, the flux of the first flux path and the flux of the second flux path interact in a manner familiar to those skilled in the art, where such an interaction is useful to generate torque by an electric motor implementing rotor-stator structure 200, according to at least one embodiment of the invention. The first and the second flux paths of rotor-stator structure 200 are efficient, at least in part, because the flux is contained within the core regions 506 (FIG. 5A) of field pole members 206 by the currents running through coils 208. The magnet flux generated by each of the conical magnets 220a and 220b interacts in a flux interaction region with the magnetic flux from pole faces of active field pole members 204. As such, flux leakage paths are generally limited to relatively very small regions at pole shoes 507a and 507b (FIG. 5A), both of which include the sides and the backs of field pole members 206. As the first and second flux paths are also mostly straight in the magnetically permeable material of field pole members 206, these field pole members are well suited to be implemented with anisotropic (e.g., grain-oriented), magnetic materials in an efficient manner. As such, field pole members 206 can be composed of any anisotropic, magnetic materials capable of carrying higher flux densities and lowering magnetic losses in the direction of magnetic orientation, such as along the grains of grain-oriented materials, as compared to the use of isotropic, non-grain oriented, magnetic materials.

To illustrate, consider that an exemplary anisotropic (e.g., grain-oriented) material can have a magnetic saturation value of at least 20,300 Gauss, whereas a typical isotropic lamination material can have a saturation value of 19,800 Gauss. An example of a suitable anisotropic material for practicing at least one embodiment of the invention is grade M6 material, as defined by the American Iron and Steel Institute ("AISI"). An example of an isotropic material is M19 material, as designated by AISI. Moreover, the anisotropic material requires only 126 Oerstead of applied field to reach saturation compared to the isotropic material, which requires 460 Oerstead. Core losses for the anisotropic grain-oriented material (e.g., laminations of 0.014 inch thick) can be about 0.66 Watts per pound at 60 Hz with 15,000 Gauss induction for Flat-Rolled, Grain-Oriented, Silicon-Iron Steel. By contrast, a typical isotropic material such as AISI lamination material M19 can have core losses of about 1.72 to 1.86 Watts per pound under similar conditions (e.g., at thicknesses of 0.0185 inches). In view of the foregoing, the use of anisotropic materials in forming field pole members 206 is advantageous over the use of isotropic materials. According to at least one embodiment, a relatively straight shape for field pole members 206 enables effective use of anisotropic materials, unlike magnetic flux paths of traditional motors.

Unlike output torque generation of conventional motors, the output torque generated by rotor-stator structures 200 of various embodiments of the invention need not be proportional to the radius from the axis of rotation of shaft 222 to the active air gaps 551a to 551d (FIG. 5B). All other factors being the same, increasing the radial distance of the pole faces and air gaps from shaft 222 does not change the output torque in the way that traditional motor design formulas indicate. For example, traditional motor design concepts teach that the regions carrying ampere-turn flux should be designed to have low reluctance paths, including the part of the ampere-turn magnetic flux path that is the air gap. According to various embodiments of the invention, the ampere-turn flux path has a relatively high reluctance path through the space occupied by permanent magnets, such as conical magnets 220, yet peak torque production is relatively high in comparison to that of most traditional motors of the same size or weight (again, with other factors being equal). In a specific embodiment, the magnet materials that constitute conical magnets 220a and 220b of FIG. 2B and/or cylindrical magnets 226 of FIG. 2A, have a magnet permeability value similar to that of air, and as such, the volume of each conical magnet 220a and 220b or cylindrical magnet 226 appears as an additional air gap to the ampere-turn magnetic circuit. In at least one embodiment, the output torque generated by an electrodynamic machine is proportional, in whole or in part, to the volumes of conical magnets 220a and 220b or to the volumes of cylindrical magnets 226.

In operation of rotor-stator structure 200, coils 208 are sequentially energized to cause rotation of rotor assembly 202. The energized coils generate magnetic potentials at the pole faces. These magnetic potentials tend to re-orient the internal field directions of the magnets (e.g., conical magnets 220) to the direction of the applied external field. The external field, in effect, presents an angularly-directed demagnetizing field to conical magnets 220a and 220b such that the demagnetizing field is capable of reaching relatively large amplitudes when a motor implementing rotor-stator structure 200 is under high torque loads. The intense demagnetizing field can detrimentally re-magnetize magnet materials of conical magnets 220a and 220b that have insufficient coercivity. For this reason, at least one embodiment of the invention uses magnet materials suited for high torque loading and have: (1) a low B-to-adverse-applied-field intensity ratio, and (2) a relatively low recoil permeability, such as less than 1.3 in CGS units, for example.

In an embodiment of the invention, the produced torque is through the natural inclination of the magnets, such as conical magnets 220, to seek the lowest energy position. Accordingly, the magnet poles of conical magnets 220, which can be permanent magnets, tend to rotate toward regions of greatest magnetic attraction and away from regions of magnetic repulsion, whereby such regions of "magnetic potential" are created at the air gaps at both ends of energized active field pole members 204 by the ampere-turn generated magnetic fields. Since a magnet having a relatively high coercivity will resist attempts to angularly displace the direction of its internal magnetic field, this resistance to angular displacement is manifested as mechanical torque on the body of the permanent magnet, thereby transferring torque to the shaft. As such, the magnets (e.g., conical magnets 220) can develop and then transfer torque to the shaft as useful output torque applied to a load.

Figure 5E:
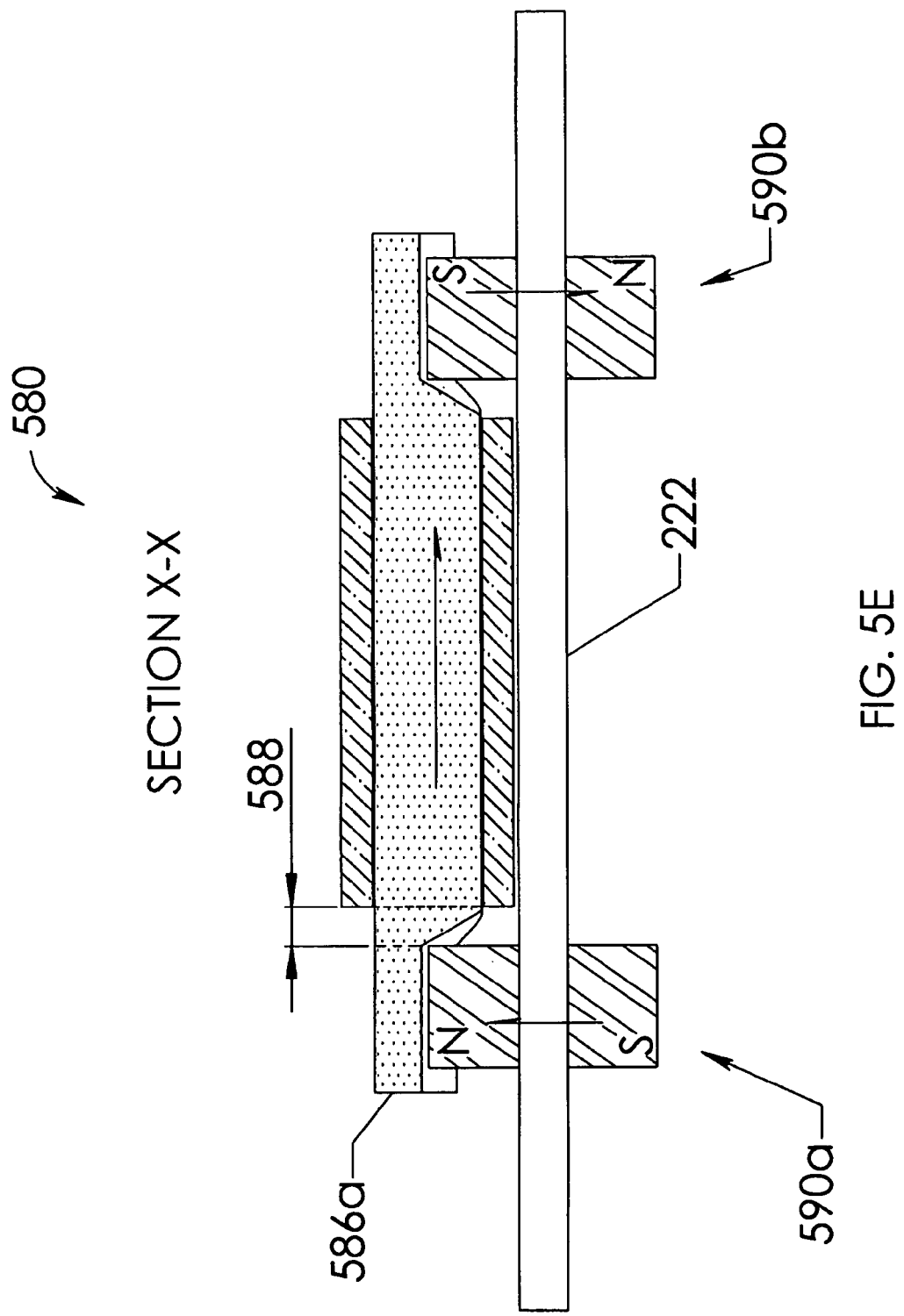
FIGS. 5E and 5F depict sectional views illustrating an exemplary magnetic flux path in another rotor-stator structure, according to an embodiment of the present invention.
Figure 5F:
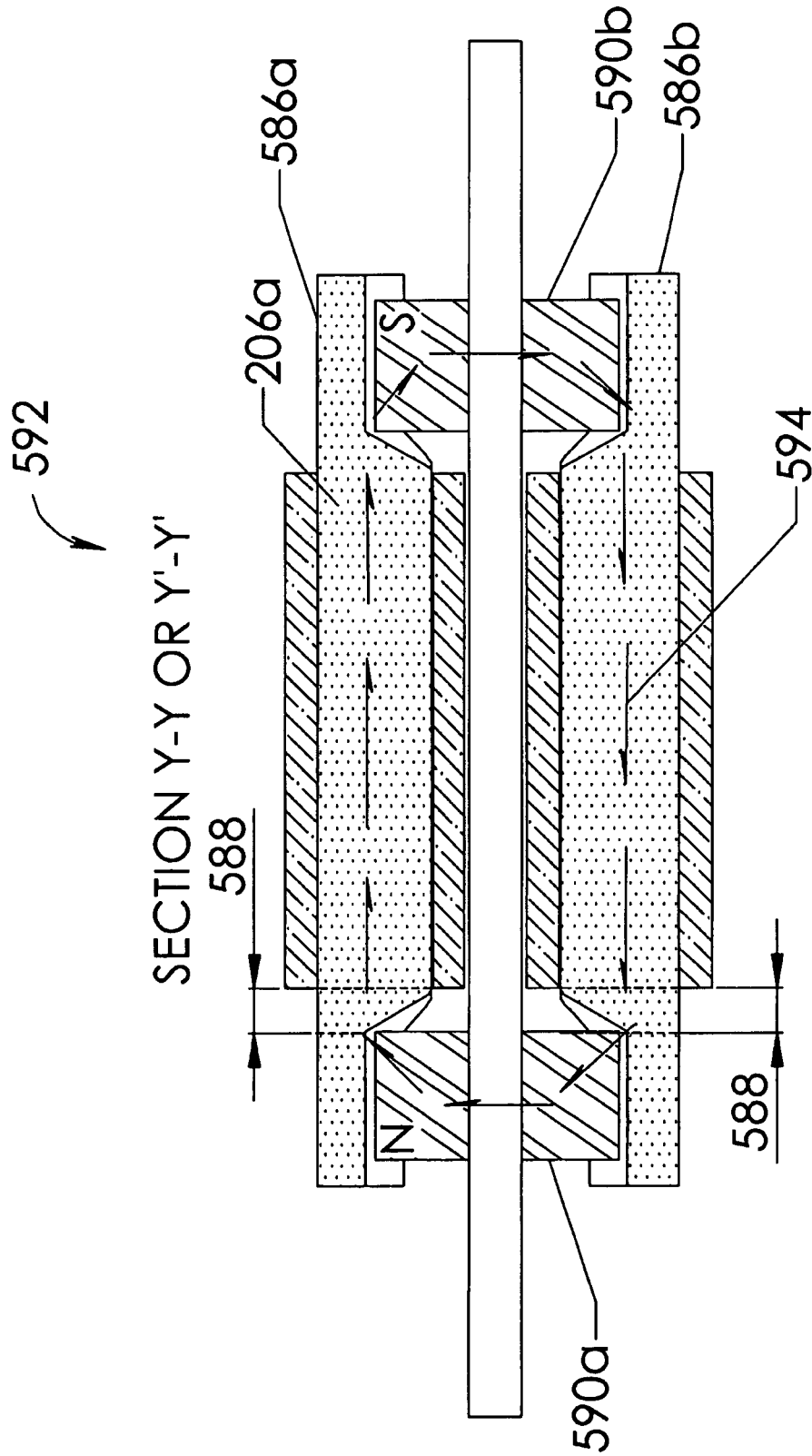

FIGS. 5E and 5F depict sectional views illustrating an exemplary magnetic flux path for another rotor-stator structure that includes cylindrical magnets, according to at least one embodiment of the invention. FIG. 5E depicts a cross section of active field pole member 586a of rotor-stator structure 580, the cross section showing a sectional view X-X of field pole member 586a and cylindrical magnets 590a and 590b. While the pole faces, pole shoes, a coil region and coil are similar in functionality to similarly-named elements of FIG. 5A, field pole member 586a includes an additional structural and/or functional element. Namely, field pole member 586a includes a transition region 588, the function and structure of which are described below, such as in one or more of FIGS. 17A to 20. FIG. 5F depicts a sectional view of at least two active field pole members similar to FIG. 5B, and depicts a magnetic flux path, according to one embodiment of the invention. Similar to sectional view Y-Y, as defined in FIG. 5B, rotor-stator structure 592 is a sectional view of field pole 586a and field pole member 586b. Magnetic flux path 594 passes through both field pole members 586a and 586b and through both cylindrical magnets 590a and 590b. Also shown are transition regions 588. Note that the shaft, pole faces, pole shoes, coil regions and coils are similar in functionality to similarly-named elements of FIG. 5B.

Figure 6A:
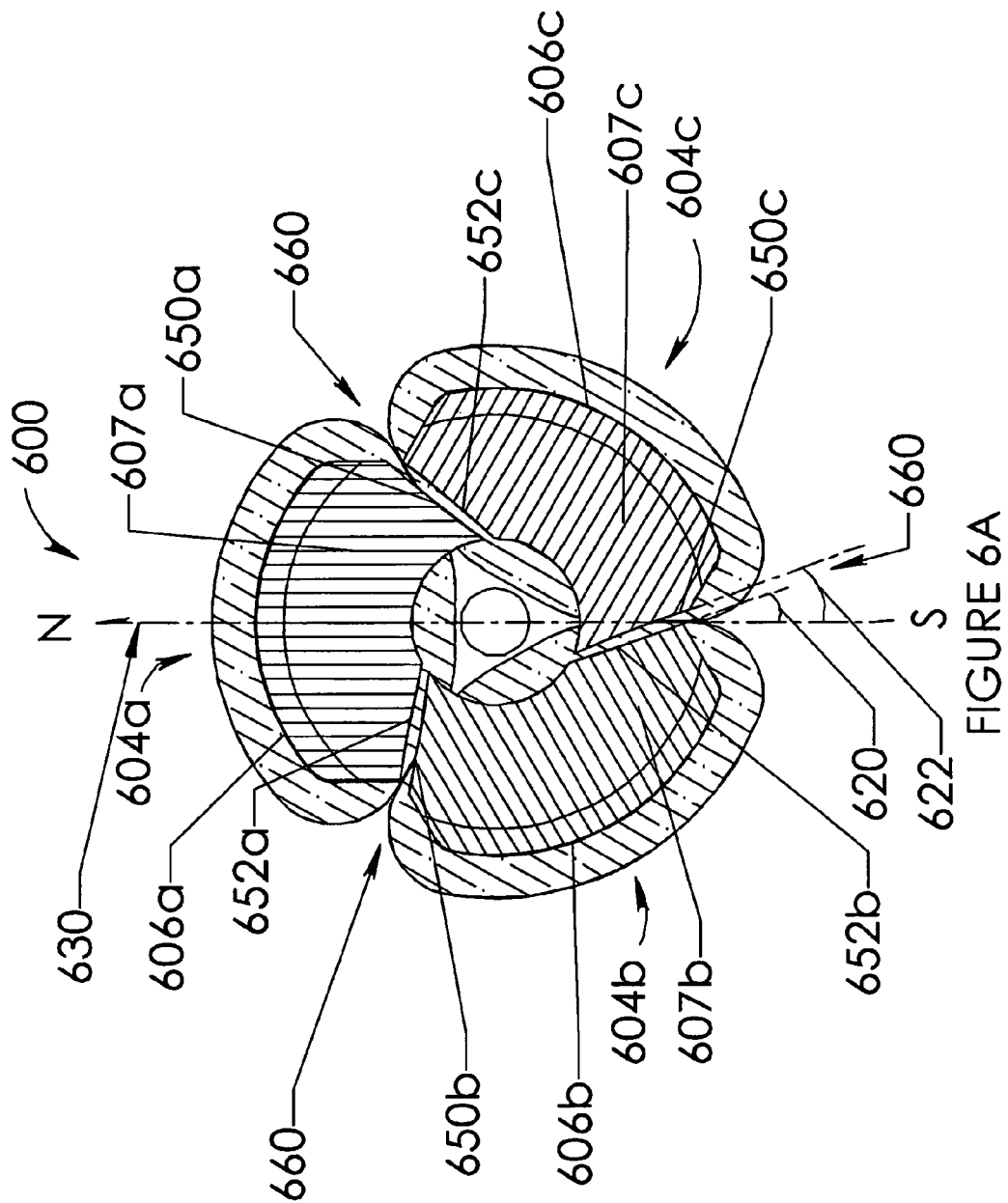
FIGS. 6A and 6B illustrate an end view of another exemplary rotor-stator structure, according to another embodiment of the present invention.
Figure 6B:
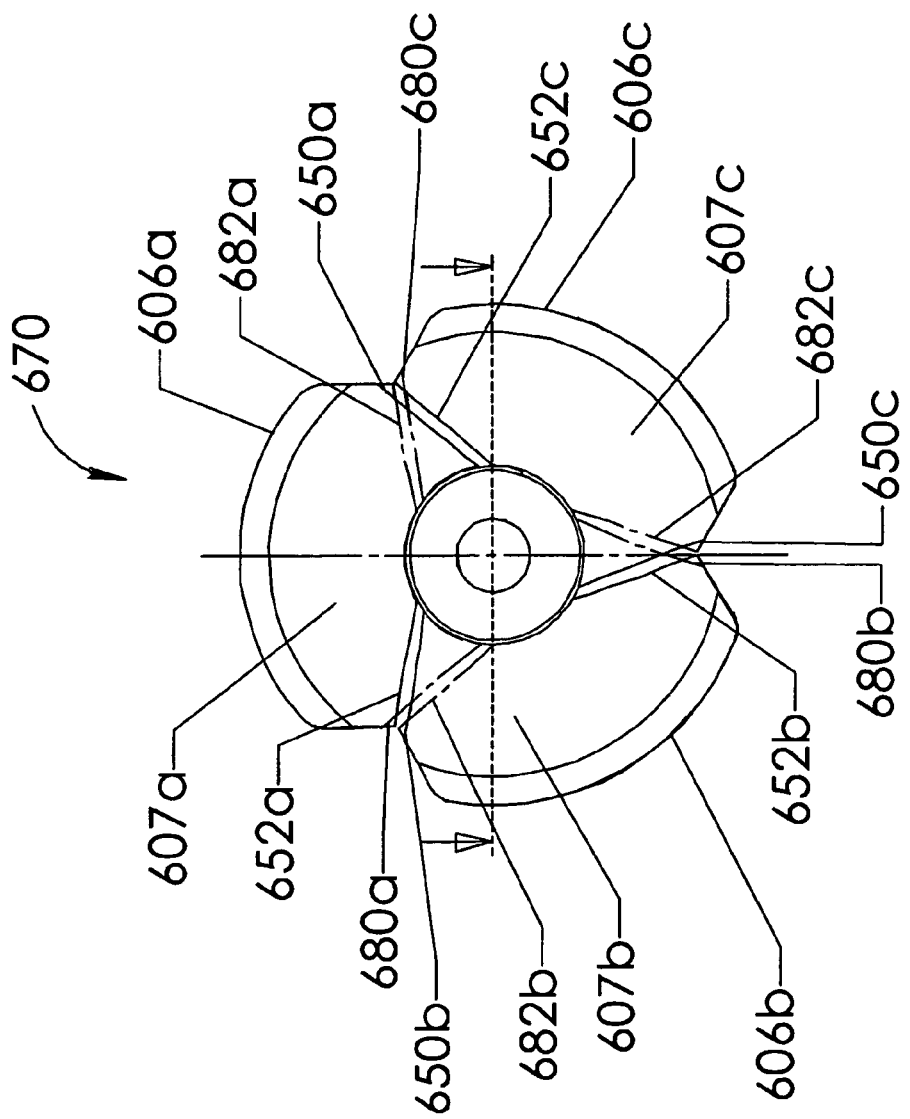
Figure 6C:
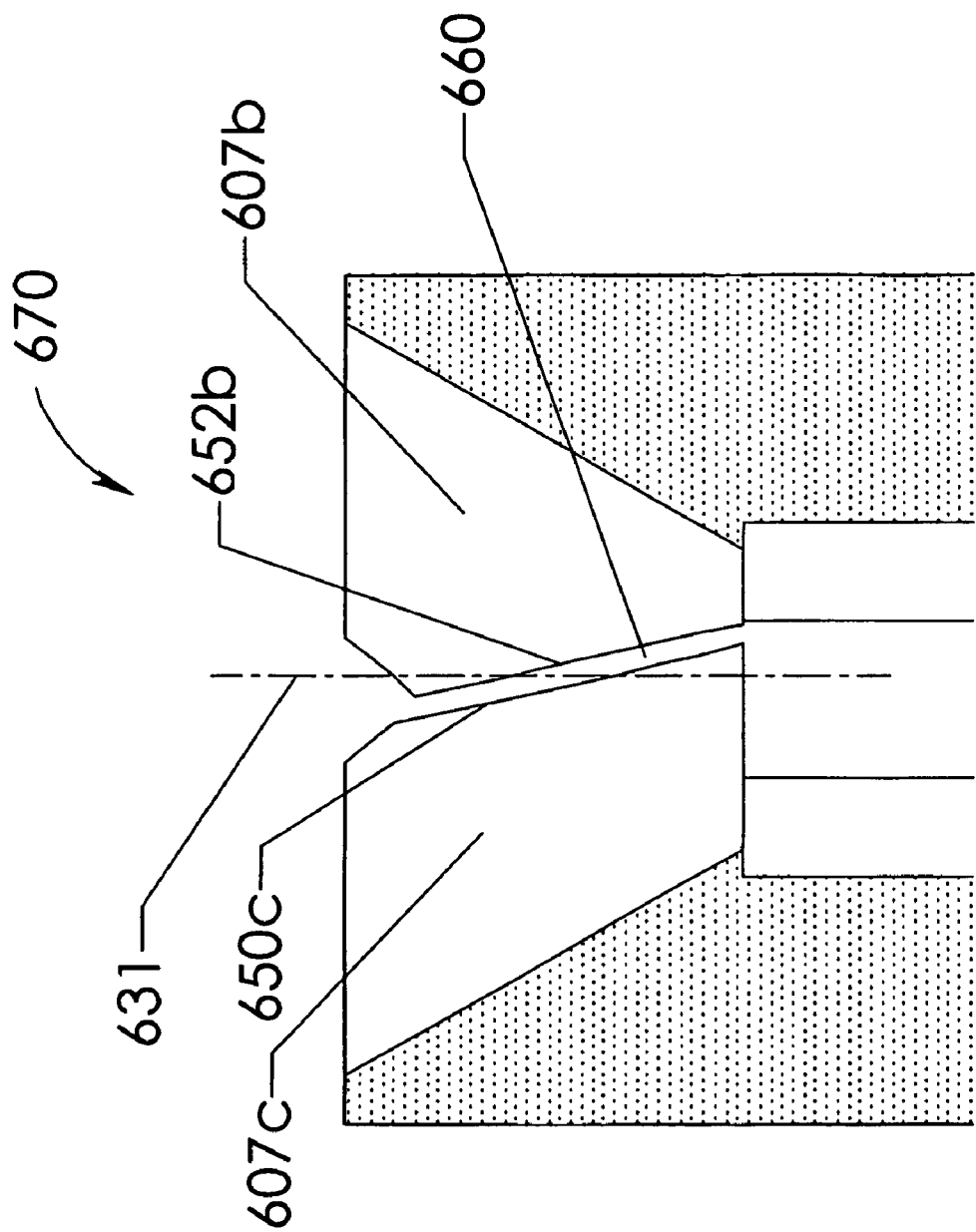
FIG. 6C depicts a partial sectional view of the rotor-stator structure of FIGS. 6A and 6B, according to one embodiment of the invention.

FIGS. 6A, 6B and 6C illustrate an end view 600 of another exemplary rotor-stator structure, according to another embodiment of the invention. FIGS. 6A and 6B show end views 600 of a rotor-stator structure while FIG. 6C is a partial sectional view A-A of FIG. 6B. FIG. 6A shows active field pole members 604 each having a skewed pole face 607 at an end of a respective field pole member 606. Each skewed pole face 607 has a contoured surface that generally tracks the surface characteristics of that of a confronting surface portion of an adjacent magnet, such as conical magnet 220a, to form an air gap having, for example, a relatively constant air gap thickness. Air gap thickness generally refers to the orthogonal distance between a point on a pole face and a point on a confronting surface of a magnet. The skewed pole faces 607 are, at least in part, defined by surface edges and/or sides of field pole members 606 that are slightly angled or skewed with respect to the magnetization direction, (e.g., direction of polarization), of an adjacent magnet. Skewed edges and/or sides are shown in FIG. 6A as first skewed edges 650 and second skewed edges 652, both of which are configured as edges of field pole members 606 to form skewed field pole gaps 660 when active field pole members 604 are arranged in a rotor-stator structure. As an example, consider that first skewed edge 650c is configured to form an angle 622 with respect to at least one direction of polarization 630 of a magnet (not shown). Consider further that second skewed edge 652b is configured to form an angle 620 with respect to direction of polarization 630. Angles 620, 622 can be the same angle or can be any other angle that is suitable for forming field pole gaps 660 that are skewed in relation to the directions of polarization of one or more magnets. Note that FIG. 6C is a partial sectional view showing skewed edges being configured so that the plane of magnetic polarization 631 does not align with either of field pole edge 650 or field pole edge 652. In particular, field pole edge 650c and field pole edge 652b both do not align (i.e., are skewed) relative to plane of magnetization 631. In at least one embodiment, field pole edge 650a and field pole edge 652 are each parallel to a first plane that is at an angle with a second plane that includes or is parallel to plane of magnetization 631.

FIG. 6B is an end view 670 showing skewed pole face edges at both ends of field pole members 606. By implementing skewed field pole gaps 660 of FIG. 6A in a rotor-stator structure, detent torque ("cogging") is reduced. In at least one embodiment, skewed field pole gaps 660 are adapted for use with permanent magnets that are diametrically polarized, such as conical magnets 220. In this instance, end view 670 of FIG. 6B is an end view showing pole faces 607 that are configured to have surface contours similar to that of an adjacent conical magnet 220a, pole faces 607 being similar to those shown in FIG. 6A. Also shown in FIG. 6B are first skewed edges 680 and second skewed edges 682, which are associated with pole faces at the other end of field pole members 606 (e.g., at the other pole shoe opposite than that associated with first skewed edges 650 and second skewed edges 652 as indicated by the broken lines). First skewed edges 680 and second skewed edges 682 in this case have angles similar to those of first skewed edges 650 and second skewed edges 652, respectively, but face a magnet surface associated with conical magnet 220b, for example. As such, the angular directions of the field pole gaps formed by edges 650 and 652 are opposite in the angular direction of the field pole gaps formed by edges 680 and 682. Consequently, the diametrically polarized magnets will generally not align with a field pole gap having pole face sides similar to those that form field pole gap "G" between planes 310 and 320 (FIG. 3), which can be a source of cogging torque in an electric motor. Note that distance between edges 650 and 652, as well as between edges 680 and 682, can be configured to be as narrow as necessary to minimize the cogging effects of the field pole gaps. In at least one embodiment, first skewed edges 680 and second skewed edges 682 can have angles similar to those of first skewed edges 650 and second skewed edges 652. But edges 680 and 682 lie in the same respective planes as edges 650 and 652. Advantageously, this helps to balance torque that tends to twist the shaft, and also to balance axial forces that derive from the direction of magnet polarization relative to the skewed edges of field pole members 606.

Figure 7A:
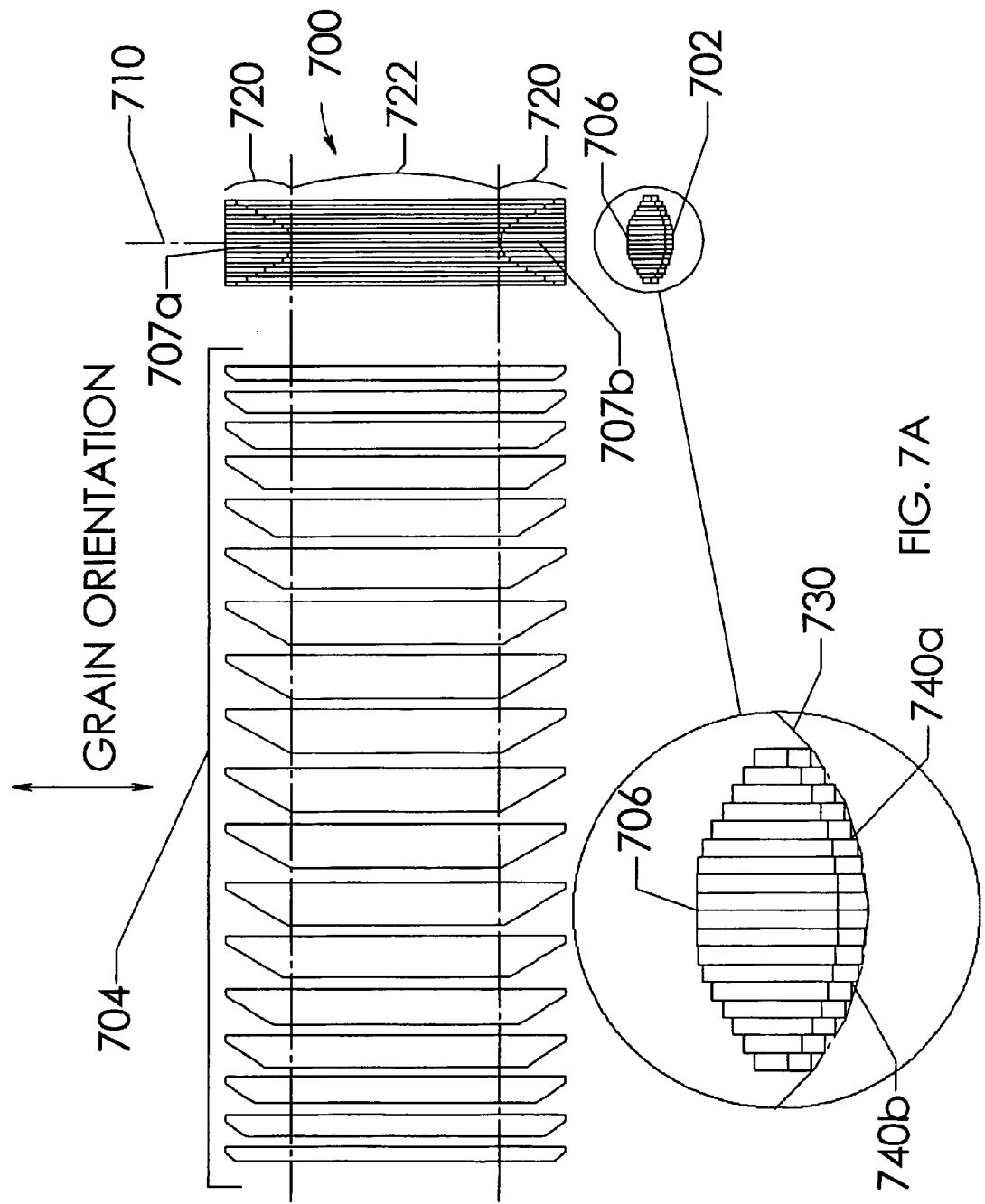

FIGS. 7A and 7B illustrate an exemplary field pole member, according to one embodiment of the invention. Although each of field pole members 206a, 206b, and 206c can be composed of a single piece of magnetically permeable material (e.g., a piece formed by a metal injection molding process, forging, casting or any other method of manufacture), these field pole members can also be composed of multiple pieces, as is shown in FIGS. 7A and 7B. FIG. 7A depicts one of field pole members 206 as a stacked field pole member 700 composed of a number of laminations 704 integrated together. In this instance, stacked field pole member 700 has an outer surface 702 having a cylindrical outside diameter with an arc and a relatively straight inner surface 706 to increase the coil packing density while still leaving room for the rotating shaft. Field pole member end regions 720 generally include pole faces 707 for interacting with the flux of permanent magnets at each end of field pole member 700, whereas a central portion 722 (i.e., a central field pole member portion) generally includes a core region between pole faces 707, such as coil region 506 (FIG. 5A). A coil (not shown) can be wound more or less about central portion 722. FIG. 7B is a perspective view of stacked field pole member 700 and laminations 704, which can be composed of an anisotropic material. In this example, the anisotropic material includes grain-oriented material.

In at least one embodiment, a field pole member 700 includes a central field pole member portion 722 having an outer peripheral surface, such as outer surface 702. The outer peripheral surface is generally coextensive with a portion of a circle 730 about the axis of rotation, regardless of whether the field pole is composed of laminates. By forming the outer peripheral surface of a field pole member to fit within a circle or an equivalent shape, a more compact rotor-stator structure provides an electrodynamic machine with a smaller volume than if the outer peripheral surface coincided with a portion of a square, for example. As depicted in FIG. 7A, a field pole member 700 includes laminations and a central field pole member portion 722 between a first flux interaction surface (e.g., a pole face 707) and a second flux interaction surface (e.g., the other pole face 707). In this example, outer surface 702 is circumscribed by at least a portion of a circle 730, whereby one or more points (e.g., points 740a and 740b) intersect or touch circle 730. In at least one embodiment, the structure of field pole member 700 can be described in reference to a conceptual median plane, which appears as medial line 710. Medial line 710 extends in an axial direction and divides a quantity of laminations constituting field pole member 700 approximately in half (e.g., includes percentages from 50/50 to 60/40). With respect to one side of medial line 710, the laminations generally decrease in at least one dimension as the laminations are positioned farther from medial line 710. Note that although not required, the laminations can be formed from a substrate composed of a magnetically permeable material in configurations that help reduce wastage of the magnetically permeable material. But again, wastage need not necessarily be a required factor in the design of each embodiment of laminated field pole of the invention.

FIG. 7C shows an example of at least a central portion of a field pole member, according to at least one specific embodiment of the invention. Note that pole shoes having contoured pole faces are omitted so as not to obscure the depiction of cross-sections for at least the central portion of a field pole member. Field pole member 790 is formed from laminations 792 and is configured to have a square-shaped form factor to increase field pole cross-sectional area, which in turn increases an amount of magnetic flux can pass through field pole member 790. For example, square cross-sectional area 794 can carry more magnetic flux than the oval-like shaped cross-sectional area of field pole member 700 of FIG. 7A. FIG. 7C also shows a tear-drop cross-sectional area 796 that can be implemented in at least one embodiment. In particular, tear-drop cross-sectional area 796 lies in a plane having a substantially radial direction. This orientation facilitates the accommodation of field pole members 790 as the quantity of field pole members 790 increases. Tear-drop cross-sectional area 796 can be configured to optimize the ratio of a winding (e.g., copper conductor) to the material (e.g., iron) constituting field pole members 790 within a specific set of magnetic flux requirements and the envelope constraints of the motor.

Note also that various winding patterns can be implemented in any of the field poles in FIGS. 7A to 7C to enhance performance. For example, a cantered or full-coverage winding can cover substantially all of the sides and/or the back of field pole member 700, at both ends of the structure, to reduce the flux that might leak from one field pole member to another. As such, the wire of a coil need not be wound in planes generally perpendicular to the long axis of the field pole member, but at an oblique angle. With coils being placed close to the magnetic air gap, those coils can be more effective in reducing flux leakage, for example, in pole shoe regions. Note that the above-described winding patterns are applicable to any of the field pole members described herein.

Figure 7D:
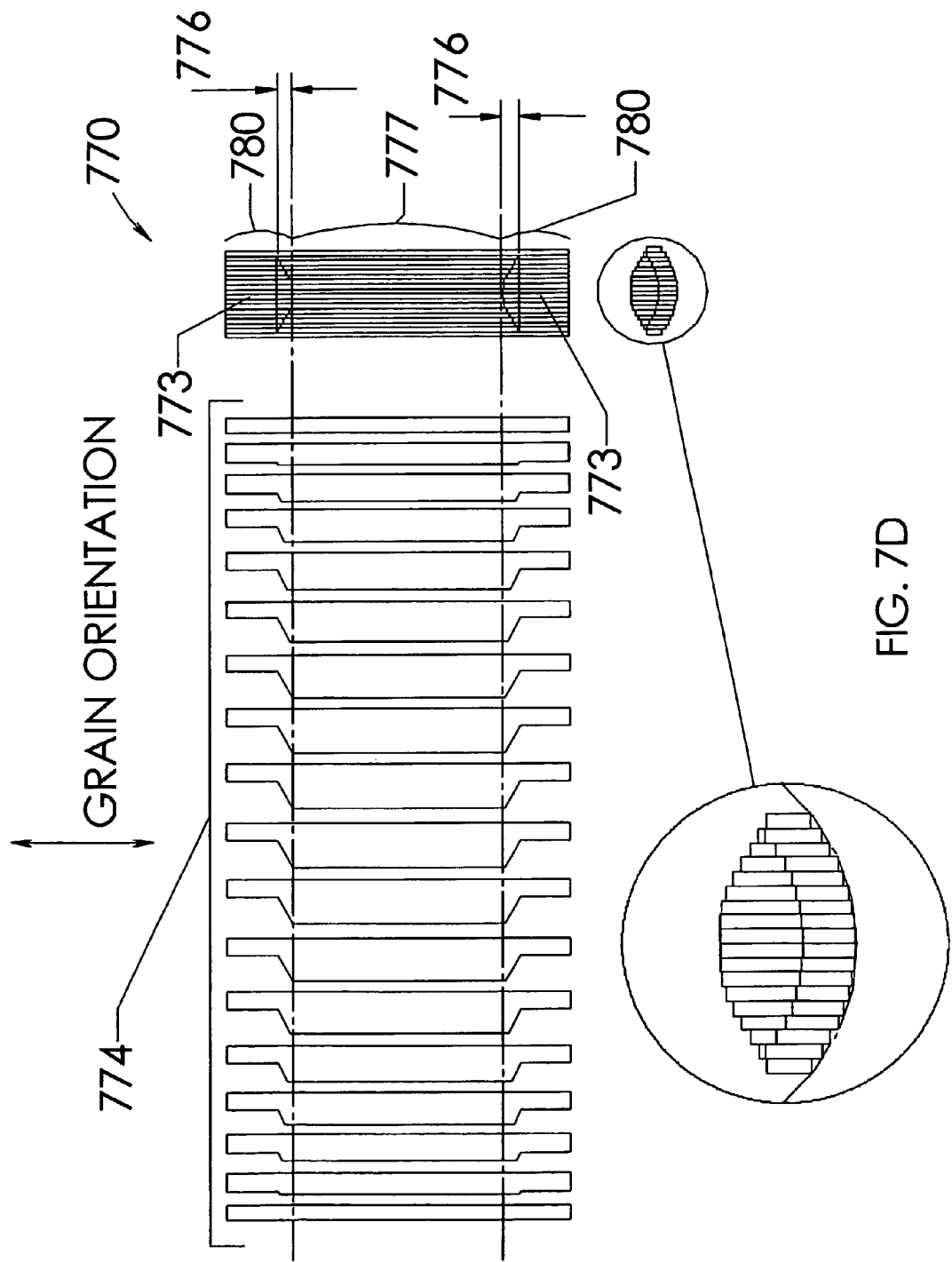
Figure 7E:
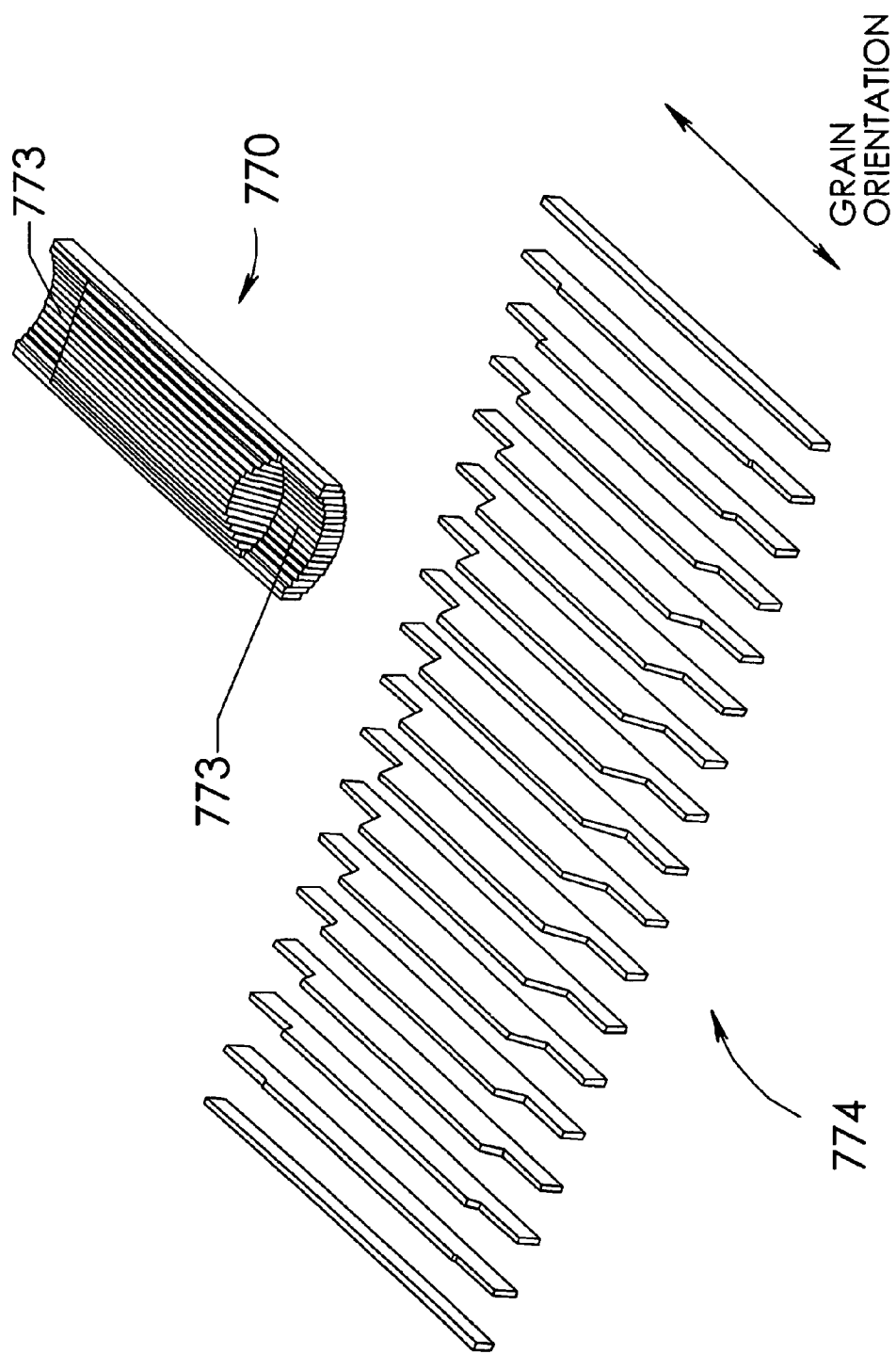

FIGS. 7D and 7E illustrate another exemplary field pole member, according to another embodiment of the invention. Although similar to FIG. 7A, FIG. 7D depicts one of field pole members 586a and 586b (FIG. 5F) as a stacked field pole member 770. As shown, field pole member 770 is composed of a number of laminations 774 integrated together. Field pole member end regions 780 generally include pole faces 773 for interacting with the flux of permanent magnets at each end of field pole member 770, whereas a central portion 777 (i.e., a central field pole member portion) generally includes a core region between pole faces of field pole members 586a (FIG. 5E). At ends 780, which can be synonymous with pole shoes in some embodiments, field pole member 770 includes transition regions 776. These transitions regions are described below in more detail. FIG. 7E is a perspective view of stacked field pole member 770 and laminations 774, which can be composed of an anisotropic material. In this example, the anisotropic material includes grain-oriented material.

Figure 8:
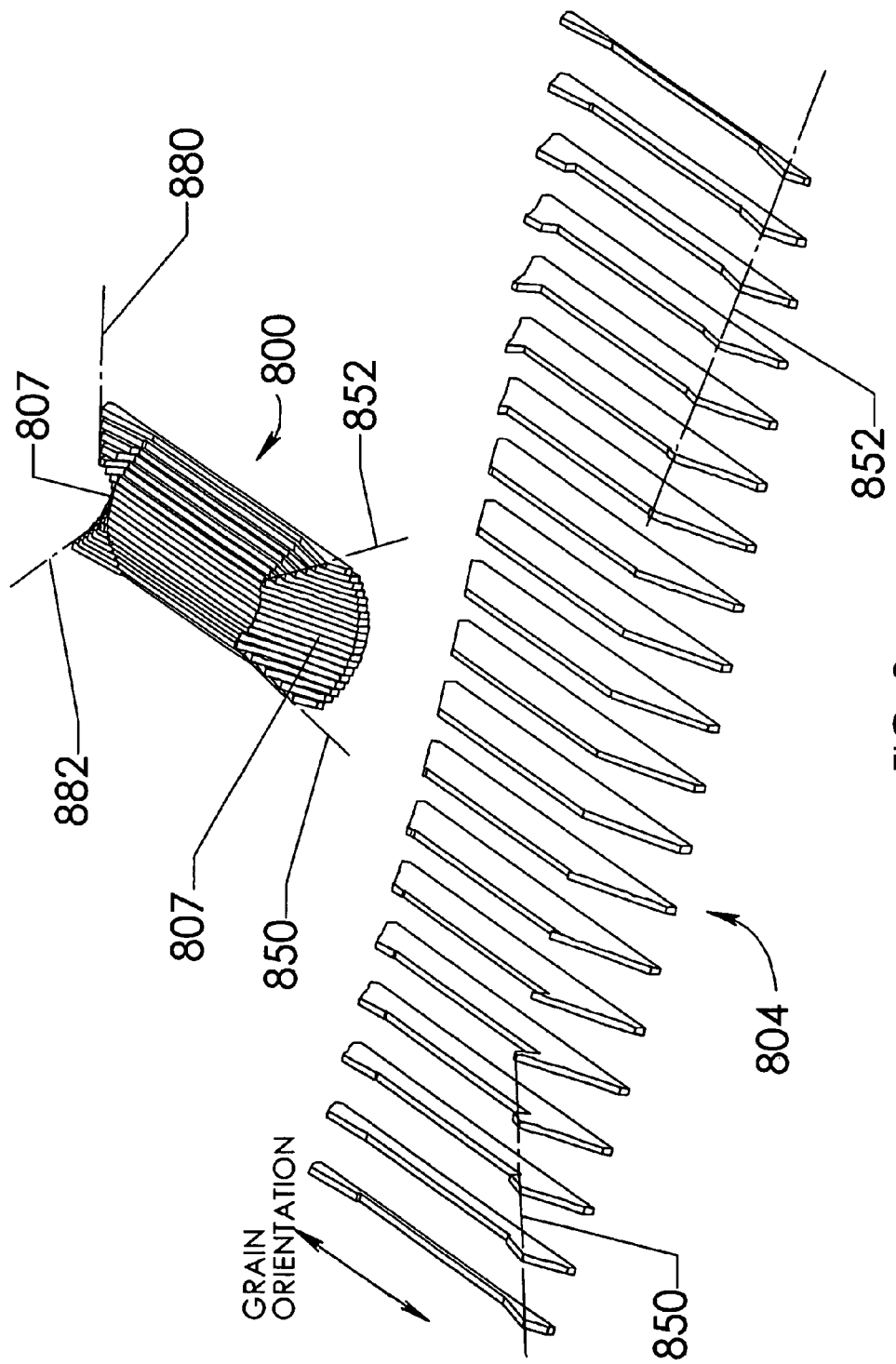
FIG. 8 illustrates another exemplary field pole member having skewed pole faces, according to a specific embodiment of the invention.

FIG. 8 illustrates another exemplary field pole member having skewed pole faces, according to a specific embodiment of the present invention. As shown, stacked field pole member 800 is constructed from a number of laminations 804, similar to stacked field pole member 700. Laminations 804 are patterned to provide skewed pole faces 807. Pole face 807 is bound by both a first skewed edge 850 and a second skewed edge 852, whereas the other pole face 807 at the other pole shoe is bound by a first skewed edge 880 and a second skewed edge 882. Note that edges 850, 852, 880 and 882 can respectively correspond to edges 650, 652, 680, and 682 of FIG. 6B. Also note that edges 850 and 882 can be formed to lie in the same planes as edges 880 and 852, respectively, to balance torque that might twist the shaft and also to balance axial forces that derive from the direction of magnet polarization relative to the skewed edges of field pole members 800. In some cases, laminations 804 (as well as laminations 704) advantageously can be formed (e.g., stamped out) in a series of either similarly or differently patterned shapes from a single substrate (e.g., a sheet of metal or the like) or from different substrates in a manner that minimizes waste during manufacturing. A substrate can either be a single sheet or an elongated strip of material that, for example, can be rolled from a spool. Note that the manufacture of laminations 704 (FIG. 7B) and 804 (FIG. 8), for example, does not waste materials typically jettisoned to create circular holes in circular stator structures.

In some embodiments, laminations 704 and 804 can be assembled from laminated anisotropic (e.g., grain-oriented) sheet stock with the direction of magnetic orientation being oriented longitudinally, such as parallel to an axis of rotation. This is so that flux can be easily conducted axially from one end of the motor to the other. The laminations can be electrically insulated from each other, which can reduce eddy current losses. In one embodiment, laminations 704 and 804 are composed of grain-oriented steel and provide various field pole members with high permeability, low loss and/or high saturation levels in a relatively low cost material. One type of anisotropic material suitable for implementing laminations 704 and 804 is cold-rolled-grain-oriented steel, or "CRGO lamination steel." To illustrate the advantages of using grain-oriented lamination in accordance with at least one embodiment, cold rolled grain oriented steel, such as grade M6 lamination (as designated by AISI) having a thickness of 0.014 inches, can have a typical permeability of 50,000 while subjected to an applied field of 10,000 Gauss. By contrast, an isotropic laminate steel (e.g., "M19" laminates of 0.0185 inches thick) can have a typical permeability of about 3700, under similar conditions. Note that permeability, as described above, is in terms of direct current ("DC") permeability. Field pole members can be made from many different magnetically permeable materials, such as silicon iron alloys, steel alloys, iron alloys, nickel iron alloys, cobalt nickel alloys, magnetic powdered alloys, soft magnetic composites, and the like, according to various embodiments of the invention. Soft magnetic composite materials, which are also known as "SMC materials," are composed of compacted, electrically insulated particles that are also magnetically permeable. As such, SMC materials exhibit relatively low eddy current losses when compared to traditional SiFe lamination materials at relatively high frequencies. Another significant advantage of SMC materials is its ability to be formed in three dimensions through use of properly designed compaction molds and dies.

Figure 9A:
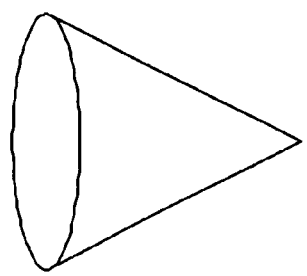
FIGS. 9A to 9P illustrate examples of other-shaped permanent magnets that can be implemented in an exemplary rotor-stator structure, according to various embodiments of the invention.
Figure 9B:
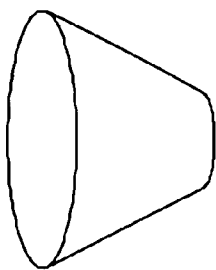
Figure 9C:
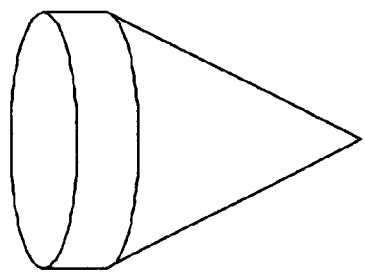
Figure 9D:
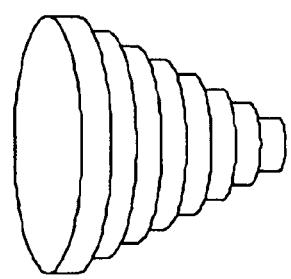
Figure 9E:
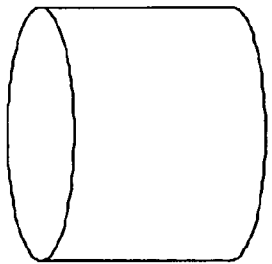
Figure 9F:
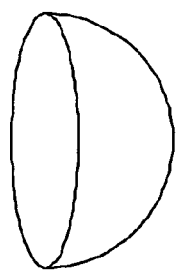
Figure 9G:
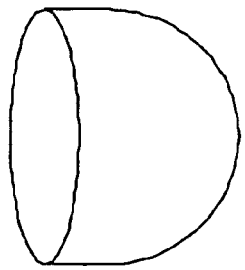
Figure 9H:
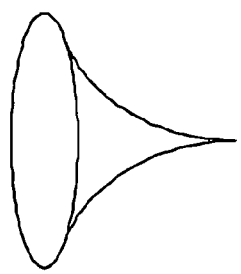
Figure 9I:
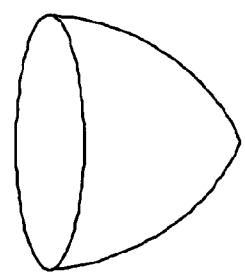
Figure 9J:
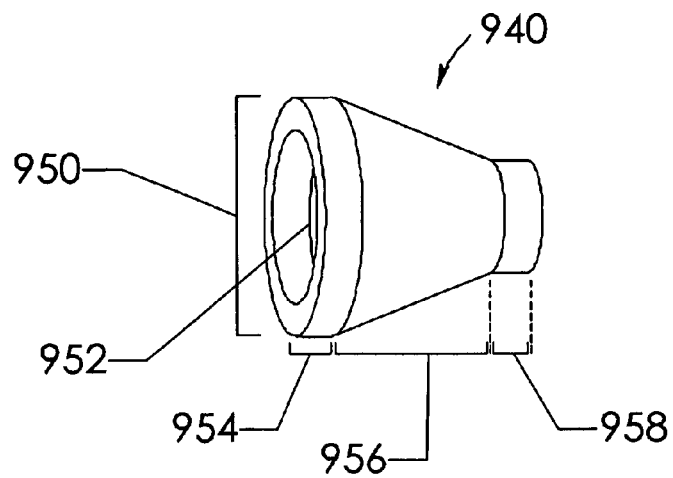
Figure 9K:
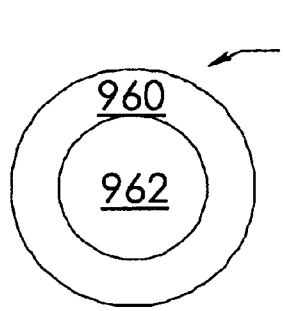
Figure 9L:
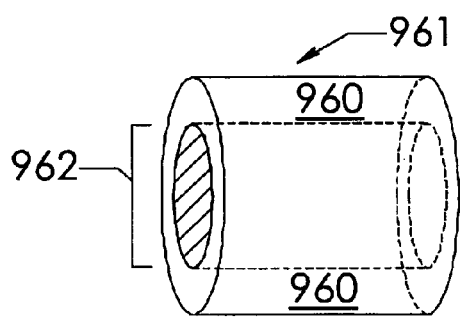
Figure 9M:
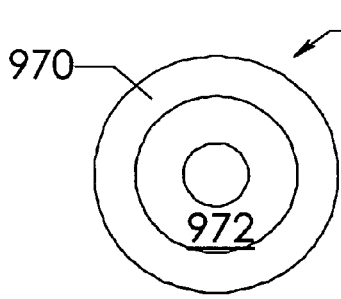
Figure 9N:
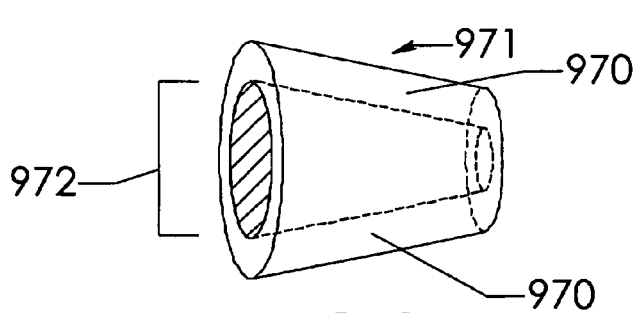
Figure 9O:
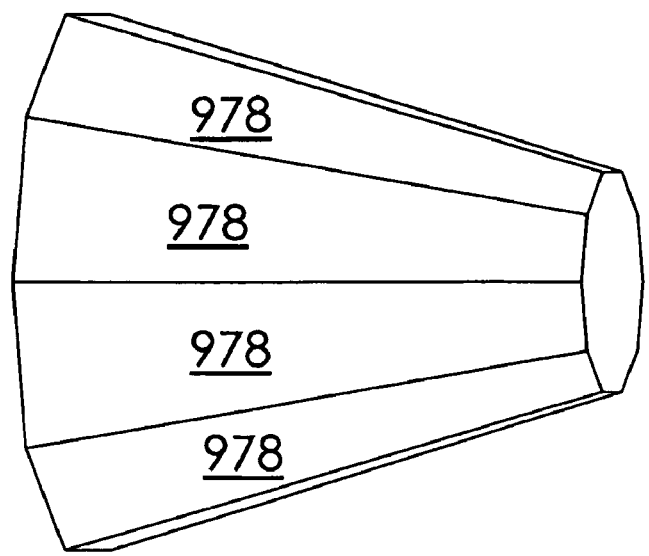
Figure 9P:
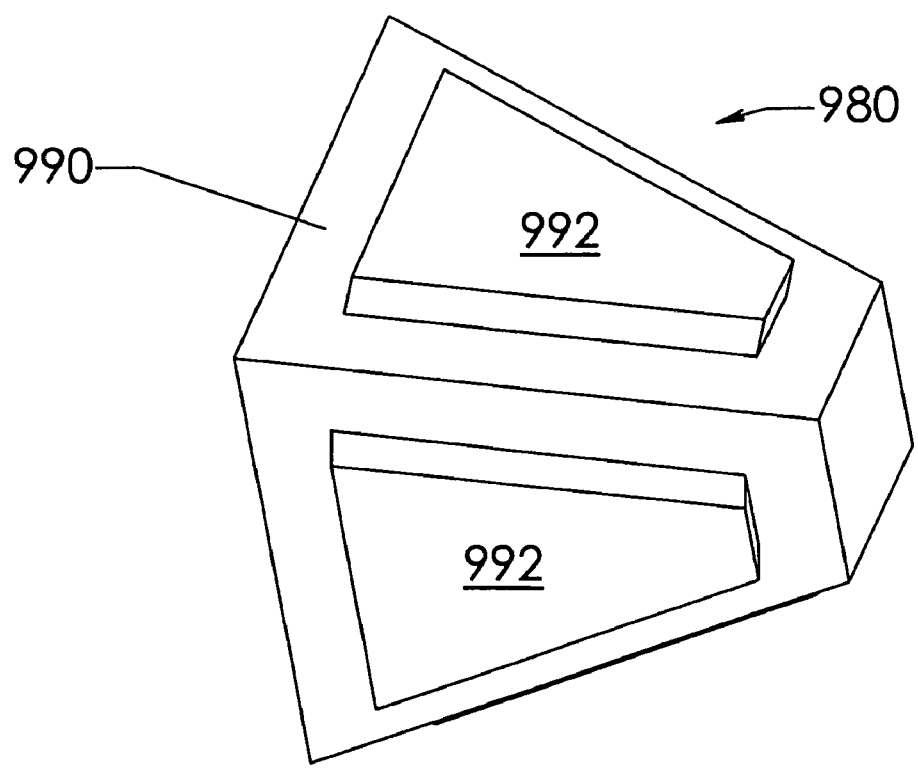

FIGS. 9A to 9P illustrate examples of other-shaped permanent magnets that can be implemented in a rotor-stator structure, according to various embodiments of the invention. Although the magnets shown in FIG. 2B are conical in shape, the term "conical" is intended to be construed broadly to include one or more shapes that form one or more surfaces, or portions thereof, that when coaxially mounted on a shaft, are at an angle to the shaft such that at least one surface, when extended, would intersect an axis of rotation. So, the term "conical magnet" is meant to cover any configuration of magnet that has at least a portion of a surface that is conical or tapered toward a point coaxial with, or on, an axis of rotation. For example, at least one type of conical magnet has one or more surfaces whereby the cross-sections of the magnet at each of those surfaces generally (or on average) either increase or decrease progressively along the axial length of the magnet. In at least one specific embodiment, a relevant dimension for describing a portion of conical magnet surface is a surface boundary, such as a contoured surface area that can be oriented in space with respect to a line. Note that FIGS. 9E, 9K and 9L depict cylindrically-shaped magnets that do not include at least a portion of a confronting surface (i.e., a surface configured to confront a pole face) that is other than cylindrical. As such, these types of shapes are generally not considered within the definition of what is deemed a conical magnet.

FIG. 9A shows a full cone-shaped magnet as an example of a conical magnet, whereas FIG. 9B depicts a conical magnet being a truncated cone magnet described as a "frustum of a right circular cone," which is a frustum created by slicing the top off a right circular cone (e.g., the slice forming an upper base parallel to the lower base, or outer surface, of the right circular conical magnet). Note that other cone angles other than that shown in FIG. 9A are within the scope of the invention. FIG. 9C shows that a conical magnet can include cylindrical portions added to the large diameter end (or, in some cases, to the small diameter end, such as shown in FIG. 9J) to optimize magnetic flux in the circuit. FIG. 9D illustrates a conical magnet being of a "stepped" or graduated form. FIGS. 9F and 9G show examples of alternative shapes suitable for implementing a magnet in accordance with embodiments of the invention, where a conical magnet can be a hemispherically-shaped magnet. FIGS. 9H and 9I are general representations showing that conical magnets of various embodiments can have any type of concave surface and/or any type of convex surface, respectively.

FIG. 9J shows an exemplary conical magnet in accordance with one embodiment of the invention. Here, conical magnet 940 includes an outer surface 950 in which a cavity 952 is formed. Cavity 952 is optional and can be used to house bearings or the like. In some embodiments, cavity 952 extends inside one or more of surfaces 954, 956 and 958. Note that cavity 952 can have differing inside dimensions along its axial length. Conical magnet 940 includes three surfaces: a first cylindrical surface 954, a conical surface 956 and a second cylindrical surface 958. In various embodiments, conical magnet 940 can include: fewer or more surfaces, cylindrical surfaces having larger or small diameters, steeper or shallower angles of inclination for conical surface 956, etc.

FIGS. 9K and 9L show an end view and a side view, respectively, of an exemplary cylindrical magnet, according to one embodiment of the invention. Cylindrical magnet 961 is composed of two cylindrical magnets 960 and 962. In this example, cylindrical magnet 962 is disposed (e.g., inserted) within cylindrical magnet 960. In one embodiment, cylindrical magnet 962 is composed of NdFe magnetic material (or a variant thereof) and cylindrical magnet 960 is composed of a ceramic magnetic material. In some embodiments, cylindrical magnet 962 is absent, thereby forming a ring magnet composed of cylindrical magnet 960 (mounting fixtures not shown). In at least one specific embodiment, cylindrical magnet 962 can be composed of a magnetically permeable material rather than a magnet material. In one embodiment, cylindrical magnet 962 need not extend through cylindrical magnet 960, but rather can extend from one end to any axial length within cylindrical magnet 960. FIGS. 9M and 9N show an end view and a side view, respectively, of an exemplary conical magnet, according to one embodiment of the invention. Conical magnet 971 is composed of two conical magnets 970 and 972. In this example, conical magnet 972 is disposed (e.g., inserted) within conical magnet 970. In one embodiment, conical magnet 970 is composed of NdFe magnetic material (or a variant thereof) and conical magnet 972 is composed of a ceramic magnetic material. In some embodiments conical magnet 972 can be composed of a magnetically permeable material instead of magnet material. In some embodiments, conical magnet 972 is absent, thereby forming a hollowed conical magnet composed of conical magnet 970 (mounting fixtures not shown). In one embodiment, conical magnet 972 need not extend through conical magnet 970, but rather can extend from one end to any axial length within conical magnet 970.

FIGS. 9O and 9P illustrate yet other conical magnets in accordance with yet other embodiments of the invention. FIG. 9O illustrates a pyramidal-shaped magnet as a conical magnet, albeit truncated, formed with any number of truncated triangular surfaces 978. FIG. 9P illustrates a conical magnet 980 of at least one embodiment, where conical magnet 980 includes a truncated pyramidal magnet 990 including magnetic regions 992 formed either therein or thereon. Magnetic regions 992 include magnet material that is different from that of truncated pyramidal magnet 990. Each of those magnetic regions 992 can be selected to have any predetermined polarity. In one embodiment, truncated pyramidal magnet 990 is four-sided and is composed of a ceramic material (e.g., magnet material), and each magnetic region 992 (two of which are hidden from view) is composed of NdFe magnet material that is formed upon truncated pyramidal magnet 990. In other embodiments, pyramidal magnet 990 can have any number of sides. In various embodiments, pyramidal magnet 990 is a magnet support and need not be composed of a magnet material, but rather can be composed of magnetically permeable material. In some embodiments, a magnet support 990 can be formed as having any shape as those shown in FIGS. 9A to 9I, with any number of magnetic regions 992 being disposed on magnet support 990. In that case, magnetic regions 992 can be of any shape suitable to be disposed on specific shapes of magnet support 990. For example, while the FIGS. 9O and 9P depict conical magnets, the magnet in FIG. 9O can be cylindrical in nature (i.e., with numerous flat surfaces 978 constituting the cylindrical magnet surface, with the end views appearing like a hexagon or some other polygon). As another example, the magnet in FIG. 9P can include a cylindrically-shaped magnet support 990 rather than pyramidal-like shape. Again, other than FIGS. 9E, 9K and 9L, the conical magnets that are illustrated in the foregoing are merely examples of conical magnets of the invention.

In a specific embodiment of the invention, conical magnets are anisotropic, diametrically magnetized, and shaped as a truncated cone with about 30 degrees of cone angle relative to an axis of rotation. The conical and cylindrical magnets, according to some embodiments, are diametrically magnetized in directions that are generally in a plane that is substantially perpendicular to the axis. At least one advantage of these types of magnet configurations is that such diametric conical magnets can be magnetized in the same direction as the original magnetic orientation of the magnet material, which provides a higher energy product for the magnet (i.e., a more powerful magnet). Anisotropic magnets are also relatively easy to manufacture and have relatively high magnetic efficiency per unit magnet volume. Another advantage of a diametric (i.e., 2 pole) magnet is that in a motor having three active field pole members and three phases, there is only one electrical revolution for each mechanical revolution of the motor. Accordingly, the diametric magnet, in whole or in part, reduces eddy current losses, hysteresis ("core" or "iron") losses and electrical switching losses in a motor drive circuit. In some embodiments, a conical magnet can: (1) include a steel core instead of being solid magnet material, (2) be constructed from ring magnets exhibiting good coercivity, (3) be constructed from arc-segment magnets, (4) be molded directly onto the shaft, (5) be radially polarized, (6) include a hollow core instead of being solid magnet material, or can include any other similar characteristics.

Figure 10:
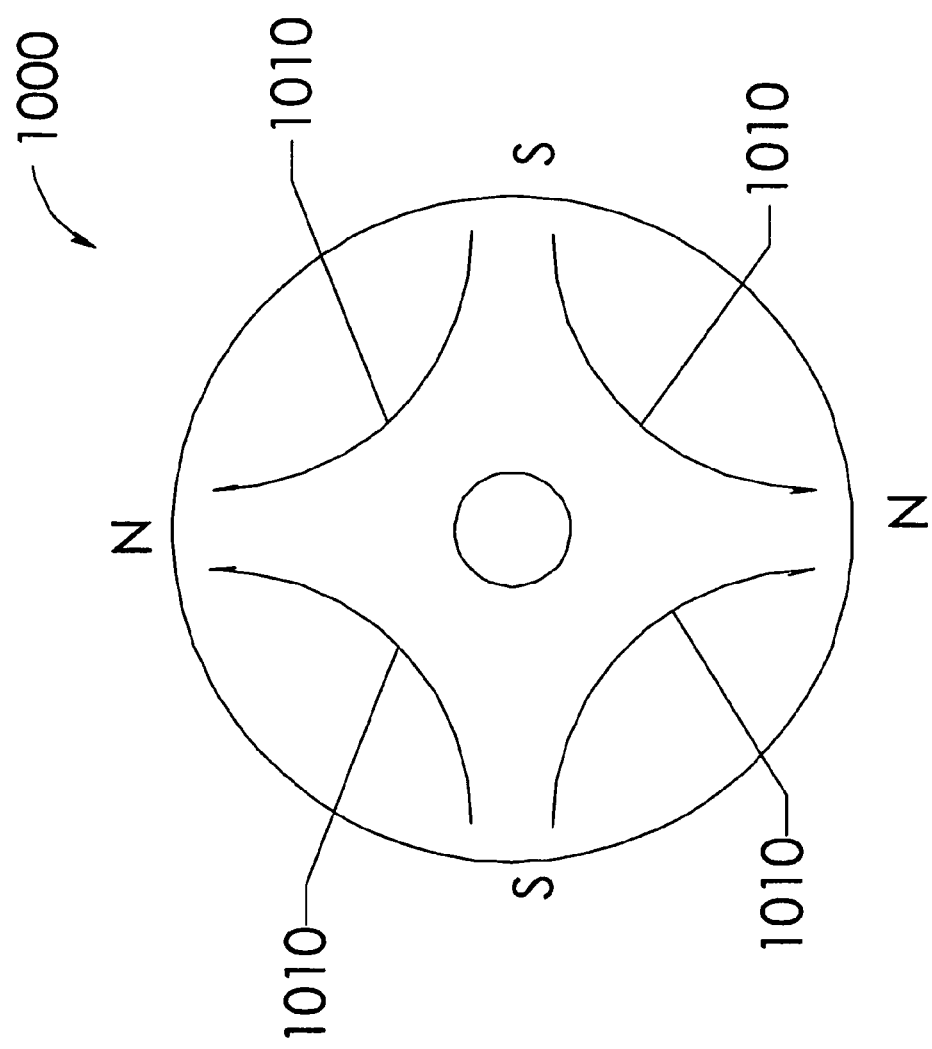
FIG. 10 shows a multiple pole magnet, according to an embodiment of the invention.

FIG. 10 shows a multiple pole magnet, according to one embodiment of the invention. In this example, permanent magnet 1000 is a four-pole magnet being magnetically oriented to have arcuate magnetic paths 1010 from south poles ("S") to north poles ("N"). Other numbers of poles and magnet orientations are within the scope and spirit of the invention. Further, a multiple pole magnet, such as permanent magnet 1000, can be either a monolithic magnet or a non-monolithic magnet according to some embodiments. As used herein, the term "monolithic," as applied to a permanent magnet, suggests that the permanent magnet is composed of integrated magnetic poles, such that the permanent magnet is non-discrete and is substantially homogenous in structure. As such, a monolithic permanent magnet lacks any physical interfaces between the magnetic poles. A monolithic magnet therefore is composed of continuous magnet material. By contrast, permanent magnet 1000 can be a non-monolithic magnet composed of separate magnets, with each separate magnet contributing an outward facing north or south pole, whereby physical interfaces exist between the separate subcomponents. As such, a non-monolithic magnet therefore can be composed of contiguous, but noncontinuous magnet material. In particular, each separate subcomponent includes continuous magnet material, but the physical interfaces give rise to discontinuities in the magnet material that constitutes the magnet as a whole. Note that the term "monolithic" can also apply to field pole members and other elements of the various rotor-stator structures of the invention. Note that in at least one embodiment, non-monolithic magnets can include those magnets where separate subcomponents are arranged at a distance from each other such that they do not contact each other.

Figure 11A:
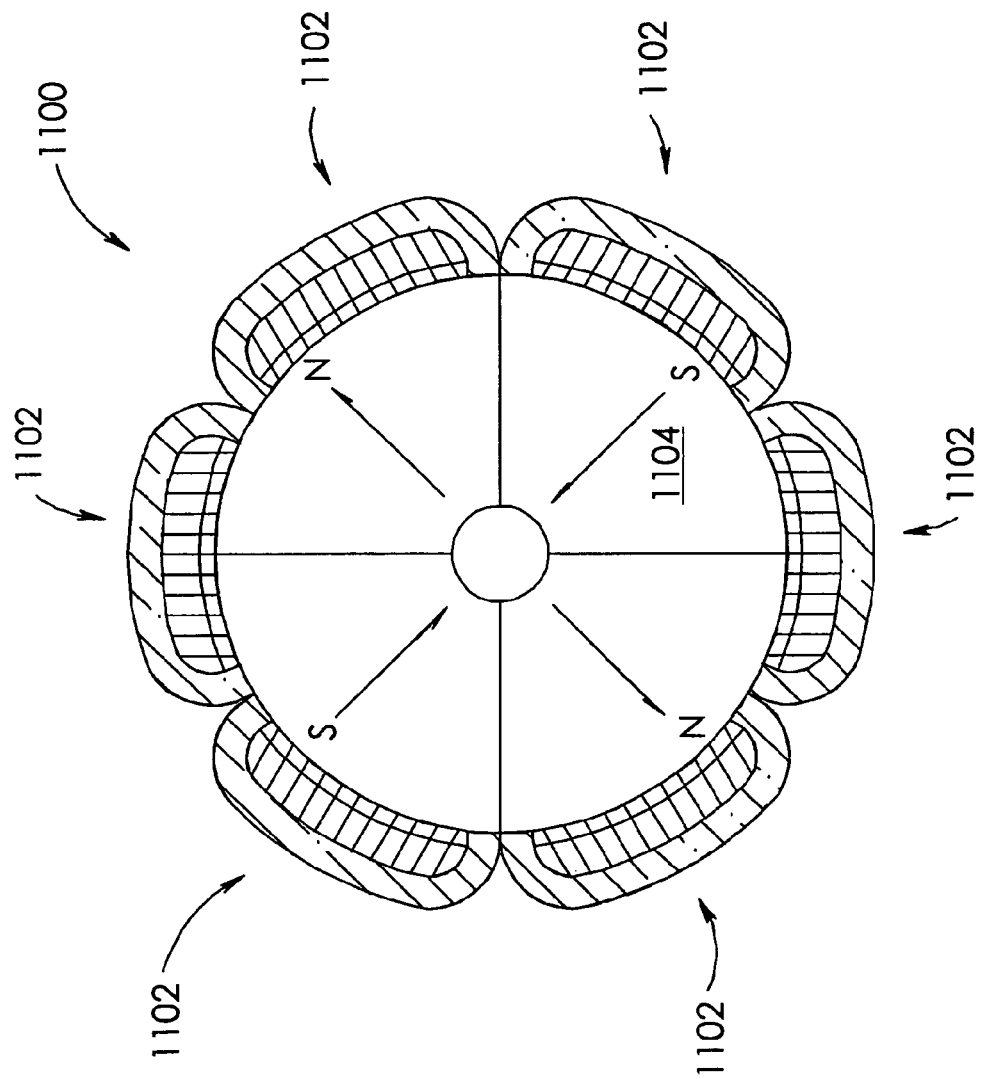
FIGS. 11A to 11C depict other examples rotor-stator structures in accordance with various embodiments of the invention.

FIG. 11A shows a side view of a rotor-stator structure 1100 as an alternate embodiment of the invention. Generally, a quantity of three active field pole members efficiently uses a cylindrical volume or space that is typically available inside the motor or generator. As such, "three" active field pole members are generally used to provide a relatively high packing density. But to provide more balanced operation, more than three active field pole members can be used. As shown, six active field pole members 1102 are arranged coaxially to and positioned equidistantly about an axis of rotation. Also, a four-pole magnet 1104 is positioned adjacent to the pole faces of active field pole members 1102. In this instance, four-pole magnet 1104 is a composite of individual magnet arc-segments. Rotor-stator structure 1100 can provide more balance magnetically relative to rotor-stator structures that include three active field pole members, because coils of opposing active field pole members 1102 can generally be excited at the same time. Other numbers of active field pole members and other even numbers of magnet poles can suitably be combined to implement rotor-stator structures of the invention.

Figure 11B:
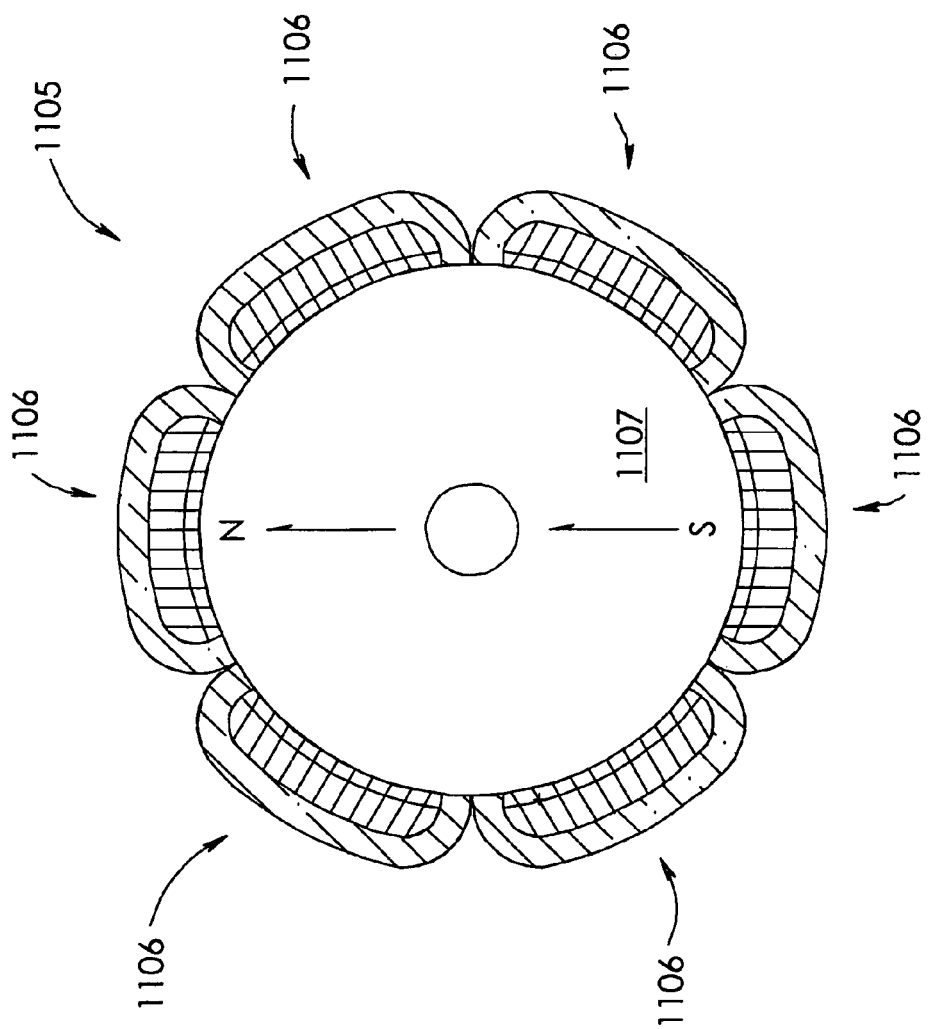
Figure 11C:
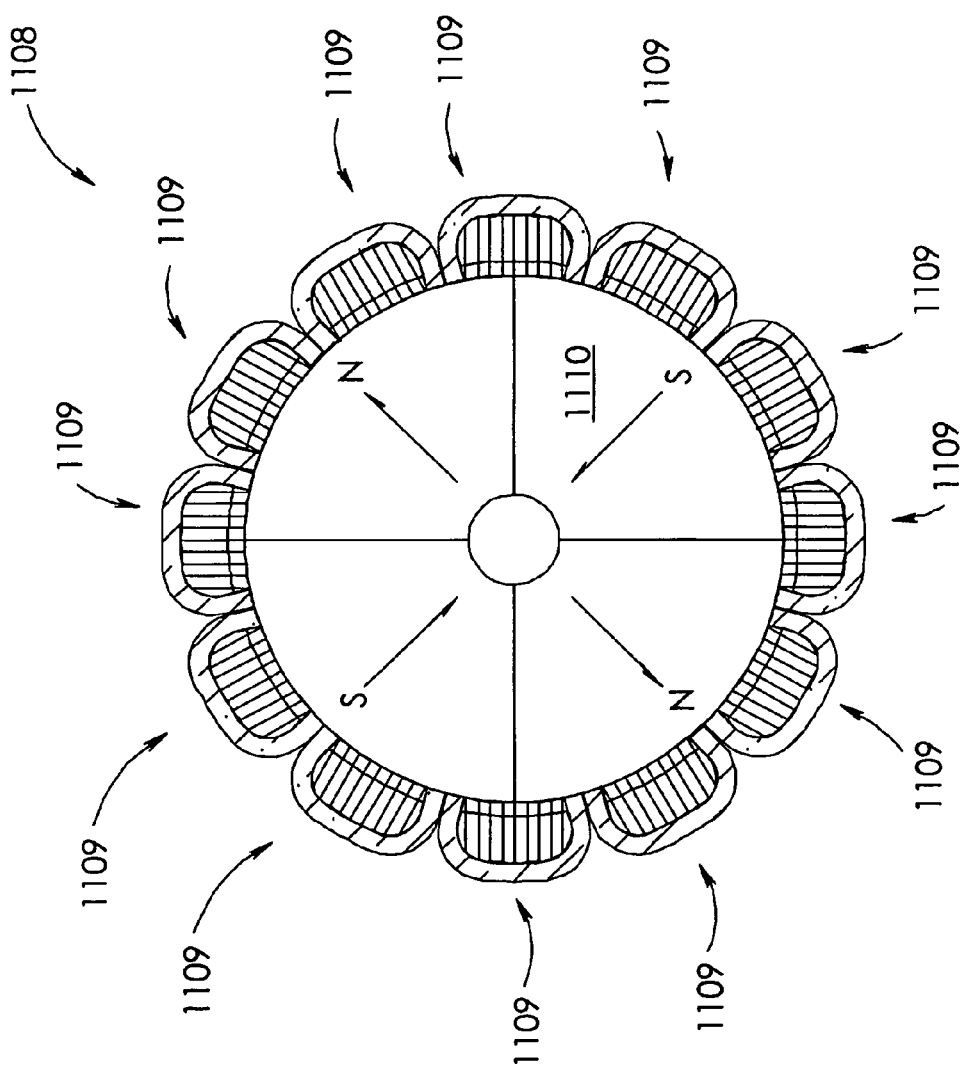

FIGS. 11B to 11C illustrate a subset of the variations in the number of field pole members and/or magnet poles, according to various embodiments of the invention. FIG. 11B shows a side view of a rotor-stator structure 1105 having six field pole members 1106 and a two-pole magnet 1107, according to one embodiment of the invention. FIG. 11C depicts a side view of a rotor-stator structure 1108 that includes twelve field pole members 1109 and a four-pole magnet 1110, according to another embodiment of the invention. Again, rotor-stator structures 1100, 1105 and 1108 depict only a few of the many field pole member-magnet pole combinations in accordance with various embodiments of the invention.

In at least one specific embodiment of the invention, an exemplary rotor-stator structure is disposed in an electrical motor to generate a torque amplitude that depends on at least one or more of the following: the volume of the magnets, the vector directions of the interacting fields in the flux interaction regions, the flux density in flux interaction regions, the area of the air gaps, and the area of the pole faces. So, the higher the flux density produced by the permanent magnets and the higher the flux density produced by the active field pole members, the higher the torque that will be developed until significant saturation is reached in the field pole members. The magnet materials of such a rotor-stator structure should have sufficient coercivity to prevent partial or total demagnetization in an intended application.

Figure 12A:
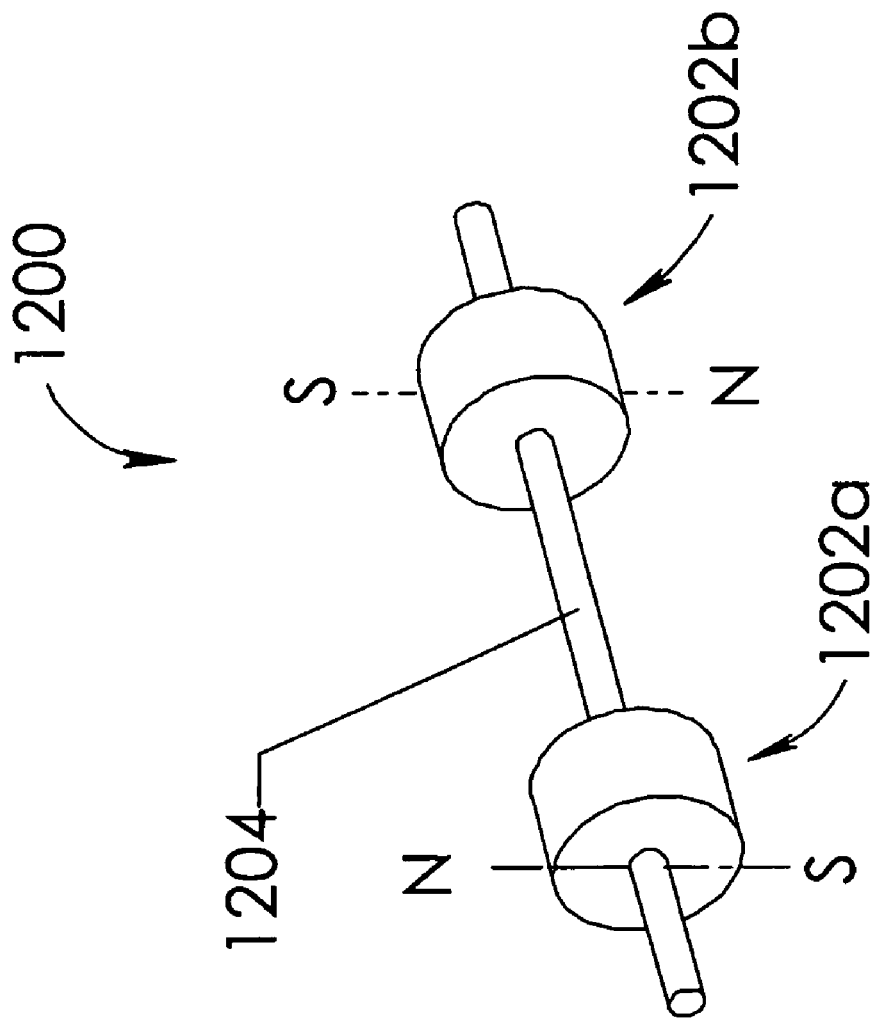
FIGS. 12A to 12D illustrate another rotor-stator structure that implements cylindrical magnets in accordance with various embodiments of the invention.
Figure 12B:
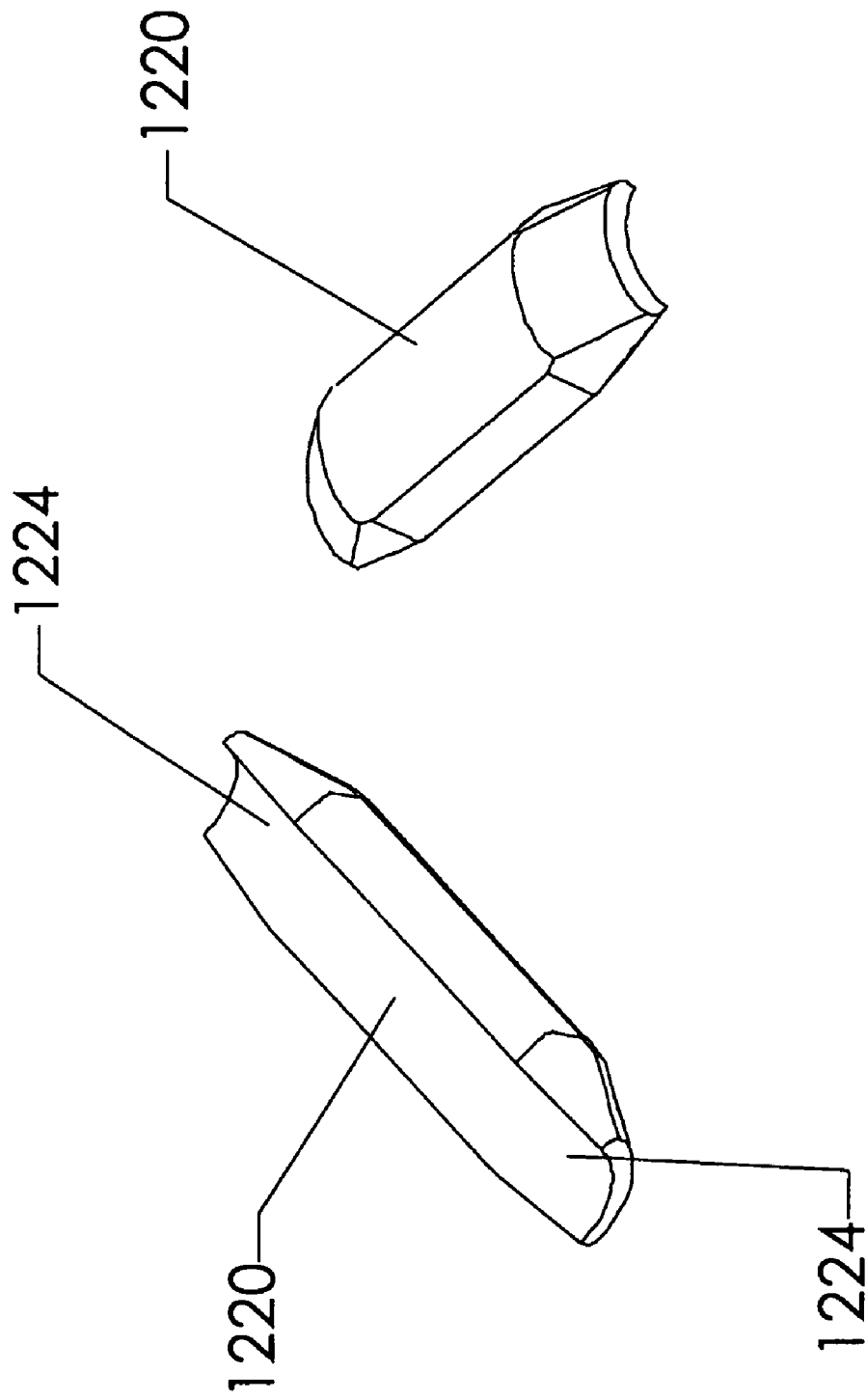
Figure 12C:
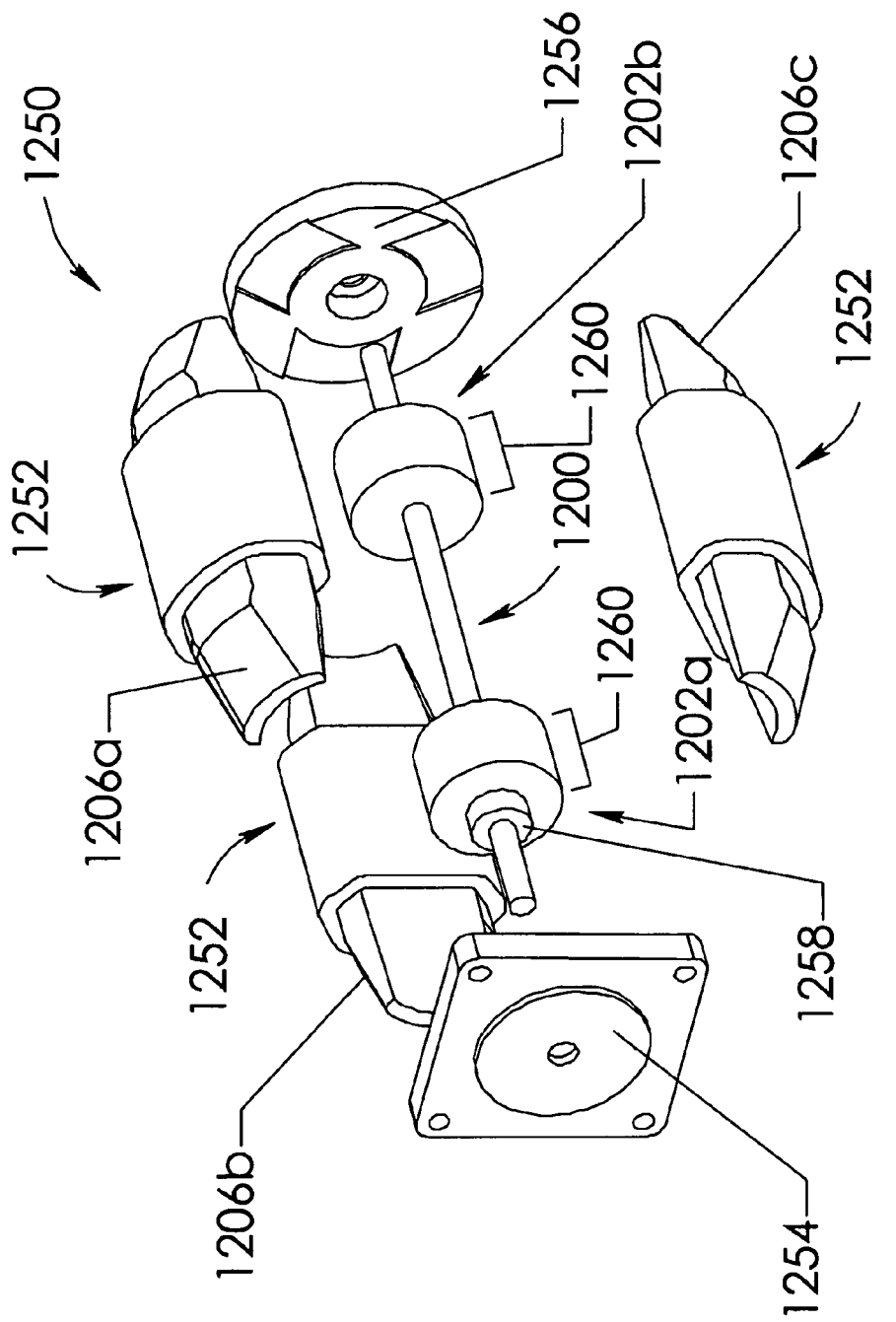

FIGS. 12A to 12D illustrate another rotor-stator structure in accordance with various embodiments of the invention. FIG. 12A depicts a rotor assembly 1200 including at least two cylindrical permanent magnets 1202a and 1202b mounted on or affixed to a shaft 1204. As shown, cylindrical magnets 1202a and 1202b are diametrically magnetized and positioned to have their north poles ("N") pointing in substantially opposite directions. In other examples, either magnets 1202a or 1202b, or both, can include any number of magnet poles, and thus, any number of directions of polarization. FIG. 12B shows two views of a field pole member 1220 including two pole faces 1224. Note that pole faces 1224 in this example are contoured or shaped so as to mimic the contours of the cylindrical surfaces of cylindrical permanent magnets 1202a and 1202b, thereby providing a relatively uniform air gap thickness for either portions of the cylindrical surfaces or the entire cylindrical surfaces. In various embodiments, field pole member 1220 can be composed of laminations (not shown) and can have functionality and/or structure as described with respect to other embodiments. FIG. 12C is an exploded view of an exemplary rotor-stator structure in accordance with a specific embodiment of the invention. In this example, rotor-stator structure 1250 is configured to increase torque generated per unit size (or per unit weight) for electric motor implementations by at least minimizing the length of magnetic flux paths through field pole members. As field pole members 1206 provide substantially straight flux path segments therein, linear deviations of magnetic flux can be minimized. Typically, the path segments are generally parallel to the axis of rotation. Further, rotor-stator structure 1250 can implement field pole members 1206 that are straight or substantially straight to minimize reluctance of those field pole members. As reluctance is minimized, so too are magnetic losses. In the example shown in FIG. 12C, rotor-stator structure 1250 includes rotor assembly 1200, three active field pole members 1252 (each of which implements field pole member 1206 and a coil), end plates 1254 and 1256, and bearings 1258. Note that cylindrical surfaces 1260 (also referred to as magnet surfaces) of cylindrical magnets 1202a and 1202b are used to confront pole faces 1224 (FIG. 12B). Such magnet surfaces can be described as being interfacial as magnetic flux passes through those surfaces when the flux enters or exits pole faces 1224. The magnet surfaces, in whole or in part (i.e., cylindrical portions thereof), define air gaps between cylindrical surfaces 1260 and pole faces 1224. In at least one embodiment, pole faces 1224 are contoured to maintain a uniform thickness for each of the air gaps to increase flux interaction between cylindrical magnets 1202a and 1202b (FIG. 12C) and field pole members 1206a, 1206b, and 1206c, thereby increasing output torque in a predictable manner. In cases where field pole members 1206a, 1206b, and 1206c are composed of laminates, pole faces 1224 are contoured to maintain at least a substantially uniform thickness for each of the air gaps.

Figure 12D:
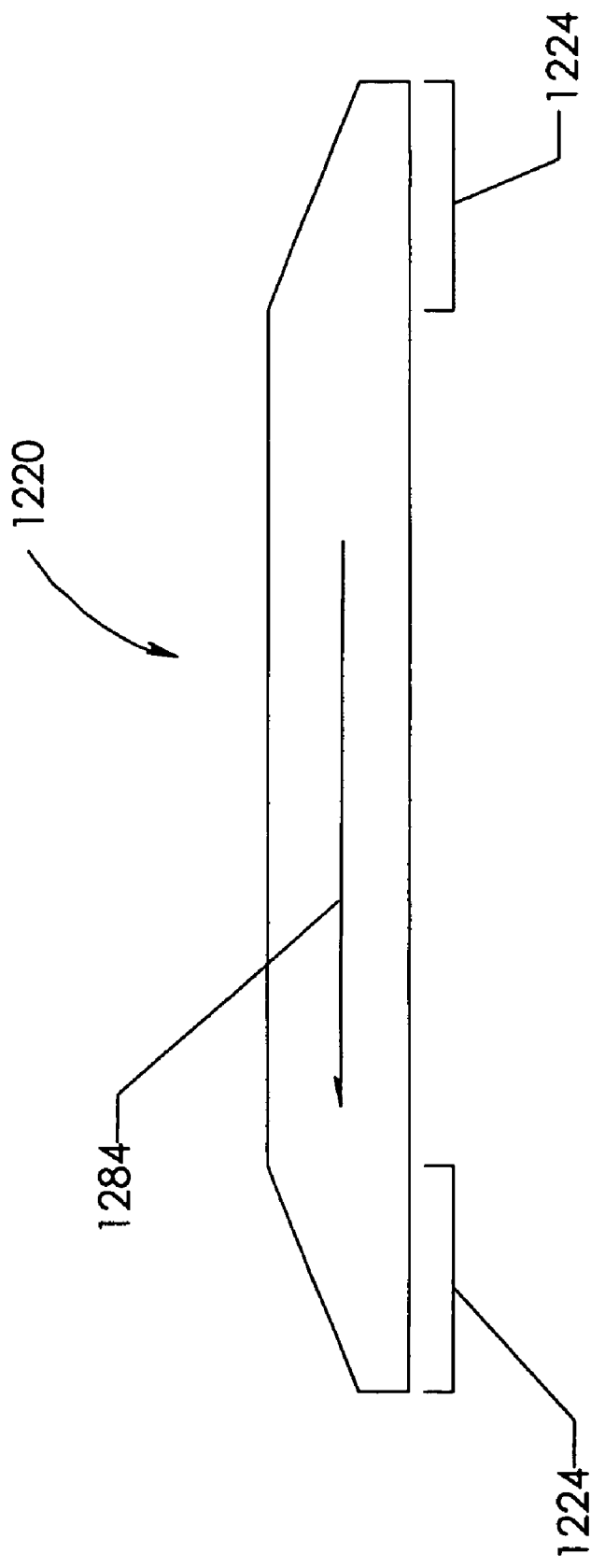

FIG. 12D shows a side view of a cross-section for field pole member 1220 (FIG. 12B) depicting a straight line 1284 that is indicative of a straight flux path segment in field pole member 1220 regardless of whether the magnetic flux path passes from either a permanent magnet or an Ampere Turn ("AT")-generated flux. In various embodiments of the invention, the path over which flux passes is a function, in whole or in part, of the shape of field pole member 1220. Note that straight line 1284 is representative of straight flux paths between pole faces 1224 of field pole member 1220.

Figure 13A:
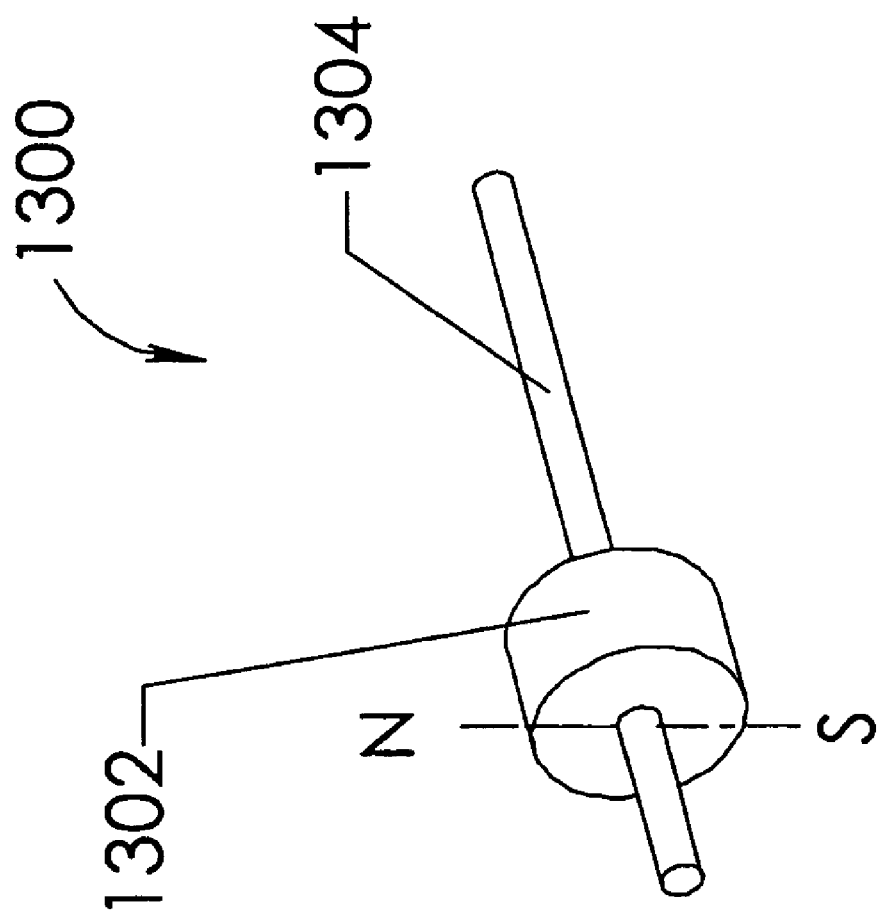
FIGS. 13A to 13D illustrate examples of other rotor-stator structures that implement only one magnet in accordance with various embodiments of the invention.
Figure 13B:
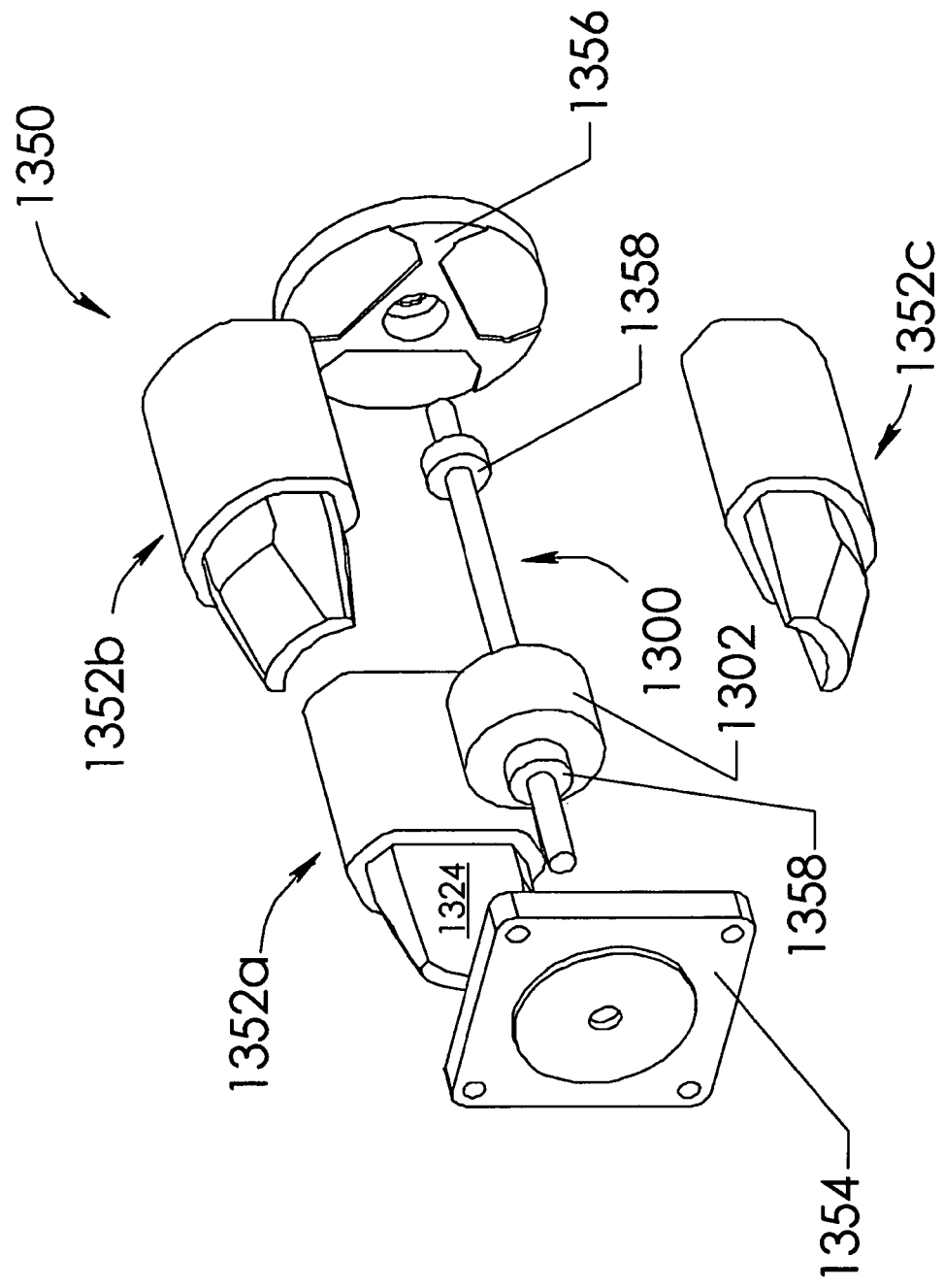

FIGS. 13A and 13B illustrate yet another rotor-stator structure in accordance with at least one embodiment with the invention. FIG. 13A depicts a rotor assembly 1300 including only one magnet, which in this example, is a cylindrical magnet 1302 mounted on a shaft 1304. As shown, FIG. 13B is an exploded view of an exemplary rotor-stator structure in accordance with a specific embodiment of the invention. In this instance, rotor-stator structure 1350 includes rotor assembly 1300, three active field pole members 1352 (i.e., 1352a, 1352b, and 1352c), end plates 1354 and 1356, and bearings 1358. In one embodiment, plate 1354 is a non-magnetic end plate and end plate 1356 is a magnetically permeable end plate for transferring flux between active field pole members 1352. In some embodiments, end plate 1356 is a non-magnetic end plate and rotor-stator structure 1350 includes a flux-carrying member (not shown) that is magnetically permeable to complete the magnet circuit through cylindrical magnet 1302. The flux-carrying member magnetically couples the other ends of active field pole members 1352 at which there are not pole faces. The field pole member implemented as part of active field pole members 1352 is similar in some respects to field pole member 1220 of FIG. 12B and to any one of field pole members 1206a, 1206b, and 1206c of FIG. 12C. But in this instance, each of the field pole members of active field pole members 1352 includes only one pole face as there is only one permanent magnet with which to interact. One example of a single pole face is pole face 1324. In alternate embodiments, other-shaped magnets can be substituted for cylindrical magnet 1302 to implement other configurations of rotor-stator structure 1350. Further, rotor-stator structure 1350 can additionally include other features of the various embodiments described herein.

Figure 13C:
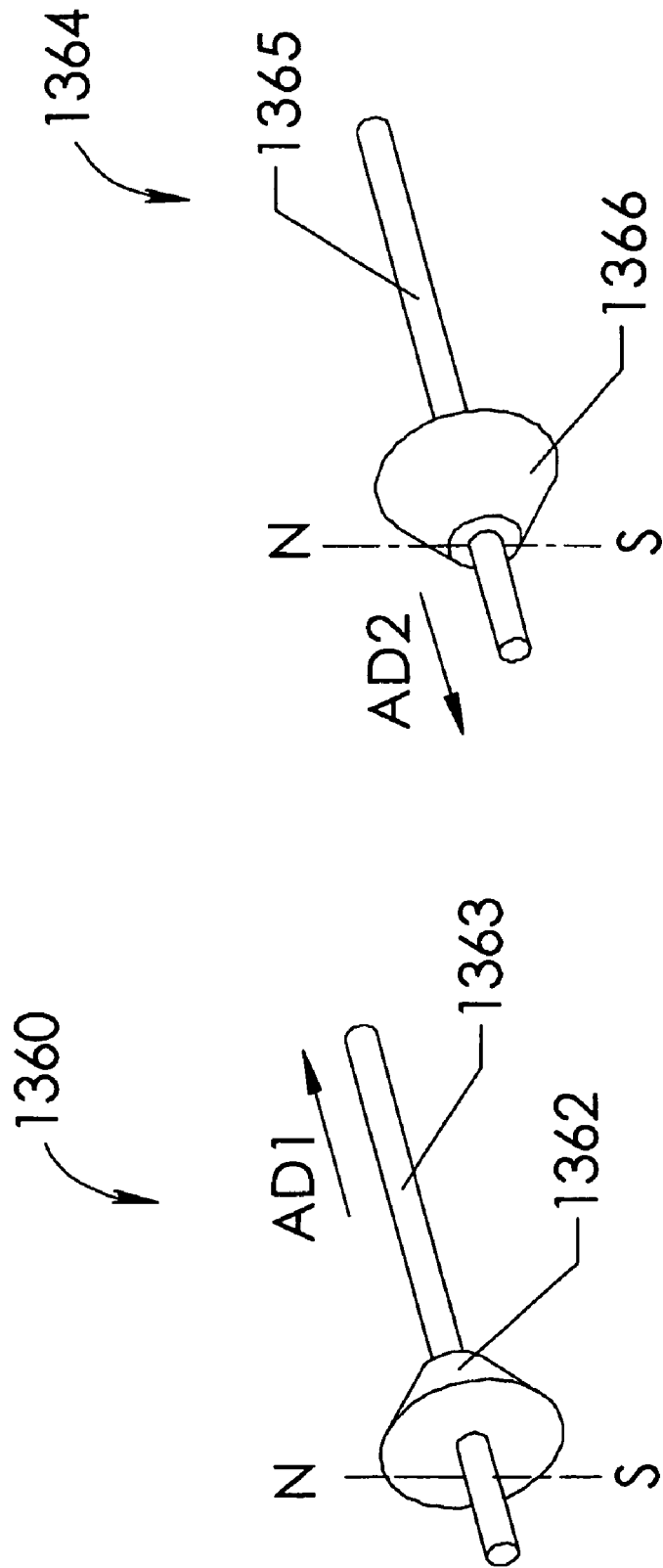
Figure 13D:
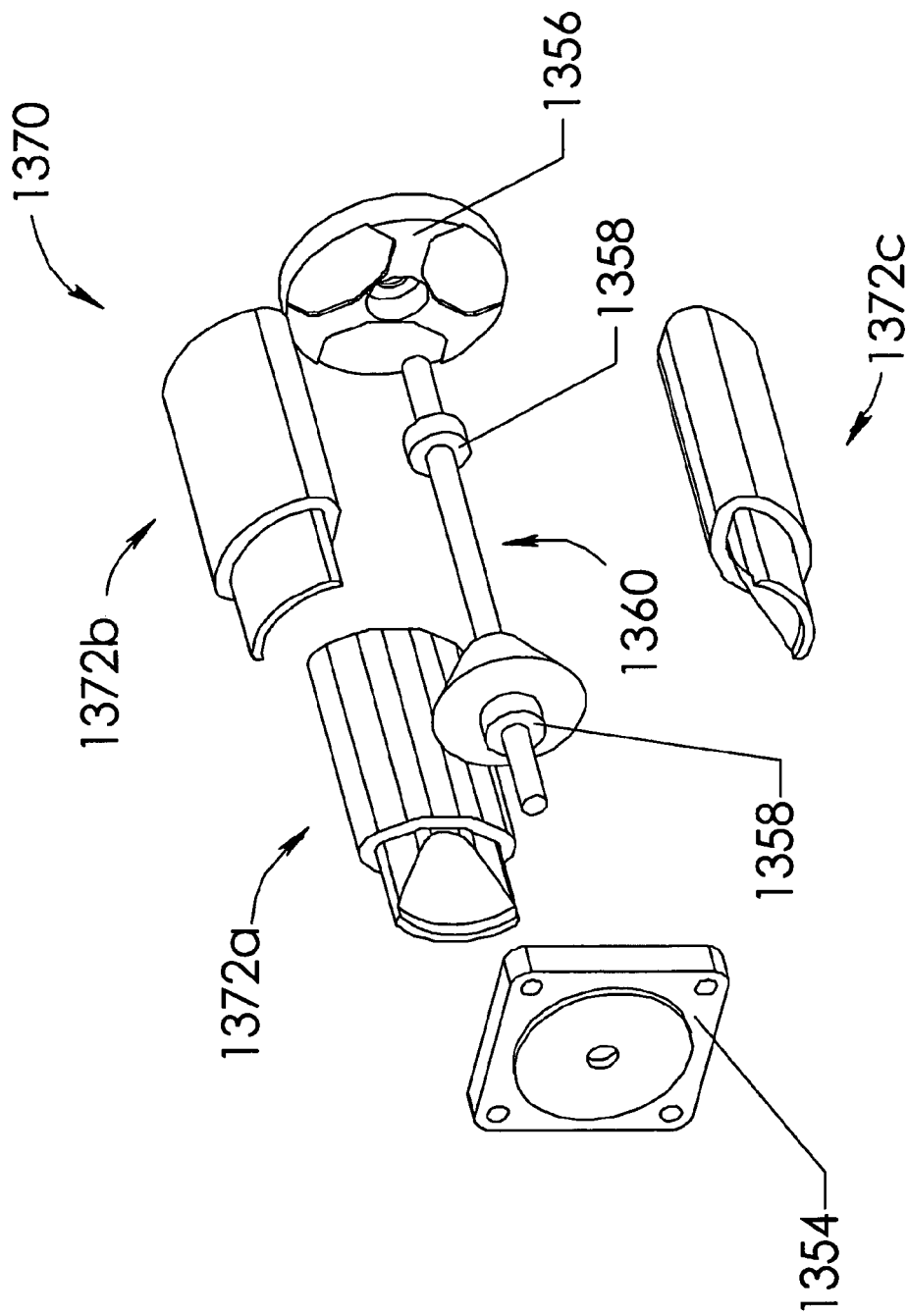

FIGS. 13C and 13D illustrate still yet another rotor-stator structure in accordance with at least one embodiment of the invention. FIG. 13C depicts rotor assemblies 1360 and 1364 including only one conical magnet each. In particular, rotor assembly 1360 includes a conical magnet 1362 mounted on a shaft 1363 such that at least a portion of a conical surface for conical magnet 1362 faces a first axial direction ("AD1"). By contrast, rotor assembly 1364 includes a conical magnet 1366 mounted on a shaft 1365 such that at least a portion of a conical surface for conical magnet 1366 faces a second axial direction ("AD2"), where the second axial direction is opposite from the first axial direction. In at least one embodiment, the first axial direction is toward a flux-carrying member (not shown), such as a magnetically permeable end plate 1356 (FIG. 13B). While rotor assembly 1364 might generate relatively longer flux paths that are less straight than those produced with rotor assembly 1360, such differences can be negligible in certain applications (e.g., in those cases where motor performance is not a critical requirement). Note that the relative positions at which conical magnets 1362 and 1366 are mounted on respective shafts 1363 and 1365 are merely examples of some of the possible positions. As such, conical magnets 1362 and 1366 each can be positioned anywhere on a shaft, including the center of either shaft 1363 or shaft 1365. FIG. 13D is an exploded view of an exemplary rotor-stator structure in accordance with a specific embodiment of the invention. As shown, rotor-stator structure 1370 includes rotor assembly 1360 (FIG. 13C), three active field pole members 1372 (i.e., 1372a, 1372b, and 1372c) each of which is similar in functionality as those similarly named in FIG. 13B. But three active field pole members 1372 of FIG. 13D include field pole members that each include only one pole face, whereby each of the single pole faces of three active field pole members 1372 are contoured to confront the conical magnet surfaces of rotor assembly 1360. Rotor-stator structure 1370 also includes end plates 1354 and 1356 as well as bearings 1358. Further, rotor-stator structure 1370 can additionally include other features of the various embodiments described herein.

Figure 14:
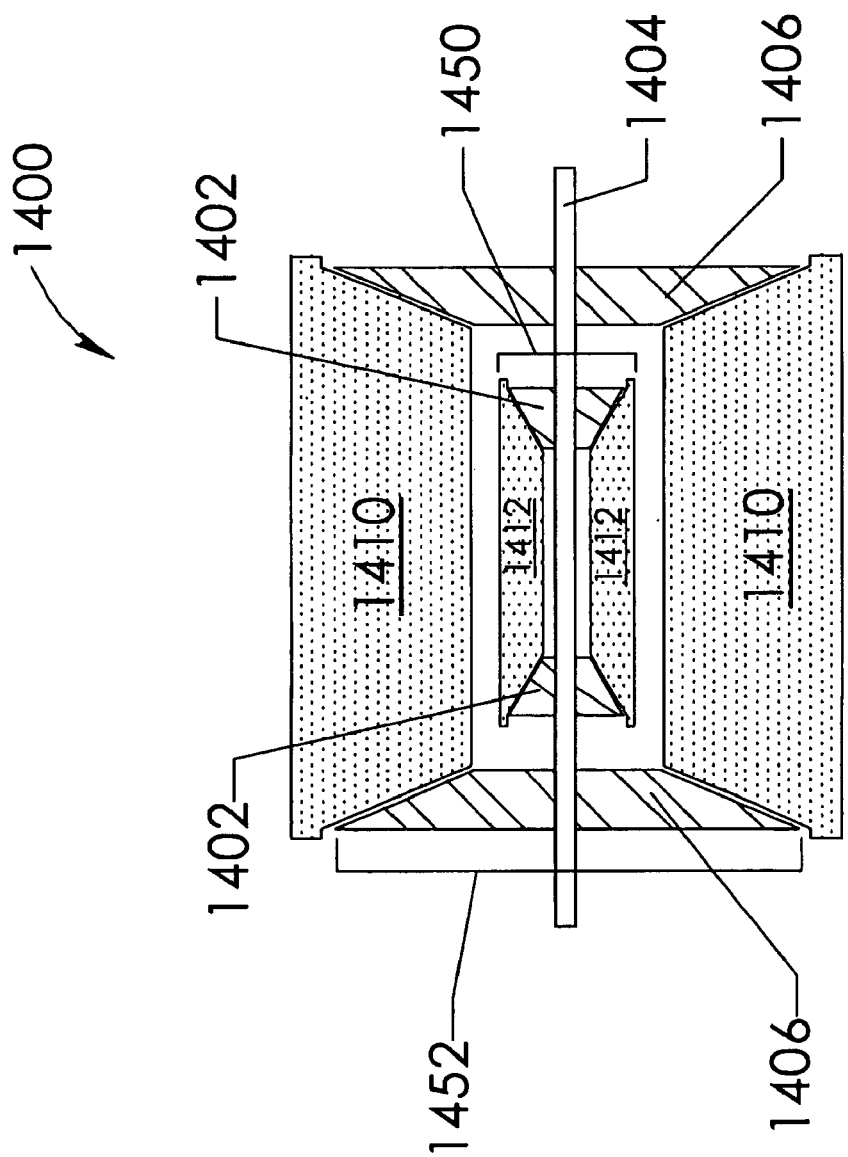
FIGS. 14 and 15 depict examples of implementations of more than two magnets in accordance with various embodiments of the invention.
Figure 15:
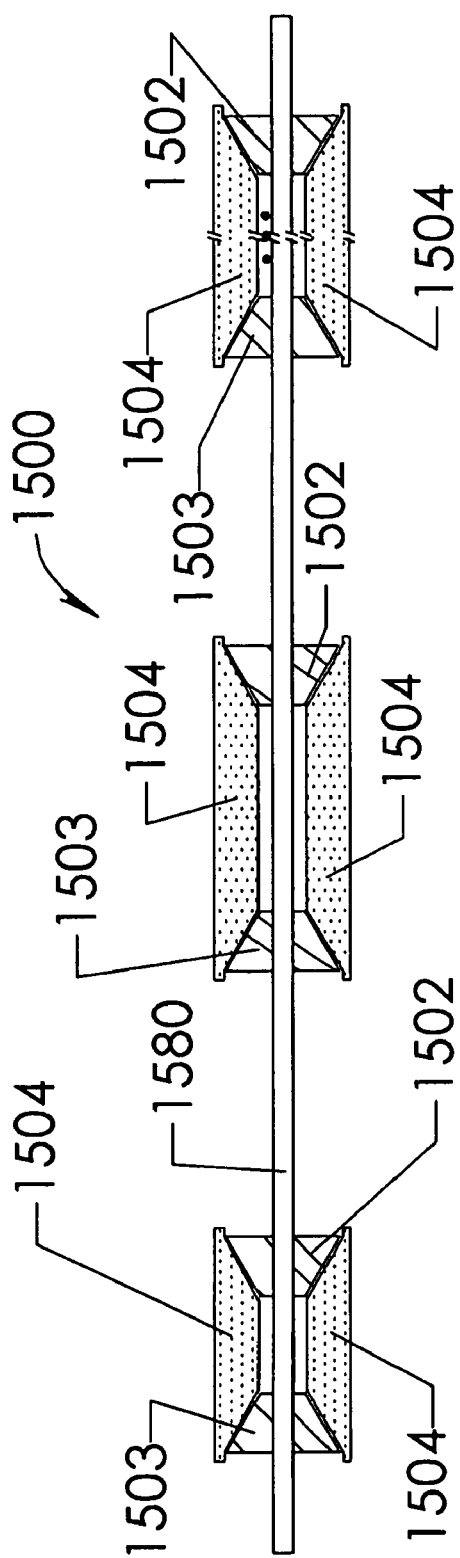

FIGS. 14 and 15 depict exemplary implementations of more than two conical magnets in accordance with various embodiments of the invention. FIG. 14 shows that both sets of conical magnets are arranged to face each other. A first set includes conical magnets 1402 and a second set includes conical magnets 1406, with both sets being affixed to a shaft 1404. In one embodiment, two sets of field pole members in cooperation with pairs of conical magnets of differing diameter can be used to form a compound motor 1400. In particular, compound motor 1400 is formed by integrating two or more motors in parallel, such as inner motor 1450 and outer motor 1452. In this example, an inner motor 1450 includes conical magnets 1402 and active field pole members 1412, conical magnets 1402 having smaller diameters than conical magnets 1406. Outer motor 1452 includes an inner motor 1450 as well as conical magnets 1406 and active field pole members 1410. In one embodiment, conical magnets 1402 and 1406 face away from each other and toward opposite axial directions. In alternate embodiments, other-shaped magnets, such as cylindrical, can be substituted for conical magnets 1402 and 1406.

FIG. 15 illustrates that any number of conical magnets 1502 and 1503 can be arranged on a shaft 1504. In particular, a first set of conical magnets 1502 has their conical surfaces facing one axial direction, and a second set of conical magnets 1503 are arranged to have each conical surface facing another axial direction, which is a direction 180 degrees different than that faced by conical magnets 1502. According to various embodiments of the invention, any number of conical magnets (e.g., any even or odd number) can be arranged on a shaft, in many orientations or directions, with one or more active field pole members being adapted to interact with those conical magnets. In one embodiment, active field pole members 1504 are included with pairs of conical magnets 1502 and 1503 to form any number of motors in series with each other. For example, series motor 1500 includes three motors sharing the same shaft 1580. Each motor includes one conical magnet 1502, one conical magnet 1503, and any number of active field pole members 1504. Series motor 1500 is well suited for use in down-hole drills and pumps where high torque in a relatively small diameter is desired and axial length is of minimal significance. In alternate embodiments, other-shaped magnets, such as cylindrical, can be substituted for conical magnets 1502 and 1503

Figure 16:
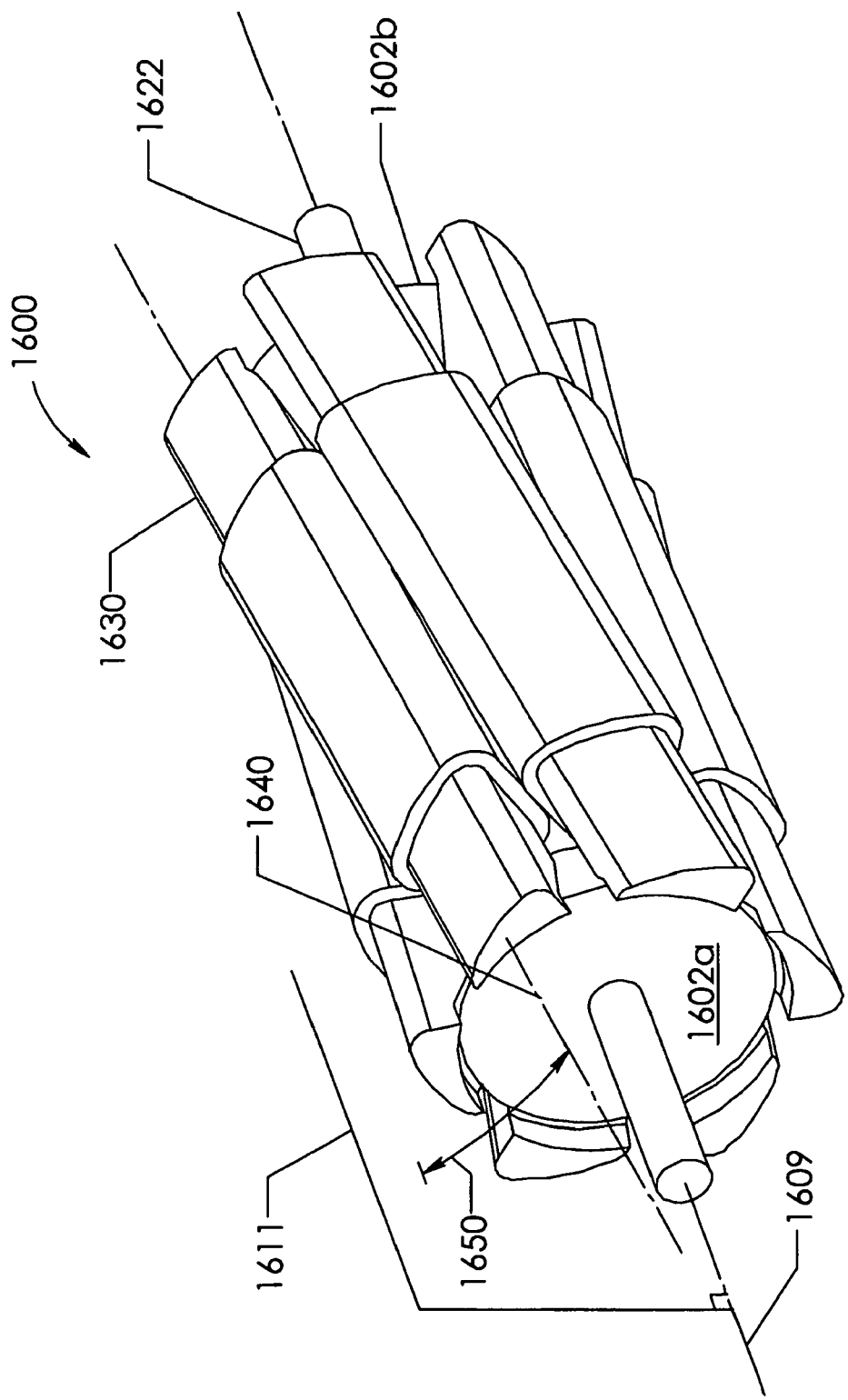
FIG. 16 depicts an alternative implementation of a rotor-stator structure having skewed orientations for its field pole members in accordance with one embodiment of the invention.

FIG. 16 depicts an alternative implementation of a rotor-stator structure having skewed orientations for its field pole members in accordance with one embodiment of the invention. Rotor-stator structure 1600 includes a number of field pole members 1630 arranged coaxially about an axis of rotation 1609 and configured to magnetically couple with magnets 1602a and 1602b, both of which are assembled on a shaft 1622. In one instance, magnets 1602a and 1602b can have conical surfaces facing toward each other. In at least one embodiment, each of field pole members 1630 is "skewed" in orientation to the axis 1609 such that a medial line 1640 passing through each field pole member 1630 is at a skew angle 1650 with a plane 1611 passing through axis 1609. By orienting field pole members 1630 at skew angle 1650 from the axis of rotation 1609, detent can be reduced. In one specific embodiment, the pole faces of each of field pole members 1630 can be contoured to confront the surfaces of magnets 1602a and 1602b. Note that one or more field pole members 1630 need not be active field pole members.

Figure 17A:
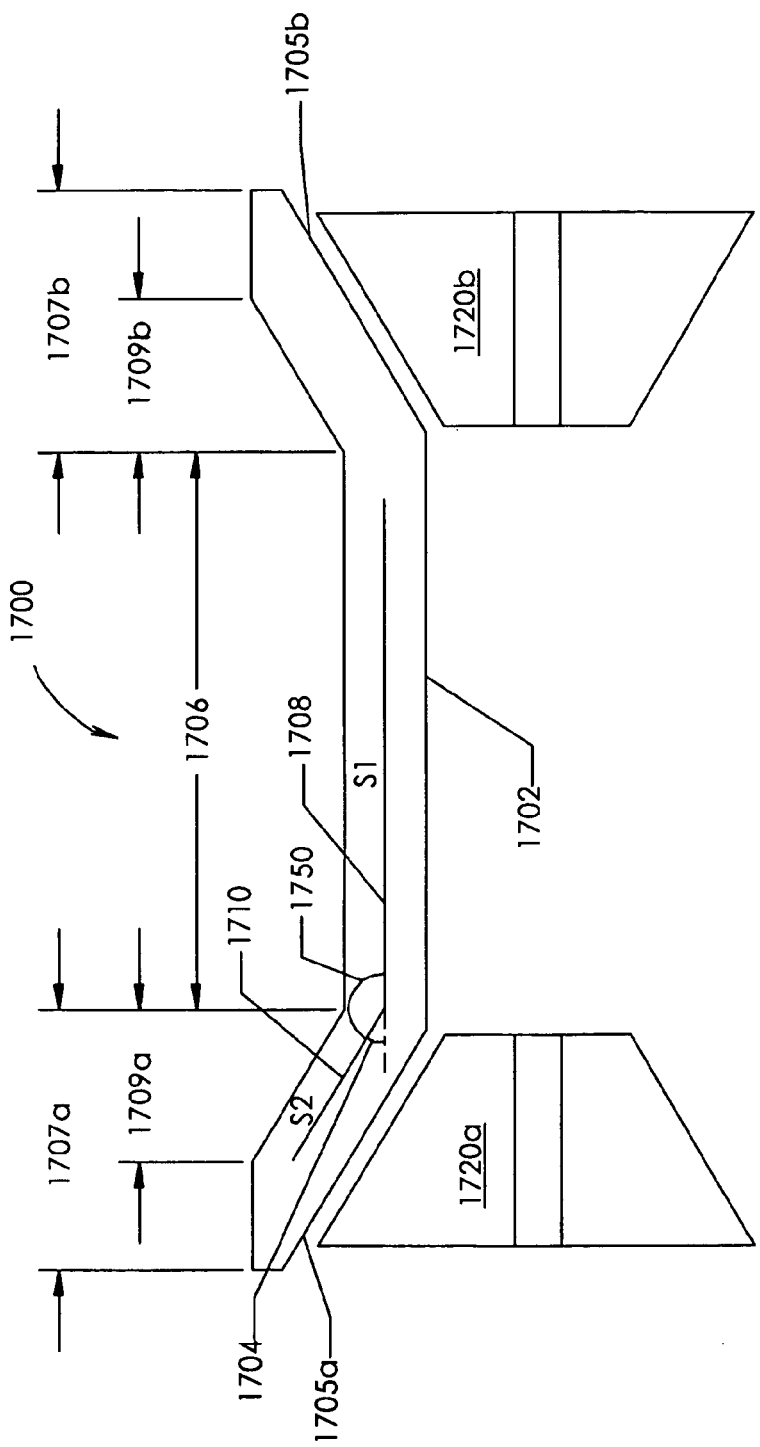
FIGS. 17A and 17B illustrate an example of a field pole member according to a specific embodiment of the invention.

FIG. 17A is a cross-sectional view illustrating another rotor-stator structure in accordance with one embodiment of the invention. In the cross-sectional view of FIG. 17A, which is similar to sectional view X-X of FIG. 5A, rotor-stator structure 1700 includes a field pole member 1702 and conical-shaped magnets 1720a and 1720b. Field pole member 1702 has a first pole shoe 1707a and a second pole shoe 1707b. First pole shoe 1707a is positioned adjacent to at least a portion (e.g., a confronting portion) of a surface of magnet 1720a so that a pole face 1705a can be used to form a first flux interaction region therewith. Similarly, second pole shoe 1707b is positioned adjacent to at least a portion of a magnet surface of magnet 1720b so that a pole face 1705b can be used to form a second flux interaction region therewith. Both of the flux interaction regions include air gaps having either a uniform thickness or a substantially uniform thickness. Field pole member 1702 also has a central field pole member portion 1706 around which one or more windings can be wound. Note that FIG. 17A distinguishes specific regions or portions of field pole member 1702 as pole shoes 1707a and 1707b, transition regions 1709a and 1709b, pole faces 1705a and 1705b, and central field pole member portion 1706, all of which are merely exemplary and are not to be construed as limiting. As such, other embodiments of the invention can include regions and portions of field pole member 1702 that are of other sizes, lengths, proportions, dimensions, shapes, etc. than as described above.

Further, first pole shoe 1707a and second pole shoe 1707b include transition region 1709a and transition region 1709b, respectively, to offset first pole shoe 1707a and second pole shoe 1707b (as well as pole faces 1705a and 1705b) from central field pole member portion 1706. Each of transitions regions 1709a and 1709b is configured to reduce the reluctance for a flux path between pole faces 1705a and 1705b. For example, transition regions 1709a and 1709b provide for a decreased reluctance for flux paths through central field pole member portion 1706 and either first pole shoe 1707a or second pole shoe 1707b, as compared to traditional field poles that require transition regions to be orthogonal (i.e., ninety degrees) to either central field pole member portion 1706 or first pole shoe 1707a and second pole shoe 1707b. Generally, the sharper a flux path turns within a field pole member or any like "low reluctance member," such as at or near a ninety degree angle, the higher the reluctance is for that flux path. This in turn leads to increased magnetic losses.

To reduce magnetic losses associated with non-straight flux paths, exemplary field pole member 1702 implements transition regions, such as transition regions 1709a and 1709b, to provide a transitory flux path segment. Transitory flux path segment 1710 facilitates lowering the reluctance associated with the length of a flux path extending between pole faces, such as pole faces 1705a and 1705b. As shown in FIG. 17A, transitory flux path ("S2") 1710 provides for an acute angle 1704 (which can be described also by its complementary obtuse angle 1750) from a flux path segment ("S1") 1708 associated with central field pole member portion 1706 to transitory flux path ("S2") 1710. As shown, flux path segment ("S1") 1708 is in a same general direction indicated as transitory flux path ("S2") 1710, which deviates from the direction of that segment 1708 by acute angle 1704. Note that such a deviation can also be described in terms of an obtuse angle 1750, as should be apparent to ordinarily skilled artisans. In a specific embodiment, acute angle 1704 can be between approximately 0 and approximately 60 degrees (including both 0 and 60 degrees). Further, a "non-straight" flux path can be described as a path having two consecutive segments 1708 and 1710 at an angle 1704 between 60 degrees and 90 degrees. In a specific embodiment, a non-straight flux path includes those paths having a subsequent flux path segment deviating at an angle of about ninety degrees from a precedent flux path segment, where both the subsequent and the precedent flux path segments are consecutive. As such, segment 1708 is precedent to segment 1710 (from south to north magnetized flux path) and segment 1710 is subsequent to segment 1708. In some embodiments, the term "substantially straight" can refer to straight flux paths (e.g., paths that have no deviation from a straight line) as well as flux paths that are 60 degrees or less.

In at least one specific embodiment, the term "flux path segment" refers to a line segment extending from one end (or approximately therefrom) of a region or portion of field pole member 1702 to the other end (or approximately thereto), the flux path segment being representative of an approximate magnetic flux path and/or a portion of an interior flux line extending between magnetic poles (e.g., pole faces). For example, flux path segment ("S1") 1708 extends the approximate length of central field pole member portion 1706 and transitory flux path ("S2") 1710 extends the approximate length of transition region 1709a.

Figure 17B:
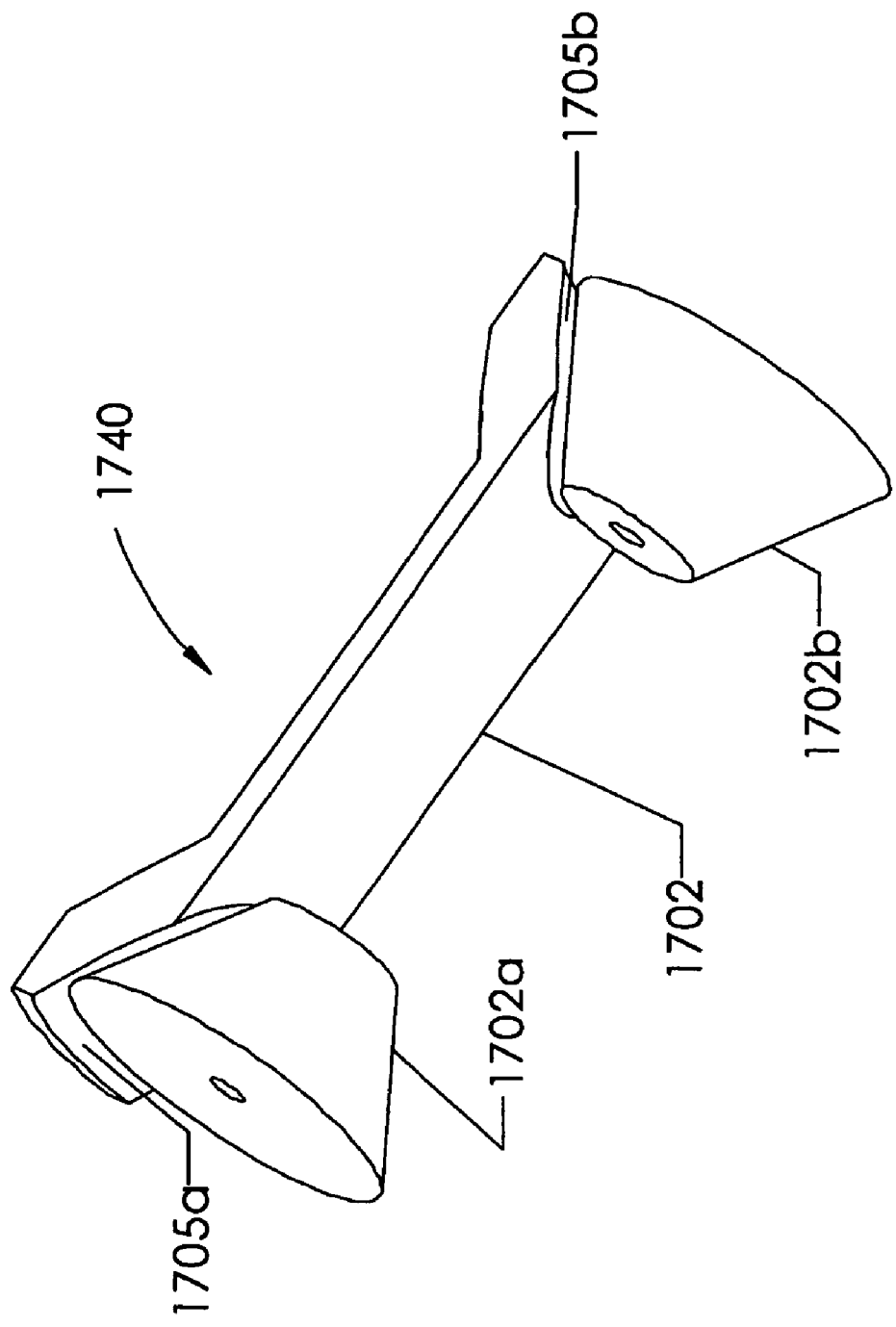

FIG. 17B illustrates a perspective view of a field pole member in accordance with a specific embodiment of the invention. As shown, a field pole member 1702 (FIG. 17A) includes pole faces 1705a and 1705b contoured to confront the conical surfaces of conical magnets 1720a and 1720b. Note that in other embodiments, pole faces 1705a and 1705b need not be contoured. For example, pole faces 1705a and 1705b of FIG. 17A each can lay in a relatively flat plane perpendicular to the page on which FIG. 17A is illustrated.

Figure 18A:
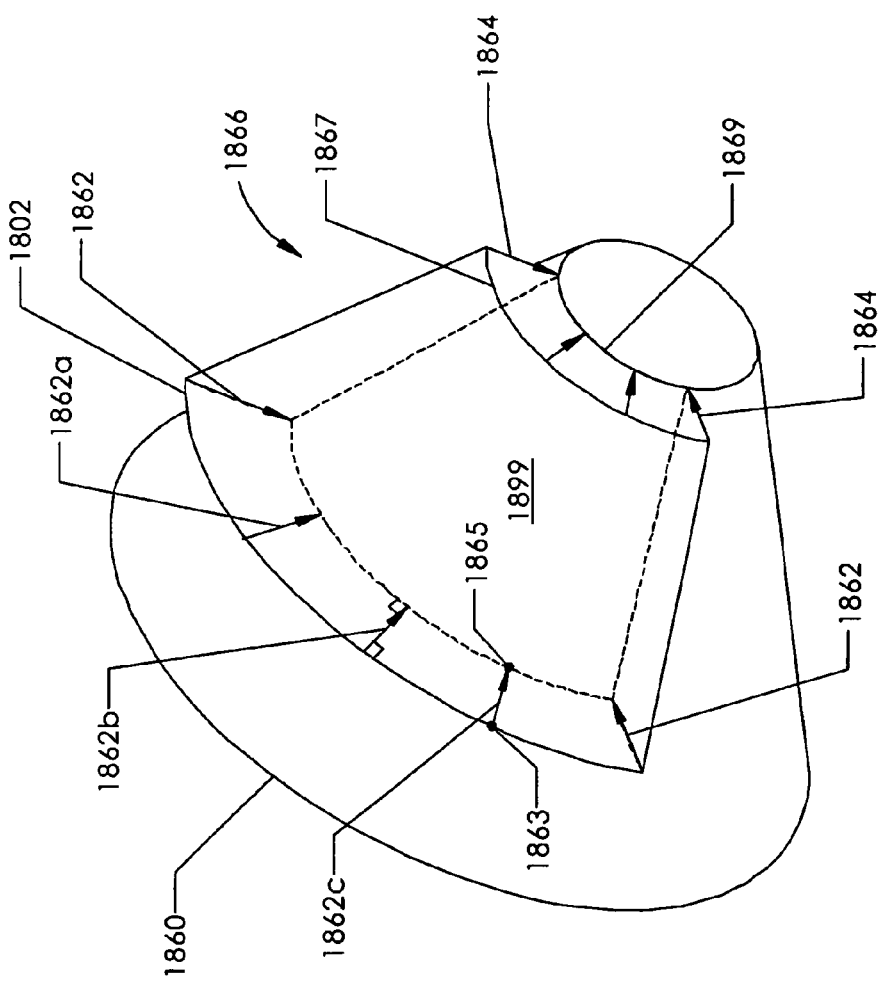
FIG. 18A depicts air gaps having various degrees of uniformity, according to at least one embodiment of the invention.
Figure 18B:
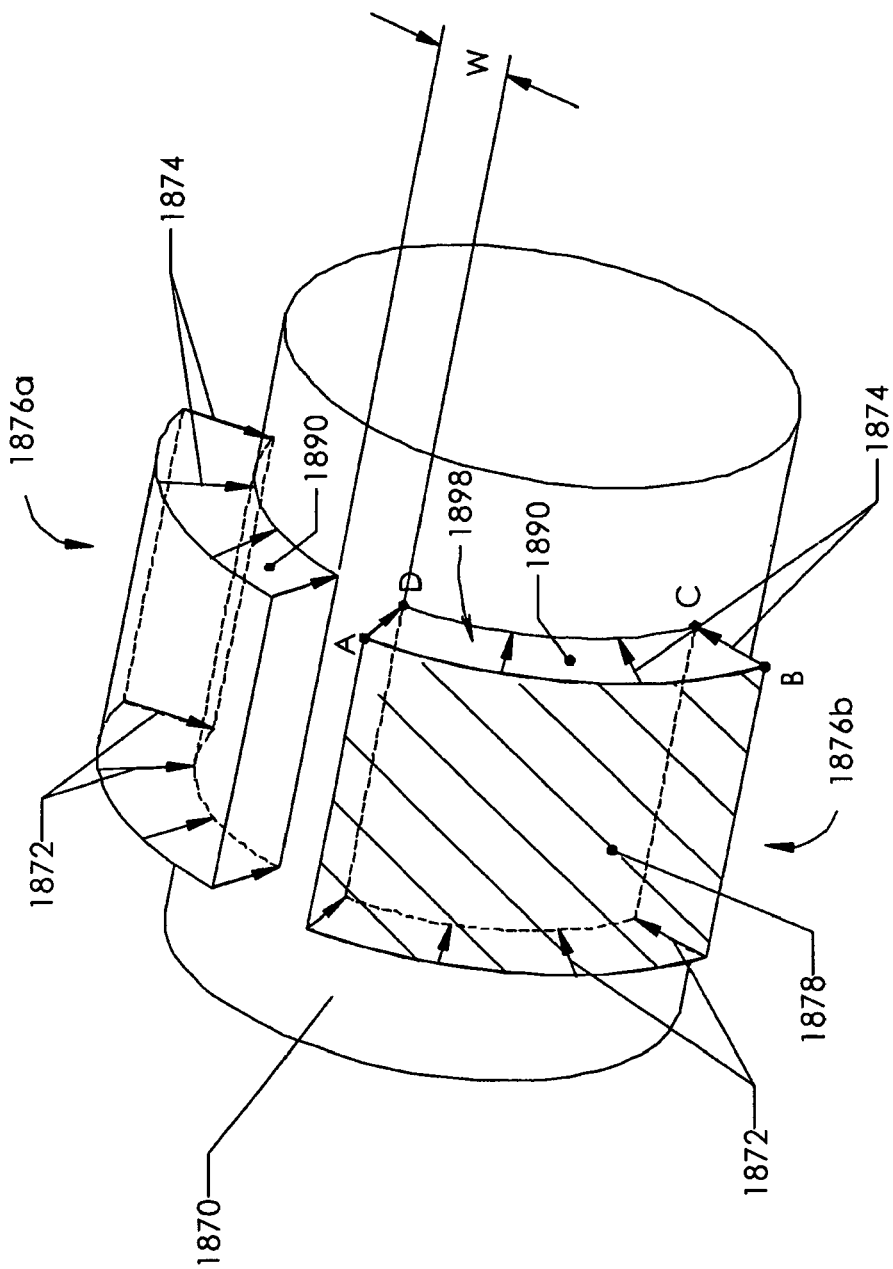
FIG. 18B depicts the configurability of air gaps according to embodiments of the invention.

FIGS. 18A and 18B depict air gaps according to embodiments of the invention.

FIG. 18A illustrates an air gap 1866 shaped by a conical magnet 1860 and a corresponding pole face, which is not shown to avoid obscuring air gap 1866. In this example, each of normal vectors 1862 and 1864 originates from a surface portion on the pole face and terminates at a corresponding point on surface portion 1899 on conical magnet 1860. For example, a normal vector 1862c originates at a portion of the pole face, such as at point 1863, and extends to a point on portion 1899 of surface of conical magnet 1860, such as point 1865. In some embodiments, normal vectors 1862 and 1864 each have the same lengths.

But in some embodiments, lengths of normal vectors 1864 can differ from lengths of normal vectors 1862. As such, an arc-shaped cross-section 1867 defines a first uniform air gap cross-section at a first axial position, whereas an arc-shaped cross-section 1802 defines a second uniform air gap cross-section at a second axial position along the length of an axis (not shown). Normal vectors 1864 lie in the same plane perpendicular, for example, to surface portion 1899, whereas normal vectors 1862 lie in the same plane also perpendicular to surface portion 1899. But both planes are different and produce different cross-sections of air gap 1866, such as arc-shaped cross-sections 1802 and 1867.

In some embodiments, it may be advantageous to vary the air gap thickness to create, for example, a narrowed air gap at the small diameter end of conical magnet 1860 and a widened air gap at the large diameter end of conical magnet 1860 to better control flux conducted across air gap 1866 to the adjacent field pole (not shown). For example, the lengths of normal vectors 1862 can be longer than normal vectors 1864. Accordingly, this creates a wider air gap at arc-shaped cross-section 1802 and a narrower air gap at arc-shaped cross-section 1867. In another example, consider that a load line of conical magnet 1860 defines a ratio between the length of the air gap ("L_gap") to the length of the magnet ("L_magnet") as L_gap/L_magnet. To control this ratio or to prevent the ratio from changing, air gap 1866 can be made narrow at the small end of the conical magnet 1860, where magnet length L_magnet is relatively short, and can be wider at the large end of conical magnet 1860 where magnet length L_magnet is relatively longer. The length of the magnet ("L_magnet") describes a diameter of conical magnet 1860 along which magnetic flux traverses from one magnet surface to another.

Note that normal vectors originating from and/or terminating at a curved surface generally are not parallel to each other in a plane perpendicular to the surface of magnet 1860. For example, normal vector 1862a is not parallel to normal vector 1862b, both of which originate from a pole face surface having a curvature associated therewith. Air gap 1866 includes an outer boundary having an arc-shaped cross-section 1867 and an inner boundary having an arc-shaped cross-section 1869. Note that although only one air gap 1866 is shown, other similar air gaps can be formed by other pole face surfaces. Those air gaps have been omitted for sake of simplicity. Also note that normal vectors 1862 and 1864 do not necessarily represent magnetic flux lines in air gap 1866; their primary purpose is to describe the physical structure of the air gap.

FIG. 18B illustrates air gaps 1876a and 1876b shaped by a cylindrical magnet 1870 and corresponding pole faces, both of which are not shown to avoid obscuring those air gaps. In this example, each of normal vectors 1872 and 1874 originates from a point on a surface portion on the pole face (not shown) and terminates at a corresponding point on surface portion 1890 on conical magnet 1870. Generally, normal vectors 1872 and normal vectors 1874 lay within a first plane (not shown) and a second plane (not shown), respectively, where both planes are substantially perpendicular to an axis. Accordingly, normal vectors 1872 and normal vectors 1874 define a first and a second substantially uniform cross-section. The first and second substantially uniform cross-sections form arc-shaped cross-sections and can be of the same size or of a different size, depending on the lengths of normal vectors 1872 and 1874. For example, when each of normal vectors 1874 is of the same length, then they form an arc-shaped cross-section 1898 (e.g., having a perimeter defined by points A, B, C and D). In one case, arc-shaped cross-section 1890 provides uniformity in radial directions about an axis. In another case, when the lengths of normal vectors 1872 and 1874 are the same, then the arc-shaped cross-sections formed therefrom provides uniformity in an axial direction, thereby providing for uniform air gap thickness in whole or in part. Note that the normal vectors can also originate from a magnet surface (not shown) to describe air gaps. In at least one embodiment, surface areas of pole face surfaces can be dimensioned as a function of the peripheral distance, "W," between field pole members (not shown). FIG. 18B shows a surface area 1878 as a crosshatched outer boundary of air gap 1876b. Surface area 1878 is representative of other surface areas of other air gaps, all of which can be similarly dimensioned. The distance, "W," of FIG. 18B is selected to provide maximum magnetic coupling between cylindrical magnet 1870 and the field pole member by maximizing pole face surface areas 1878 while minimizing leakage between said field pole members associated with air gaps 1876a and 1876b by increasing distance, "W." An optimal value of "W" minimizes magnetic field leakage while providing an increased output torque.

Figure 19:
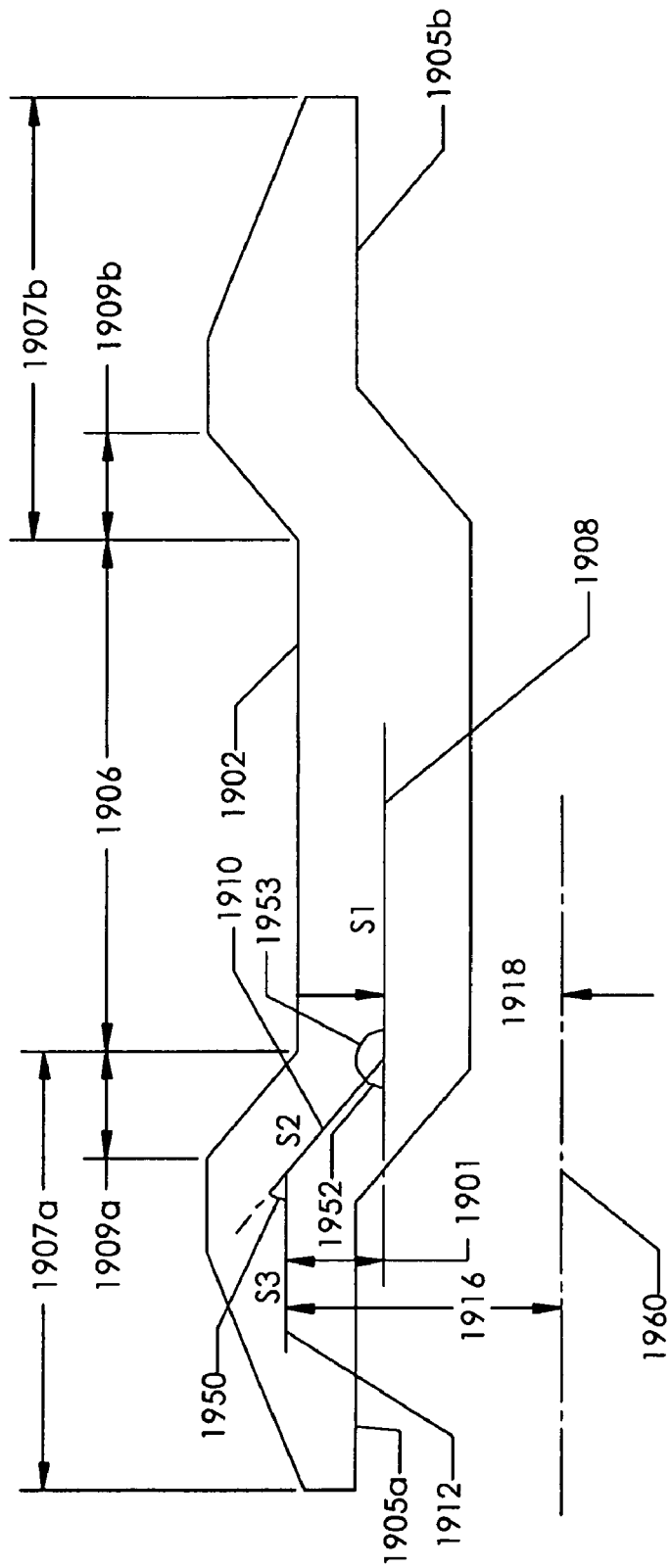
FIG. 19 is a cross-sectional view illustrating yet another general field pole member configuration in accordance with yet another embodiment of the invention.

FIG. 19 is a cross-sectional view illustrating yet another general field pole member configuration in accordance with yet another embodiment of the invention. In the cross-sectional view of field pole member 1902, which is similar to sectional view X-X of FIG. 5A, field pole member 1902 is shown to include similar regions or portions as field pole member 1702 of FIG. 17A. In this example, field pole member 1902 has a first pole shoe 1907a, a second pole shoe 1907b, a first pole face 1905a, a second pole face 1905b, and a central field pole member portion 1906, all of which have equivalent functionalities as those described above. Note that in other embodiments, the regions and portions of field pole member 1902 can be of other sizes, lengths, shapes, proportions, dimensions, cross-sectional areas, etc. than the above-mentioned.

As shown in FIG. 19, transition region 1909a includes a transitory flux path ("S2") 1910 for providing an acute angle 1952 from or to a first flux path segment associated with central field pole member portion 1906, such as flux path segment ("S1") 1908, and for providing the same or a different acute angle 1950 from or to a second flux path segment, such as flux path segment ("S3") 1912, that is associated with first pole shoe 1907a. In some instances, the angle at which transitory flux path ("S2") 1910 deviates from flux path segments 1908 and 1912 can also be defined by an obtuse angle 1953, which is complementary to acute angle 1952. In some cases, flux path segment ("S1") 1908 and flux path segment ("S3") 1912 are at respective distances 1918 and 1916 from an axis of rotation defined by shaft 1960, both segments 1908 and 1912 being substantially parallel to shaft 1960. In FIG. 19, flux path segment ("S1") 1908 and transitory flux path ("S2") 1910 extend the approximate length of central field pole member portion 1906 and transition region 1909a, respectively, whereas flux path segment ("S3") 1912 extends the length of first pole shoe 1907a (or a portion thereof). Consider that transition region 1909a provides a transitory flux path portion for gently transitioning flux from flux path segment 1908 (which is at a distance 1918 from an axis 1960 of rotation) to flux path segment 1912 (which is at a distance 1916 from axis 1960). Or consider that transition region 1909a provides a transitory flux path portion for gently transitioning flux a radial distance 1901 from axis 1960 without 90 degree bends.

Figure 20:
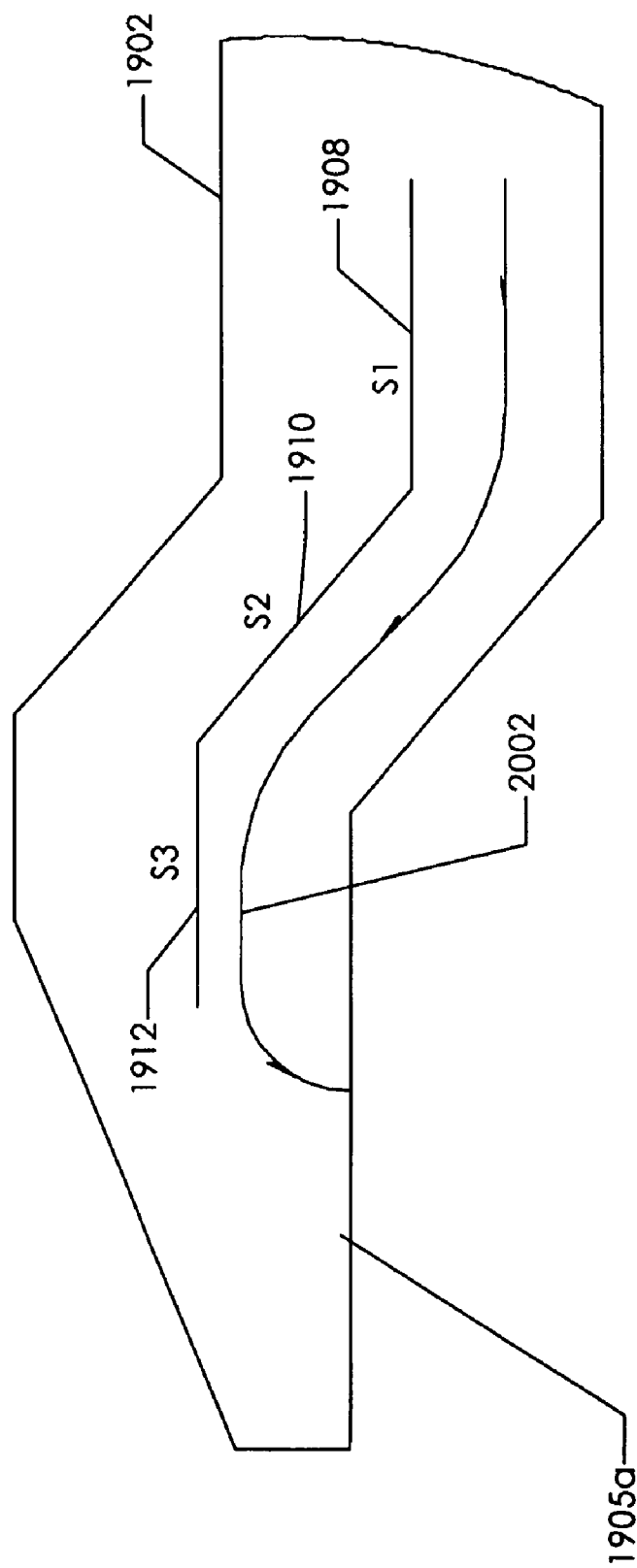
FIG. 20 illustrates an exemplary flux line to represent an instance of magnetic flux between pole faces of a field pole member, according to one embodiment of the invention.

FIG. 20 illustrates a flux line 2002 as an example of a portion of magnetic flux extending to a pole face 1905a of field pole member 1902, according to one embodiment. Flux line 2002 is shown to be approximately incident to a flux path including flux path segment ("S1") 1908, transitory flux path ("S2") 1910 and flux path segment ("S3") 1912.

Generally, the motor constant (Km) for an electric motor implementing rotor-stator structure 200 (FIG. 2B), or the like, can be set by varying the length of the field pole member's core (i.e., the winding region) without materially affecting the other motor characteristics, other than for motor length and weight in some cases. For example, by doubling the winding length while keeping an outside diameter constant, the winding volume can also be doubled so the number of turns that can be wound within the motor doubles. Since motor performance is set by ampere-turns, in whole or in part, when the number of turns doubles, the current can be cut approximately in half and still achieve the same performance. So, doubling the number of turns of same wire size can cause the winding resistance to increase by a factor of two or so. Since the power lost in a motor can be determined by a square of the current times the winding resistance, a reduction in current by a factor of two and a doubling of the resistance can lead to a halving of the power loss in the winding.

An exemplary method of converting electrical energy to mechanical torque by using a rotor-stator structure of at least one embodiment of the invention is described as follows. A first element magnetic flux is produced by an even number of poles of two permanent magnets, whereby those magnets substantially direct the first element magnetic flux in a radial direction inside and to the pole surfaces of the magnets. The permanent magnets are separated axially, but are connected along a common axis such that the magnet poles are substantially aligned in planes that include the axis. The magnet poles in the two permanent magnets are substantially oppositely directed in magnetization when viewed along the axis, thus completing a magnetic circuit. The first element flux is directed in a substantially axial direction through a plurality of low reluctance path elements, the paths being substantially parallel to the axis, thus aiding the magnetic flux density in the magnetic circuit. At least one of the low reluctance path elements is substantially surrounded by a second magnetic flux-producing element composed of current-carrying means surrounding the low reluctance path element. The current in the second flux element, when energized, is selectively switchable so as to produce magnetic potentials in regions of flux interaction at the axial ends of the low reluctance path elements, such as at the stator surfaces. The switchable magnetic potentials, when energized, either aid or oppose magnetic flux from the first element flux source, thereby producing torque in the permanent magnets in planes perpendicular to the axis. The magnitude of the torque produced is a function of the angle between the direction of the first element flux and the second element flux. In some embodiments, the regions of flux interaction at the axial ends of the low reluctance path elements form air gap surfaces that are at an angle relative to the axis. In alternative embodiments, the regions of flux interaction at the axial ends of the low reluctance path elements form air gap surfaces that are parallel to the axis. In a specific embodiment, the coercivity of the permanent magnets as measured by the relative recoil permeability is less than 1.3 in CGS units, for example.

As rotor-stator structures and electrical motors can be designed such that their functionalities can be simulated and modeled using computing devices, at least an embodiment of the invention relates to a computer-readable medium having computer code thereon for performing various computer-implemented operations, such as modeling the conversion of electrical energy to mechanical torque (or the generation of electrical energy from mechanical torque). In particular, control strategies of various embodiments of the invention may be implemented in software associated with a processor. The media and computer code may be those specially designed and constructed for the purposes of embodiments of the invention, or they may be of the kind well known and available to those having skill in the computer software arts. Examples of computer-readable media include hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions. Further, other embodiments of the invention include motors using rotor-stator structures of various embodiments of the invention that are electrically driven by well known drive technology, as would be appreciated by those ordinarily skilled in the art.

Figure 21A:
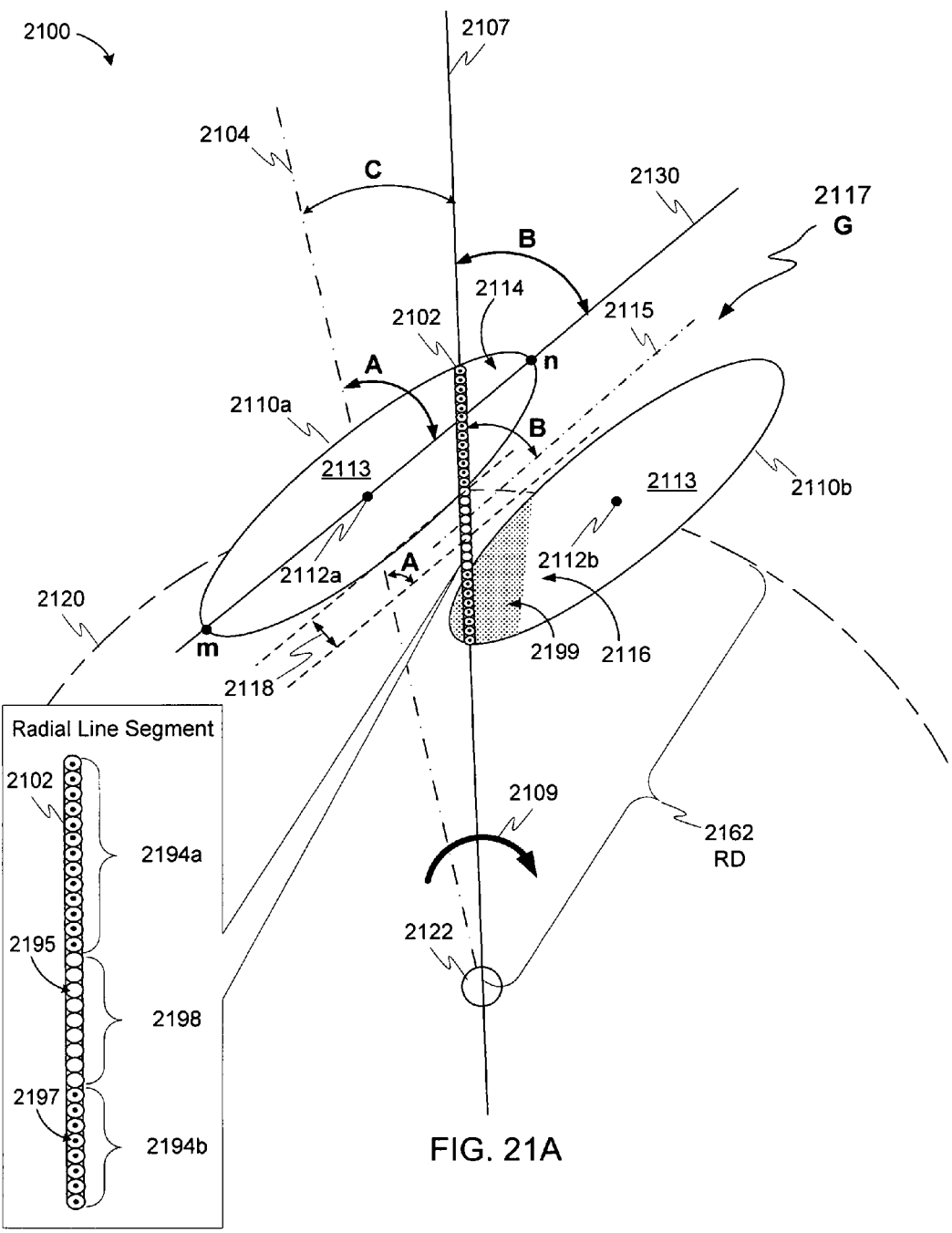
FIG. 21A illustrates an example of one implementation of an arrangement of field pole members to form a stator structure for electrodynamic machines, according to at least one embodiment of the invention.

FIG. 21A illustrates an example of one implementation of an arrangement of field pole members to form a stator structure for electrodynamic machines, according to at least one embodiment of the invention. Here, diagram 2100 is an end view showing a portion of a stator structure including field pole member 2110a and field pole member 2110b, both of which are coaxially positioned about a line, such as an axis 2122 of rotation for an axial-based electrodynamic machine. Further, field pole member 2110a and field pole member 2110b can include an exterior portion 2114 and an interior portion 2116, respectively. In at least one case, exterior portion 2114 can be an outer-most region of a field pole member, and can be located, for example, external to an arc 2120 and/or at a radial distance farthest from axis 2122, whereas interior portion 2116 can be an inner-most region of a field pole member that can be located, for example, internal to arc 2120 and/or at a radial distance nearest to axis 2122. In one embodiment, field pole member 2110b can be oriented with respect to field pole member 2110a to form an overlap portion, an example of which can be illustrated as overlap region 2199, whereby the overlap portion can be configured to include (e.g., intercept) a plane 2107, such as a reference plane, passing through axis 2122 of rotation. In a specific embodiment, field pole member 2110a can be oriented to intercept plane 2107 simultaneous (or substantially simultaneous) to the overlap portion associated with field pole member 2110b intercepting plane 2107.

In view of the foregoing, a stator structure including field pole member 2110a and field pole member 2110b can be oriented to provide for a skewed field pole gap ("G") 2117, whereby one or more portions of skewed field pole gap 2117 can be formed at an angle "B" between plane 2107 and line 2115, as shown in FIG. 21A. Further, angle "B" of skewed field pole gap 2117 can be configured, for example, to form a skewed field pole gap 2117 that can reduce or eliminate the number of rotation angles over which a plane 2107 extends from axis 2122 to an exterior boundary without intercepting one or more field pole members. Further, the arrangement of field pole member 2110a and field pole member 2110b can ensure that radial line segment 2102 passes at least through overlap region 2199.

As shown, plane 2107 can include a radial line segment 2102. As used herein, the term "radial line segment" can generally refer, at least in one embodiment, to a portion of a plane, such as a line segment, that represents an orientation of a portion of the surface of a magnet, such as a conical magnet, in relation to field pole members, such as field pole members 2110a and 2110b. A radial line segment, such as radial line segment 2102, can represent a number of incremental magnet elements, which can be depicted as elements 2195 and 2197. Each of these elements can be composed of a volume, a surface area, or the like, of a surface of a magnet, such as a conical magnet surface. In at least one embodiment, the incremental magnet elements can each be composed of infinitesimally small units of volume or surface area that, for example, confront one or more pole face portions. The incremental magnet elements can have the same polarization, with at least a proportion of which being oriented toward pole faces (not shown) of the field pole members. Such pole faces, or portions thereof, can be formed in surfaces 2113. For example, one pole face (or a portion thereof) can be formed at or near exterior portion 2114 and another pole face (or a portion thereof) can be formed at or near interior portion 2116. In at least one embodiment, the incremental magnet elements, such as elements 2195 and 2197, can represent—conceptually or otherwise—a region of peak or highest magnet flux (e.g. relative to other parts of a magnet) that can be associated with, for example, a pole of a magnet. In at least one example, the peak amounts of magnet flux can originate from a magnet having symmetrical properties adjacent to a line segment on the magnet that corresponds to radial line segment 2102. Note that the various embodiments are not limited to symmetric magnets. As is shown, radial line segment 2102 includes elements 2195 and 2197. Here, elements 2195 represent incremental magnet elements that do not face magnetically permeable material (e.g., they do not face a field pole member and/or pole face), whereas elements 2197 (shown with "centered dots") represent incremental magnet elements that face magnetically permeable material (e.g., magnetic flux can emanate from elements 2197 to the surface of each element 2197). As shown in FIG. 21A, a group 2194a of elements 2197 face field pole member 2110a, a group 2198 of elements 2195 faces skewed field pole gap 2117, and a group 2194b of elements 2197 faces field pole member 2110b.

Accordingly, the portion of the stator structure shown in FIG. 21A can reduce detent, according to at least one embodiment. In a specific embodiment, the portion of the stator structure shown in FIG. 21A can also reduce the peak magnitudes of detent (e.g., detent torque), and can optionally distribute the detent torque over rotational positions. Note, too, that skewed field pole gap 2117 can be configured to have a width 2118, such as a uniform width or the like, so that the leakage across gap "G" between field pole member 2110a and field pole member 2110b is at or near a sufficiently reduced amount for a specific performance of an electrodynamic machine.

In the example shown, field pole member 2110a and field pole member 2110b can conceptually include respective medial lines 2112a and 2112b, both of which can be positioned to coincide (or substantially coincide) on an arc 2120 located at a radial distance ("RD") 2162 from axis 2122. In this example, medial lines 2112a and 2112b can be parallel (or are substantially parallel) to axis 2122 and lie in a medial plane, such as medial plane 2130, which includes medial line 2112a. Here, medial lines 2112a and 2112b each appear as a point in FIG. 21A, as these lines extend out of the page in a parallel to axis 2122 at least in one embodiment. Note that, in some embodiments, medial plane 2130 (as well as other medial planes not shown) can be positioned to exclude axis 2122 of rotation. Field pole member 2110a and field pole member 2110b can be positioned with respect to a reference plane, such as planes 2104 and 2107. Here, field pole member 2110a can be oriented so that medial plane 2130 and planes 2104 form an angle A (or an equivalent angle), which is sufficient to form skewed field pole gap 2117 at angle B, where B can be equal to (or is substantially equal to), for example, the angle of A minus the angle of C (e.g., B=A−C). C can represent the angle between planes 2104 and 2107.

To illustrate the functionality of the stator structure portion shown in FIG. 21A, consider that radial line segment 2102 represents a series of magnet elements along a line segment that are associated with an amount of magnet flux (e.g., a peak amount of magnet flux generated by each magnet element) that originates from a magnet (not shown). Further consider that radial line segment 2102 sweeps in an angular direction 2109, which is shown to be clockwise. At a first point in time, radial line segment 2102 coincides with plane 2104, and, thus, is intercepted by field pole member 2110a. In this case, group 2194b of elements 2197 is absent from the radial line segment (not shown), and these elements can be illustrated as elements 2195. At a second point in time, radial line segment 2102 sweeps clockwise, transitioning from intercepting both field pole members 2110a and 2110b, as shown, to intercepting field pole member 2110b. In this case, group 2194a of elements 2197 is absent from the radial line segment (not shown), and these elements can be shown as elements 2195. Overlap region 2199 can thereby ensure that radial line segment 2102 does not fall within a field pole gap, which otherwise might contribute to detent. That is, overlap region 2199 can be configured to position magnetically permeable material of field pole members 2110a and 2110b to face no less than one or more elements 2197 as radial line segment 2102 sweeps an entire revolution, so long as other field pole member similar to 2110a and 2110b are similarly situated about axis 2122. Note that surfaces 2113 can include portions that constitute pole faces (not shown), or portions thereof, which can be configured to confront a surface of a magnet, such as a conical magnet or a cylindrical magnet. For example, at least one of surfaces 2113 can be configured to be coextensive with an acute angle (e.g., an angle less than 90 degrees) in accordance with at least one embodiment. Note, too, that radial line segment 2102 is not limited to being orthogonal to axis 2122. In at least one instance, radial line segment 2102 can be at an angle to axis 2122 such that rotation in direction 2109 sweeps out a conical sectional (e.g., in association with the conical surface portion of a conical magnet).

As used herein, the term "overlap" can generally refer, at least in one embodiment, to a portion of a second field pole member that can interpose between, for example, an axis 2122 of rotation and a first field pole member. In one instance, a portion of field pole member 2110b that is positioned within a conceptual triangular area defined by point "m," point "n," and the axis of rotation can form an overlap portion. An overlap portion can prevent a plane 2107 that includes radial line segment 2102 from extending beyond an exterior boundary of, for example, the stator structure without intercepting a field pole member. As used herein, the term "medial" can generally refer, at least in one embodiment, to a plane (i.e., a medial plane) that longitudinally divides a field pole member into two parts, whereby the two parts can be equivalent (or substantially equivalent) parts. For example, a medial plane can bisect the field pole member into two halves. In at least one instance, a medial plane can extend longitudinally in parallel (or substantially parallel) to a height dimension of a field pole member (see e.g., FIG. 21E), or along (e.g., within 45 degrees) the same dimension. In a specific embodiment, a medial line can be coincident with a centerline passing lengthwise through an approximate center of a field pole member, regardless of whether the field pole member is straight. An approximate center of a field pole member can be determined by the center of a cross-sectioned area that is perpendicular to, for example, a longitudinal dimension (e.g., a length of a field pole member extending from pole face to pole face). In a specific embodiment, the approximate center of a field pole member can be an aggregate of the centroids of each of the cross-sectioned areas.

In various embodiments, other attributes of field pole members 2110a and 2110b can be modified to influence the functionality and/or structure of a stator structure to form a suitable skewed field pole gap. For example, while field pole members 2110a and 2110b are represented as having elliptical cross-sections, field pole members 2110a and 2110b can have other cross-sectional shapes. For instance, field pole members 2110a and 2110b can have triangular cross-sections, rectangular cross-sections, rhomboidal cross-sections, trapezoidal cross-sections, crescent-shaped cross-sections and/or surfaces, and any other shape or modification thereof. Further, while field pole members 2110a and 2110b are represented as having symmetrical sides and/or lateral portions, field pole members 2110a and 2110b can have asymmetrical sides and/or lateral portions. In one example, the sides and/or lateral portions of field pole members 2110a and 2110b can have sides shaped to have different dimensions, such as different height dimensions. As another example, one side can be convex while another side can be concave. In various embodiments, field pole members 2110a and 2110b can be formed as monolithic components composed of magnetic permeable material, or can be formed of constituent elements, such as laminates. In some embodiments, field pole members 2110a and 2110b can be formed in accordance with U.S. Nonprovisional application Ser. No. 11/707,817, entitled "Field Pole Members and Methods of Forming Same for Electrodynamic Machines," published on Sep. 6, 2007 as U.S. Publication No. 20070205675 A1. In at least one embodiment, field pole members 2110a and 2110b can be formed to have uniform cross-sections extending, for example, along a length dimension from pole shoe to pole shoe. In a specific embodiment, field pole members 2110a and 2110b can be formed to have substantially uniform cross-sections extending, for example, along a length dimension (e.g., an axial length) from pole face to pole face. In at least one embodiment, different field pole members can be positioned at different radial distances from an axis of rotation (not shown). In one embodiment, field pole members 2110a and 2110b can be referred to as adjacent field pole members, the structure of which can be replicated about axis of rotation 2122.

Figure 21B:
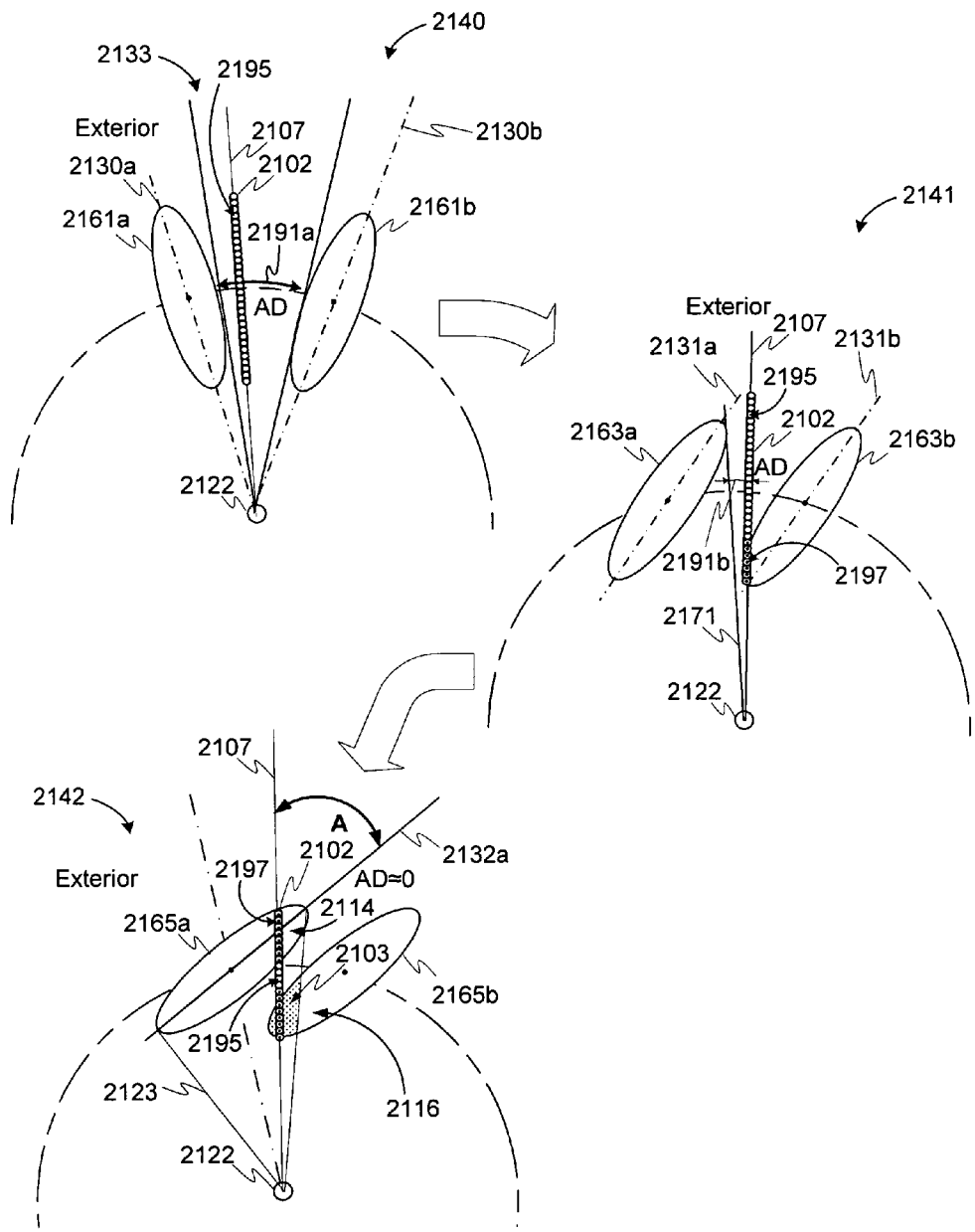
FIG. 21B illustrates examples of various implementations of field pole members to form various stator structures for electrodynamic machines, according to various embodiments of the invention.

FIG. 21B illustrates examples of various implementations of field pole members to form various stator structures for electrodynamic machines, according to various embodiments of the invention. Here, diagram 2140 is an end view showing a portion of a stator structure including field pole member 2161a and field pole member 2161b, both of which are coaxially positioned about axis 2122 of rotation. Further, field pole member 2161a and field pole member 2161b can respectively include medial planes 2130a and 2130b. As shown, medial planes 2130a and 2130b extend through and include axis 2122 of rotation. As such, the portion of a stator structure that is shown in diagram 2140 can establish an effective field pole gap 2133 in which a plane 2107, which includes radial line segment 2102, can extend through an arc segment, as shown by an angular distance ("AD") 2191a, to an exterior region or boundary. As used herein, the term "an effective field pole gap" can generally refer, at least in one embodiment, to a gap as determined by an angular distance of an arc segment (or an arc length) in the context of a radial line segment extending into an exterior boundary. In some embodiments, an effective field pole gap can be refer to a sector of a circle bounded by two radii and an arc segment, such as 2191a, whereby a radial line segment, such as radial line segment 2102, can extend without intersecting a field pole member (i.e., no incremental magnet elements associated with the radial line segment confront a pole face, or portion thereof). Note that in this example, each of the incremental magnet elements of radial line segment 2102, such as elements 2195, is attracted toward field pole 2161a (e.g., due to the illustrated proximity of radial line segment 2102), and, thus, can contribute to a torque in that direction. Since radial line segment 2102 can represent the highest flux region of, for example, a symmetric magnet (not shown), when the torque contributions (e.g., the incremental torque magnitudes and directions) of each of the magnet incremental elements over the entire surface of the magnet (or series of magnets in rotor hub structure) are summed, the net torque can be in a direction toward field pole 2161a. The peak amplitude of the torque increases as radial line segment 2102 rotates toward the center of the angular distance ("AD") 2191a, and, then changes to zero when radial line segment 2102 is at (½)AD (i.e., half the angular distance 2191a). This torque profile continues to a similar peak amplitude, with the torque being directed toward field pole 2161b as it continues to rotate (e.g., in the clockwise direction).

Diagram 2141 is an end view showing a portion of another stator structure that includes field pole member 2163a and field pole member 2163b, both of which are coaxially positioned about axis 2122 of rotation. Further, field pole member 2163a and field pole member 2163b can respectively include medial planes 2131a and 2131b, neither of which is configured—at least in this example—to extend through and include axis 2122 of rotation. As such, the portion of the stator structure that is shown in diagram 2141 can form an effective field pole gap width, as defined by a plane that includes radial line segment 2102 and a plane 2171. Note that radial line segment 2102 and plane 2171, and arc segment 2191b establish a sector of a circle representative of the effective field pole gap. As such, plane 2107, which includes radial line segment 2102, can extend through an arc segment, as shown by an angular distance ("AD") 2191b, to an exterior region or boundary from axis 2122. Accordingly, field pole member 2163a and field pole member 2163b can be oriented to form a skewed field pole gap. Note that angular distance ("AD") 2191b is less than angular distance ("AD") 2191a, which can reduce detent (i.e., the incremental magnet elements 2195 face no field pole members for a shorter duration of time (and/or over fewer rotational positions) in diagram 2141 than in diagram 2140). Thus, the orientation of a skewed field pole gap (and/or a skewed field pole gap angle)—in whole or in part—can be configured to modify the angular distance of an arc segment through which radial line segment 2102 can extend to an exterior boundary to, for example, reduce detent. Further, skewed field pole gap (and/or a skewed field pole gap angle) can be configured to include an overlap region, as is shown next in diagram 2142, to reduce peak detent torque amplitudes. Note that the incremental magnet elements 2195 that face the field pole gap (e.g., do not confront a field pole face) can generate a radial torque. As such, these magnet elements can be attracted to the nearest high permeability surface (i.e., the nearest field pole member). Note, too, that the detent peak amplitude can be reduced if a sufficient quantity of incremental magnet elements is attracted to field pole 2163b sooner (e.g., in fewer rotation angles) than in the arrangement shown in diagram 2141. In field pole member arrangement of diagram 2141, the detent torque amplitude may spread out, thereby distributing detent torque, as well as elements 2195, over more rotational positions. In some cases, this is because the skewing of field pole members can enable the incremental magnet elements to face the field pole gap at angles of rotation different than in the arrangement shown in diagram 2140. The portion of the stator structure shown in diagram 2141 can thereby reduce the peak amplitude of detent and "smear out the waveform" (i.e., distribute detent torque amplitude over more rotational positions than is the case with the arrangement shown in diagram 2140).

Diagram 2142 is an end view showing a portion of yet another stator structure that includes field pole member 2165a and field pole member 2165b, both of which are coaxially positioned about axis 2122. Further, field pole member 2165a includes medial plane 2132a, which is not configured—at least in this example—to extend through and include axis 2122. The portion of the stator structure that is shown in diagram 2142 does not form an effective field pole gap width as a result of forming an overlap portion 2103. Thus, the angular distance ("AD") of an arc segment is zero or approximately zero. In this example, overlap portion 2103 is formed by interposing an interior portion 2116 between exterior portion 2114 and axis 2122, for example, within a triangular-shaped area 2123. Thus, overlap portion 2103 provides for transitioning radial line segment 2102 from field pole member 2165a to field pole member 2165b without a plane 2107, which includes radial line segment 2102, extending to an exterior boundary. In the example shown in diagram 2142, incremental magnet elements that overlap either field pole face, such as elements 2197, do not generate incremental torque. Rather, other incremental magnet elements that face the gap between the field poles members, such as elements 2195, can contribute to the generation of incremental torques. Again, the incremental torques from incremental magnet elements can be summed to determine the net detent torque. The result of this summation can depend on the shape of the field pole face (not shown), the total magnet size (not shown), and the like. Generally, at least in some embodiments, the peak amplitude of the detent waveform can decrease for the field pole member arrangement in diagram 2142, at least in comparison with the arrangement in diagram 2140, which includes non-skewed field pole members.

Figure 21C:
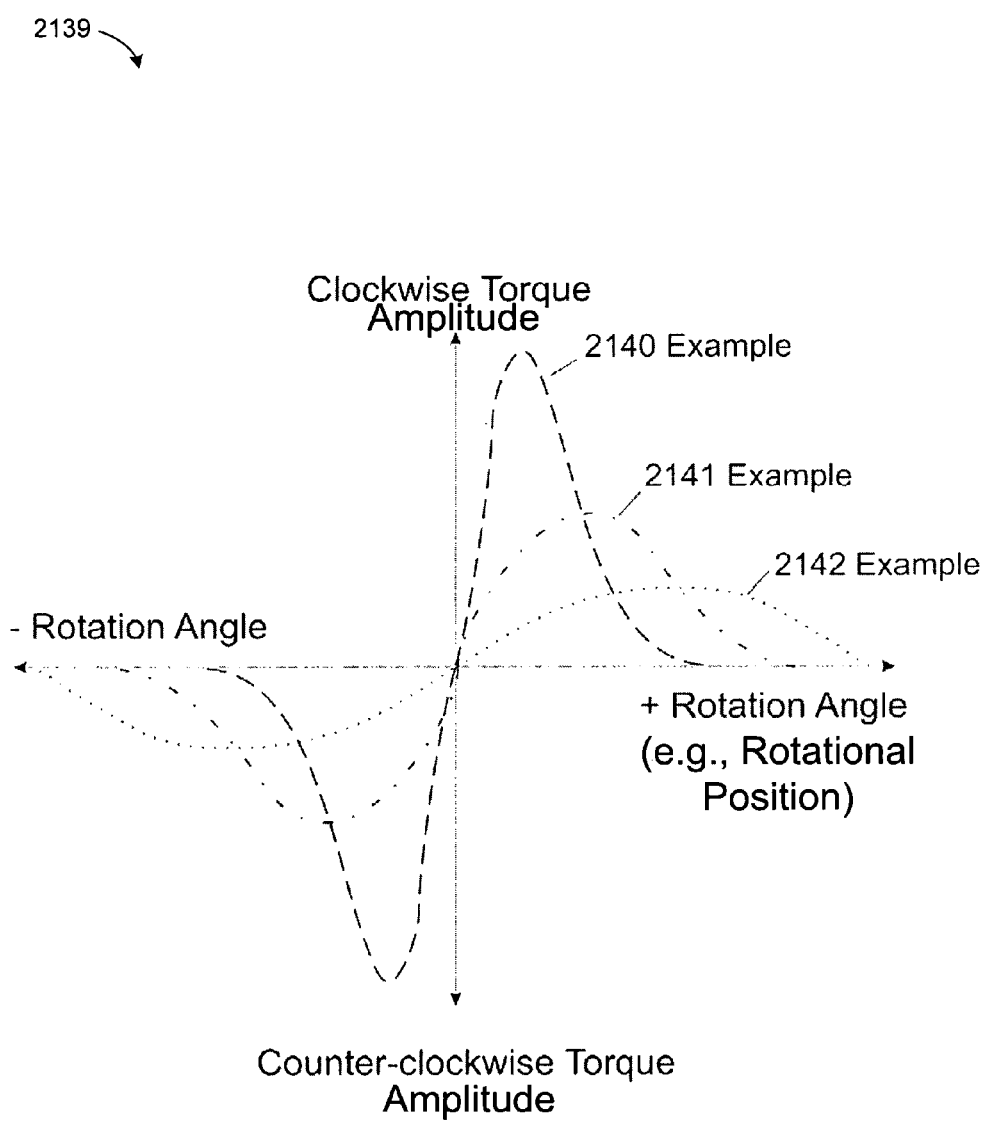
FIG. 21C depicts approximate detent torque amplitudes as a function of various rotation angles for the field pole arrangements shown in FIG. 21B, according to at least one embodiment of the invention.

FIG. 21C depicts approximate detent torque amplitudes as a function of various rotation angles for the field pole arrangements shown in FIG. 21B, according to at least one embodiment of the invention. Diagram 2139 illustrates that the field pole member arrangement in diagram 2140, for example, can produce higher torque amplitudes due to detent than the other field pole member arrangements in diagrams 2141 and 2142. In at least one embodiment, the other field pole member arrangements in diagrams 2141 and 2142 can respectively reduce the detent torque amplitudes for a given rotation angle (or a range of rotation angles). In one or more embodiments, the other field pole member arrangements in diagrams 2141 and 2142 also can respectively distribute elements 2195, which do not face a field pole member, over an increased number of rotation angles (or rotational positions), which, in turn, can facilitate the reduction in detent torque amplitude.

Figure 21D:
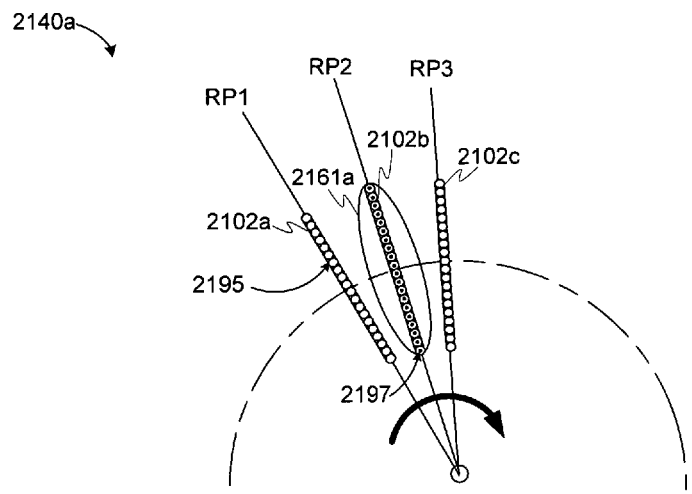
FIG. 21D illustrates an example of a field pole arrangement that can facilitate the distribution of incremental magnet elements over additional rotation angles, according to at least one embodiment of the invention.
Figure 21D:
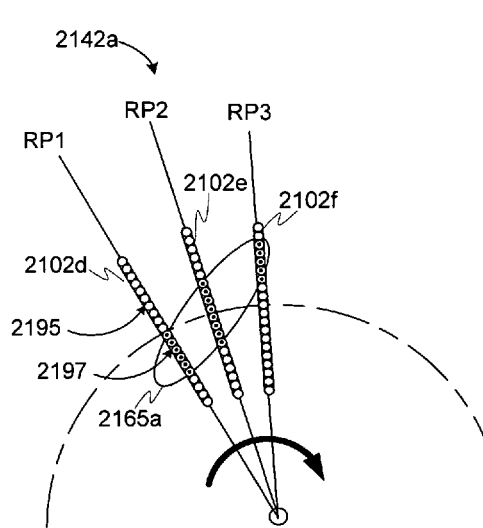
Figure 21D:
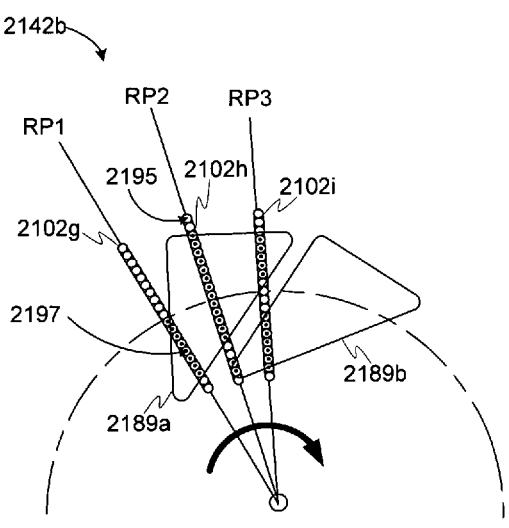

FIG. 21D illustrates an example of a field pole arrangement that can facilitate the distribution of incremental magnet elements over additional rotation angles, according to at least one embodiment of the invention. Diagrams 2140a and 2142a represent at least a portion of field pole member arrangements in diagrams 2140 and 2142, respectively, in FIG. 21B. As shown in diagram 2140a, radial line segment 2102 of FIG. 21B can sweep through rotational positions RP1, RP2, and RP3 as radial line segments 2102a, 2102b, and 2102c, respectively. Similarly, radial line segment 2102 of FIG. 21B can sweep through rotational positions RP1, RP2, and RP3 as radial line segments 2102d, 2102e, and 2102f, respectively, as shown in diagram 2142a. The field pole arrangement in diagram 2140a shows that rotational position RP2 includes all of the elements 2197 that face a field pole member, such as field pole member 2161a, for the three rotational positions. As such, the elements 2195 at rotational positions RP1 and RP3 can contribute to a corresponding amount of detent torque amplitudes. By contrast, the orientation of field pole member 2165a distributes elements 2195 and 2197 over more rotational positions, which, in turn, can correspond to a distribution of detent torque amplitudes over a larger range of rotational positions (rotation angles). Diagram 2142b illustrates a variant of diagram 2142a in which the cross section of the field pole members is triangular (or substantially triangular), such as field pole members 2189a and 2189b. Here, radial line segment 2102 of FIG. 21B can sweep through rotational positions RP1, RP2, and RP3 as radial line segments 2102g, 2102h, and 2102i, respectively, as shown in diagram 2142b. The field pole arrangement in diagram 2142b shows that the triangular cross sections and/or the positioning of field pole members 2189a and 2189b can increase the number of elements 2197 for individual rotational positions, which, in turn, can correspond to a distribution and/or a reduction of detent torque amplitudes over a larger range of rotational positions (rotation angles).

Figure 21E:
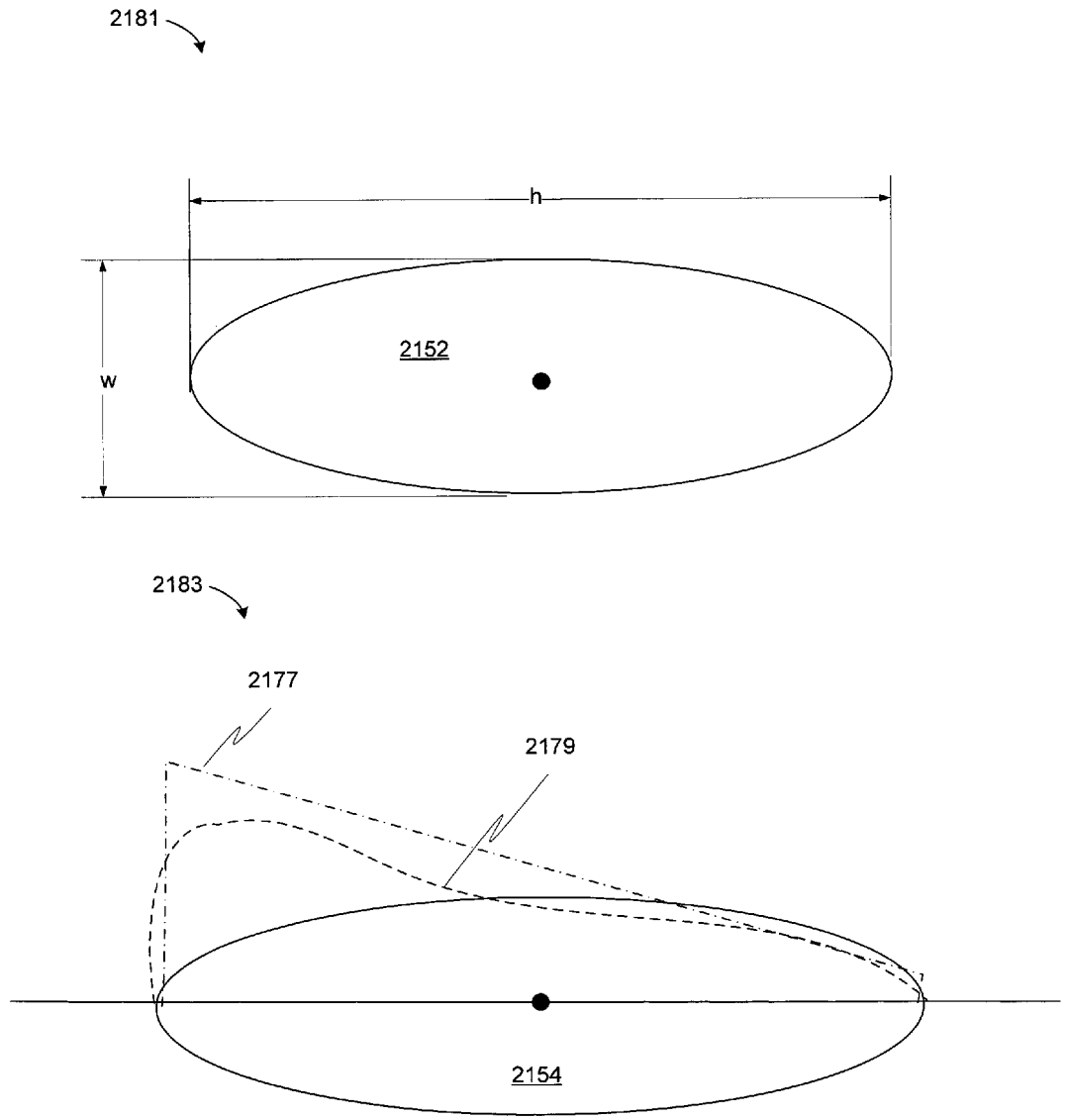
FIG. 21E depicts attributes that can influence detent reduction by a stator structure, according to various embodiments of the invention.

FIG. 21E depicts attributes that can influence detent reduction by a stator structure, according to various embodiments of the invention. Here, diagram 2181 depicts a cross-section 2512 of a field pole member having a height dimension, h, which characterizes an elongated dimension ("ED") of cross section 2512. Cross-section 2152 also has a width dimension, w, where w<h. Both the height and width dimensions can be modified to, for example, form an overlap portion and/or a skewed field pole gap, at least according to one embodiment. In at least some embodiments, an elongated dimension can be positioned to confront an area on a surface that is coextensive (or is substantially coextensive) with an acute angle with an axis of rotation so as to confront, for example, a conical magnet structure. To illustrate, consider that the line segment between point m and point n for field pole member 2210 (e.g., FIG. 21A) coincides with an elongated dimension. Further, the elongated dimension can be positioned at an angle, such as angle A, with a plane that includes the axis of rotation, such as plane 2104. In at least one example, the angle can be configurable to modify a number of rotational positions over which the elongated cross section confronts a pole region (e.g., a magnetic region) of a conical magnet. The pole region can be oriented parallel (or substantially parallel) to the plane that includes the axis of rotation. In another example, the angle can be configurable to distribute detent torque over the number of rotational positions.

Diagram 2183 depicts a cross-section 2154 of a field pole member being configurable to include asymmetric sides. For example, a side 2177 of cross-section 2154 can have triangular shape, whereas a side 2179 of cross-section 2154 can have a contoured shape that can either be convex or concave. Note that modifying either side of cross-section 2154 can influence the formation of an overlap portion and/or a skewed field pole gap, according to at least one embodiment.

Figure 22:
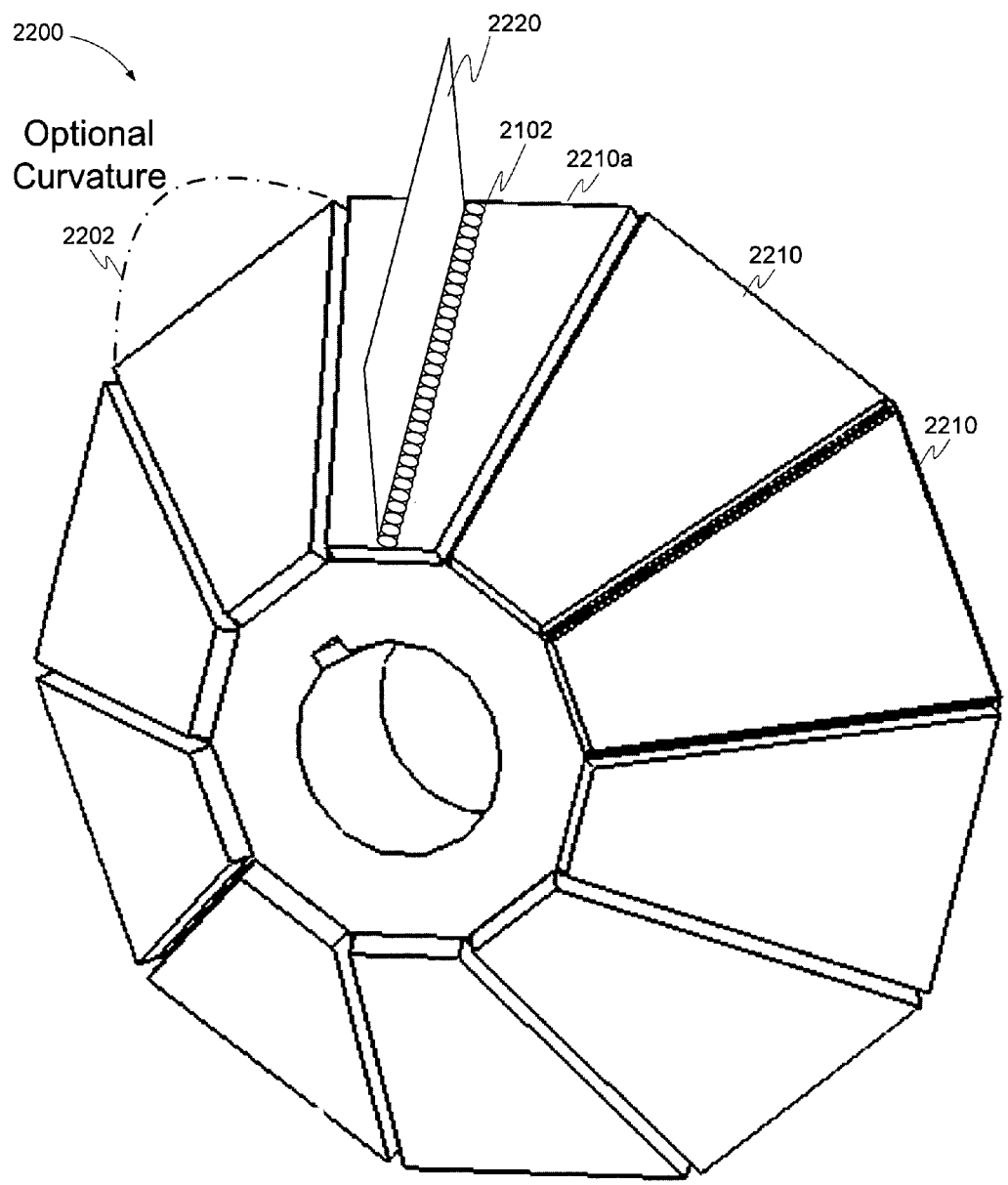
FIG. 22 depicts an example of a conical magnet that a stator structure can be configured to confront, according to at least one embodiment of the invention.

FIG. 22 depicts an example of a conical magnet that a stator structure can be configured to confront, according to at least one embodiment of the invention. Here, conical magnet 2200 is shown to be composed of magnet portions 2210, which can be substantially flat or can have a bevel or curvature, such as shown by arc 2202. As shown, a reference plane 2220 can include or coincide with a radial line segment 2102 of FIG. 21A, which can be representative of incremental magnet elements disposed, for illustration purposes, within a pole region associated with a surface of conical magnet 2200, such as magnet portion 2210a, with polarization (e.g., flux) in the direction away from the surface of the magnet. When conical magnet 2200 is integrated as a rotor that operates with a stator structure, the incremental magnet elements represented by radial line segment 2102 can be configured so that some portion of the magnet elements confront pole faces of one or more field pole members (e.g., including an overlap portion) during rotation.

Figure 23A:
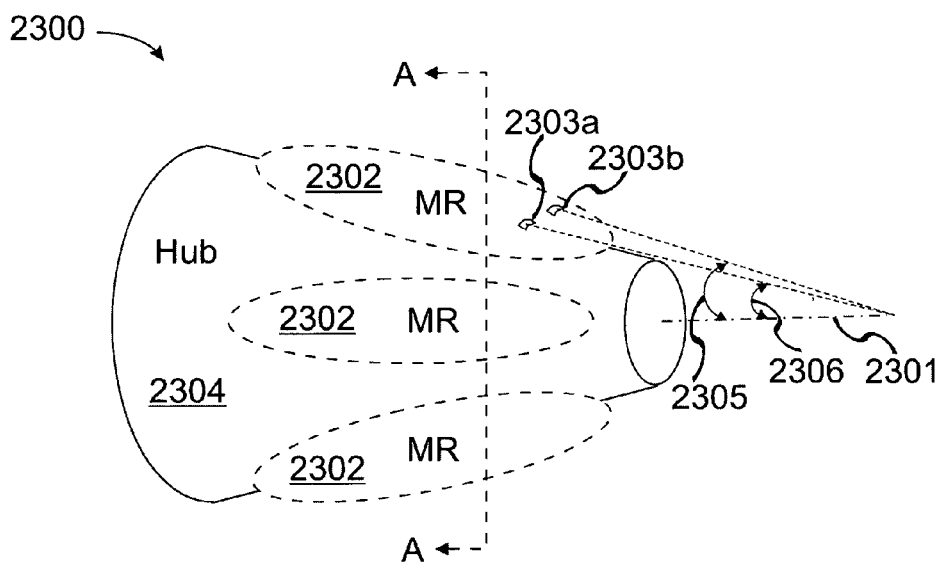
FIG. 23A depicts an example of a conical magnet including magnetic regions, according to at least one embodiment of the invention.

FIG. 23A depicts an example of a conical magnet including magnetic regions, according to at least one embodiment of the invention. As shown, conical magnet 2300 can include an arrangement of magnetic regions ("MR") 2302. In one or more embodiments, at least one magnetic region 2302 has a surface (or a portion thereof) that is coextensive (or is substantially coextensive) to one or more acute angles with respect to axis of rotation 2301. In the example shown, surface portion 2303a can be at acute angle 2306 to axis of rotation 2301, whereas surface portion 2303b can be at acute angle 2305. Further, the arrangement of magnetic regions 2302 can be mounted upon a hub 2304, such as a core (in the context of a rotor magnet, such as a conical magnet) or an equivalent structure. In at least one embodiment, magnetic regions 2302 can be configured to modify the thickness of at least a portion of an air gap (not shown) in, for example, a plane perpendicular to axis of rotation 2301, whereby the thickness of the air gap can vary during rotation relative to conical magnet 2300. The arrangement of magnetic regions 2302 can include one or more configurable structural attributes that modify magnetic regions 2302, which, in turn, can modify the generation of a sinusoidal flux waveform (or a substantially sinusoidal flux waveform), or an equivalent thereof. In a specific embodiment, the one or more magnetic region portions of magnetic regions 2302 can be configured to modify portions of the sinusoidal flux waveform. In at least one embodiment, magnetic regions 2302 can be configured to include one or more surfaces (or one or more portions thereof) that can provide for a substantially uniform thickness for at least a portion of an air gap (not shown) in a plane perpendicular to axis of rotation 2301. To illustrate, consider that configuring magnetic region 2302 as an internal permanent magnet ("IPM") can provide for a uniform air gap thickness. In various embodiments, magnetic regions 2302 can include magnets or magnetically permeable material, or both, as well as other equivalent materials. As used herein, the term "conical magnet" can generally refer to, in at least one embodiment, a structure of a conical magnet that implements an assembly of magnet components including, but not limited to, magnetic regions and/or magnetic material and a hub structure. In at least some embodiments, the term "conical magnet" can be used interchangeably with the term "conical magnet structure." In at least one embodiment, the term "conical magnet" can refer to those magnets described in U.S. Pat. No. 7,061,152 and/or U.S. Pat. No. 7,294,948 B2.

In view of the foregoing, magnetic regions 2302 (and/or portions thereof) can provide for configuring, for example, the shape of a flux waveform, such as a magnetic flux waveform in field pole members (not shown) of an electrodynamic machine in which conical magnet 2300 is implemented. In at least some embodiments, the arrangement of magnetic regions 2302 can be configured to reduce higher-order harmonic frequencies in the flux waveform. This, in turn, can reduce the hysteresis and eddy current losses (both of which can be collectively referred to as "core losses") that otherwise might be generated by higher-order harmonic frequencies in, for example, magnetically permeable material (e.g., steel) of the field pole members. Therefore, the configuration of the magnetic regions 2302 (and portions thereof) can facilitate, among other things, a reduction in power losses due to the core losses, according to various embodiments. In at least some embodiments, the shape of a magnetic region can be determined in accordance with the multiple radial distances to provide flux, in a substantially sinusoidal manner, to one or more fixed point or area portions in space, such as a point or area associated with a pole face.

Figure 23B:
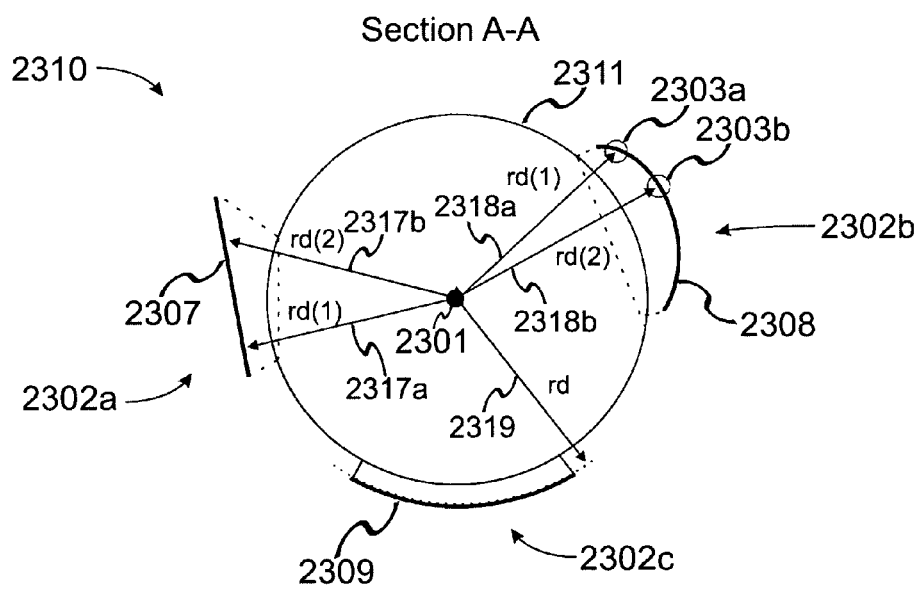
FIG. 23B depicts examples of sectional views for magnetic regions, according to various embodiments of the invention.

FIG. 23B depicts examples of sectional views for magnetic regions, according to various embodiments of the invention. For purposes of illustration, diagram 2310 depicts a cross section 2311 of a conical magnet, the cross section 2311 showing a sectional view A-A of conical magnet 2300 of FIG. 23A with magnetic regions 2302 having different surfaces. As shown, magnetic regions 2302a, 2302b, and 2302c have surfaces 2307, 2308, and 2309, respectively. Surfaces 2307 and 2308 are shown as being positioned at multiple radial distances, "rd," from axis of rotation 2301 in a plane perpendicular to axis of rotation 2301. In particular, surface 2307 is positioned at multiple radial distances, which include radial distance ("rd(1)") 2317a and radial distance ("rd(2)") 2317b from axis of rotation 2301, whereas surface 2308 is positioned at multiple radial distances that include radial distance ("rd(1)") 2318a and radial distance ("rd(2)") 2318b. In at least some embodiments, the multiple radial distances can determine multiple angles with which a surface can be coextensive. The multiple angles can be determined with reference to axis of rotation 2301. For example, radial distance ("rd(1)") 2318a and radial distance ("rd(2)") 2318b can determine angles 2305 and 2306 of FIG. 23A, respectively, for surface portions 2303b and 2303a. The multiple radial distances can determine the variation of the thickness of an air gap as conical magnet 2300 rotates. Surface 2309 is positioned at a radial distance ("rd") 2319a from axis of rotation 2301, which can facilitate the establishment of an air gap having a uniform air gap thickness.

Figure 23C:
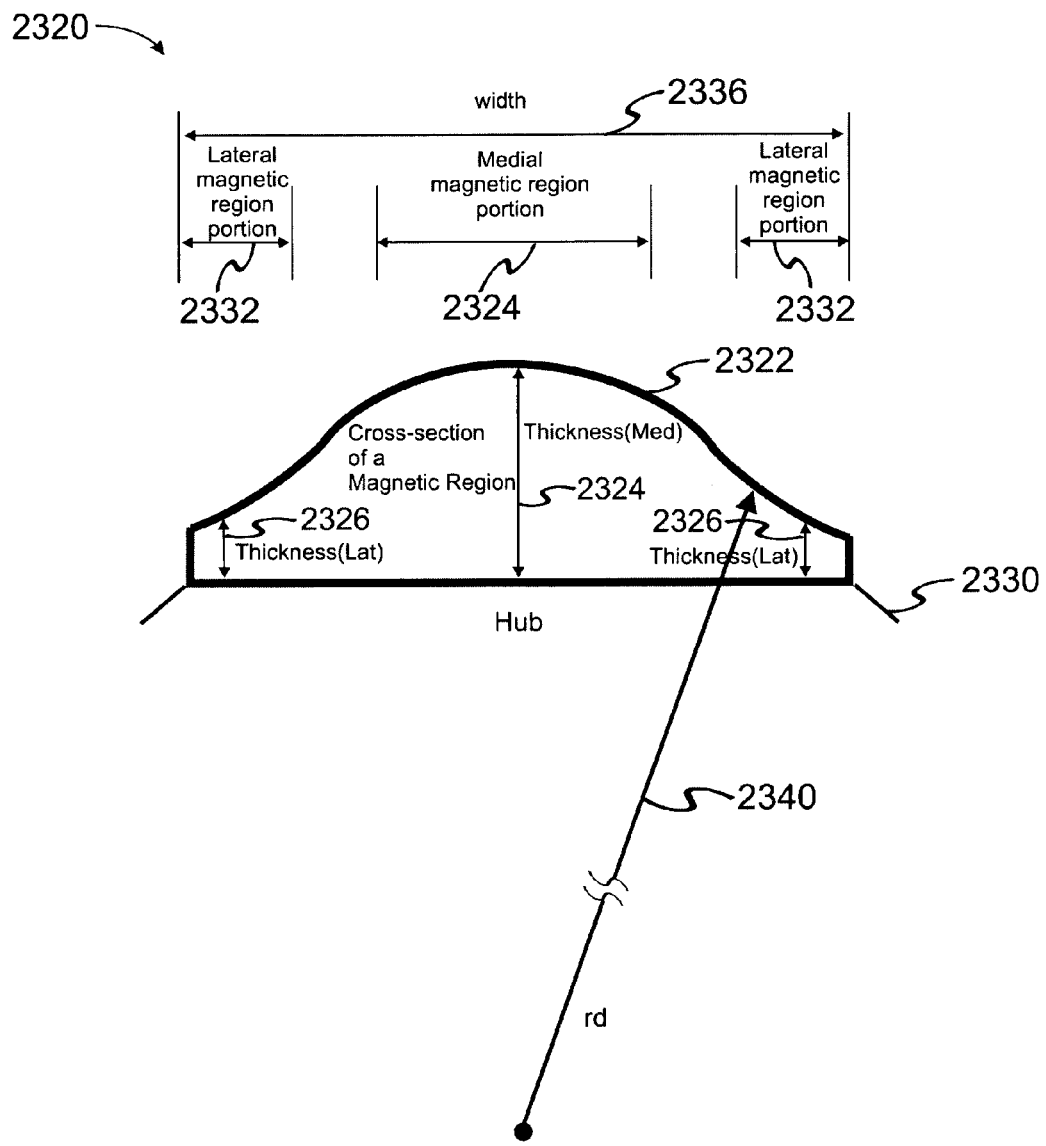
FIG. 23C depicts a cross-sectional view for an example of a magnetic region, according to at least one embodiment of the invention.

FIG. 23C depicts a cross-sectional view for an example of a magnetic region, according to at least one embodiment of the invention. Magnetic region 2320 can include any number of portions, at least a subset of which can be configured to define the rate at which flux is exchanged with a pole face (not shown). As such, portions of magnetic region 2320 can determine the portions of a flux waveform, such as a sinusoidal flux waveform. In this example, magnetic region 2320 includes a medial portion ("medial magnetic region portion") 2334 and lateral portions ("lateral magnetic region portions") 2332. Further, surface 2322 of magnetic region 2320, including the surface portions of medial portion 2334 and lateral portions 2332 can be configured to have a shape or shapes that facilitate the shaping of a flux waveform to establish a substantially sinusoidal flux waveform in, for instance, a field pole (not shown). Lines of flux can be established between magnetic region 2320 and a pole face, with the directions of flux oriented either toward magnetic region 2320 from a pole face or from magnetic region 2320 into the pole face. In at least one embodiment, surface 2322 associated with medial portion 2334 can be located at a thickness ("Thickness(Med)") 2324 that can be greater than the thicknesses ("Thickness(Lat)") 2326 at which lateral portions 2332 are located. In another embodiment surface 2322 associated with medial portion 2334 can be located at a thickness ("Thickness(Med)") 2324 that can be less than the thicknesses ("Thickness(Lat)") 2326 at which lateral portions 2332 are located.

In a specific embodiment, one or more shapes of surfaces associated with medial portion 2334 and lateral portions 2332 can be configured to modify a part of a sinusoidal flux waveform. In one embodiment, the part of the sinusoidal flux waveform can be in a range from approximately 20 degrees to approximately 80 degrees of a quadrant of a sinusoidal waveform (e.g., from an amplitude of zero to a positive peak amplitude). In other embodiments, the part can include fewer or more degrees, and can overlap other portions of the sinusoidal flux waveform. Note that the shape of surface 2322, including the shapes of medial portion 2334 and lateral portions 2332, can be configured to coincide (or substantially coincide) with a curved boundary, according to one embodiment. In at least some embodiments, the rate of change of surface 2322 from one or more points on surface 2322 associated with medial portion 2334 to one or more points on surface 2322 associated with at least one of lateral portions 2332 can influence the shaping of the portion of a flux waveform, such as a sinusoidal flux waveform, from approximately 20 degrees to approximately 80 degrees, as an example. In at least some embodiments, the rate of change of surface 2322 can be represented by (and/or coextensive with) an angle of surface 2322, such as the angle ("A") 2325 of FIG. 23D. Referring back to FIG. 23C, magnetic region 2320 can be composed of one or more magnets having curved surfaces. In another embodiment, surface 2322 can be configured to coincide (or substantially coincide) with multiple straight boundaries (e.g., straight or flat boundary portions that reside in a plane tangent to a cone circumscribing a conical magnet). As such, magnetic region 2320 can be composed of one or more magnets having flat surfaces. Or, surface 2322 can include a combination of flat and curved surface portions.

In at least one embodiment, medial portion 2334 can be configured to modify another part of the sinusoidal flux waveform. In one embodiment, another part of the sinusoidal flux waveform can be from approximately 70 degrees to approximately 90 degrees of the quadrant of a sinusoidal waveform. In other embodiments, this part can include fewer or more degrees, and can overlap other portions of the sinusoidal flux waveform. In one instance, medial portion 2334 can be configured to include an intra-magnetic region gap, the modification of which (e.g., in terms of size) can influence the shaping of a flux waveform to approximate, for example, a portion of sine wave from approximately 70 degrees to approximately 90 degrees. In a specific embodiment, different thicknesses(med) 2324 can be established over medial portion 2334 (or part of medial portion 2334) to produce the same effect as the intra-magnetic region gap at or near a surface portion (not shown) of surface 2322 that is configured to generate, for example, a relatively small air gap thickness (e.g., for at least a portion of surface 2322). In at least one embodiment, magnetic region 2320 can include multiple intra-magnetic region gaps of one or more shapes.

In at least one embodiment, any of lateral portions 2332 can be configured to modify yet another part of the sinusoidal flux waveform. In one embodiment, the part of the sinusoidal flux waveform can be from approximately 0 degrees to approximately 30 degrees of the quadrant of a sinusoidal waveform. In other embodiments, this part can include fewer or more degrees, and can overlap other portions of the sinusoidal flux waveform. As an example, consider that one or more of lateral portions 2332 can be configured to include an inter-magnetic region gap (or a portion thereof), the widening of which can influence the shaping of a flux waveform to approximate, for example, a portion of a sine wave from approximately 0 degrees to approximately 30 degrees. In a specific embodiment, thicknesses(lat) 2326 can be negligible or non-existent (e.g., zero thickness) in association with lateral portions 2332 (or part of lateral portions 2332) to produce inter-magnetic region gaps with neighboring magnetic regions (not shown).

In various embodiments, magnetic region 2320 can include one or more permanent magnets formed to produce, for example, at least one magnet pole (e.g., a North pole or a South pole). In at least some embodiments, the polarity of a pole can be represented by a direction of polarization, which can be at any angle to, for example, at least a portion of a surface of magnetic region 2320 (or surface of a conical magnet). For example, a direction of polarization representing a north pole can be depicted as a ray extending at any angle with respect to surface of magnetic region 2320, the direction of the ray pointing away from the surface of magnetic region 2320. As another example, a direction of polarization can represent a south pole. Thus, the direction of polarization can be depicted as a ray intersecting a point on the surface of magnetic region 2320, the direction of the ray pointing into the surface of magnetic region 2320. Magnetic region 2320 can comprise magnet material, such as neodymium iron ("NdFe"), ceramic, Samarium Cobalt ("SmCo"), and/or any other magnet material. In some cases, a flux, such as the peak magnet flux, in a field pole member can also be a function of the angle of a surface of hub 2330 (e.g., with respect to the axis of rotation) at which magnetic region 2320 is mounted, the thickness of magnet material of magnetic region 2320, and/or the energy product of the magnet material to meet a target peak flux level, among other things. In at least one embodiment, magnetic region 2320 can be produced as an internal permanent magnet ("IPM"). As such, magnetic region 2320 can include magnetically permeable material disposed with or on magnets. As used herein, the term "medial" refers, in at least one embodiment, to being situated at or pertaining to the middle of a magnetic region (e.g., nearer the middle of the magnetic region). As used herein, the term "lateral" refers, in at least one embodiment, to being situated at or pertaining to the side of a magnetic region (e.g., at a portion that is farther from the middle of a magnetic region). Note that in various embodiments, one or more lateral portions and one or more medial portions can overlap each other or can be separate from each other. In at least some embodiments, magnetic region 2320 can include any number of lateral portions and/or any number of medial portions.

Further to the example shown in FIG. 23C, magnetic portion 2320 can be mounted on hub 2330. Note that while FIG. 23C shows thickness 2324 and thickness 2326 of surface 2322 being referenced from hub 2330, these thicknesses can be referenced from the axis of rotation or any other point of reference. To illustrate, surface 2322 and portions thereof can be determined with respected to a radial distance ("rd") 2340. As such, a rate of change of surface 2322 can be determined with respect to radial distance 2340, which in this example, is referenced from the centerline (not shown) of hub 2330. Hub 2330 can be of any shape, such as, but not limited to, conical shapes with curved and/or flat surfaces, as well as any other shapes suitable to support internal permanent magnets (such as in FIG. 33B). For instance, hub 2330 is shown to include a flat portion having width 2336. In various embodiments, hub 2330 can include "magnetically permeable" material such as, without limitation, ferromagnetic materials, soft magnetic composites ("SMCs"), steel, laminated metals (e.g., steel), pressed metal, and the like.

Figure 23D:
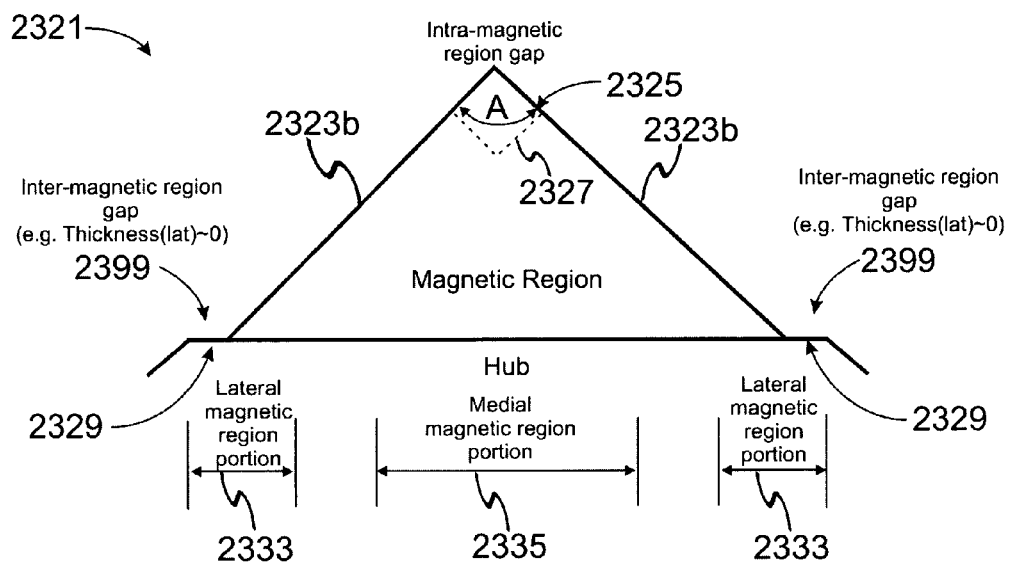
FIG. 23D depicts a cross-sectional view for an example of a specific magnetic region, according to at least one embodiment of the invention.

FIG. 23D depicts a cross-sectional view for an example of a specific magnetic region, according to at least one embodiment of the invention. In this example, magnetic region 2321 includes flat surfaces (or substantially flat surfaces) 2323a and 2323b for modifying portions of a sinusoidal flux waveform in field pole members (not shown). In this example, magnetic region 2321 includes a medial portion ("medial magnetic region portion") 2335 and lateral portions ("lateral magnetic region portions") 2333. In one embodiment, angle ("A") 2325 can be configured to modify the part of the sinusoidal flux waveform from approximately the range of 20 degrees to 80 degrees of the first quadrant of a sinusoidal waveform. Angle 2325 can describe the rate of change of a surface (e.g., surface 2323b) of either a magnet or magnetically permeable material, or both, approximately between at least one point in medial portion 2335 to at least one point in one of lateral portions 2333. Optionally, the surface portions of flat surfaces 2323a and 2323b for medial portion 2335 can be configured to modify another part of the sinusoidal flux waveform by, for example, implementing an intra-magnetic region gap 2327, which can be composed of flat, curved or any other type of surface portion and/or shape.

In one embodiment, flat surfaces 2323a and 2323b can belong to two or more separate magnets. In a specific embodiment, the surface portions of flat surfaces 2323a and 2323b for lateral portions 2333 can be configured to modify yet another part of the sinusoidal flux waveform by, for example, implementing a reduced (e.g., a negligible) thickness or a zero thickness ("Thickness(lat)") at parts 2329 of lateral portions 2333, thereby providing for inter-magnetic region gaps. Portions 2399 of an inter-magnetic region gap at parts 2329 can facilitate formation of an inter-magnetic region gap with a neighboring magnetic region (not shown).

Figure 23E:
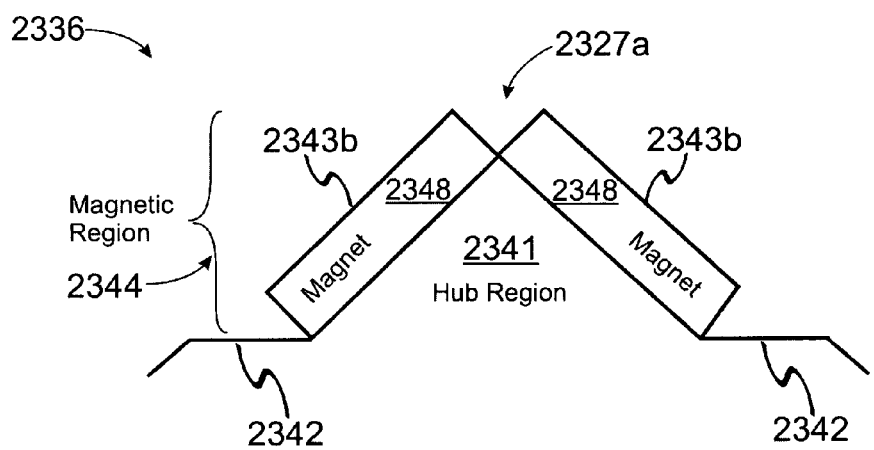
FIG. 23E depicts a cross-sectional view of an example of a specific implementation of a magnetic region, according to at least one embodiment of the invention.

FIG. 23E depicts a cross-sectional view 2336 of an example of a specific implementation of a magnetic region, according to at least one embodiment of the invention. In this example, a magnetic region 2344 includes magnets 2348 having, for example, flat surfaces 2343a and 2343b, both of which can be configured to confront a pole face (not shown). An intra-magnetic region 2327a can be disposed between the two magnets 2348. Magnets 2348 can be mounted on a hub region 2341, which is a portion of hub 2342 that can extend into magnetic region 2344. In some embodiments, hub region 2341 can be composed of material or a structure other than that associated with hub 2342. In at least some embodiments, a magnetically permeable layer (not shown) can be disposed on or relating to surfaces 2343a and 2343b.

Figure 23F:
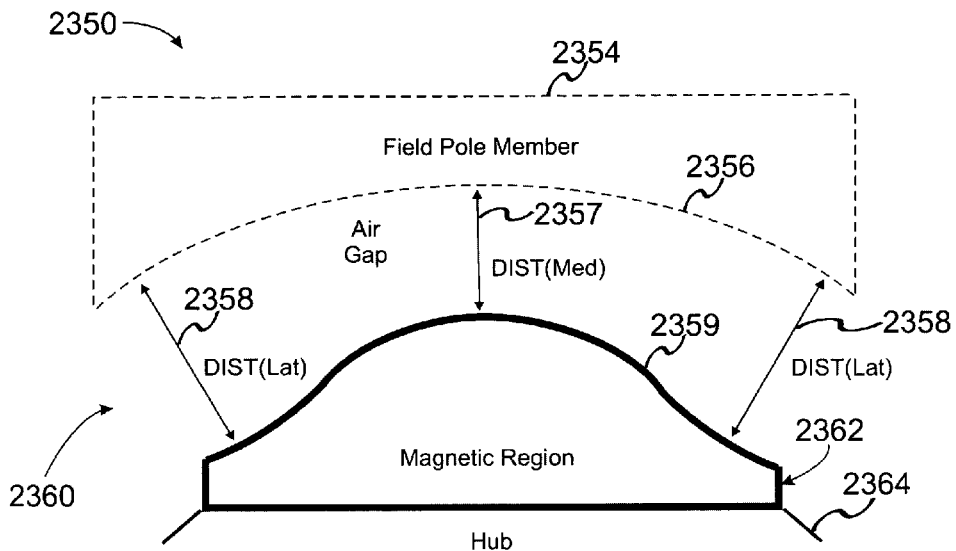
FIG. 23F depicts a cross-sectional view of an example of a magnetic region, according to at least one embodiment of the invention.

FIG. 23F depicts a cross-sectional view 2350 of an example of a magnetic region, according to at least one embodiment of the invention. In this example, a field pole member 2354 includes a field pole face 2356 having, for example, a curved cross-section configured to confront a conical magnet. Magnetic region 2362 can be mounted on hub 2364, and can include a surface 2359 for modifying portions of a sinusoidal flux waveform. As shown, the distances ("DIST(Lat)") 2358 from field pole face 2356 to surface 2359 can be greater than the distance ("DIST(Med)") 2357. As distances 2358 from field pole face 2356 to surface 2359 can be greater than the distance 2357, the thickness of air gap 2360 can generally be greater at the lateral portions of magnetic region 2362 than the medial portion. In at least some embodiments, magnetic region 2362 can include one or more magnets, whereby surface 2359 can include one or more surfaces of magnetic material associated with one or more magnets. In at least some embodiments, surface 2359 (or one or more portions thereof) of magnetic region 2362 (e.g., at a lateral portion thereof) can be located at a subset of one or more distances, including distance 2358, from a surface of field pole face 2356. Similarly, surface 2359 (or one or more portions thereof) of magnetic region 2362 (e.g., at a medial portion thereof) can be located at another subset of one or more distances, including distance 2357, from field pole face 2356. Note that distances 2357 and 2358 can each be coincident with a radial line (not shown) that extends from either a centerline of hub 2364 or an axis of rotation.

Figure 23G:
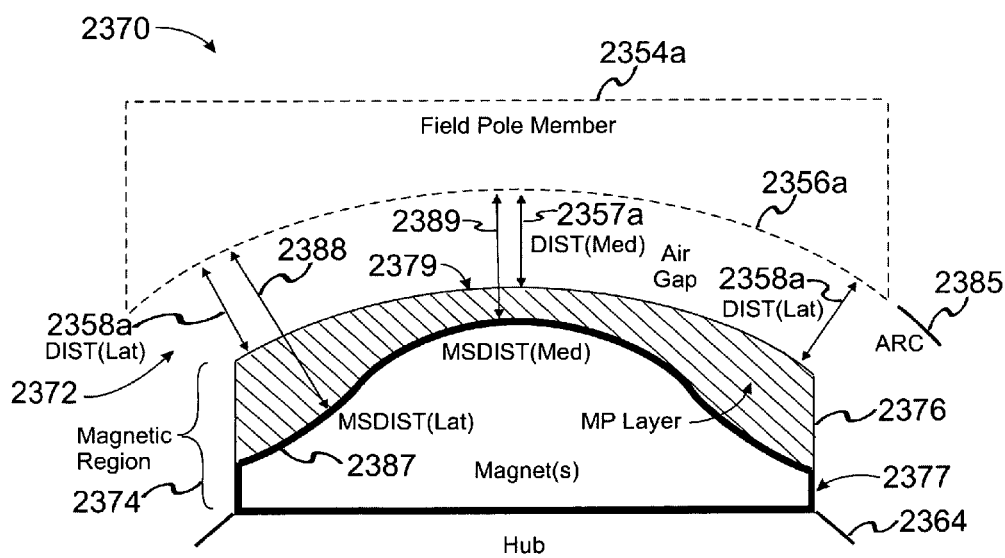
FIG. 23G depicts a cross-sectional view of another example of a magnetic region, according to at least one embodiment of the invention.
Figure 26A:
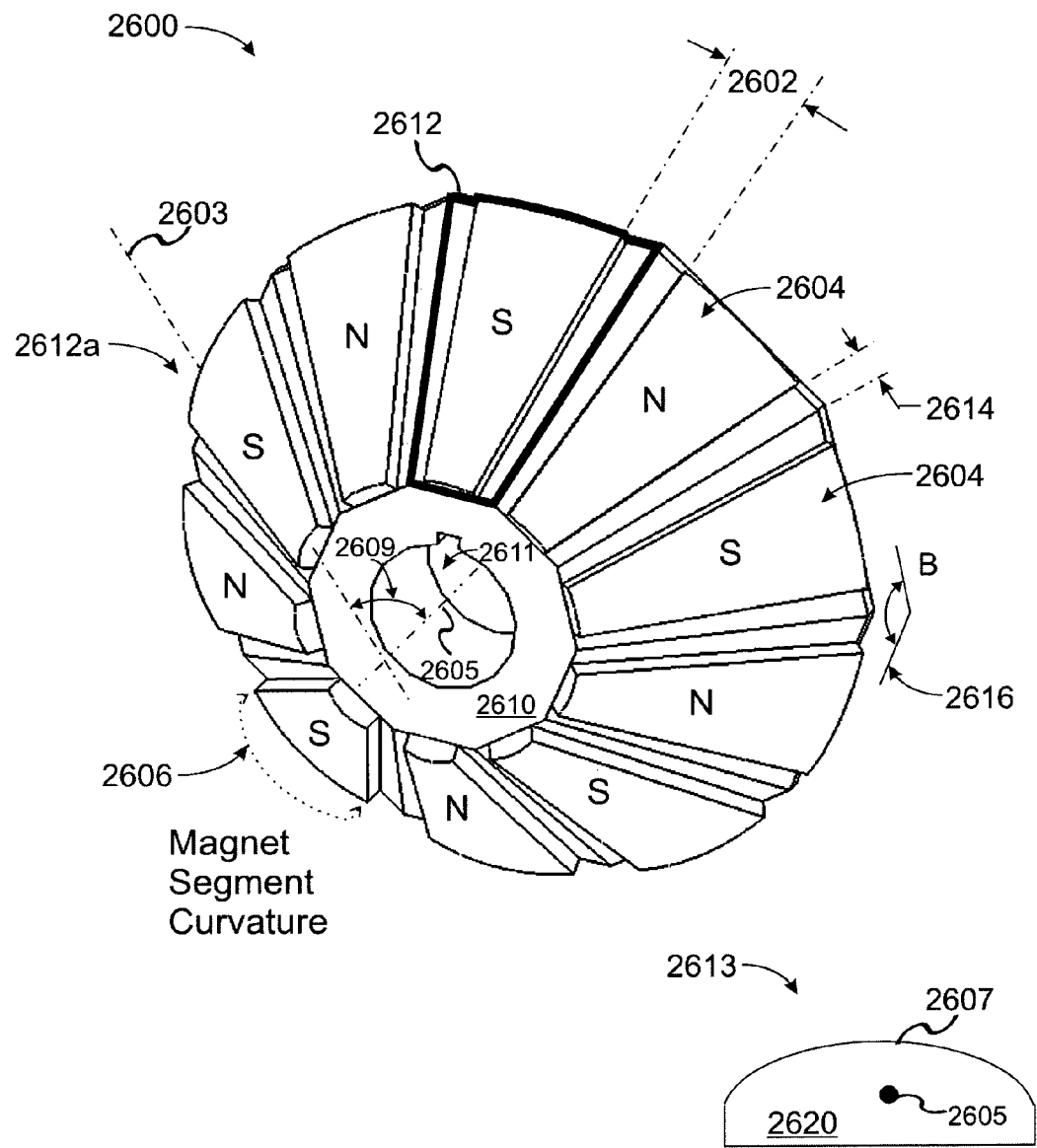
FIG. 26A depicts a conical magnet structure in accordance with one embodiment of the invention.
Figure 26B:
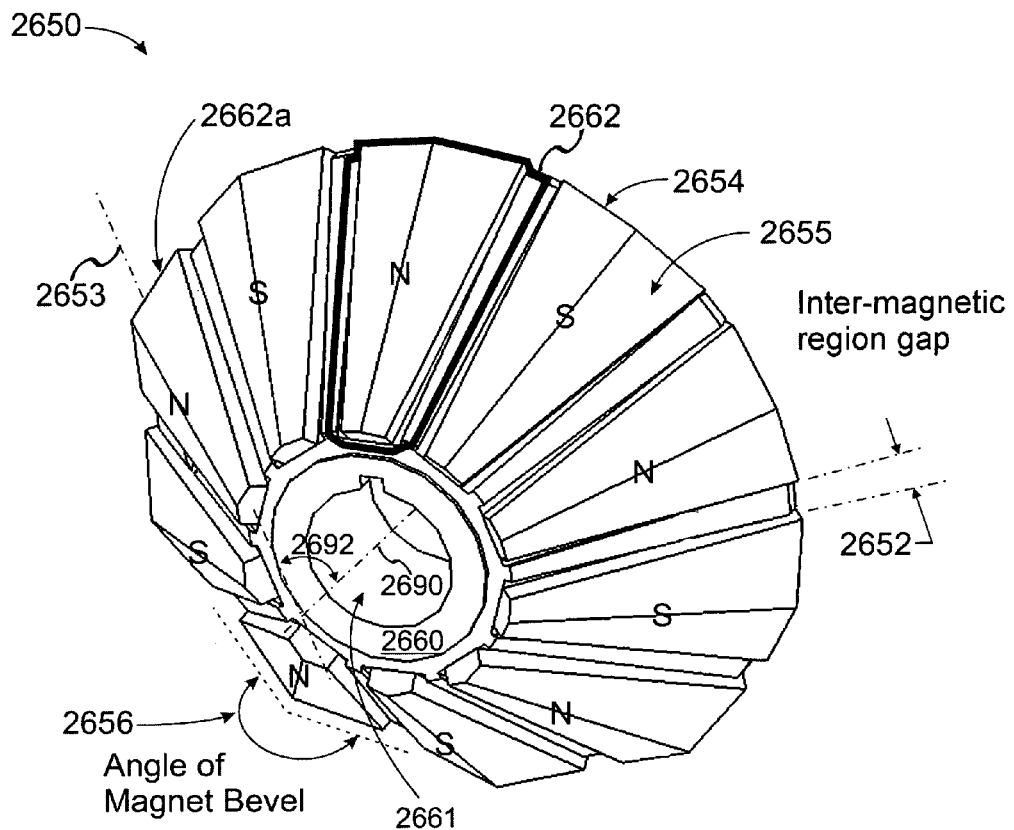
FIG. 26B depicts a conical magnet structure in accordance with yet another embodiment of the invention.
Figure 26B:
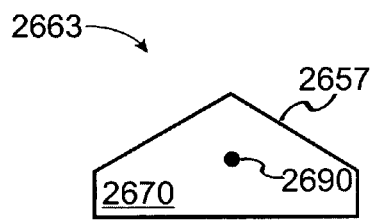

FIG. 23G depicts a cross-sectional view 2370 of another example of a magnetic region, according to at least one embodiment of the invention. In this example, elements having similar names and/or reference numbers can have (but need not have) similar structures and/or functions described in FIG. 23F. In this case, magnetic region 2374 can be mounted on hub 2364, and can include one or more magnets represented as magnet(s) 2377 on which a magnetically permeable layer ("MP layer") 2376 can be formed thereupon. In at least one embodiment, magnetically permeable layer 2376 can be disposed on one or more magnets ("magnet(s)") 2377 to form a substantially uniform air gap thickness for air gap 2372. As such, surface 2379 (or portions thereof) can be positioned at a substantially constant radial distance (not shown), which, in turn, can establish distances ("DIST(Lat)") 2358a from field pole face 2356a to surface 2379 to be the same (or substantially the same) as distance ("DIST(Med)") 2357a. In at least some embodiments, magnetic region 2374 can include surface 2387 (or portions thereof) of magnetic material that can be associated with one or more magnets ("magnet(s)") 2377. As such, magnet surface distance ("MSDIST(Lat)") 2388 can represent one or more distances from field pole face 2356a to surface 2387 of one or more magnets 2377 (e.g., at a lateral portion thereof), and magnet surface distance ("MSDIST(Med)") distance 2389 can represent one or more distances from field pole face 2356a to surface 2387 of one or more magnets 2377 (e.g., at a medial portion thereof). These examples of magnet surface distances demonstrate that one or more portions of surface 2387 can be irregular while being implemented in a magnetic region that provides uniform air gap 2372, according to at least some embodiments. As used herein, the term "irregular surface" can refer to a non-uniform magnet surface or surfaces of a magnetic region, such as surface 2387, the non-uniform magnet surface being determined by multiple distances between a magnet surface and an arc 2385 at a radial distance from hub centerline (not shown). Examples of hub centerlines are shown in FIGS. 26A and 26B. In some embodiments, arc 2385 can be coextensive with one or more surface portions of a pole face, such as pole face 2356a of field pole member 2354a (e.g., active field pole member 2354a).

Figure 24:
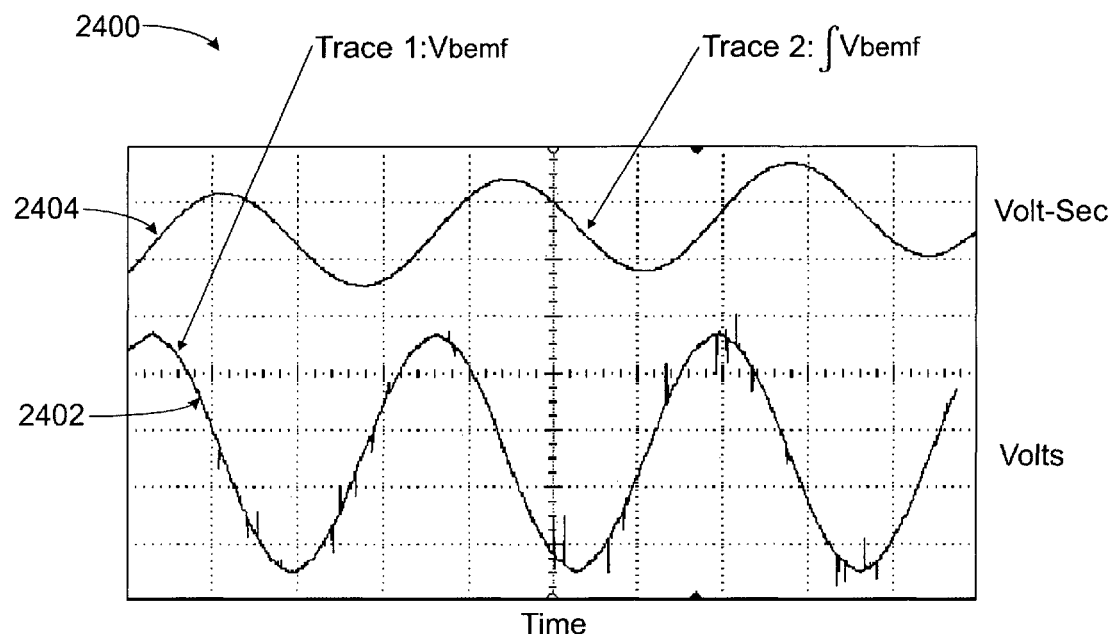
FIG. 24 is a diagram illustrating an example of a sinusoidal flux waveform generated by an arrangement of magnetic regions, according to at least one embodiment of the invention.

FIG. 24 is a diagram 2400 illustrating an example of a sinusoidal flux waveform generated by an arrangement of magnetic regions, according to at least one embodiment of the invention. Diagram 2400 depicts the voltage that results from the back electromagnetic force ("Vbemf"), which can be induced, for example, in a coil about a field pole member (not shown) by a magnet flux waveform created by either a hub with magnet regions or field pole faces rotating relative to the other. For purposes of illustration, consider that Faraday's Law provides that the amplitude of the Vbemf is given by (or is related to) the following relationship: $-d(N\Phi)/dt$, where "N" is the number of turns of a coil and "$\Phi$" is the magnetic flux. Integration of the Vbemf waveform can determine the shape of the flux waveform (e.g., the magnet flux waveform). In the example shown in FIG. 24, an arrangement of magnetic regions in a conical magnet structure can produce Vbemf ("trace 1") 2402 and magnet flux waveform ("trace 2") 2404, both of which are approximate sinusoids.

Figure 25:
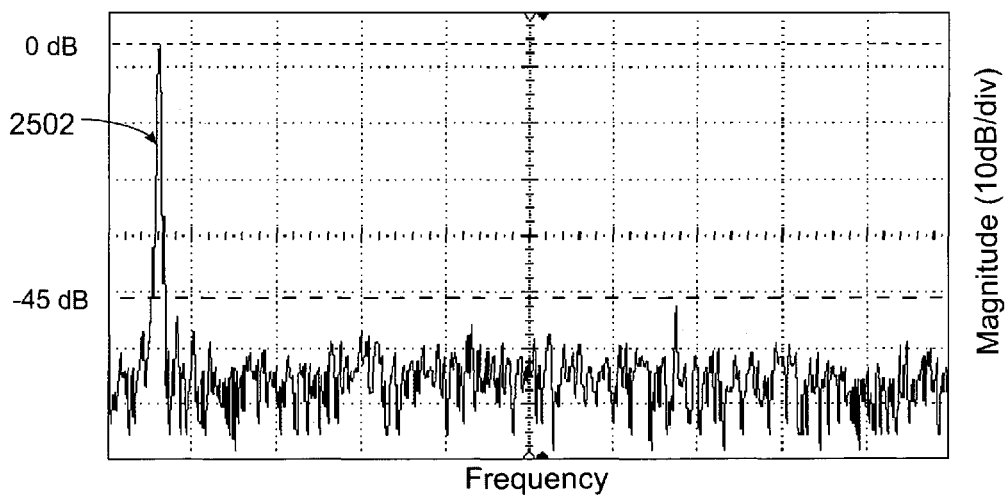
FIG. 25 depicts an example of spectrum diagram showing a Vbemf waveform, according to one embodiment of the invention.

FIG. 25 depicts an example of spectrum diagram 2500 showing a Vbemf waveform, according to one embodiment of the invention. As shown in this example, an arrangement of magnetic regions can maintain the harmonics below, for example, −45 dB. The fundamental frequency is shown in this example to be at or near spectral waveform portion 2502. Note that the proportions, amplitudes, frequencies and other depicted portions of the waveforms are provided for purposes of discussion and are not intended to be limiting.

FIG. 26A depicts a conical magnet structure in accordance with one embodiment of the invention. Conical magnet 2600 includes an arrangement of magnetic regions 2612 mounted on a hub 2610, at least one of magnetic regions 2612 including magnetic material 2604 for forming magnet poles. In at least on embodiment, hub 2610 can include a hub hole 2611 through which a shaft (not shown) can pass to mount conical magnet 2600 thereupon. Hub hole 2611 can be configured to align centerline 2605 of hub 2610 with an axis of rotation (not shown) when conical magnet 2600 is disposed upon the shaft. At least one of magnetic regions 2612, such as magnetic region 2612a, can be disposed on hub 2610 so that a centerline 2603 of magnetic region 2612a can be at an acute angle 2609 with centerline 2605 of hub 2610 (and/or hub hole 2611). In various embodiments, at least portions of curved surfaces 2606 can be coextensive with at least one acute angle with respect to centerline 2605 of hub 2610.

Further, at least one of magnetic regions 2612 can include a surface 2606 having a curvature (i.e., one or more curved surfaces) that has curved portions for producing sine wave-like flux waveforms. Curved surfaces 2606 facilitate a reduction in the number of magnet segments constituting a magnetic region (e.g., the use of a curved surface can reduce a quantity of multiple magnets to a single magnet, at least in some cases). One or more radii of curvature for one or more portions of surface 2606 can be selected to approximate a sinusoidal waveform shape to ensure a relatively small air gap (i.e., the closest distance of surface 2606 to a field pole face, which is not shown) is at or near the center of magnetic region 2612. In at least some embodiments, the radii of curvature can be described in a plane that is perpendicular to the axis of rotation. In at least one case, the one or more radii of curvature can be varied along the length of magnetic region 2612 (e.g., from the large diameter end of conical magnet 2600 to the small diameter end). In other cases, one or more radii of curvature can be constant along the length. In at least one embodiment, the radii of curvature can be referenced to or reside in one or more planes that are perpendicular (or substantially perpendicular) to a centerline of magnetic region, such as centerline 2603 of magnetic region 2612a (and/or magnetic material 2604). Production of sine wave-like flux waveforms can be affected by the implementation of an inter-magnetic region gap 2602, which can affect the sine flux waveform in approximately the 0 to 30 degree portion. For example, the thickness at a part 2614 of a magnetic region 2612 can be effectively zero to produce inter-magnetic region gap 2602. In a specific instance, hub 2610 can include a surface defined by an angle 2616. As shown, FIG. 26A depicts a cross-section 2613 of an example of magnetic material 2620 for a magnet region 2612 having a curved surface 2607. Also shown in relation to cross-section 2613 is a point that represents a centerline 2605, which can be similar to centerline 2603, of magnetic material 2620 (e.g., a magnet).

FIG. 26B depicts a conical magnet structure in accordance with yet another embodiment of the invention. Conical magnet 2650 includes an arrangement of magnetic regions 2662 mounted on a hub 2660, at least one of magnetic regions 2662 including magnetic material, such as magnet(s) 2654, for forming magnet poles. In at least on embodiment, hub 2660 can include a hub hole 2661 through which a shaft (not shown) can pass to mount conical magnet 2650 thereupon. Hub hole 2661 can be configured to align a centerline 2690 of hub 2660 with an axis of rotation (not shown) when conical magnet 2650 is disposed upon the shaft. At least one of magnetic regions 2662 can be disposed on hub 2660 so that a centerline 2653 of magnetic region 2662a is at an acute angle 2692 with respect to centerline 2690 of hub 2660 (and/or hub hole 2661). In various embodiments, at least portions of surfaces 2655 can be coextensive with at least one acute angle with respect to centerline 2690 of hub 2660.

Further, at least one of magnetic regions 2662 can include a surface 2655 that has at least one beveled surface portion for producing sine wave-like flux waveforms. Beveled surfaces 2655 can be coextensive with, for example, an angle, such as angle 2656. As shown, FIG. 26B depicts a cross-section 2663 of an example of magnetic material 2670 for a magnet region 2662, the magnetic material 2670 having a beveled surface 2657. Inter-magnetic region gaps 2652 are also shown. According to various embodiments, magnetic regions 2662 can include one or more magnets. Also shown in relation to cross-section 2663 is a point that represents centerline 2690, which can be similar to centerline 2653, for magnetic material 2670 (e.g., a magnet).

Figure 27A:
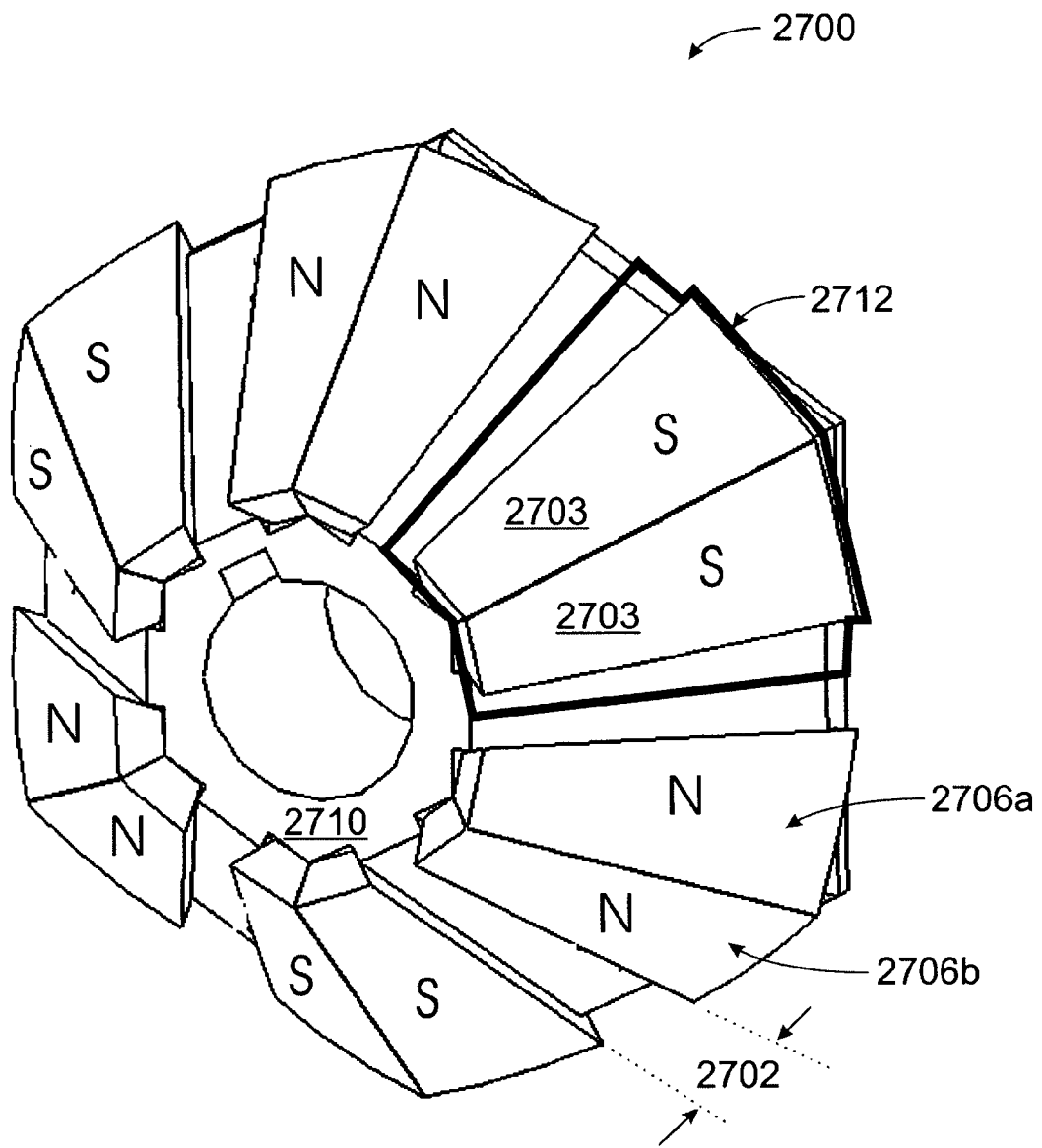
FIGS. 27A to 27C depict another conical magnet structure in accordance with another embodiment of the invention.
Figure 27B:
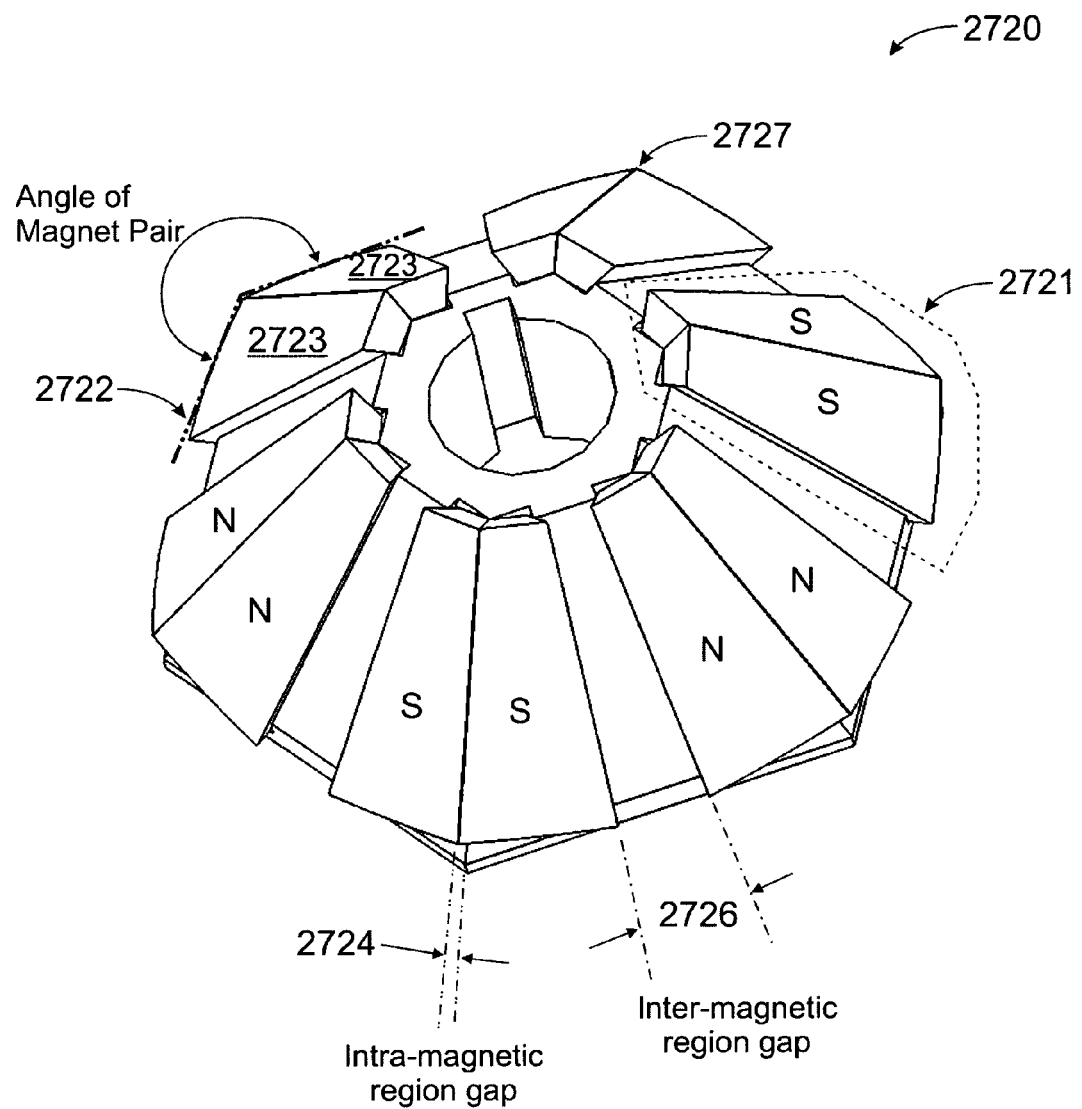
Figure 27C:
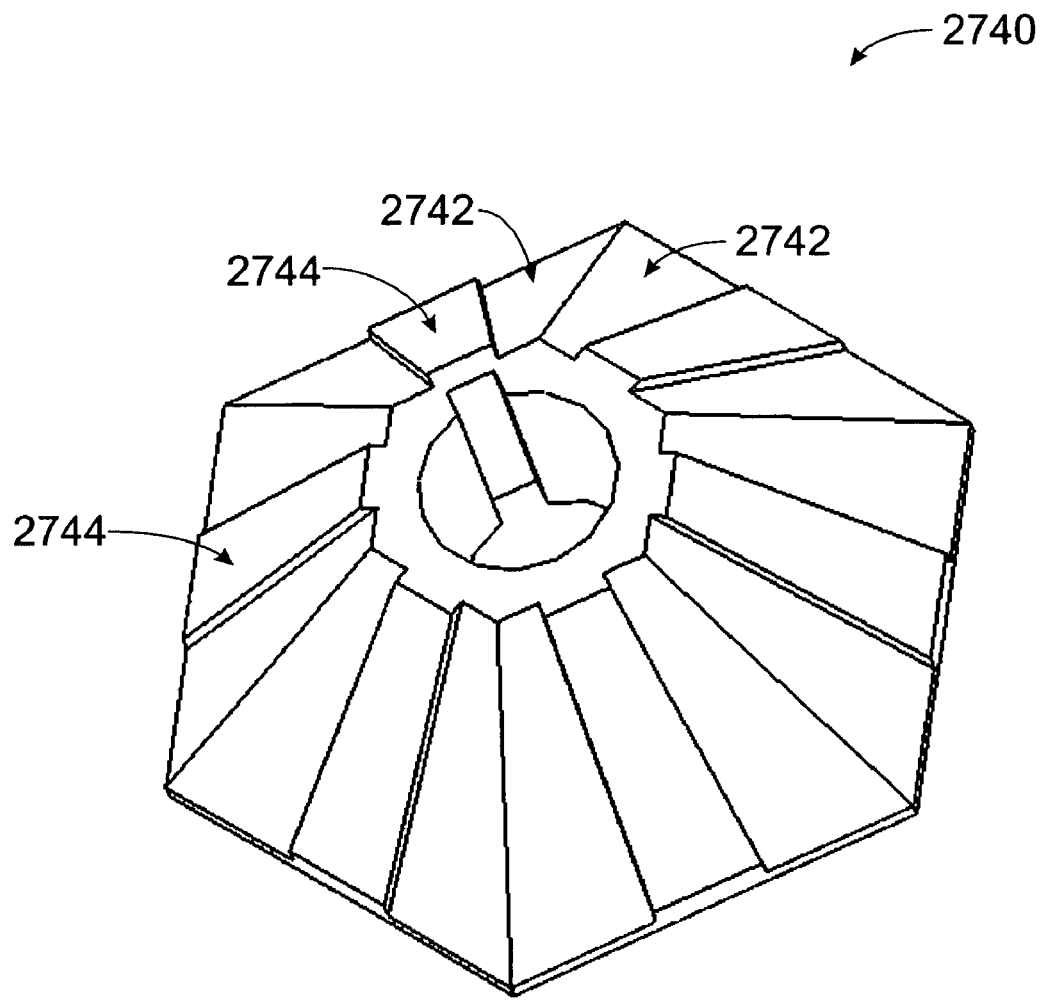

FIGS. 27A to 27C depict another conical magnet structure in accordance with another embodiment of the invention. Conical magnet 2700 includes an arrangement of magnetic regions 2712 mounted on a hub 2710, at least one of magnetic regions 2712 including magnets 2703. As shown in this example, six magnetic regions 2712 can give rise to a six pole conical magnet structure 2700. Further to this example, there are two magnets 2703 within magnetic region 2712. Magnets 2703 include magnetic material for forming magnet poles. Further, magnetic regions 2712 can include surfaces 2706a and 2706b that can have relatively flat surface portions, and are configured to produce inter-magnetic region gaps 2702. In one embodiment, magnets 2703 can have flat-surfaced magnet having a trapezoid shape (e.g., a trapezoidal cross-section). In at least one case, flat magnets 2703 can consume fewer resources to be produced than, for example, magnets having curvature. In other embodiments, any number of magnets 2703 or other magnets can be used.

FIG. 27B depicts configurable structural attributes in accordance with at least one embodiment of the invention. A first configurable structural attribute is an angle 2722 in associations with at least two magnets 2723. In at least one case, angle 2722 can be selected to urge the surfaces of magnets 2723 and/or the medial portion 2727 of the magnet pole nearer to a point or area that is physically closer to a field pole face (e.g., as the hub rotates). As such, angle 2722 can determine how closely a portion of the shape of the flux waveform approximates a sine wave (e.g., from 20 to 80 degree range). In some embodiments, the rate of change of a surface portion associated with a medial portion to a surface portion associated with at least one of lateral portions can determine a portion of a flux waveform, such from approximately 20 degrees to 80 degrees. As such, the rate of change between the surface portions can be considered a configurable structural attribute. A second configurable structural attribute can be an intra-magnetic region gap 2724 that optionally can be implemented, such as between at least two magnets 2723, to modify the shape of the flux waveform approximately from 70 to 90 degrees. Note that in the example shown, magnets 2723 are shown to abut each other, thereby excluding an intra-magnetic region gap 2724 in this instance. A third configurable structural attribute can be an inter-magnetic region gap 2726 that optionally can be implemented, for example, between at least two magnet groups 2721 of magnets 2723, at least one group 2721 of magnets 2723 providing for a magnet pole. Modification of the third configurable structural attribute can affect the shape of a flux waveform to approximate a sine wave approximately from 0 to 30 degrees. In one embodiment, the above-described configurable structural attributes can each be optimized to produce a conical magnet structure by implementing a computer-based simulation of, for example, the magnetic flux induced in a field pole member, which can be determined at several points of hub rotation using, for example, a 3D finite or boundary element magnet analysis software program. Also, a configurable structural attribute can be the angle of at least a portion of the surface of one of magnets 2723 to the axis of rotation (not shown) or to a centerline to the hub for conical magnet 2720, as well as the magnetic properties of magnets 2723. There are also several sequences that could be used to perform the design optimization, but one sequence can be as follows without limitation: (1) optimize the angle (e.g., an acute angle) between the centerline of a magnetic region and an axis of rotation to establish a desired level of peak flux (e.g., in a field pole member), (2) optimize a first configurable structural attribute (e.g., determine an angle 2722 of the surface (or a rate in change) for a magnetic region that includes magnets 2723 to produce a desired flux waveform shape (e.g., in the 20 to 80 degree region), (3) optimize the second configurable structural attribute (e.g., determine an intra-magnetic region gap 2724), and (4) optimize the third configurable structural attribute (e.g., determine an inter-magnetic region gap 2726).

FIG. 27C depicts a hub 2740 including support regions 2742 for supporting magnets 2723 (FIG. 27B) in accordance with at least one embodiment of the invention. Further, hub 2740 can optionally include raised sections 2744, or any other element providing for an equivalent functionality and/or structure. Raised section 2744 can be implemented in the inter-magnetic region gaps to provide for physical alignment of magnetic regions and/or the magnetic material thereof. In some embodiments, the height of raised section 2744 relative to support regions 2742 can influence flux leakage between magnetic regions (not shown). As such, the size of an inter-magnetic region gap between the magnetic regions may be adjusted to compensate for the height of raised section 2744.

Figure 28:
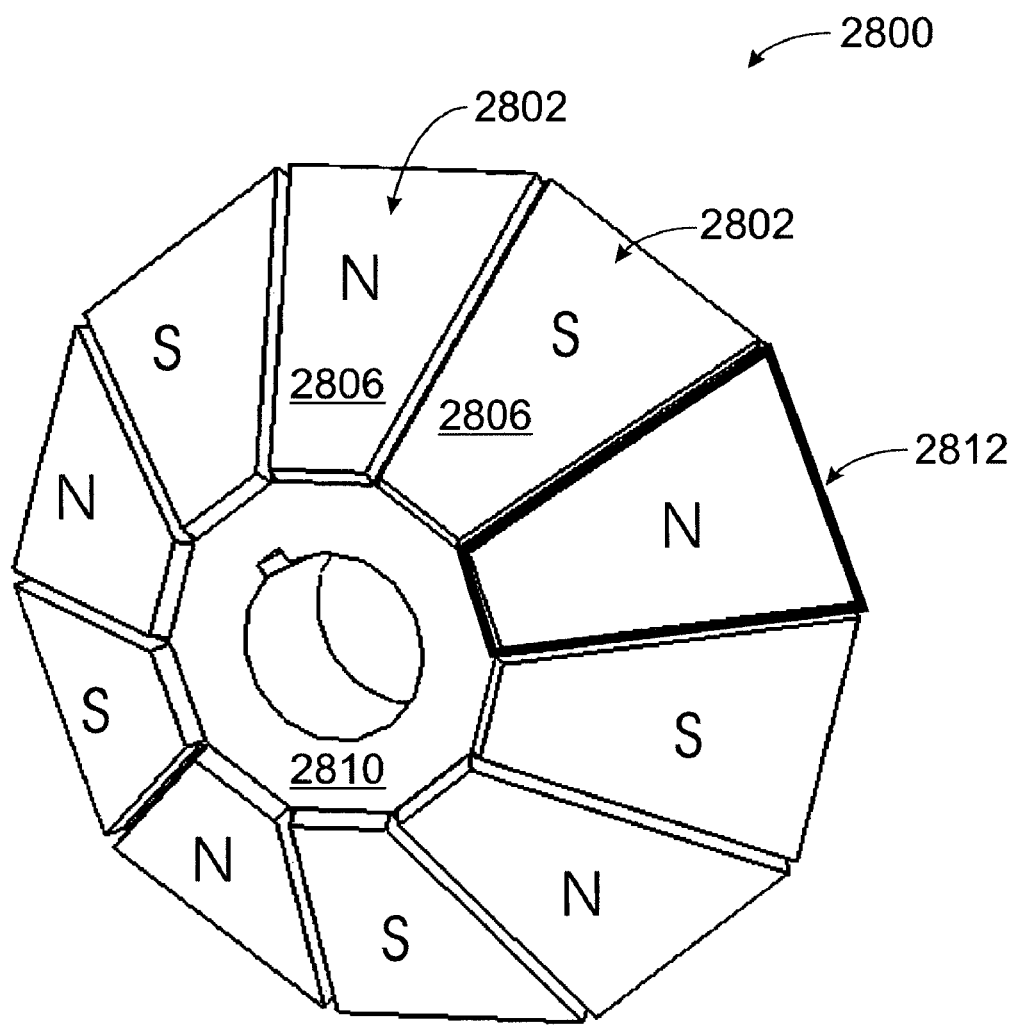
FIG. 28 depicts yet another conical magnet structure in accordance with yet another embodiment of the invention.

FIG. 28 depicts yet another conical magnet structure in accordance with yet another embodiment of the invention. Conical magnet 2800 includes an arrangement of magnetic regions 2812 mounted on a hub 2810, at least one of magnetic regions 2812 including magnetic material in magnets 2802 for forming magnet poles. Magnets 2802 can be described as trapezoid magnets 2802 having a trapezoidal shape that confronts an air gap (not shown). Further, at least one of magnets 2802 includes a surface 2806 that has flat portions. While this arrangement of magnetic regions 2812 excludes both inter-magnetic region gaps and intra-magnetic region gaps, either of which, or both, can be implemented in some embodiments.

Figure 29:
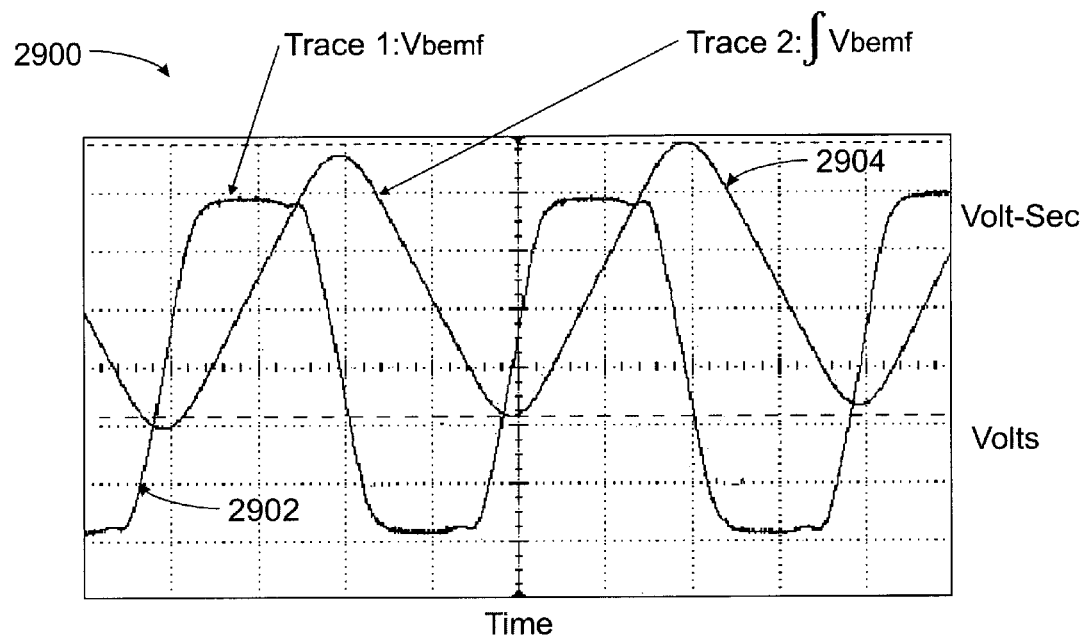
FIG. 29 is a diagram illustrating a flux waveform generated by an arrangement of magnetic regions of FIG. 28, according to at least one embodiment of the invention.

FIG. 29 is a diagram 2900 illustrating a flux waveform generated by an arrangement of magnetic regions 2812 of FIG. 28, according to at least one embodiment of the invention. In the example shown in FIG. 29, an arrangement of magnetic regions in a conical magnet structure 2800 of FIG. 28 can yield Vbemf ("trace 1") 2902 and magnet flux waveform ("trace 2") 2904, both of which are nonlinear. In particular, Vbemf 2902 is shown as a flat-topped or clipped waveform, and flux waveform 2904 is shown be somewhat triangular. This means that both waveforms in this example are composed of a fundamental frequency and several higher order harmonics. Note that if it is desired to modify flux waveform 2904 toward a sinusoidal shape, then any combination of the waveform shaping techniques described herein can be used.

Figure 30:
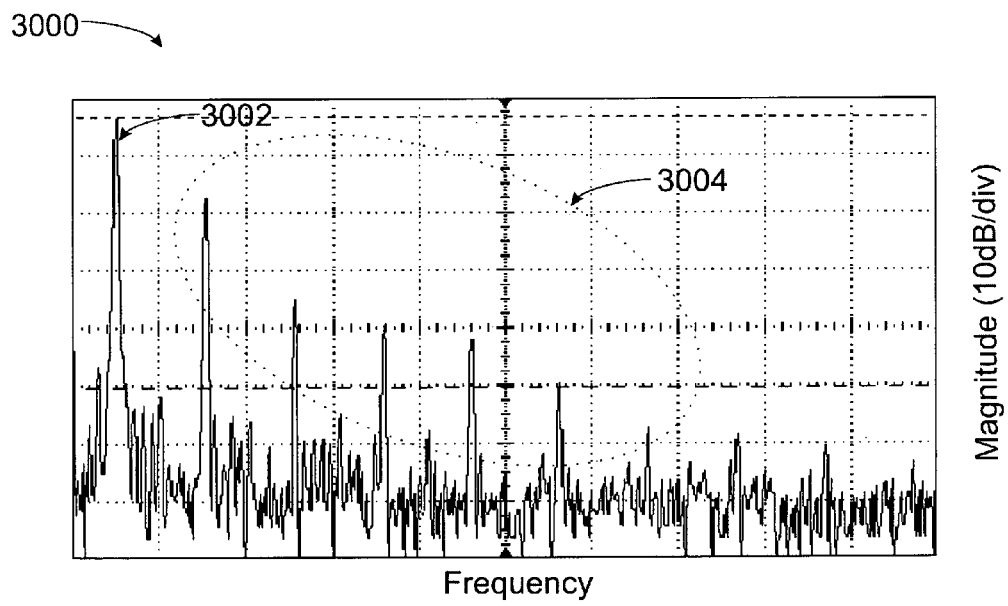
FIG. 30 is an example of a spectrum diagram depicting an example of a Vbemf waveform, according to one embodiment of the invention.

FIG. 30 is spectrum diagram 3000 depicting an example of a Vbemf waveform, according to one embodiment of the invention. As shown, conical magnet structure 2800 of FIG. 28 can produce harmonics 3004 and a fundamental frequency at or near waveform portion 3002. Fourier transform theory generally provides that the integral of Vbemf, which can represent the magnet flux waveform, will have the higher order harmonics, but with amplitudes scaled (e.g., divided) by the order of the harmonic. For the example shown in FIG. 30, the 3rd, 5th, 7th, 9th, and 11th harmonics are shown to be −13 dB, −32 dB, −38 dB, −40 dB, and −47 dB below the fundamental frequency, respectively. When adjusted to reflect the harmonic levels in the integrated waveform that corresponds to the magnetic flux, the respective values for the 3rd, 5th, 7th, 9th and 11th harmonics are −23 dB, −46 dB, −56 dB, −59 dB, −68 dB. These amplitude levels may be irrelevant in applications where power loss is not critical. But note that core losses in field pole members can increase with frequency by, for example, an amount equivalent to the frequency (as the base of an exponential expression) raised to a power of approximately 1.5 (as the exponent). So when the core losses are summed together over the adjusted harmonics in the magnetic flux, the sum of the core losses can be, for example, 1.66 times the core losses that might be associated with a pure sine wave at the fundamental frequency. Thus, configurable structural attributes can be used and/or modified to produce an approximate sinusoidal flux waveform that can reduce or exclude higher-order harmonics 3004, thereby reducing the core losses in the field pole members by, for example, about 40% compared to the case shown in this example.

Figure 31A:
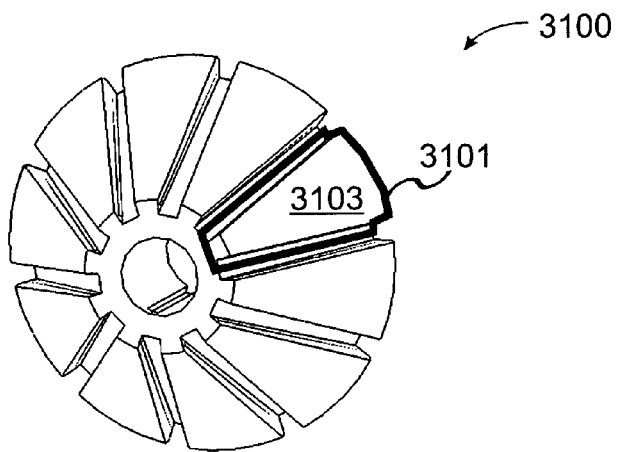
FIGS. 31A to 31C depict an example of an internal permanent magnet ("IPM")-based implementation of a conical magnet structure in accordance with at least one embodiment of the invention.
Figure 31B:
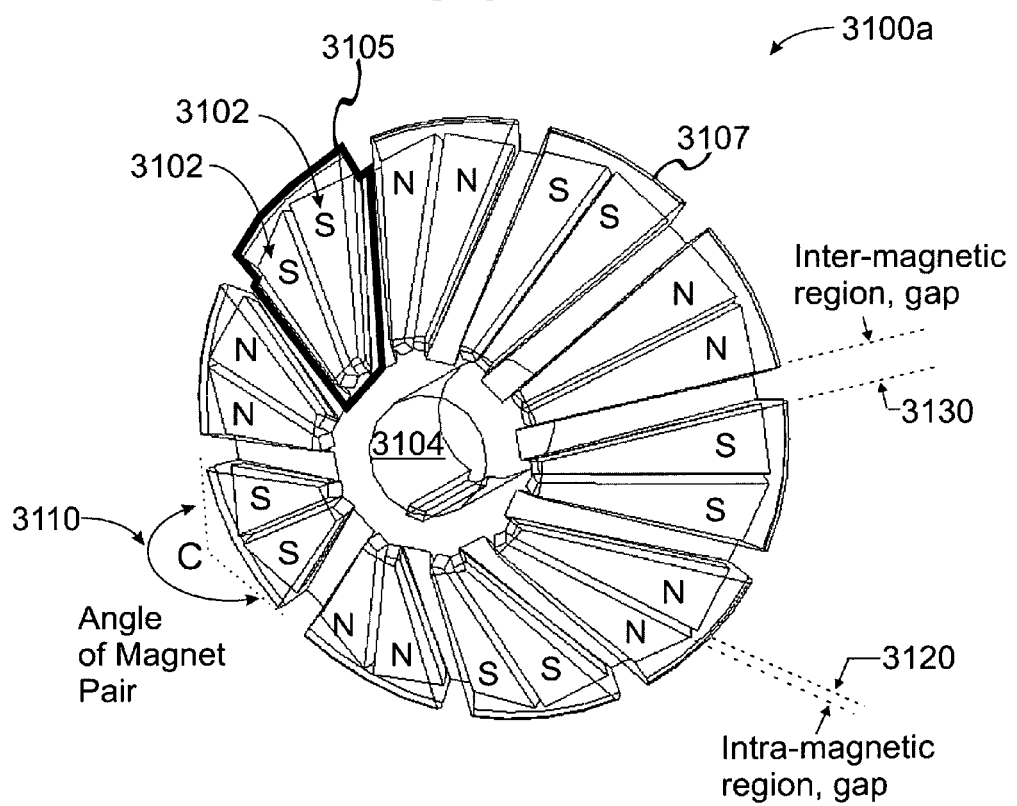
Figure 31C:
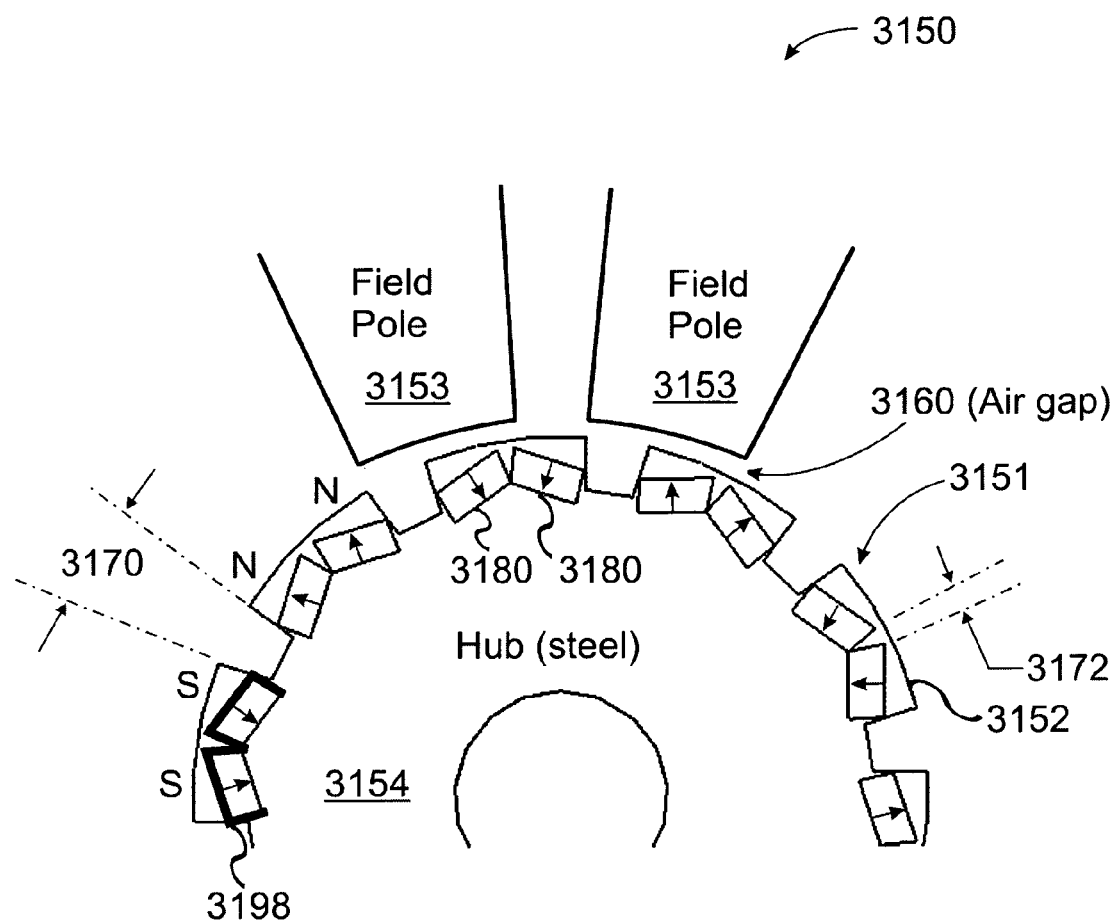

FIGS. 31A to 31C depict an example of an internal permanent magnet ("IPM")-based implementation of a conical magnet structure in accordance with at least one embodiment of the invention. FIG. 31A shows a conical magnet structure 3100 that includes magnetic regions 3101. In this example, at least one of magnetic regions 3101 can include magnetically permeable material 3103, such as steel (e.g., powdered metal) or soft composite material ("SMC"), layered upon one or more magnets or magnet segments, as shown in FIG. 31B. Conical magnet structure 3100a can produce a sinusoidal flux waveform using at least some of the above-described techniques.

FIG. 31B depicts one or more magnets embedded (entirely or partially) and/or mounted in magnetically permeable material. For example, magnetic region 3105 includes magnets 3102 that are embedded in magnetically permeable material, such as magnetically permeable material 3107, which is depicted as being transparent for purposes of illustration.

Magnets 3102, which are shown to form a South pole, can be mounted on a hub 3104. Magnets 3102 can be oriented on hub 3104 with respect to an angle 3110 (angle "C"), which can set the general shape for a portion of a flux waveform. One or more inter-magnetic region gaps 3130 and one or more intra-magnetic region gaps 3120 can be implemented to modify the 0 to 30 degree and 70 to 90 degree portions, respectively, of a flux waveform. In at least some embodiments, angle 3110 (i.e., the rate of change in the surface curvature between medial and lateral portions) can control the degree of shaping of a flux waveform (e.g., in the 20 to 80 degree portion of a sine wave.

FIG. 31C depicts one or more magnets embedded in magnetically permeable material. As shown in cross-sectional diagram 3150, magnets 3180 are shown embedded in magnetically permeable material 3152 to form, for example, magnetic regions 3151, which can implement an inter-magnetic region gap 3170 and intra-magnetic region gap 3172. Magnets 3180 are mounted on hub 3154. As shown, magnetically permeable material 3152 is disposed on magnets 3180 to form substantially uniform air gaps 3160 between magnetic regions 3151 and field poles 3153 (e.g., pole faces), with surface 3198 of the magnetic material (e.g., surfaces of magnets 3180) being an irregular surface, according to at least some embodiments. In at least one embodiment, substantially uniform air gaps 3160 can produce relatively higher output torque than might otherwise be the case. Note that inter-magnetic region gap 3170 can facilitate a reduction of leakage between magnetic regions 3151, as well as provide a structure configurable to shape a flux waveform.

Figure 32A:
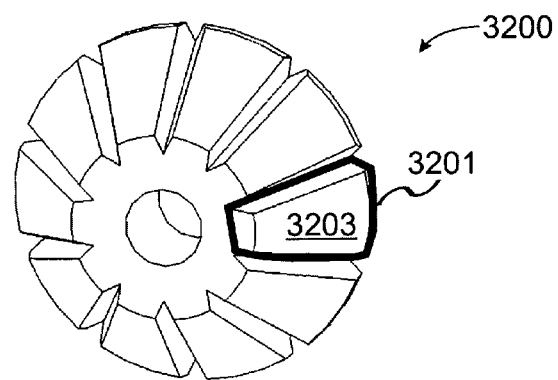
FIGS. 32A to 32C depict another example of an internal permanent magnet ("IPM")-based implementation of a conical magnet structure in accordance with at least one embodiment of the invention.
Figure 32B:
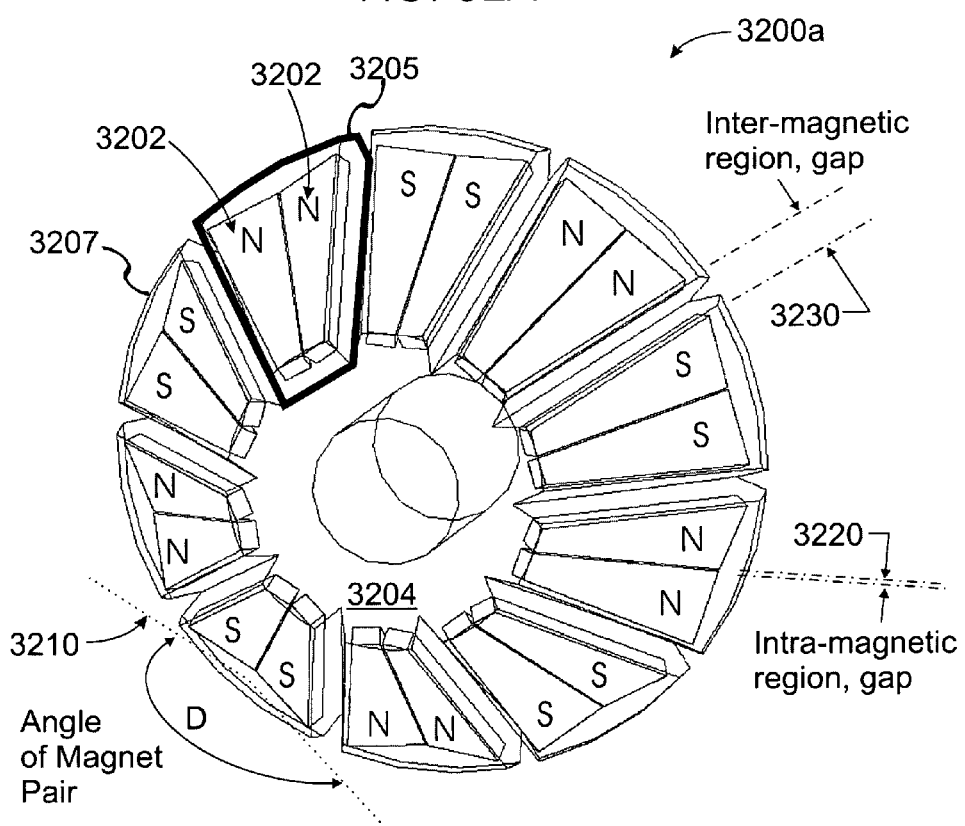
Figure 32C:
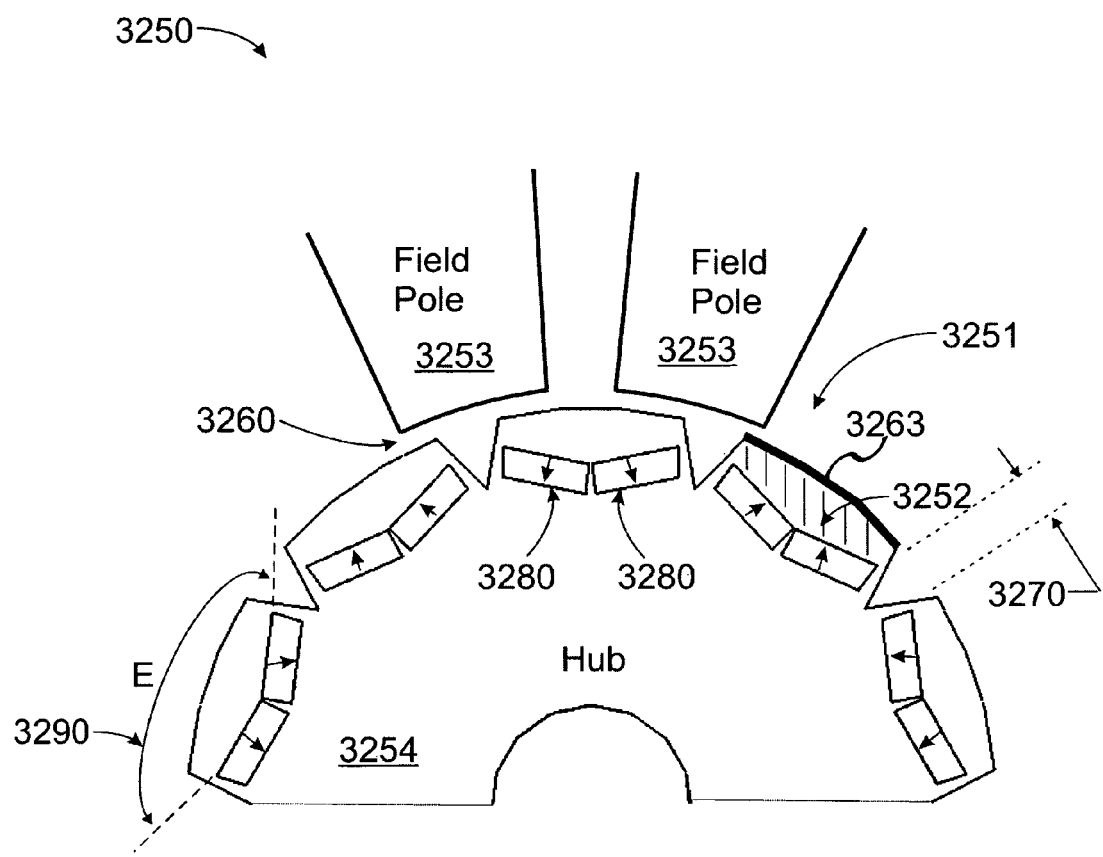

FIGS. 32A to 32C depict another example of an internal permanent magnet ("IPM")-based implementation of a conical magnet structure in accordance with at least one embodiment of the invention. FIG. 32A shows a conical magnet structure 3200 that includes magnetic regions 3201. In this example, at least one of magnetic regions 3201 can include magnetically permeable material 3203 layered upon one or more magnets or magnet segments, as shown in FIG. 32B. Conical magnet structure 3200 can produce a flux waveform using at least some of the above-described techniques to approximate a sine wave.

FIG. 32B depicts conical magnet structure 3200a including one or more magnets, such as magnets 3202, that are embedded in magnetically permeable material, such as magnetically permeable material 3207, which is depicted as being transparent for purposes of illustration. Magnets 3202, which are shown to form a North pole, can be mounted on a hub 3204. Magnets 3202 can be oriented on hub 3204 with respect to an angle ("D") 3210, which can set the shape for a portion of a flux waveform. In some embodiments, one or more inter-magnetic region gaps 3230 and one or more intra-magnetic region gaps 3220 can modify the 0 to 30 degree and 70 to 90 degree portions, respectively, of a flux waveform. In at least some embodiments, angle 3210 (angle "D") is an angle that configures the lateral portions to be at a greater radial distance from an axis of rotation (not shown) than the radial distance for a medial portion. In some instances, angle 3210 can be an obtuse angle.

FIG. 32C depicts one or more magnets that are embedded in magnetically permeable material. As shown in cross-sectional diagram 3250, magnets 3280 are shown to be embedded in magnetically permeable material to form, for example, magnetic regions 3251, which can implement a relatively larger quantity of magnetically permeable material 3252 than in the configuration shown in FIG. 31C (e.g., more magnetically permeable material 3252 can be disposed between magnets 3280 and field poles 3253 than magnetically permeable material between magnets 3180 and field poles 3153 of FIGS. 31C). Referring back to FIG. 32C, magnets 3280 are shown to be mounted on hub 3254. As shown, magnetically permeable material 3252 is disposed on magnets 3280 to form substantially uniform air gaps 3260 between magnetic regions 3251 and field poles 3253 (e.g., pole faces). In at least some embodiments, angle ("E") 3290 can be an obtuse angle that is substantially coextensive with surfaces of magnets 3280, which, in turn, facilitates the use of a relatively larger quantity of magnetically permeable material 3252. This enables relatively more flux to pass through the surface 3263 (e.g., the surface area) of magnetic region 3251. In particular embodiments, an inter-magnetic region gap 3270 and an intra-magnetic region gap (not shown) can modify the 70 to 90 degree and 0 to 30 degree portions, respectively, of a flux waveform, as described above.

Figure 33A:
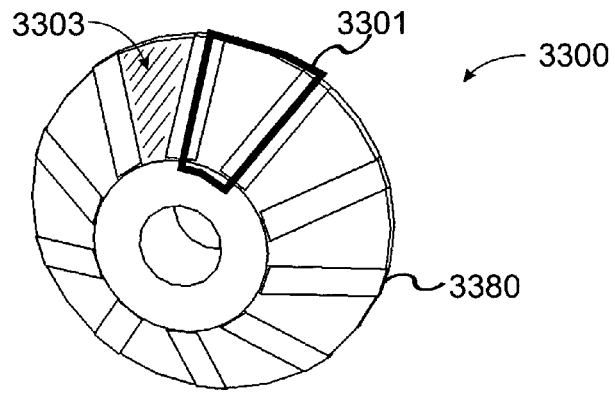
FIGS. 33A to 33C depict yet another example of an internal permanent magnet ("IPM")-based implementation of a conical magnet structure in accordance with at least one embodiment of the invention.
Figure 33B:
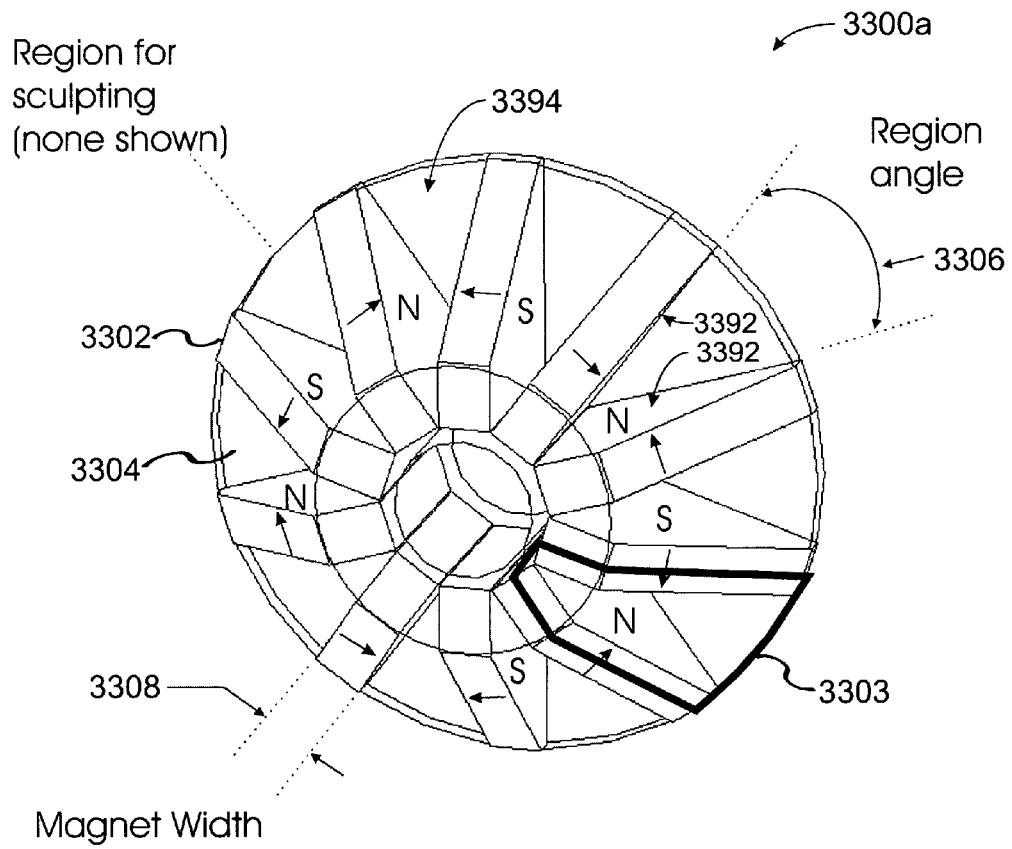
Figure 33C:
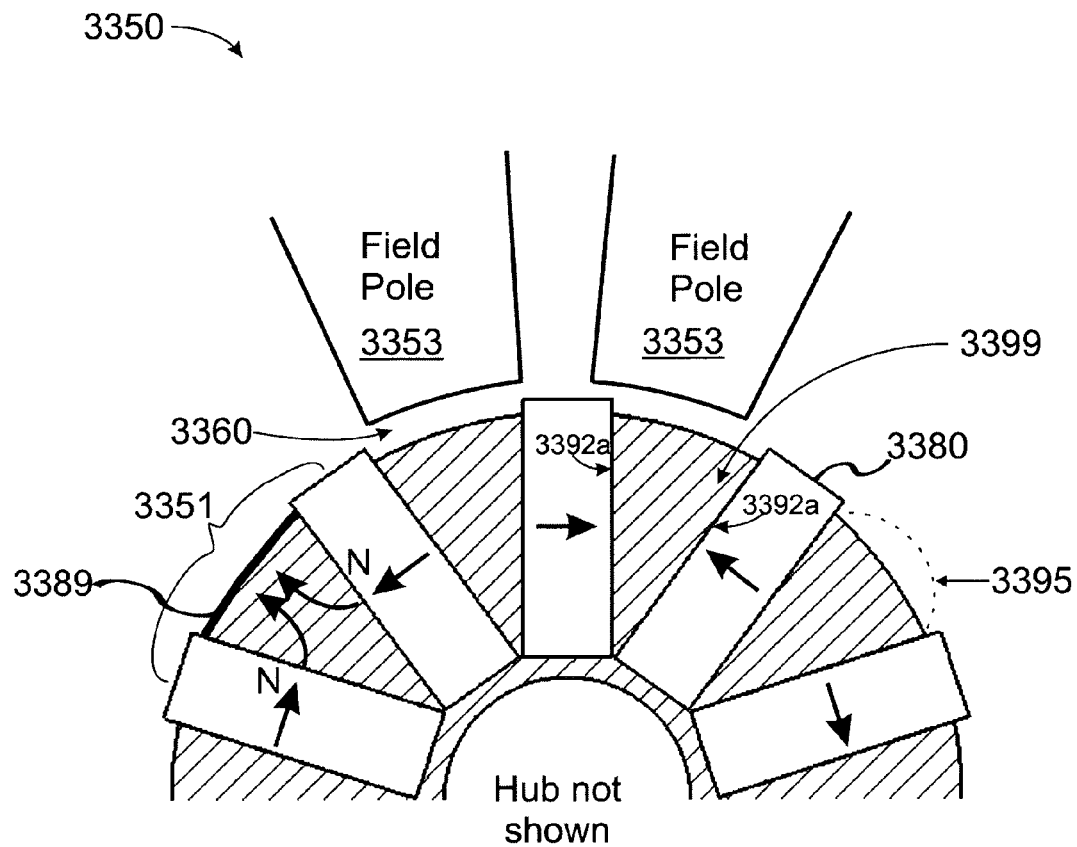

FIGS. 33A to 33C depict yet another example of an internal permanent magnet ("IPM")-based implementation of a conical magnet structure in accordance with at least one embodiment of the invention. FIG. 33A shows a conical magnet structure 3300 that includes magnetic regions 3301. In this example, at least one of magnetic regions 3301 can include magnetically permeable material 3303 disposed between magnets or magnet segments 3380, as shown in FIG. 33C. In some embodiments, conical magnet structure 3300 can produce a flux waveform using at least some of the above-described techniques to approximate a sine wave.

FIG. 33B depicts a conical magnet 3300a including magnets, such as magnets 3302, that can be arranged to receive or be located adjacent magnetically permeable material at regions 3394. Magnets 3302 can be mounted on a hub 3304. Magnets 3302 can be arranged on hub 3304 with polarities being oriented, for example, normal to surface areas 3392. As such, the directions of polarization can be perpendicular (or substantially perpendicular), or at acute angles, to surface areas 3392. In some instances, the number of magnet poles associated with hub 3304 and widths 3308 of magnets 3302 can determine region angle 3306. Width 3308 of the magnet segment 3302 can be adjusted (including optional beveling of the edges) to reduce, for example, the relatively high amplitudes of a flux waveform. In some instances, region 3394 can be described as an intra-magnetic gap located between two surfaces (e.g., surfaces 3392) of magnets 3302 that, in the case of a North pole, provide flux to magnetically permeable material in region 3394, thereby establishing a magnetic region, such as magnetic region 3301.

FIG. 33C depicts one or more magnets that are arranged adjacent to magnetically permeable material, according to one embodiment. As shown in cross-sectional diagram 3350, magnets 3380 are shown to be arranged adjacent to magnetically permeable material 3399 to form, for example, magnetic regions 3351, which can implement a relatively larger amount of magnetically permeable material 3399 than in the configuration shown in FIG. 31C. Referring back to FIG. 33C, magnets 3380 are mounted on a hub. Magnetically permeable material 3399 can be disposed adjacent to magnets 3380 to form air gaps 3360 that can be optionally uniform (or substantially uniform) thicknesses between magnetic regions 3351 and field poles 3353 (e.g., pole faces). In at least some embodiments, surface areas 3392a provide for relatively higher flux for magnetic region 3351 via magnetically permeable material 3399 than otherwise might be the case. This enables a relatively higher flux amount to pass through the surface 3389 (e.g., the surface area) of magnetic region 3351. In at least one embodiment, magnetic regions 3351 can have a curved surface, such as curved surface 3395, or any other type of surface shape.

Figure 34:
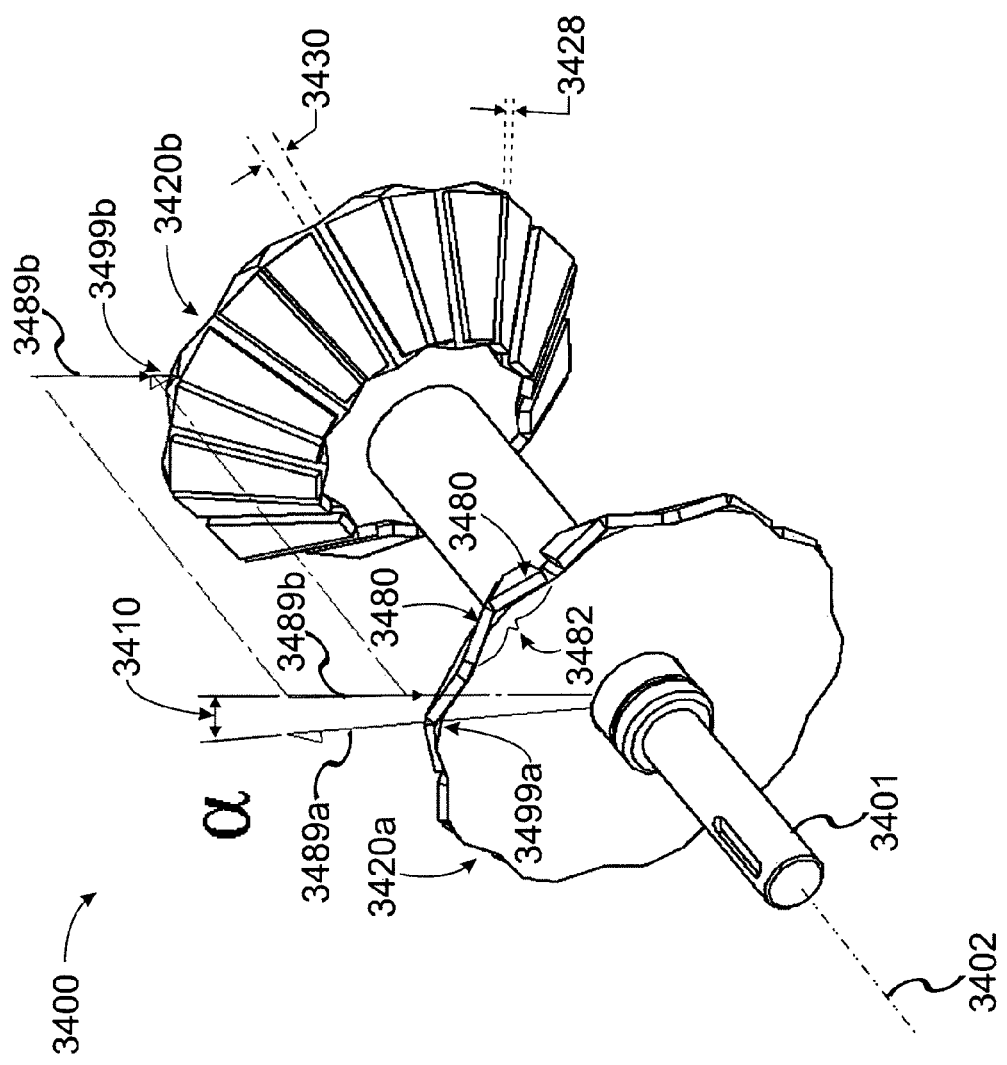
FIG. 34 shows a rotor structure implementing an arrangement of offset conical magnets, according to one or more embodiments of the invention.

FIG. 34 shows a rotor structure implementing an arrangement of offset conical magnets, according to one or more embodiments of the invention. Rotor structure 3400 is shown to include conical magnets 3420a and 3420b disposed on a shaft 3401, which can define an axis of rotation 3402. Conical magnets 3420a and 3420b are shown to include magnet regions 3482, which, in turn, can include magnets 3480. Conical magnets 3420a and 3420b can include intra-magnetic region gaps 3428 and inter-magnetic region gaps 3430. As conical magnets 3420a and 3420b each can contribute to a detent waveform when positioned to interact with field poles (not shown) in the stator. Flux from either conical magnets 3420a and 3420b can contribute to detent waveforms. The detent waveforms produced in association with conical magnets 3420a and 3420b can be substantially similar in shape and amplitude, and, as such, the amplitudes of the detent waveforms for conical magnets 3420a and 3420b can be added together (e.g., through the principles of superposition). The detent waveforms can add together to form a composite detent waveform.

According to at least some embodiments, offsetting conical magnets 3420a and 3420b by an angle (e.g., alpha 3410) can provide for a composite detent waveform that has an amplitude less than if there was no offset. In some examples, alpha 3410 can be determined to offset the detent waveforms to be out of phase (or substantially out of phase), where alpha 3410 can be any number of degrees. In at least some examples, alpha 3410 can be any angle between 0 to 30 degrees (i.e., in the range of −330 to +30 degrees). A composite detent waveform can have a reduced amplitude, with the offset conical magnets 3420a and 3420b causing the detent waveforms to be offset relative to each other. In some cases, offset detent waveforms can cancel (or substantially cancel) each other. By canceling additive effects of the individual detent waveforms, a rotor-stator structure implementing rotor structure 3400 in a motor, for example, can provide for a magnetic circuit (or at least a portion thereof) having waveforms with relatively low detent content. In some cases, lower detent content can provide for enhanced position control of a motor and relatively smoother operation, according to various embodiments.

Angle alpha 3410 can be referenced in relation to conical magnets and/or between any points of reference associated with the conical magnets, and can be expressed in terms of mechanical degrees about shaft 3401. In at least some embodiments, alpha 3410 is an angle between poles between conical magnets 3420a and 3420b, such as an angle between one pole associated with conical magnet 3420a and another pole associated with conical magnet 3420b. For example, a north pole associated with conical magnet 3420a can be positioned on shaft 3401 at an angle 3410 relative to a south pole associated with conical magnet 3420b. In at least some embodiments, alpha 3410 can be referenced relative to a first reference point associated with conical magnet 3420a and a second reference point associated with conical magnet 3420b. As shown in this example, reference points, such as center points 3499a and 3499b of corresponding magnetic regions 3482, can be used to determine an offset from each other by angle alpha 3410. A center, such as either center points 3499a or 3499b, can be an intersection between a centerline (not shown) passing longitudinally through one of magnetic regions 3482 and a radial line (not shown) from shaft 3401 in a plane perpendicular to shaft 3401. A centerline can be located in intra-magnetic region gaps, such as intra-magnetic region gap 3428, according to some embodiments. Or, the centers of opposing conical magnets 3420a and 3420b can be offset from each other by an angle, such as alpha 3410, as measured in mechanical degrees between two planes (not shown), a first plane passing through shaft 3401 and bisecting conical magnet 3420a and a second plane passing through shaft 3401 and bisecting conical magnet 3420b.

Alpha 3410 can be determined as function of the number of detent cycles per revolution of shaft 3401, according to at least some embodiments. For example, alpha 3410 can be determined by dividing 180 by the number of detent cycles ("Ndc") in one mechanical revolution of rotor 3400. A number of detent cycles, Ndc, can be established by determining the least common multiple ("LCM") of the number of field poles (not shown) and the number of magnet poles for each of conical magnets 3420a and 3420b. To illustrate, consider that an electrodynamic machine has six field poles (i.e., field pole members) and two magnet poles. Such an electrodynamic machine can be referred to as a "6/2" electrodynamic machine. In this case, the electrodynamic machine has a least common multiple of 6, thereby establishing 6 detent cycles for a mechanical revolution of 360 degrees (i.e., Ndc=LCM (6,2)=6). Thus, alpha can be 30 degrees (i.e., 180/6), as an angle about shaft 3401 between, for example, a magnetic region 3482 representing a north pole on one magnet and another magnetic region 3482 representing a south pole on another magnet. Similarly, consider an example of an electrodynamic machine having nine field poles and six magnet poles (i.e., a "9/6" electrodynamic machine). In this case, the electrodynamic machine has a least common multiple of 18, thereby establishing 18 detent cycles. Thus, alpha in this case can be 10 degrees (i.e., 180/18). An electrodynamic machine having twelve field poles and 10 magnet poles (i.e., a "12/10" electrodynamic machine) has a least common multiple of 60, thereby establishing an alpha of 3 degrees (i.e., 180/60). Note that in some embodiments, rotor structure 3400 can include more or fewer conical magnets 3420a and 3420b, and conical magnets 3420a and 3420b can be any shaped magnet, such as cylindrical magnets. Rotor structure 3400 need not have an offset (i.e., alpha can be zero), according to some embodiments. According to other embodiments, rotor structure 3400 using an arrangement of offset magnets (conical or otherwise) can also be used in combination with other techniques, some of which are discussed herein, to reduce detent and its effects, among other things. Note that in some cases, offsetting conical magnets 3420a and 3420b can reduce the torque production of a motor in which rotor structure 3400 is implemented. So while a specific value for an offset angle, such as alpha 3410, can minimize detent, that specific value for the offset may cause an unacceptable reduction in torque production for the motor. Thus, a designer can back off and reduce the specific value of the offset angle to achieve an optimal detent reduction that keeps the reduction in the torque production of the motor above an acceptable threshold.

According to at least some embodiments, offsetting conical magnets 3420a and 3420b can be referenced relative to directions of polarization. As shown, a direction of polarization depicted as a ray extending out from conical magnet 3420a can be offset from a direction of polarization depicted as a ray for conical magnet 3420b. In particular, a plane including the ray into conical magnet 3420a, such as ray 3489a, can be offset by an angle (e.g., alpha 3410) from another plane that includes the ray for conical magnet 3420b, such as ray 3489b. While planes including rays 3489a and 3489b can pass though axis of rotation 3402, the planes need not be so limited. In the example shown, ray 3489a represents a north pole for a magnet region on conical magnet 3420a, and ray 3489b represents a south pole for a magnet region on conical magnet 3420b. In various embodiments, the directions of polarization (e.g., as illustrated by rays 3489a and 3489b) can be in substantially opposite directions. For example, alpha 3410 between the directions of polarization can be, for example, 0 to 30 degrees. In at least some embodiments, the directions of polarization can be in substantially opposite directions as viewed, for example, in an end view of rotor structure 3400. For example, rays 3489a and 3489b are shown to be in substantially opposite directions as viewed, for example, from the end of shaft 3401. Note that while FIG. 34 depicts rays 3489a and 3489b being perpendicular to axis of rotation 3402, they need not be. For example, rays 3489a and 3489b can be normal (not shown) to portions of magnetic regions for respective conical magnets 3420a and 3420b. In at least some embodiments, directions of polarization (e.g., rays 3489a and 3489b) can be at any angle (with respect to at least portions of magnetic regions 3480), and can be referenced from any point or area on either a portion of a conical magnet or on a magnetic region. Also, the directions of polarization can represent either a north pole or a south pole. According to at least some embodiments, conical magnets 3420a and 3420b can be offset from each other about axis of rotation 3402 by offsetting a magnetic region associated with conical magnet 3420a relative to a magnetic region associated with conical magnet 3420b, where both magnetic regions can be arranged about axis of rotation 3402 to form a portion of a closed flux path between the magnetic regions (e.g., via a field pole member, which is not shown). Thus, the magnetic regions need not be symmetric, and can be offset relative to each other so that their respective detent waveforms can be out of phase (or are substantially out of phase).

Figure 35A:
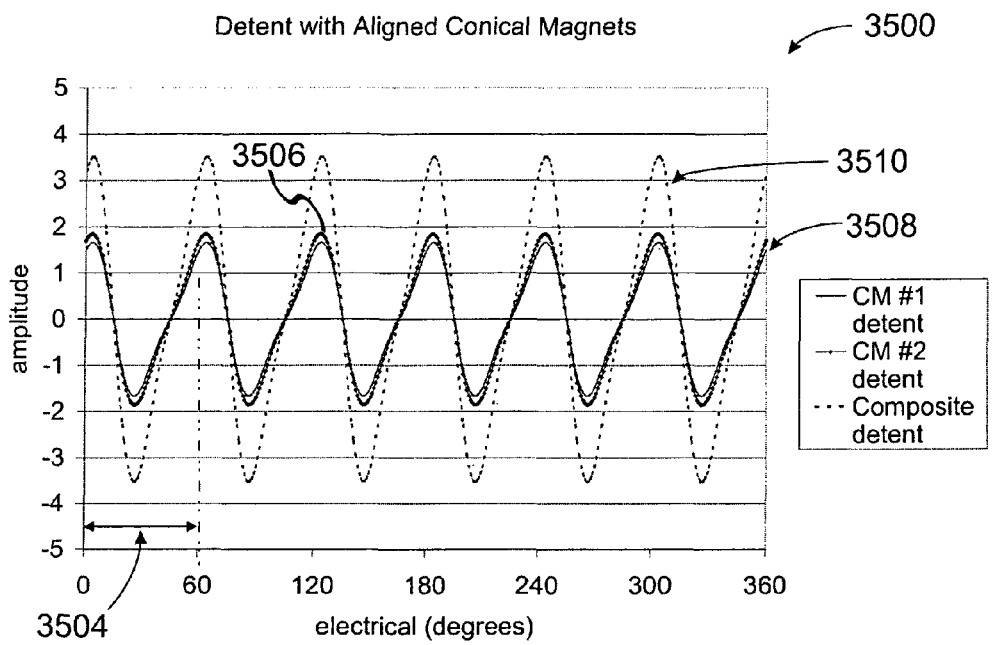
FIGS. 35A and 35B depict amplitudes of detent waveforms for rotor structures implementing arrangements of conical magnets with and without offsets, according to one or more embodiments of the invention.

FIGS. 35 and 36 depict amplitudes of detent waveforms for rotor structures implementing arrangements of conical magnets with and without offsets, according to one or more embodiments of the invention. FIG. 35A is a diagram 3500 showing simulated detent waveforms for a rotor structure in which the directions of polarization of conical magnets are aligned, according to an embodiment of the invention. As such, the detent waveforms can add together in phase to create a composite waveform with an equivalent shape and approximately twice the amplitude of an individual detent waveform. In the example shown, a first conical magnet ("CM #1") can be modeled to produce a detent waveform 3506 and a second conical magnet ("CM #2") can be modeled to produce a detent waveform 3508. Here, the first and second conical magnets are aligned (i.e., alpha angle is about 0 degrees), and, thus, their detent waveforms are in phase. Composite detent waveform 3510 results from adding amplitudes of simulated detent waveforms 3506 and 3508. For purposes of illustration, consider that the first conical magnet is configured to produce detent waveform 3506 with an amplitude of 1.5 units (with a second harmonic of amplitude 0.4 units), whereas second conical magnet is configured to produce detent waveform 3508 with an amplitude of 1.7 units (with a second harmonic of amplitude 0.4 units). Given these amplitudes, composite detent waveform 3510 has an amplitude of approximately 3.2 units. Further to the example, detent waveforms 3506 and 3508 are shown to have a saw tooth-like shape, with the slope of the falling edge being much steeper than the leading edge. Note further that there are six detent cycles 3504 shown for 360 electrical degrees. For a 6/2 electrodynamic machine, the 360 electrical degrees represent 1 revolution of a shaft (i.e., 360 mechanical degrees), whereas for a 9/6 electrodynamic machine, the 360 electrical degrees represent one-third revolution of the shaft (e.g., 120 mechanical degrees).

Figure 35B:
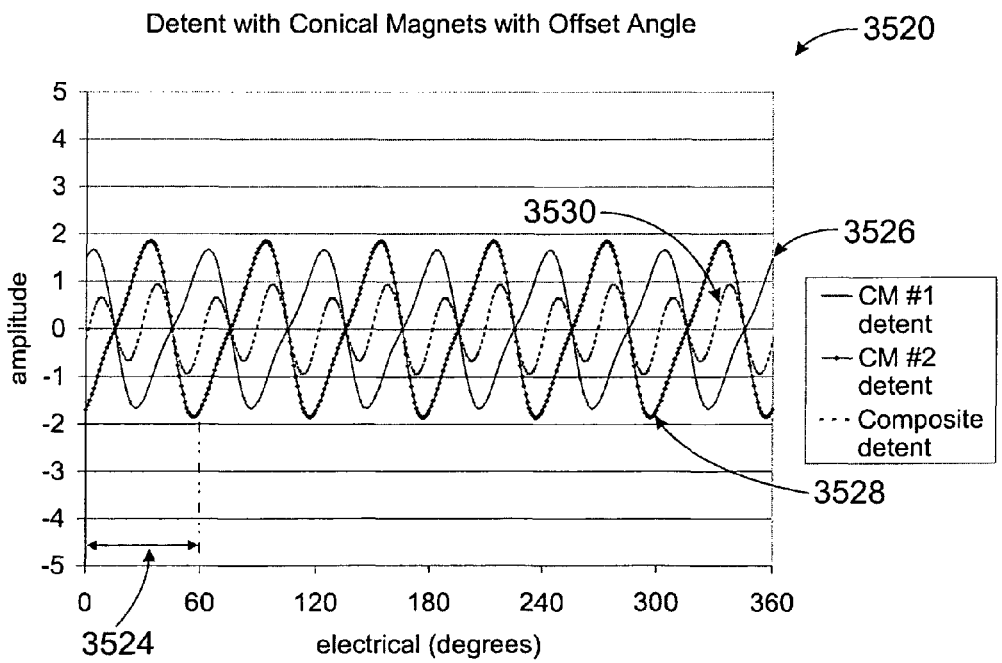

FIG. 35B is a diagram 3520 showing detent waveforms for a rotor structure in which the directions of polarization of conical magnets are offset by one-half a detent cycle, according to an embodiment of the invention. In the example shown, the first conical magnet ("CM #1") of FIG. 35A can be modeled to produce a simulated detent waveform 3526 and the second conical magnet ("CM #2") of FIG. 35A can be modeled to produce a simulated detent waveform 3528, which is shifted by one-half of detent cycle 3524. In FIG. 35B, while detent waveforms 3526 and 3528 have the same amplitudes and harmonics as in FIG. 35A, composite waveform 3530 has a lower amplitude than either of detent waveforms 3526 and 3528. Note that the apparent frequency of composite waveform 3530 can effectively double, depending on, for example, the shape of detent waveforms 3526 and 3528.

Figure 36A:
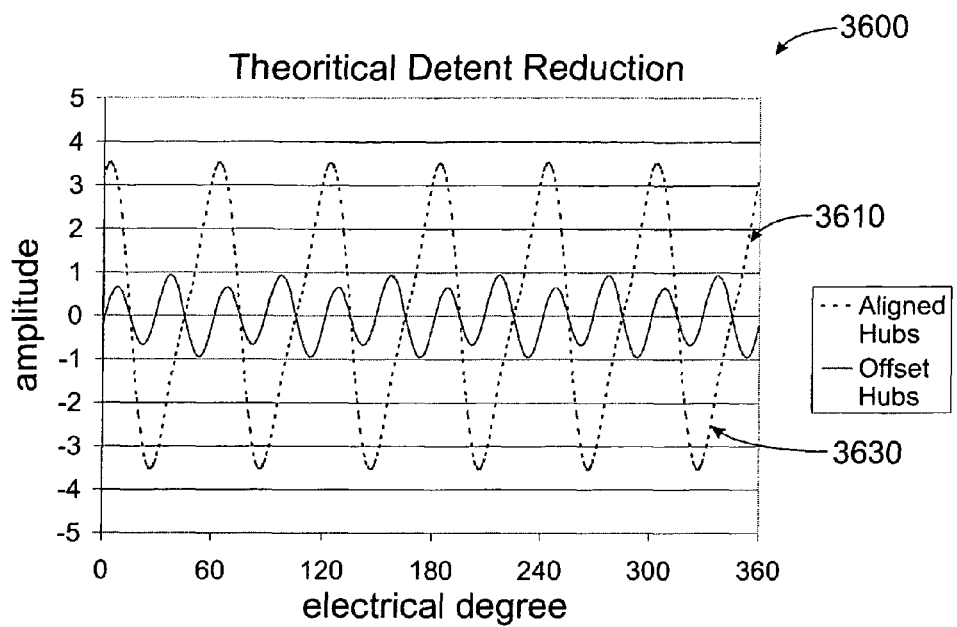
FIGS. 36A and 36B depict amplitudes of composite detent waveforms for rotor structures implementing arrangements of conical magnets with and without offsets, according to one or more embodiments of the invention.

FIG. 36A is a diagram 3600 illustrating composite detent waveform 3530 of FIG. 35B having a lower amplitude than composite detent waveform 3510 of FIG. 35A. Note that further to the example shown, simulated composite detent waveforms 3510 and 3530 can be respectively derived by modeling detent waveforms 3506 and 3508 of FIG. 35A and detent waveforms 3526 and 3528 of FIG. 35B.

Figure 36B:
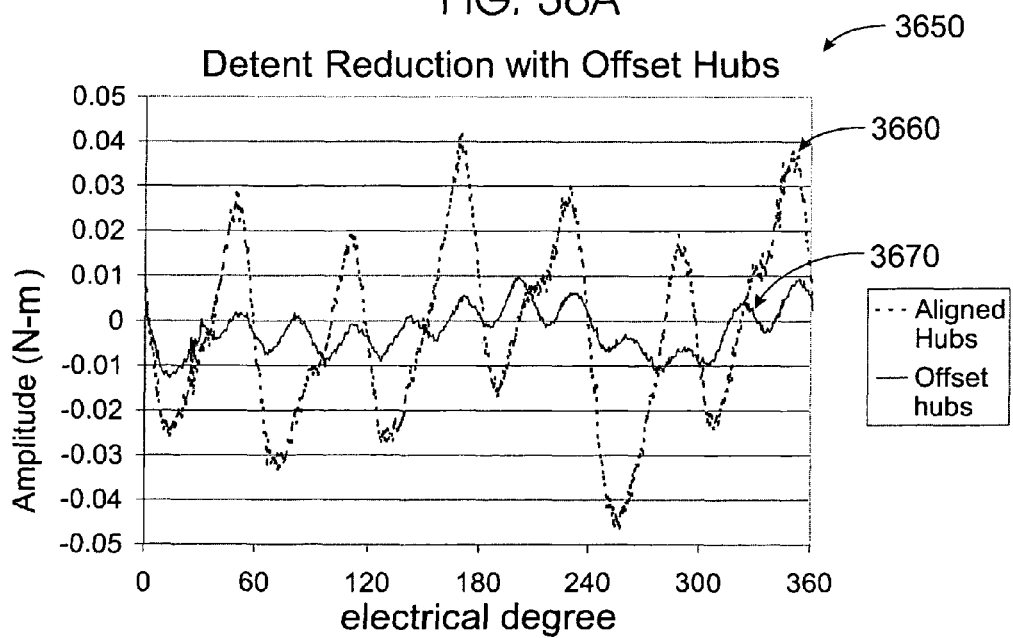

FIG. 36B shows a comparison between other composite waveforms, according to an example of an embodiment. In particular, FIG. 36B provides a diagram 3650 illustrating an example of measured composite detent waveforms 3660 and 3670 that, in this instance, are based on conical magnets that produce detent waveforms that deviate from those shown in FIGS. 35A and 35B due to, for example, differences in manufacturing tolerances. In this example, detent waveform 3660 relates to an arrangement of aligned conical magnets (i.e., alpha≈0 degrees), whereas detent waveform 3670 relates to an arrangement of conical magnets that are offset by, for example, 10 mechanical degrees with respect to each other (not shown) in, for example, a 9/6 electrodynamic machine (e.g., a 9/6 motor).

Figure 37:
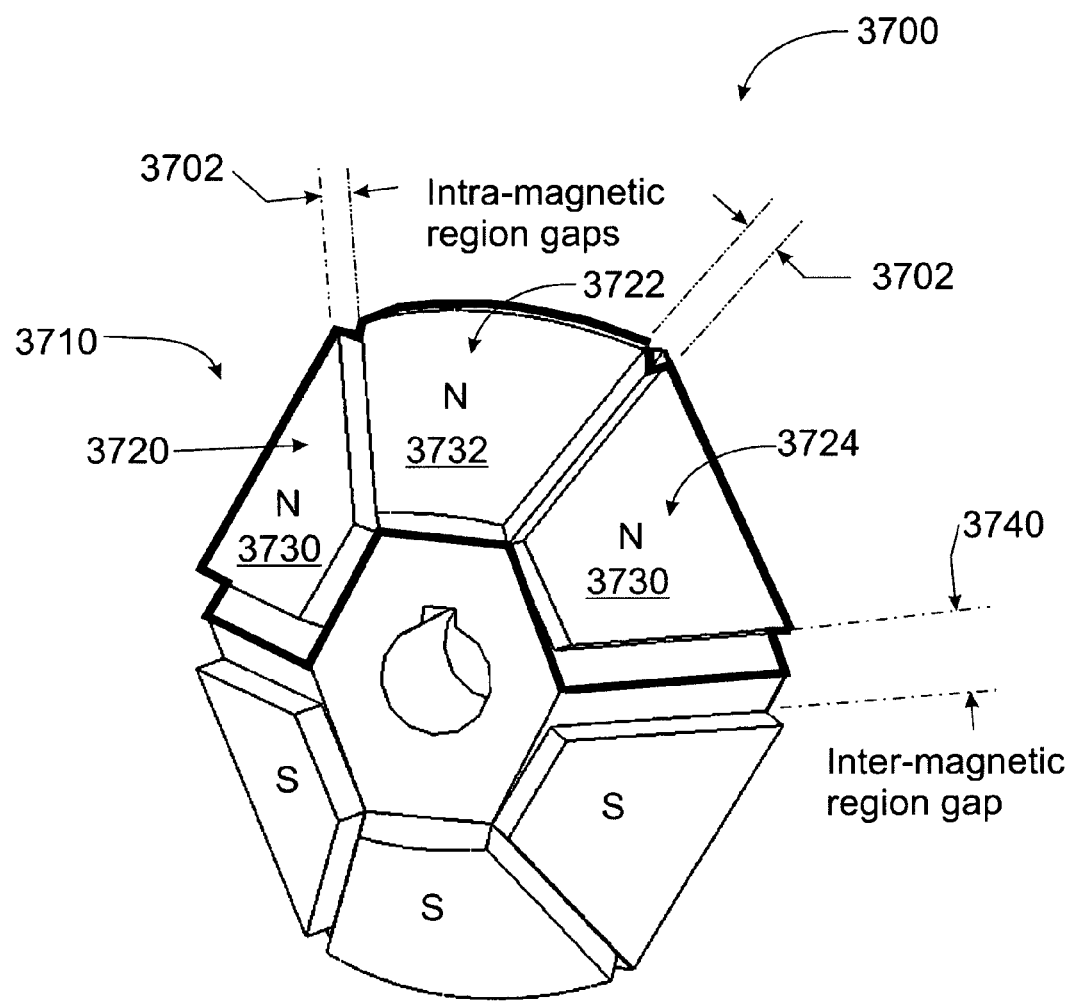
FIG. 37 depicts a conical magnet structure having a magnetic region composed of multiple magnets, in accordance with at least one embodiment of the invention.

FIG. 37 depicts a conical magnet structure having a magnetic region composed of multiple magnets, in accordance with at least one embodiment of the invention. In this example, conical magnet 3700 includes two magnetic regions, with one magnetic region being a north pole and another magnetic region being a south pole. As such, conical magnet 3700 is a two pole conical magnet structure. As shown, magnetic region 3710 can include multiple magnets, such as magnet 3720, magnet 3722, and magnet 3724. Magnetic region 3710 can include one or more intra-magnetic region gaps 3702 and/or one or more inter-magnetic region gaps 3740 (or one or more portions thereof). In the example shown, surfaces 3730 of magnets 3720 and 3724 are flat (or substantially flat), whereas surface 3732 of magnet 3722 includes curvature. In various embodiments, other numbers of magnets and/or magnetic regions can be implemented, as well as other surface shapes.

Figure 38:
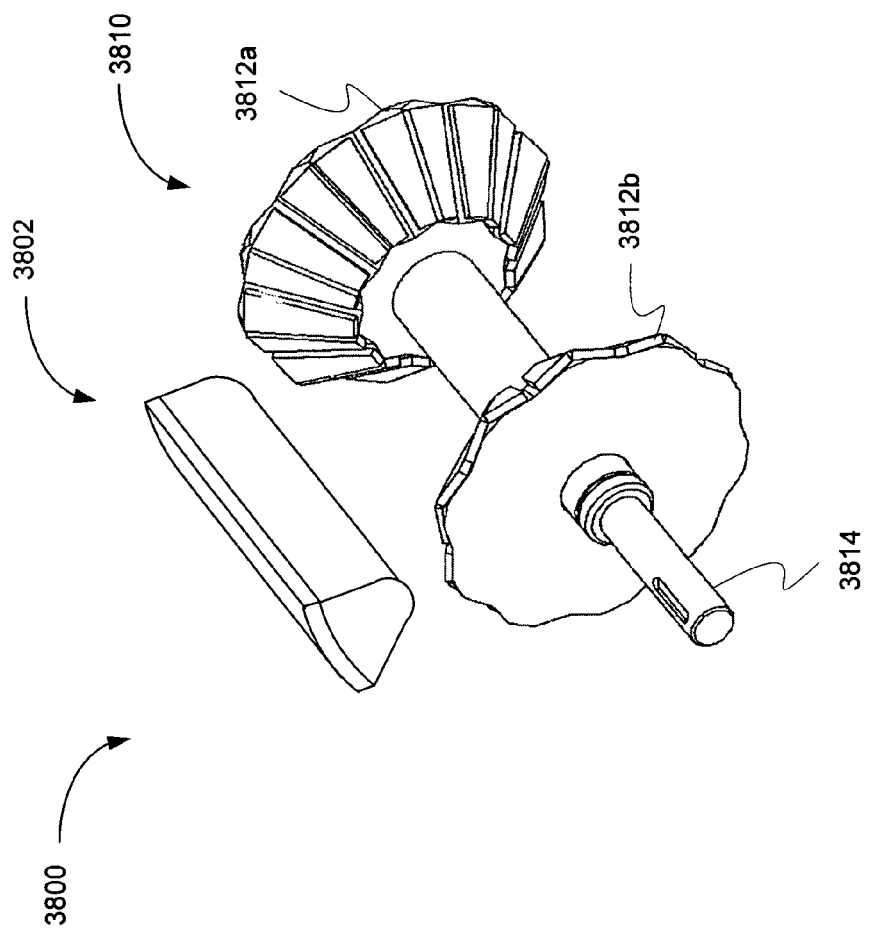
FIG. 38 is an exploded view depicting an example of a rotor-stator structure, according to various embodiments of the invention.

FIG. 38 is an exploded view depicting an example of a rotor-stator structure, according to various embodiments of the invention. Rotor-stator structure 3800 includes a number of field pole members, one field pole member of which is depicted as field pole member 3802. Rotor structure 3810 includes any conical magnet, such as conical magnets 3812a and 3812b, that can be arranged—with or without an offset—on a shaft 3814. To illustrate, consider that conical magnets 3812a and 3812b each had 10 magnetic regions (e.g., 10 poles), and 12 active field pole members that can include field pole member 3802 as well as eleven other field pole members that are not shown. As such, an electrodynamic machine using rotor-structure 3800 can be referred to as a 12/10 electrodynamic machine. In accordance with the various embodiments of the invention, conical magnets 3812a and 3812b conical magnet structures can be composed of any kind of magnet, including the various magnets discussed herein. According to various embodiments, field pole member 3802 and other field pole members (not shown) can be active field pole members.

The foregoing description, for purposes of explanation, used specific nomenclature to provide a thorough understanding of the various embodiments of the invention. However, it will be apparent to one skilled in the art that specific details are not required in order to practice the various embodiments of the invention. In fact, this description should not be read to limit any feature or aspect of the various embodiments of the invention to any embodiment; rather features and aspects of one embodiment may readily be interchanged with other embodiments. For example, although the above description of the embodiments relate to a motor, the discussion is applicable to all electrodynamic machines, such as to a generator.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles the various embodiments of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of embodiments of the invention.

The invention claimed is:

1. A rotor-stator structure for electrodynamic machine comprising:
field pole members each having an elongated shape oriented axially about an axis of rotation between pole faces disposed and the ends of the field pole members, the pole faces each having a surface oriented at an acute angle to the axis of rotation; and
conical magnets arranged on the axis of rotation adjacent the pole faces, at least one of the conical magnets is a conical magnet comprising magnetic regions configured to confront at least a subset of the pole faces to form air gaps, the magnetic region having a surface being substantially coextensive with one or more acute angles to the axis of rotation, the magnetic regions each including one or more magnets and a magnetically permeable material disposed adjacent the one or more magnets, the one or more magnets having directions of polarization oriented circumferentially to establish a flux path portion between the surface of the magnetic region and at least one pole face in the subset of the pole faces, the flux path portion oriented at another acute angle relative to the axis of rotation.

2. The rotor-stator structure of claim 1 wherein the magnetic region comprises:
a surface positioned at multiple radial distances from the axis of rotation in a plane perpendicular to the axis of rotation.

3. The rotor-stator structure of claim 2 wherein the surface further comprises:
a shape in accordance with the multiple radial distances to provide flux to the subset of the pole faces in a substantially sinusoidal manner.

4. The rotor-stator structure of claim 1 wherein the magnetic region comprises:
one or more magnetic region portions that are configured to modify an air gap thickness for at least one of the air gaps in a plane perpendicular to the axis of rotation.

5. The rotor-stator structure of claim 4 wherein the one or more magnetic region portions comprises:
the one or more magnets.

6. The rotor-stator structure of claim 1 wherein the magnetic region comprises:
a magnetically permeable layer disposed on the one or more magnets.

7. The rotor-stator structure of claim 1 wherein the magnetic region further comprises:
one or more magnetic region portions, at least one of which is configured to influence the shape of a portion of a sinusoidal flux waveform.

8. The rotor-stator structure of claim 1 wherein the conical magnet further comprises:
a shaft; and
a hub configured to be disposed on the shaft,
wherein the hub is configured to support an arrangement of magnetic regions that includes the magnetic region.

9. The rotor-stator structure of claim 1 wherein the magnetic region further comprises:
a medial portion; and
lateral portions,
wherein the surface is configured to position the medial portion farther from the axis of rotation than the lateral portions.

10. The rotor-stator structure of claim 1 wherein the magnetic region further comprises:
a surface configured to determine a first portion of a sinusoidal flux waveform.

11. The rotor-stator structure of claim 1 wherein the magnetic region further comprises:
a medial portion that is configured to determine a second portion of a sinusoidal flux waveform.

12. The rotor-stator structure of claim 11 wherein the medial portion comprises:
an intra-magnetic region gap.

13. The rotor-stator structure of claim 1 wherein the magnetic region further comprises:
lateral portions that are configured to determine a third portion of a sinusoidal flux waveform.

14. The rotor-stator structure of claim 13 wherein at least one of the lateral portions comprises:
at least a part of an inter-magnetic region gap.

15. The rotor-stator structure of claim 1 wherein the magnetic region comprises:
magnets; and
a magnetically permeable material disposed between the magnets.

16. The rotor-stator structure of claim 15 wherein the magnets comprise:
a first magnet having a first polarity substantially normal to a first surface of the first magnet;
a second magnet having a second polarity substantially normal to a second surface of the second magnet, the second surface confronting the first surface,
wherein the magnetically permeable material is disposed between the first surface and the second surface.

17. The rotor-stator structure of claim 16 wherein the first polarity and the second polarity is the same polarity, the first polarity and the second polarity each being either a north pole or a south pole.

* * * * *